(12) United States Patent
Nguyen

(10) Patent No.: US 9,087,319 B2
(45) Date of Patent: Jul. 21, 2015

(54) SYSTEM AND METHOD FOR DESIGNING, DEVELOPING AND IMPLEMENTING INTERNET SERVICE PROVIDER ARCHITECTURES

(75) Inventor: John V. Nguyen, Round Rock, TX (US)

(73) Assignee: Oracle America, Inc., Redwood City, CA (US)

( * ) Notice: Subject to any disclaimer, the term of this patent is extended or adjusted under 35 U.S.C. 154(b) by 3055 days.

(21) Appl. No.: 10/375,589

(22) Filed: Feb. 27, 2003

(65) Prior Publication Data
US 2003/0172145 A1 Sep. 11, 2003

Related U.S. Application Data

(60) Provisional application No. 60/363,175, filed on Mar. 11, 2002.

(51) Int. Cl.
G06Q 10/10 (2012.01)
H04L 12/18 (2006.01)
H04L 12/14 (2006.01)

(52) U.S. Cl.
CPC ............... *G06Q 10/10* (2013.01); *H04L 12/14* (2013.01); *H04L 12/1403* (2013.01); *H04L 12/185* (2013.01)

(58) Field of Classification Search
CPC ... H04L 12/14; H04L 12/185; H04L 12/1403; H04L 12/1428; H04L 12/5695; H04L 41/12; H04L 41/18; H04L 41/5003; H04L 41/5029; H04Q 2213/1313; H04Q 2213/13349; H04Q 2213/13389; H04Q 3/0062
USPC .......................................... 709/223, 228, 230
See application file for complete search history.

(56) References Cited

U.S. PATENT DOCUMENTS

| | | | |
|---|---|---|---|
| 5,867,495 A | 2/1999 | Elliott et al. | |
| 6,128,624 A * | 10/2000 | Papierniak et al. | 1/1 |
| 6,335,927 B1 | 1/2002 | Elliott et al. | |
| 6,754,181 B1 | 6/2004 | Elliott et al. | |
| 6,782,412 B2 | 8/2004 | Brophy et al. | |

(Continued)

OTHER PUBLICATIONS

Kar et al., "Managing Application Services over Service Provider Networks: Architecture and Dependency Analysis," Proceedings of the Seventh IEEE/IFIP Network Operations and Management Synmposium (NOMS 2000), Apr. 2000, (14 Pages).

*Primary Examiner* — Barbara Burgess
(74) *Attorney, Agent, or Firm* — Robert C. Kowert; Meyertons, Hood, Kivlin, Kowert & Goetzel, P.C.

(57) ABSTRACT

System and method for designing, developing and implementing Internet Service Provider (ISP) architectures. One embodiment of a method for designing and implementing ISP architectures may include formulating a set of design requirements for an ISP architecture, establishing an architectural model for the ISP architecture using the set of design requirements, generating a logical design for the ISP architecture from the architectural model and the set of design requirements, and generating a physical design for the ISP architecture using the architectural model and the logical design. One embodiment may also include selecting one or more components of the ISP architecture and implementing the ISP architecture according to the logical design and the physical design. In one embodiment the system and method for designing, developing and implementing ISP architectures may be used to design, develop and implement an N-tiered ISP architecture.

108 Claims, 43 Drawing Sheets

(56) References Cited

U.S. PATENT DOCUMENTS

| | | | |
|---|---|---|---|
| 6,917,816 B2* | 7/2005 | Abed et al. | 455/556.1 |
| 7,145,898 B1* | 12/2006 | Elliott | 370/352 |
| 7,149,698 B2* | 12/2006 | Guheen et al. | 705/319 |
| 7,162,427 B1* | 1/2007 | Myrick et al. | 705/348 |
| 7,346,539 B1* | 3/2008 | Atkinson et al. | 705/7.32 |
| 2001/0013001 A1* | 8/2001 | Brown et al. | 704/270.1 |
| 2001/0053991 A1* | 12/2001 | Bonabeau | 705/7 |
| 2003/0140131 A1* | 7/2003 | Chandrashekhar et al. | 709/223 |
| 2003/0149746 A1* | 8/2003 | Baldwin et al. | 709/219 |

* cited by examiner

| Scaling Model: | Vertical | Horizontal |
|---|---|---|
| System type: | Single Large System | Multiple Small Systems |
| Application type: | Multithreaded | Single-threaded |
| To scale: | Add CPU, memory, disk, and I/O | Add additional systems |

*FIG. 10*

| Uptime Percentage | # of Nines | Allowable Downtime Per Month |
|---|---|---|
| 99.9999 | 6 | 0.043 minute |
| 99.999 | 5 | 0.43 minute |
| 99.99 | 4 | 4.30 minutes |
| 99.9 | 3 | 43 minutes |
| 99.0 | 2 | 7.2 hours |

*FIG. 11*

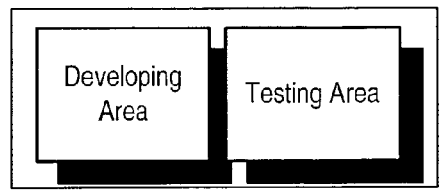
FIG. 19
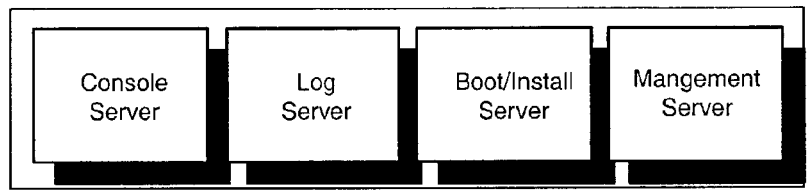
FIG. 20
FIG. 21
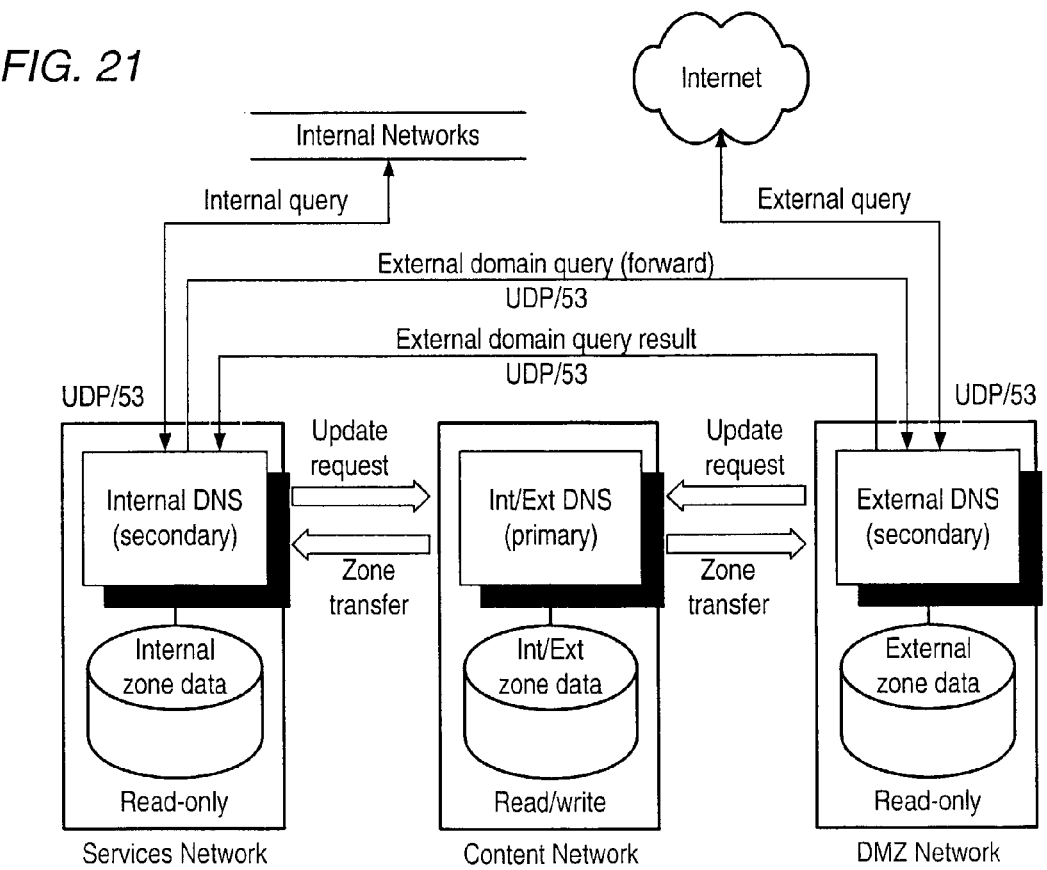

| VLANs | Subnets | Addresses | Broadcast | Netmask |
|---|---|---|---|---|
| A1 | 10.0.0.0 | 10.0.0.1-2 | 10.0.0.3 | 255.255.255.252 |
| A2 | 10.0.0.4 | 10.0.0.5-6 | 10.0.0.7 | 255.255.255.252 |
| A3 | 10.0.0.8 | 10.0.0.9-10 | 10.0.0.11 | 255.255.255.252 |
| ... | ... | ... | ... | ... |
| A62 | 10.0.0.244 | 10.0.0.245-246 | 10.0.0.247 | 255.255.255.252 |
| A63 | 10.0.0.248 | 10.0.0.249-250 | 10.0.0.251 | 255.255.255.252 |
| A64 | 10.0.0.252 | 10.0.0.253-254 | 10.0.0.255 | 255.255.255.252 |

*FIG. 33*

| VLANs | Subnets | Addresses | Broadcast | Netmask |
|---|---|---|---|---|
| B1 | 10.0.0.0 | 10.0.0.1-14 | 10.0.0.15 | 255.255.255.240 |
| B2 | 10.0.0.16 | 10.0.0.17-30 | 10.0.0.31 | 255.255.255.240 |
| B3 | 10.0.0.32 | 10.0.0.33-46 | 10.0.0.47 | 255.255.255.240 |
| ... | ... | ... | ... | ... |
| B14 | 10.0.0.208 | 10.0.0.209-222 | 10.0.0.223 | 255.255.255.240 |
| B15 | 10.0.0.224 | 10.0.0.225-238 | 10.0.0.239 | 255.255.255.240 |
| B16 | 10.0.0.240 | 10.0.0.241-254 | 10.0.0.255 | 255.255.255.240 |

*FIG. 34*

| VLANs | Subnets | Addresses | Broadcast | Netmask |
|---|---|---|---|---|
| C1 | 10.0.0.0 | 10.0.0.1-254 | 10.0.0.255 | 255.255.255.0 |
| C2 | 10.0.1.0 | 10.0.1.1-254 | 10.0.1.255 | 255.255.255.0 |
| C3 | 10.0.2.0 | 10.0.2.1-254 | 10.0.2.255 | 255.255.255.0 |
| ... | ... | ... | ... | ... |
| C254 | 10.0.253.0 | 10.0.253.1-254 | 10.0.253.255 | 255.255.255.0 |
| C255 | 10.0.254.0 | 10.0.254.1-254 | 10.0.254.255 | 255.255.255.0 |
| C256 | 10.0.255.0 | 10.0.255.1-254 | 10.0.255.255 | 255.255.255.0 |

*FIG. 35*

| Variable | Value | Description |
|---|---|---|
| T | Environment dependent | Total number of subscribers |
| $P_{act}$ | Environment dependent | Percentage of active email users |
| $S_{ave}$ | Environment dependent | Average email message size |
| $N_{rev}$ | Environment dependent | Average email messages received per user per day |
| $S_{nsa}$ | $T \times P_{act} \times S_{ave} \times N_{rev}$ | Average storage for active email users |
| $S_{MSP}$ | Environment dependent | Average storage for email queue |
| $S_{MSM}$ | Environment dependent | Maximum email storage quota per subscriber |
| $S^{msq}$ | Environment dependent | Maximum storage for email queue |
| $S_{mss}$ | Application dependent | Storage requirement for email software and various plug-ins |

FIG. 36

| Variable | Value | Description |
|---|---|---|
| T | Environment dependent | Total number of subscribers |
| $P_{con}$ | Environment dependent | Percentage of concurrency |
| $P_{act}$ | Environment dependent | Percentage of active email users |
| $P_{pop}$ | Environment dependent | Percentage of POP users |
| $P_{ima}$ | Environment dependent | Percentage of IMAP users |
| $M_{msi}$ | Application dependent | Memory footprint per IMAP connection |
| $M_{msp}$ | Application dependent | Memory footprint per POP connection |
| $M_{mst}$ | Application dependent | Memory footprint per simple mail transfer protocol (SMTP) connection |
| $M_{msb}$ | Application dependent | Memory requirement for email server |

FIG. 37

| Variable | Value | Description |
| --- | --- | --- |
| T | Environment dependent | Total number of subscribers |
| $P_{act}$ | Environment dependent | Percentage of active users with web pages |
| $S_{ave}$ | Environment dependent | Average web storage size per user |
| $S_{wsa}$ | $T \times P_{act} \times S_{ave}$ | Average storage for active users with web pages |
| $S_{wcd}$ | Environment dependent | Average storage for web cache |
| $S_{wsw}$ | Environment dependent | Maximum web storage quota per subscriber |
| $S_{wsc}$ | Environment dependent | Maximum storage for web cache |
| $S_{wss}$ | Application dependent | Storage requirement for web software and various plug-ins |

*FIG. 38*

| Variable | Value | Description |
| --- | --- | --- |
| T | Environment dependent | Total number of subscribers |
| $P_{con}$ | Environment dependent | Percentage of concurrency |
| $N_{web}$ | Environment dependent | Number of web servers |
| $N_{par}$ | 1 | Number of parent processes |
| $N_{pro}$ | Environment dependent | Number of child processes (fork/exec model) |
| $N_{thr}$ | Environment dependent | Number of threads (thread model) |
| $N_{con}$ | Environment dependent | Peak number of HTTP connections |
| $M_{wsc}$ | Application dependent | Memory footprint per HTTP connection |
| $M_{wss}$ | Application dependent | Memory footprint per child process (fork/exec model) |
| $M_{wsl}$ | Application dependent | Memory footprint per thread (thread model) |

*FIG. 39*

| Variable | Value | Description |
| --- | --- | --- |
| $S_{nsa}$ | Time dependent | Storage requirement for daily news articles for a full feed |
| $S_{nsh}$ | Environment dependent | Storage requirement for news spooler, history, and index |
| $S_{nss}$ | Application dependent | Storage requirement for news software |

*FIG. 40*

| Variable | Value | Description |
| --- | --- | --- |
| T | Environment dependent | Total number of subscribers |
| $P_{con}$ | Environment dependent | Percentage of concurrency |
| $P_{act}$ | Environment dependent | Percentage of active news users |
| $M_{nss}$ | Application dependent | Memory footprint per news server |
| $N_{nfd}$ | Environment dependent | Number of downstream feeds |
| $M_{nfd}$ | Application dependent | Memory requirement per downstream feed |
| $N_{nco}$ | $T \times P_{con} \times P_{act}$ | Peak number of news connection |
| $M_{nco}$ | Application dependent | Memory footprint per news connection |

*FIG. 41*

| Variable | Value | Description |
| --- | --- | --- |
| $S_{fss}$ | Application dependent | Storage requirement for FTP software |
| $S_{fsu}$ | Environment dependent | Storage requirement for FTP spool |

*FIG. 42*

| Variable | Value | Description |
| --- | --- | --- |
| $M_{ftp}$ | Application dependent | Memory footprint per FTP process |
| $N_{ftp}$ | Environment dependent | Number of concurrent FTP connections |

*FIG. 43*

| Variable | Value | Estimation |
|---|---|---|
| $S_{dns}$ | Application dependent | Storage requirement for DNS software |
| $S_{dnd}$ | Environment dependent | Storage requirement for DNS zone Databases |

*FIG. 44*

| Variable | Value | Description |
|---|---|---|
| $M_{dns}$ | Application dependent | Memory requirement per DNS server |
| $M_{zon}$ | Environment dependent | Memory requirement for zone database |

*FIG. 45*

| Variable | Value | Description |
|---|---|---|
| T | Environment dependent | Total number of subscribers |
| $S_{rse}$ | Application dependent | Average size for a RADIUS database entry |
| $S_{rsd}$ | $T \times S_{rse}$ | Storage requirement for RADIUS database |
| $S_{rss}$ | Application dependent | Storage requirement for RADIUS software |
| $S_{rsl}$ | Environment dependent | Storage requirement for RADIUS log |

*FIG. 46*

| Variable | Value | Description |
|---|---|---|
| T | Environment dependent | Total number of subscribers |
| $P_{con}$ | Environment dependent | Percentage of concurrency |
| $N_{rsc}$ | $T \times P_{con}$ | Peak number of RADIUS authentication |
| $M_{rso}$ | Application dependent | Memory footprint per RADIUS authentication |
| $M_{rsa}$ | $N_{rsc} \times S_{rse}$ | Memory requirement for RADIUS authentications |
| $M_{rss}$ | Application dependent | Memory requirement for RADIUS server |

*FIG. 47*

| Variable | Value | Description |
|---|---|---|
| T | Environment dependent | Total number of subscribers |
| $S_{dse}$ | Environment dependent | Average size for a directory database entry |
| $S_{dsd}$ | $T \times S_{dse}$ | Storage requirement for directory database |
| $S_{dsi}$ | $2 \times S_{dsd}$ | Storage requirement for directory index |
| $S_{dss}$ | Application dependent | Storage requirement for directory software |

FIG. 48

| Variable | Value | Description |
|---|---|---|
| T | Environment dependent | Total number of subscribers |
| $M_{dss}$ | Application dependent | Memory requirement for directory server |

FIG. 49

| Variable | Value | Description |
|---|---|---|
| T | Environment dependent | Total number of subscribers |
| $S_{dhe}$ | Application dependent | Average size for a DHCP database entry |
| $S_{dhd}$ | $T \times S_{dhe}$ | Storage requirement for DHCP database |
| $S_{dhs}$ | Application dependent | Storage requirement for DHCP software |

FIG. 50

| Variable | Value | Description |
|---|---|---|
| T | Environment dependent | Total number of subscribers |
| $P_{con}$ | Environment dependent | Percentage of concurrency |
| $N_{dhc}$ | $T \times P_{con}$ | Peak number of DHCP leases |
| $M_{dhl}$ | Application dependent | Memory footprint per DHCP lease |
| $M_{dhd}$ | $N_{dhc} \times M_{dhl}$ | Memory requirement for DHCP leases |
| $M_{dhs}$ | Application dependent | Memory footprint for DHCP server |

FIG. 51

| Variable | Value | Description |
|---|---|---|
| $S_{nts}$ | Application dependent | Storage requirement for NTP software |

FIG. 52

| Variable | Value | Description |
|---|---|---|
| $M_{nts}$ | Application dependent | Memory requirement for NTP server |

FIG. 53

| Variable | Value | Description |
|---|---|---|
| $S_{bsi}$ | Environment dependent | Storage requirement for backup indexes |
| $S_{bss}$ | Application dependent | Storage requirement for backup software |

FIG. 54

| Variable | Value | Description |
|---|---|---|
| $M_{bsd}$ | Application dependent | Memory requirement for backup server |

FIG. 55

| Variable | Value | Description |
|---|---|---|
| $S_{fws}$ | Application dependent | Storage requirement for firewall software, objects, and policy |
| $S_{fwl}$ | Environment dependent | Storage requirement for firewall logs |

*FIG. 56*

| Variable | Value | Description |
|---|---|---|
| $M_{fws}$ | Platform dependent | Memory requirement for firewall |

*FIG. 57*

| Variable | Value | Description |
|---|---|---|
| $S_{lss}$ | Environment dependent | Storage requirement for log spooler |
| $S_{lsa}$ | Environment dependent | Storage requirement for log archive |

*FIG. 58*

| Variable | Value | Description |
|---|---|---|
| $M_{lss}$ | Environment dependent | Memory requirement for log server |

*FIG. 59*

| Variable | Value | Description |
|---|---|---|
| $S_{oss}$ | Vendor dependent | Storage requirement for operating system |
| $S_{swp}$ | Recommend at least twice the amount of RAM | Storage requirement for swap space |
| $S_{osl}$ | Environment dependent | Storage requirement for log archive |
| $S_{app}$ | Environment dependent | Storage requirement for native and third party applications |

*FIG. 60*

| Partition | Filesystem | Description |
|---|---|---|
| 0 | / | Root (the first partition is always the root partition). |
| 1 | swap | Swap (the second partition is typically the swap partition) |
| 2-7 | Operating system dependent | /usr (binaries and libraries), /var (logs and patches), and /export (home directories) |

*FIG. 61*

| Variable | Value | Description |
|---|---|---|
| /data | Environment dependent | Data (MailStores, web contents, news articles, etc.) |

*FIG. 62*

| Type | Size | Specification |
|---|---|---|
| Front-End Servers (DNS, DHCP, NTP, RADIUS, firewalls, mail relays, mail proxies, news readers, web servers, boot/install, etc.) | Small (horizontal scalability only) | Uniprocessor (1 CPU, <= 1 GB RAM) |
| Mid-Size Servers (application, backup, LDAP replicas, management, etc.) | Medium (horizontal and limited scalability) | Multiprocessor (<= 4 CPU, <= 4 GB RAM) |
| Back-End Servers (NFS, MailStore, database, LDAP master, billing system, etc.) | Large (horizontal and high scalability) | Multiprocessor (>= 4 CPU, >= 4 GB RAM) |

*FIG. 63*

| Variable | Value | Description |
|---|---|---|
| $T$ | Environment dependent | Total number of subscribers |
| $P_{con}$ | Environment dependent | Percentage of concurrent users |
| $B_{usr}$ | Environment dependent | Average network bandwidth consumption per user |
| $B_{the}$ | Hardware dependent | Theoretical network bandwidth |
| $B_{sat}$ | $40\% \times B_{the}$ | Network bandwidth saturation level |
| $B_{ove}$ | $10\% \times B_{the}$ | Network bandwidth overhead |

*FIG. 64*

| Variable | Value | Description |
|---|---|---|
| T | Environment dependent | Total number of subscribers |
| $P_{con}$ | Environment dependent | Percentage of concurrency |

*FIG. 65*

| Variable | Value | Description |
|---|---|---|
| T | Environment dependent | Total number of subscribers |
| $P_{con}$ | Environment dependent | Percentage of concurrent users |
| $B_{usr}$ | Environment dependent | Average bandwidth consumption per user |
| L | Hardware dependent | Bandwidth supported per high-speed trunk |

*FIG. 66*

| Variable | Value | Description |
|---|---|---|
| T | Environment dependent | Total number of subscribers |
| $P_{con}$ | Environment dependent | Percentage of concurrent users |
| C | Hardware dependent | Number of channels supported per high speed trunk |

*FIG. 67*

| Variable | Value | Description |
|---|---|---|
| $N_{wan}$ | Environment dependent | Number of WAN interfaces slots (T1, T3, etc.) |
| $N_{lan}$ | Environment dependent | Number of fixed LAN ports (10/100 Mbps) |

*FIG. 68*

| Variable | Value | Description |
|---|---|---|
| $N_{ser}$ | Environment dependent | Number of servers connected to the switch (e.g. mail relays, mail proxies, web servers, application servers, DNS servers, etc.) |
| $N_{apl}$ | Environment dependent | Number of network appliances connected to the switch (e.g. firewalls, load balancers, cache engines, IDS sensors, console servers, access servers, etc.) |
| $N_{adm}$ | Environment dependent | Number of network ports required for administrative purposes (e.g. trunking, heartbeats, failover, etc.) |
| $N_{ave}$ | Environment dependent | Number of network ports required for immediate growth. |

*FIG. 69*

| Variable | Value | Description |
|---|---|---|
| $N_{ser}$ | Environment dependent | Number of servers connected to the console server (e.g. mail relays, mail proxies, web servers, application servers, DNS servers, etc.) |
| $N_{apl}$ | Environment dependent | Number of network appliances connected to the console server (e.g. firewalls, load balancers, cache engines, IDS sensors, access servers, routers, switches, etc.) |
| $N_{ove}$ | Environment dependent | Number of console ports required for immediate growth |

*FIG. 70*

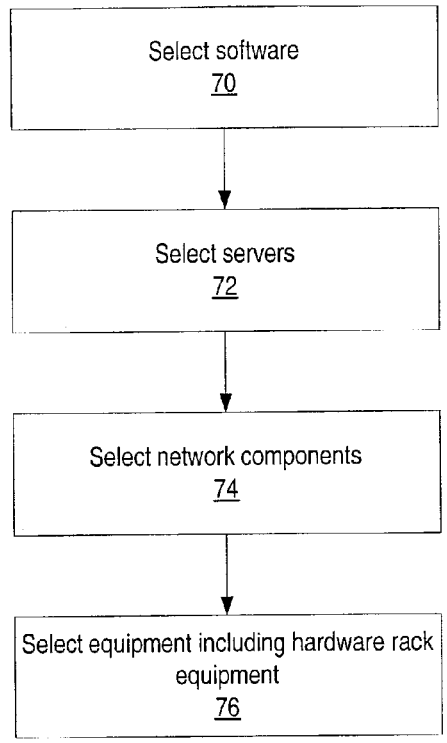
FIG. 71
| Type | Specification | Associated Tier |
|---|---|---|
| Front-end | Uniprocessor (1 CPU, ? 1 GB RAM) | DMZ and services networks |
| Mid-range | Multiprocessor (? 4 CPU, ? 4 GB RAM) | Application, backup, and management networks |
| Back-end | Multiprocessor (? 4 CPU, ? 4 GB RAM) | Content network |
FIG. 72
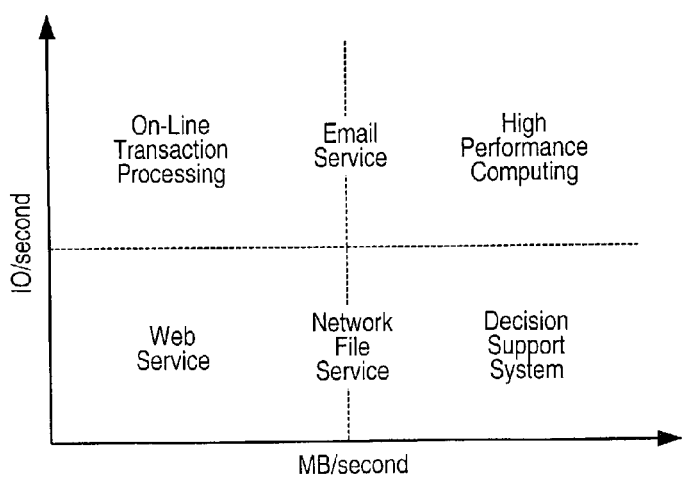
FIG. 73

Dedicated Web Sites

Shared Web Front-End Processors

Web Content Servers

Web Content Storage

SYSTEM AND METHOD FOR DESIGNING, DEVELOPING AND IMPLEMENTING INTERNET SERVICE PROVIDER ARCHITECTURES

PRIORITY INFORMATION

This application claims benefit of priority to provisional application Ser. No. 60/363,175 filed Mar. 11, 2002 titled INTERNET SERVICE PROVIDER ARCHITECTURE, which is hereby incorporated by reference in its entirety.

BACKGROUND OF THE INVENTION

1. Field of the Invention

This invention relates to networking, and more particularly to architectures for Internet Service Providers (ISPs).

2. Description of the Related Art

In the early days of the Internet, Internet Service Providers (ISPs) served relatively few clients and offered a typically narrow scope of services. As a result, the first generation Internet services infrastructures combined the few required applications onto a single server or a small number of servers. This monolithic architecture design inherently limited the number of clients that could be served and the variety of services that could be offered. As demand for Internet applications expanded, ISPs could not react quickly enough to scale their systems capacity or offer new services.

A new generation of ISPs has emerged that combine the increased scalability of multi-threaded applications with dedicated hardware for each independent service. This "stovepipe" infrastructure design enabled ISPs to scale their service offerings to support hundreds of thousands, even millions of customers. While this type of design addressed the scalability issues of first generation designs, adding new services required adding new stovepipes, (that is, new dedicated hardware) for each additional service. From a business perspective, the stovepipe Internet services infrastructure was costly to implement, difficult to manage, and not flexible enough to allow rapid changes or additions to service offerings.

In a relatively short time, the Internet has become a major marketplace. Service providers of every size and composition are active in the market, and both new and established companies are looking for ways to increase subscribers, services, and, ultimately, revenues. Even though the ISP market has matured, significant opportunities still exist, especially for international ISPs, to capitalize on niche and underdeveloped marketplaces and to add new residential and business subscribers. As bandwidth becomes available at an increasingly affordable cost, ISPs look for new value-added services and ways to attract new subscribers. The ISPs with established infrastructures are uniquely positioned to leverage their expertise and scale. In addition, ISPs are seeking new channels for their services and opportunities to reach new subscribers.

FIG. 1 illustrates segmentation of the Internet Service Provider market. Service providers may be classified into three classes: network service providers (NSPs), application service providers (ASPs), and Internet service providers (ISPs). Each of these types of service providers is developing their specific market while making inroads into complementary areas. Companies that provide services in all three areas are known as Full Service Providers.

NSPs are companies that offer high-speed backbone Internet access. These companies are typically large telecommunication providers and network equipment providers, and may own and operate networked, wireless, and wireline telephones, cable, and satellite. For example, some NSPs in the market today are AT&T$^{SM}$, BBN®, Bell South, Level3, Qwest®, and UUNet®. ASPs are companies that offer online application hosting to businesses. ASPs provide businesses such as ISPs with applications and infrastructure for running applications over the Internet. These applications are usually provided via a wide area network (WAN) from a centralized data center. Businesses operating over the Internet most often outsource Information Technology (IT) functions to ASPs, to save time and money. For example, some ASPs in the market today are PeopleSoft®, TIBCO™, VerticalNet™, ATG®, and Oracle. ISPs provide Internet access and services to business and residential subscribers. For example, some ISPs in the market today are America Online$^{SM}$ (AOL$^{SM}$) AT&T Broadband Internet$^{SM}$, Mindspring™, and Earthlink™.

In response to decreasing market share and new opportunities, many traditional telecommunication companies have shifted business strategies and become NSPs, then integrated ASP and ISP characteristics. By having all classes under one roof, these companies provide a one-stop portal for both business and residential subscribers. Smaller ISPs that offer high-speed Internet access via digital subscriber lines (DSL) or cable modems are more likely to grow in the competitive market. Growth patterns and customer satisfaction surveys indicate both national and regional ISPs that want to attract new customers have to offer high-speed service. In response to customer demand, local cable and regional telephone providers are gearing up to roll out more DSL and cable modem services.

Change is constant on the Internet. High-speed access appears to be a trend for the next several years. Predictions are that broadband will grow quickly, and that DSL and fixed wireless access will gain on cable. Increasing consumer demand and technical innovations with self-provisioning are cited as the major cause for this growth. Fixed wireless and two-way satellite technologies are being deployed as alternatives to DSL and cable modem. These technologies substitute where cable modem and DSL services are unavailable. In some cases, these technologies directly compete with DSL and cable modem. In general, cable subscribers are more satisfied with their broadband service than DSL subscribers. DSL access remains popular among small businesses.

Many businesses are looking to enter or expand their business in the ISP market. Entering the ISP market may present daunting infrastructure challenges. The entrance to the ISP market typically involves a significant commitment and a substantial cost associated with services. Infrastructure challenges include managing a large number of subscribers, subscriber and service provisioning, and operation and management.

For many companies, what it takes to be an ISP is far removed from their core business. A key factor for success in this market is delivering reliable and consistent services in a fast-moving market. Small to medium-sized businesses that approach this market may lack the infrastructure and technical expertise to deliver services in an economical way. Typically, solutions require a large amount of time and effort, as well as a significant initial investment and on-going support costs. These costs may include, but are not limited to, recruiting and retaining qualified technical and management staff. These businesses may face a market where there may be a shortage of skilled IT professionals, making it difficult to be self-sufficient in managing a variety of applications and platforms in-house. Significant hardware, software, and integration costs may be required, often amounting to hundreds of thousands of dollars. On an annual basis, operations and management costs can be as much as the initial entry costs. For many businesses, this investment can be a considerable financial strain. Planning for applications in-house may be very difficult without an army of qualified professionals. The need to anticipate growth rates and forecasts in volatile markets may lead to inaccurate estimates and costly mistakes.

Many ISPs are marketing add-on services to current subscribers rather than spending large investments to attract new subscribers, because it tends to be more cost-effective. Value-added services may produce higher profit margins for services sold to current subscribers. Most revenues earned by ISPs from residential subscribers are still a product of dialup Internet access. However, market indicators show that ISPs may find it difficult to increase revenue from dial-up residential subscribers unless these subscribers either adopt high-speed technologies or sign up for value-added services.

In a market that includes multi-national conglomerates, it may be preferable for independent ISPs to rely on the same business strategies that have helped other small businesses succeed when facing larger rivals: for example, personal service, quick responses to customer service inquiries, and the idea that the customer always comes first. Local and regional ISPs may also utilize their geographic service area to their advantages by offering content or services specifically designed to appeal to local audiences.

An important consideration for any company entering the ISP market may be whether it is necessary to build a new ISP from the ground up to serve its subscribers. There are a variety of ways to provide ISP services without committing large capital expenses and ongoing operating resources necessary for a new ISP. In particular, some applications have become a commodity, and it may be possible to outsource to ASPs. Each of these relationships may have inherent advantages and disadvantages. However, many if not all of them may off-load the expertise and much of the capital expense needed to build and operate an ISP. If an ISP does not have in place the qualified staff and expertise, then off-loading to ASPs is generally the best option, because these companies typically have core competency in the service provider market.

For mission-critical applications that drive a business, ISPs may rely on an ASP's applications, such as accounting and provisioning, for essential and critical business processes. The outsourcing model may offer, for example, service level agreement (SLA) and around-the-clock dedicated operation and management staff. The outsourcing solution may provide a level of operation and management excellence beyond that economically viable for small businesses, at a very attractive rate. Specific applications, such as a billing system, auto-registration, and customer self care, may be outsourced, while others may be retained in-house. Small to medium sized businesses may leverage professional expertise from outsourcing, rather than facing the high-risk and high-cost approach of the past. In fact, with variable costing models, minimal commitment terms, and typically minimal integration work, tactical decisions on short-term outsourcing can be used in an economical way, allowing businesses to focus on their core business and leave provisioning, operation, and management to qualified professionals.

The trends driving outsourcing are clear: leveraged expertise, channel strategies, and financial challenges faced by small and medium-sized businesses. There is a wide variety of outsourced solutions which are available today from most ASPs, and the variety may grow depending upon the pace of broadband access in the residential market. Those that do not adapt to this model may find the cost pressure to compete under the old model unbearable.

For small and regional ISPs, performing everything in-house typically draws IT resources from critical marketing and sales initiatives. Without a focus on their core business, these small and medium-sized businesses may fall out of step with their market, relying increasingly on unprofitable and limited service offerings. The purchase of commercial off-the-shelf (COTS) products for these small ISPs may prove to be a difficult business case to make. Low-end applications may provide some required features, but may lack the robust end-to-end functionality, the flexibility to add new value-added services, and the scalability to keep pace with the exponential growth in subscribers and new services.

The full-feature, carrier-grade billing systems, necessary hardware, technical support, and deployment expertise required may be impractical for small and regional ISPs. The high-cost of meeting these requirements typically cannot be justified within the business case. This may leave businesses settling for short-term tactical homegrown or low-end solutions, which obviously do not solve the problem of flexibility, reliability, and scalability.

Requirements that small and regional ISPs preferably look for in an outsourced solution may include one or more of, but are not limited to:

Resource leverage—The decision to outsource provisioning is due to the fact that small ISPs can get a better solution than that available via purchasing.

Variable costs—Small ISPs are looking for low up-front investment.

Flexible terms—The solution must be low risk, without excessively long-term agreements.

Service level agreements—Much of the value that a large service provider offers relates to the reliability and availability of a carrier-grade solution, including but not limited to, provisioning, online billing and payment, subscriber self-care, auto-registration, guaranteed availability, and disaster recovery.

Integration—Small ISPs are looking for a seamless offer. Everything from online billing and auto-registration interfaces to subscriber self-care applications must be integrated with directory services.

These and potentially other requirements may create some significant infrastructure demands. While it may be relatively easy to implement homegrown systems, this approach may be unprofitable and difficult to differentiate. The support systems that facilitate these basic offerings are typically unable to scale to manage the phenomenal growth of the Internet, and they lack capabilities to generate revenue from value-added service.

An alternative approach for companies entering the ISP market is to enter a co-location or managed operation agreement with an existing ISP or hosting service provider. With this approach, a company commits capital resources necessary to build its own computing environment. This investment includes, and is not limited to, hardware, software, data center footprint, and Internet connectivity from a NSP or a telecommunication service provider. The advantage of this alternative is that it gives a company as much control over the services as it wants, while still limiting the capital and operation expenses of building a new ISP from the ground up. In particular, this approach eliminates the need for a company to maintain its own in-house technical, operation, and management staffing. In addition, it eliminates the need to build and maintain an expensive data center environment. At the same time, it allows a company to determine exactly what services to offer and what software to use to support services. Perhaps, most importantly, this approach allows a company flexibility to customize its product offerings and pricing, while reducing the up-front capital investment to start an ISP. Although this approach is a far less expensive option for entering the ISP market than building and operating an ISP infrastructure from the ground up, there is still significant capital investment needed. Some hardware and software investment is necessary to support this model.

For enterprises and service providers alike, knowing how to leverage the Internet for more than mere Web advertising and e-mail access may be vital to remaining competitive in today's increasingly Net-driven markets. Successful service providers and commercial enterprises may differentiate themselves by the way they use Internet technology to rapidly create and deploy new services and implement new business models. To leverage the potential of the Internet, service providers and enterprises may need to transform their existing IT infrastructures to support new applications that reach beyond the corporate intranet. These new applications may open new markets and deliver competitive advantages through a unique approach to core business processes such as customer care, supply chain management, sales/distribution, and decision support. Likewise, service providers may need to respond to concurrent market pressures such as an increasingly crowded marketplace, growth in user volumes, and demands for new services such as vertical portals, business outsourcing, secure remote access and e-commerce. Without a versatile, reliable foundation, existing service provider infrastructures may be incapable of scaling to meet increased capacities or delivering the new services the market demands.

Regardless of market niche, all types of providers must position themselves for growth and agility to handle increasing numbers of subscribers, additional services, and workloads that are more challenging. System architectures that meet these demands are critical to success. Therefore, it may be desirable to achieve a solution to the above challenges by implementing a well-defined, flexible IT infrastructure that fully integrates Internet technologies with core business systems.

SUMMARY OF THE INVENTION

Embodiments of a system and method for designing, developing and implementing Internet Service Provider (ISP) architectures are described. In one embodiment, a method for designing and implementing ISP architectures may include formulating a set of design requirements for an Internet Service Provider (ISP) architecture, establishing an architectural model for the ISP architecture according to the set of design requirements, generating a logical design for the ISP architecture according to the architectural model and the set of design requirements, and generating a physical design for the ISP architecture according to the architectural model and the logical design. In one embodiment, the method for designing and implementing ISP architectures may include selecting one or more components of the ISP architecture in light of the logical design and the physical design. In one embodiment, the method for designing and implementing ISP architectures may include implementing the ISP architecture according to the logical design and the physical design. In one embodiment the system and method for designing, developing and implementing ISP architectures may be used to design, develop and implement an N-tiered ISP architecture. In one embodiment, the N-tiered ISP architecture includes one or more of a network layer, a system layer, an application layer, and a data layer.

In one embodiment, formulating the set of design requirements may include obtaining the design requirements, evaluating the design requirements, establishing assumptions for the design requirements, and determining design tradeoffs and addressing architectural limitations in light of the evaluations of the design requirements and the assumptions for the design requirements. In one embodiment, design requirements may include one or more business requirements and one or more functional requirements.

In one embodiment, establishing an architectural model for the ISP architecture according to the set of design requirements may include identifying one or more core components of the architectural model and applying one or more architectural principles to the architectural model. In one embodiment, the core components may include, but are not limited to, one or more of an operating platform, an operating environment, and one or more ISP services. The operating platform may include, but is not limited to, one or more of network equipment, server systems, and storage equipment. The operating environment may include, but is not limited to, an operating system and one or more operating environment tools and applications. The ISP services may include, but are not limited to, one or more of basic services, value-added services, infrastructure services, and operation and management services. The architectural principles may include, but are not limited to, one or more of scalability, availability, reliability, manageability, adaptability, security, performance, and open systems.

In one embodiment, generating a logical design for the ISP architecture according to the architectural model and the set of design requirements may include identifying a high-level topology for the ISP architecture, identifying one or more services within the topology, defining one or more service flows for the ISP architecture, and defining one or more network components for the logical design according to the identified one or more services and the logical design. In one embodiment, the high-level topology may include point of presence (POP) and internal infrastructure. The internal infrastructure may include the one or more services and one or more physical servers. In one embodiment, network topology of the internal infrastructure may be divided into a plurality of logical layers. Access through each of the logical layers may be secured by one or more firewalls. In one embodiment, the plurality of logical layers may include one or more of a demilitarized zone (DMZ) network layer, a services network layer, an application network layer, a content network layer, a staging network layer, a backup network layer, and a management network layer. In one embodiment, the ISP architecture may be an N-tiered ISP architecture including a plurality of layers. In this embodiment, at least one of the one or more identified services may be functionally decomposed into two or more of the layers of the N-tiered ISP architecture. In one embodiment, the network components may be configured in the logical design according to a layered network components model.

In one embodiment, generating a physical design for the ISP architecture according to the architectural model and the logical design may include creating a network design for the ISP architecture and planning for capacity of the ISP architecture. In one embodiment, generating a physical design may further include creating an IP address schema for the ISP architecture. In one embodiment, creating a network design for the ISP architecture may include identifying one or more network components of the ISP architecture and creating a network design diagram that documents network components of the ISP architecture. In one embodiment, the network design for the ISP architecture may be created according to an N-tiered network architecture.

In one embodiment, planning for capacity of the ISP architecture may include estimating software capacity of the ISP architecture and estimating hardware capacity of the ISP architecture. In one embodiment, estimating software capacity may include estimating storage capacity and memory capacity for software implementing one or more of basic services, infrastructure services, operating and management services, and operating environment. In one embodiment, estimating hardware capacity may include estimating server capacity and estimating network capacity. Estimating network capacity may include estimating one or more of, but not limited to, network bandwidth requirements, the number of modems needed for dial-up access, the number of links needed for Internet connectivity, the number of links needed for dial-up access, and port capacity for routers, switches and consoles.

In one embodiment, selecting components of the ISP architecture may include selecting software for the ISP architecture, selecting one or more servers for the ISP architecture, and selecting one or more network components for the ISP architecture. In one embodiment, hardware rack equipment for the ISP architecture may be selected. Software to be selected may include, but is not limited to, software for one or more basic services, software for one or more value-added services, software for one or more infrastructure services, software for one or more operation and management services, and operating environment software. Servers to be selected may include, but are not limited to, front-end servers, mid-range servers, back-end servers and enterprise servers. Storage hardware including data storage hardware and tape library hardware may also be selected Network components to be selected may include, but are not limited to, routers, switches, load balancers, firewalls, Intrusion Detection Systems (IDSs), console servers, and Network Access Servers (NASs).

In one embodiment, implementing the ISP architecture according to the logical design and the physical design may include implementing an operating platform for the ISP architecture, implementing an operating system for the ISP architecture, and implementing one or more services for the ISP architecture. Implementing services for the ISP architecture may include implementing one or more infrastructure services, one or more basic services, and one or more value-added services. In one embodiment, the ISP architecture is an N-tiered ISP architecture, and implementing the services may include functionally decomposing at least one of the services into two or more layers of the N-tiered ISP architecture. In one embodiment, a prototype of the ISP architecture may be implemented to test and validate the ISP architecture.

In one embodiment, the method for designing, developing and implementing ISP architectures described herein may be implemented in an at least partially automated ISP architecture development system. In one embodiment, this system may include an ISP architecture development mechanism that may accept a set of design requirements and one or more architectural principles, generate an architectural model for the ISP architecture using the set of design requirements and the architectural principles, generate a logical design for the ISP architecture using the generated architectural model and the set of design requirements, and generate a physical design for the ISP architecture using the generated architectural model and the generated logical design. One or more components for the ISP architecture may be selected using the generated logical design and physical design. The ISP architecture may then be implemented according to the generated logical design and the physical design.

BRIEF DESCRIPTION OF THE DRAWINGS

FIG. 10 illustrates exemplary scaling models that may be used when addressing scalability according to one embodiment;

FIG. 11 illustrates several availability levels according to one embodiment;

FIG. 19 illustrates an exemplary staging network according to one embodiment;

FIG. 20 illustrates an exemplary management network according to one embodiment;

FIG. 21 illustrates DNS service flow according to one embodiment;

FIG. 33, illustrates sample address masking at the core layer according to one embodiment;

FIG. 34 illustrates sample address masking at the distribution layer according to one embodiment;

FIG. 35 illustrates sample address masking at the access layer according to one embodiment;

FIG. 36 illustrates information that may be used in estimating storage for email service according to one embodiment;

FIG. 37 illustrates information that may be used in estimating memory for email service according to one embodiment;

FIG. 38 illustrates information that may be used in estimating storage for a web service according to one embodiment;

FIG. 39 illustrates information that may be used in estimating memory for a web service according to one embodiment;

FIG. 40 illustrates information that may be used in estimating storage for a news service according to one embodiment;

FIG. 41 illustrates information that may be used in estimating memory for a news service according to one embodiment;

FIG. 42 illustrates information that may be used in estimating storage for FTP Service according to one embodiment;

FIG. 43 illustrates information that may be used in estimating memory for FTP Service according to one embodiment;

FIG. 44 illustrates information that may be used in estimating storage for DNS Service according to one embodiment;

FIG. 45 illustrates information that may be used in estimating memory for DNS Service according to one embodiment;

FIG. 46 illustrates information that may be used in estimating storage for RADIUS service according to one embodiment;

FIG. 47 illustrates information that may be used in estimating memory for RADIUS service according to one embodiment;

FIG. 48 illustrates information that may be used in estimating storage for Directory service according to one embodiment;

FIG. 49 illustrates information that may be used in estimating memory for directory service according to one embodiment;

FIG. 50 illustrates information that may be used in estimating storage for DHCP service according to one embodiment;

FIG. 51 illustrates information that may be used in estimating memory for DHCP service according to one embodiment;

FIG. 52 illustrates information that may be used in estimating storage for NTP service according to one embodiment;

FIG. 53 illustrates information that may be used in estimating memory for NTP service according to one embodiment;

FIG. 54 illustrates information that may be used in estimating storage for Backup service according to one embodiment;

FIG. 55 illustrates information that may be used in estimating memory for Backup service according to one embodiment;

FIG. 56 illustrates information that may be used in estimating storage for Host-Based Firewall service according to one embodiment;

FIG. 57 illustrates information that may be used in estimating memory for Host-Based Firewall service according to one embodiment;

FIG. 58 illustrates information that may be used in estimating storage for Log service according to one embodiment;

FIG. 59 illustrates information that may be used in estimating memory for Log service according to one embodiment;

FIG. 60 illustrates information that may be used in estimating storage capacity for the operating system according to one embodiment;

FIG. 61 illustrates an exemplary file system layout for a system disk according to one embodiment;

FIG. 62 illustrates an exemplary file system layout for data according to one embodiment;

FIG. 63 illustrates information that may be used to estimate the size of enterprise servers for an ISP customer according to one embodiment;

FIG. 64 illustrates information that may be used in estimating network bandwidth for users according to one embodiment;

FIG. 65 illustrates information that may be used in estimating modems needed for dial-up access according to one embodiment;

FIG. 66 illustrates information that may be used in estimating links needed for Internet connectivity according to one embodiment;

FIG. 67 illustrates information that may be used in estimating links needed for dial-up access according to one embodiment FIG. 68 illustrates information that may be used in estimating the number of ports for routers according to one embodiment;

FIG. 69 illustrates information that may be used in estimating the number of ports for switches according to one embodiment;

FIG. 70 illustrates information that may be used in estimating the port capacity for console servers according to one embodiment;

FIG. 71 illustrates selecting components according to one embodiment;

FIG. 72 lists server types, specifications, and associated tiers according to one embodiment;

FIG. 73 illustrates exemplary services and their characteristics according to one embodiment;

Figure 1:
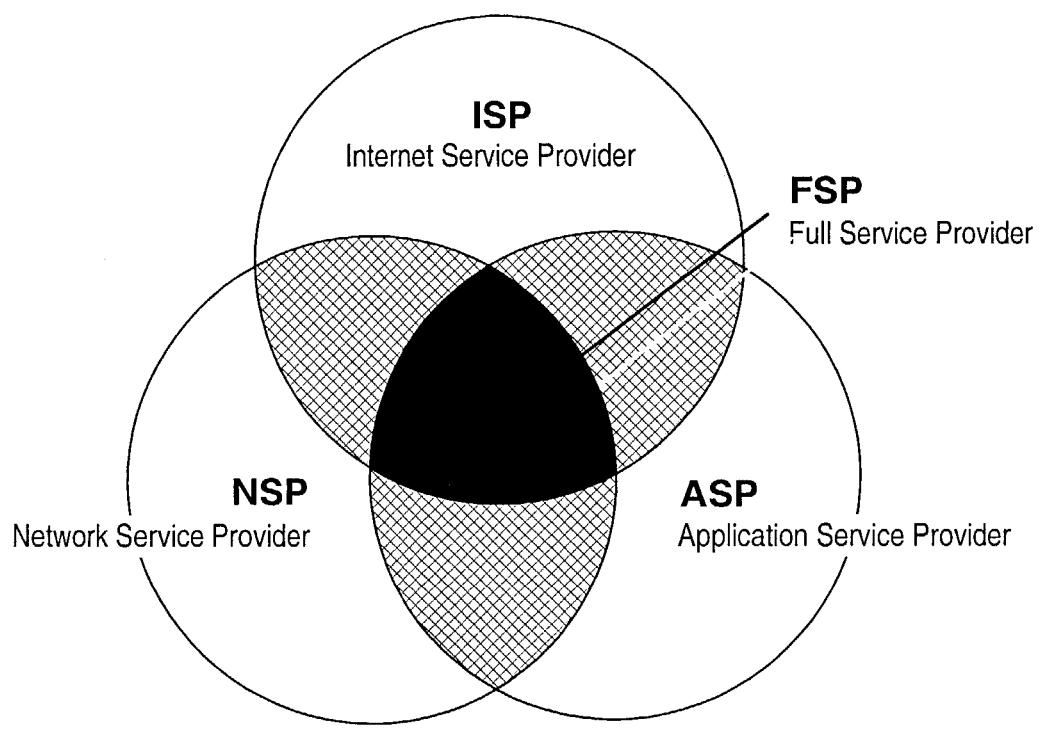
FIG. 1 illustrates segmentation of the Internet Service Provider market according to the prior art.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS OF THE INVENTION

Embodiments of a system and method for designing, developing and implementing ISP architectures are described, as well as ISP architectures that may be designed and implemented using these embodiments. An Internet Service Provider (ISP) provides Internet services to business and residential subscribers, also referred to as users. ISPs provide basic services such as email, web hosting, and news. In addition, ISPs may offer value-added services such as calendars, address books, search engines, chat rooms, instant messages, etc.

In this document, a first section, Designing, Developing, and Implementing ISP Architectures, describes a system and method for designing, developing and implementing ISP architectures. In a second section, Internet Architecture for Service Providers, embodiments of an Internet architecture are described that establishes a framework for the development of, for example, multi-service ISPs, Application Service Providers (ASPs), advanced E-commerce sites and mission critical Intranets. A final section, Internet Service Provider Configuration Guidelines, describes exemplary guidelines and principles that may be applied to ISP architecture designs, as well as services that ISPs may be expected to deliver and some principles behind the network architectures that may be needed to support them.

Designing, Developing, and Implementing ISP Architectures

An ISP designer or design team typically define the overall structure, which may be referred to as the ISP architecture, that sets forth structuring principles and patterns for an ISP's infrastructure, services, network, customer care system, and so on. The architecture sets system-wide constraints that are preferably adhered to by each portion of the subsequent design. Within the ISP architecture, the architect identifies major components and their interrelationships. An ISP designer or design team may define how overall processing are to be decomposed into components, and in addition may define how major components are to be organized and well integrated. Developing an ISP architecture may be important because the ISP architecture may become the fundamental organization of a system embodied in its components, their relationships to each other and to the environment, and the principles guiding an ISP architecture's design and evolution.

Figure 2:
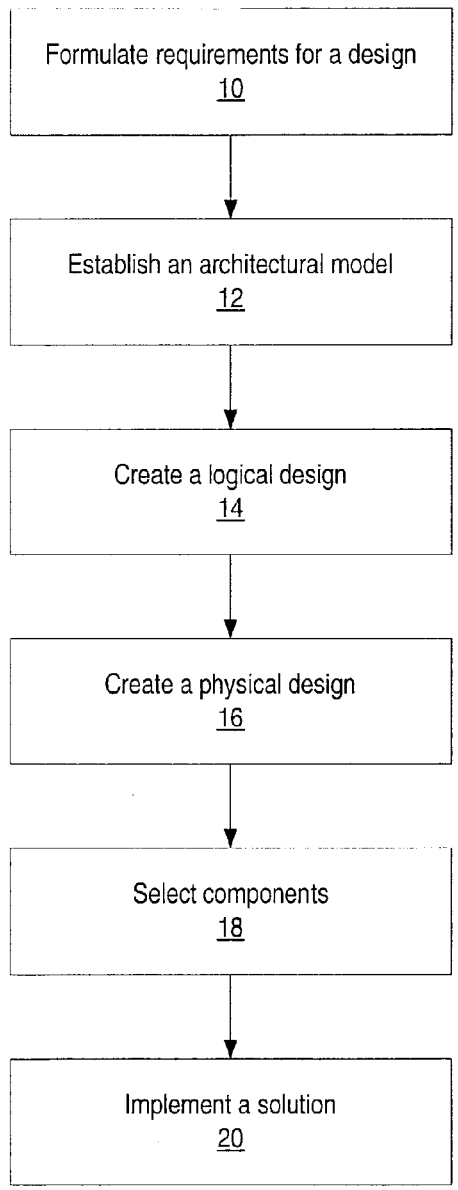
FIG. 2 illustrates a method for designing, developing and implementing ISP architectures according to one embodiment.

FIG. 2 illustrates a method for designing, developing and implementing ISP architectures according to one embodiment. Requirements for a design may be formulated, as indicated at 10. An architectural model may be established, as indicated at 12. A logical design may be created, as indicated at 14. A physical design may be created, as indicated at 16. Components for the ISP architecture may be selected, as indicated at 18. As indicated at 20, a solution generated according to 10, 12, 14, 16 and 18, may be implemented.

The elements of the method of FIG. 2 are further described in the following subsections Formulating Requirements for a Design, which describes guidelines for obtaining and evaluating requirements for an ISP architecture design; Establishing an ISP Architectural Model, which describes an architectural model as a framework for designing an ISP architecture; Creating a Logical Design, which describes several elements that may provide a high-level framework that provides a logical structure for designing an ISP architecture from the top level down; Creating a Physical Design, which describes constructing a high-level network design and planning for capacity; Selecting Components, which describes guidelines for selecting software, server, and network components for an ISP architecture design; Implementing a Solution, which describes general practices and recommendations for implementing an ISP architectural design generated using the mechanisms described in the previous subsections; and ISP Architecture Development System, which describes embodiments of a system that may be used to perform one or more of the functions described in the previous subsections.

Formulating Requirements for a Design

As indicated at 10 of FIG. 2, an ISP designer or design team formulates requirements for a design. Preferably, an ISP architecture design is predicated on detailed requirements. Formulating requirements is a process that may vary depending upon how well ISP customers know their business challenges (present and future) and on how readily available their requirements are. In one embodiment, formulating requirements for designing an ISP architecture may include one or more of, but is not limited to, obtaining requirements, evaluating requirements, establishing assumptions, determining design tradeoffs, and addressing architectural limitations.

Figure 3:
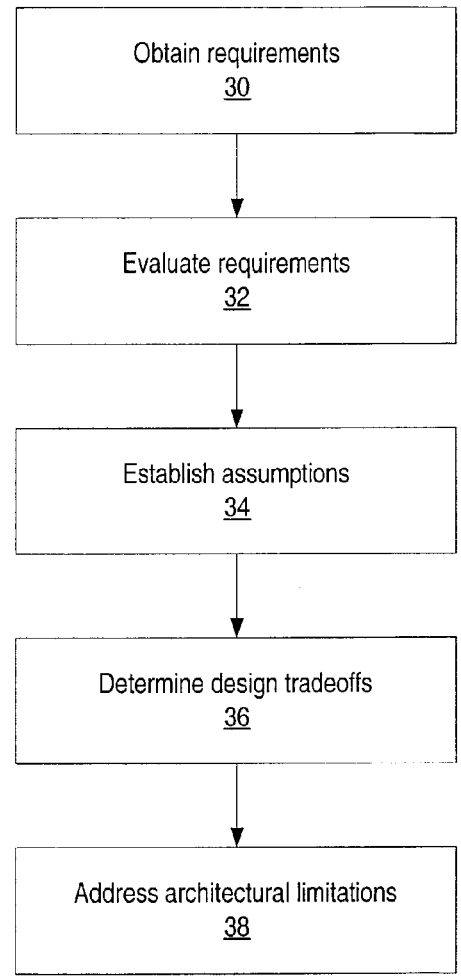
FIG. 3 illustrates formulating requirements for a design according to one embodiment.
Figure 5:
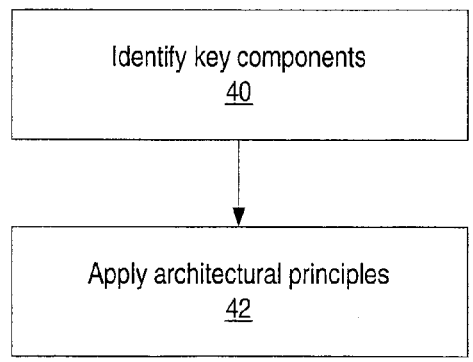
FIG. 5 illustrates establishing an ISP architectural model according to one embodiment.

FIG. 3 illustrates formulating requirements for a design according to one embodiment. The method illustrated in FIG. 5 illustrates means for formulating requirements for a design according to one embodiment. As indicated at 30 of FIG. 3, the ISP designer or design team may obtain requirements.

These requirements preferably set forth business and functional requirements. A series of information interviews and meetings may be necessary to gather requirements and to ensure that the requirements are interpreted accurately within the context of an ISP architecture. As requirements are gathered, all information that may be helpful in designing an ISP architecture is preferably recorded.

Questions for customers when designing ISP architectures may include one or more of, but are not limited to, questions in the following areas: general, business-related, support, systems and network management, end-user, registration, customer care, billing system, service availability, security, demographic, networking, dialup, directory, email, Web hosting, search engine, caching proxy, Internet relay chat, FTP, Internet News, and development and staging. General questions for customers when designing ISP architectures may include one or more of, but are not limited to:

- Is this an existing or new ISP?
- What type of ISP is it (e.g., Dialup, broadband, wireless, etc.)?
- What is its target market (residential, businesses, intranet/extranet, etc.)?
- What are the services provided (web hosting, messaging, Internet news, etc.)?
- What is the subscriber profile (residential users, business users, etc.)?
- What is the service usage profile of the subscribers?
- What are the expected peak usage hours?
- What are the training requirements for operations and management staff?

Business-related questions for customers when designing ISP architectures may include one or more of, but are not limited to:

- What is the marketing strategy?
- What is the time-to-market?
- What is the budget?

Support questions for customers when designing ISP architectures may include one or more of, but are not limited to:

- Is there an operations and management team available in-house?
- What is the skill level of the operations and management team?
- What are the technical support plans?

Systems and network management questions for customers when designing ISP architectures may include one or more of, but are not limited to:

- Is there a system and network management team available in-house?
- What are the automation requirements for systems and network management?
- What are the logging requirements for management, business, and customer reporting?

End-user questions for customers when designing ISP architectures may include one or more of, but are not limited to:

- What is the client access method (e.g., Netscape™, Microsoft® Internet Explorer, etc.)?
- Which client platforms will be supported (e.g., Solaris, Linux, Windows, etc.)?
- Are there any internationalization/multilingual issues (e.g., English, French, German, Italian, Spanish, etc.)?
- What other protocols besides TCP/IP will be supported (e.g. NetBEUI, AppleTalk™, etc.)?

Registration questions for customers when designing ISP architectures may include one or more of, but are not limited to:

- What is the registration system?
- What are the registration channels (web, phone, fax, etc.)?
- What are the plans for user provisioning?
- What are the integration requirements with the billing system (directory, database, etc.)?
- Will a registration system be connected directly to a credit card system?

Customer care questions for customers when designing ISP architectures may include one or more of, but are not limited to:

- What is the customer care system?
- What are the integration requirements with the management system?
- What are the integration requirements with the registration system?
- What are the integration requirements with the billing system?
- Are there any internationalization/multilingual issues?

Billing system questions for customers when designing ISP architectures may include one or more of, but are not limited to:

- What is the billing strategy (email, credit card, postal mail, etc.)?
- What is the billing system (AmdocsHorizon, Portal™, Kenan®, etc.)?
- Will a flat or metered rate be used?

Service availability questions for customers when designing ISP architectures may include one or more of, but are not limited to:

- What are the service level agreements (SLAs)?
- What level of availability is desired (e.g. High availability, fault tolerance, cluster, etc.)?
- What level of service interruption is tolerable?
- What are the requirements for service failure versus service degradation?
- What are the disaster recovery requirements?
- What are the backup/recovery strategies?
- What are the performance goals (e.g. throughput, response time, etc.)?

Security questions for customers when designing ISP architectures may include one or more of, but are not limited to:

- What are the corporate security policies?
- What network security is already in place?
- What level of security is desired?
- What are the security policies for each service?
- What is the authentication method (e.g. directory, database, NIS/NIS+, etc.)?
- What are the logging requirements for management, business, and subscriber reporting?
- Will subscriber's CGIs be allowed?
- Will subscriber's Java servlets be allowed?
- Is there any intention of supporting shell accounts?
- Will VPNs be used?
- Will RADIUS be authenticated using LDAP?
- Will NAT (Network Address Translation) be used?
- Will split-DNS be used?
- How is each system to be hardened?
- How is the security posture of each system to be managed over time?
- How will it be validated that patches and other software updates do not modify the security posture of a system?
- Is there a management network to protect and isolate administrative traffic?
- How are backup tapes protected?
- When are passwords expired?
- What is the policy for dealing with employee terminations?

What authentication access mechanism do administrators use?

How are terminal servers protected against sniffing and malicious misuse?

How often are network scans performed to validate that only appropriate services are offered by the systems?

What type of centralized logging and automated reconciliation infrastructure is in place?

What is the process by which security patches are evaluated and decisions made on how quickly they are applied to systems?

How often are security assessments to be performed on the environment by internal staff and by a third party?

Demographic questions for customers when designing ISP architectures may include one or more of, but are not limited to:

What is the total number of subscribers?

What is the expected growth in the number of subscribers?

What is the average connection time of a user?

What is the percentage of concurrent users (e.g. 10 percent, 12.5 percent, 15 percent, etc.)?

What are the scalability requirements of each service?

What are the scalability requirements of the ISP architecture? Over what period?

Networking questions for customers when designing ISP architectures may include one or more of, but are not limited to:

What is the current network architecture?

What is the current network bandwidth (e.g. 10 Mbytes/sec, 100 Mbytes/sec, etc.)?

Is this a single-site or multiple-site environment?

Will there be multiple POPs (point of presence)?

Will the data center be the concentrator between POPs and a central site?

Is there a preference for LAN technology (e.g. 10/100 Mbytes/sec, Fast Ethernet, Gigabit Ethernet, FDDI, ATM, etc.)?

Is there a preference for WAN technology (e.g. T1, T3, OC-3, DS-3, ATM, Frame Relay, etc.)?

Are there multiple connections to the Internet?

Will DHCP be used for dynamic network configuration?

Will clients have static or dynamic IP addresses?

Will private addresses be used for internal networks?

Will clients' domain names be hosted on the DNS?

Will there be a time source for NTP?

Dialup questions for customers when designing ISP architectures may include one or more of, but are not limited to:

What is the ratio of modems-to-users (e.g. 1:10, 1:8, 1:6, etc.)?

What is the authentication mechanism (e.g. RADIUS, TACACS, etc.)?

Which modem speeds are supported (e.g. 14 Kbytes/sec, 28 Kbytes/sec, 56 Kbytes/sec, etc.)?

Directory questions for customers when designing ISP architectures may include one or more of, but are not limited to:

What is the method of authentication (e.g. Directory, database, etc.)?

If a directory is used, what are the availability needs?

What are the policies or legal issues regarding content?

Is there a DIT (directory information tree) schema?

What are the integration requirements for user and service provisioning (registration, customer care, billing, etc.)?

Will RADIUS use a directory for authentication?

Email questions for customers when designing ISP architectures may include one or more of, but are not limited to:

Will email service be offered?

What are the methods of email access (e.g., POP, IMAP, WebMail, etc.)?

Is email forwarding/relaying allowed?

Is email accounting required?

What is the storage requirement for email queue?

What is the average size of an email message (e.g. 10 Kbytes, 25 Kbytes, etc.)?

What is the mailbox maximum size allowed (e.g. 5 Mbytes, 10 Mbytes, etc.)?

Is there a limit on email message size (e.g. 2 Mbytes, 5 Mbytes, etc.)?

What percentage of users will use email (e.g. 50 percent, 75 percent, etc.)?

What is the email backup policy?

Will multiple domain services be offered?

Will administration delegation for accounts and domains be offered?

How many email messages will be sent/received by each user per day?

What is the plan for email overflow management for users who exceed storage allocation (e.g., Bounce, additional charge, etc.)?

What are the capacity planning requirements for email storage?

What are the requirements for the billing system integration?

What are the authentication integration requirements?

What are the logging requirements for management, business, and subscriber reporting?

What are the policies or legal issues regarding content?

Will automated customer care for email aliases be provided?

Will virus scanning and anti-spam be integrated with the email server?

Web hosting questions for customers when designing ISP architectures may include one or more of, but are not limited to:

Will web hosting be offered?

What percentage of users will be surfing the web? What percentage of their connected time?

How many pages will the average user read per hour?

What is the average size for user web sites (e.g. 2 Mbytes, 3 Mbytes, etc.)?

What is the maximum storage allowed (e.g. 5 Mbytes, 10 Mbytes, etc.)?

What are the scalability requirements?

Will dedicated or shared storage be used?

What percentage of users will have a web site (e.g. 25 percent, 30 percent, etc.)?

Will Java services be provided?

Will JavaScript services be provided?

Will subscriber's CGIs be allowed?

Will scripting languages be provided?

What will be the staging strategy (e.g. push, pull, on demand, etc.)?

What will be the content management strategies?

Will a search engine be provided?

Will HTML/links validation services be provided?

Will dynamic web hosting be provided?

Will professional web hosting (e.g. shared, co-located, or dedicated) be provided?

What will be the backup policy?

What are the integration requirements with the billing system?

What are the integration requirements with directory service?

Will SSL or other secure transaction system be used?

Will pages be indexed on the fly as they are published?
Will individual domains for URLs be supported?
What are the policies or legal issues regarding content?
What are the logging requirements for management, business, and subscriber reporting?

Search engine questions for customers when designing ISP architectures may include one or more of, but are not limited to:
  Will a search engine be integrated?
  Will it be local and/or external?
  Will the pages be indexed on the fly as they are published?
  What are the integration requirements with the billing system?
  What are the integration requirements with directory?

Caching proxy questions for customers when designing ISP architectures may include one or more of, but are not limited to:
  Will a caching proxy be provided?
  Will a multilevel hierarchical caching proxy be provided?
  Will URL pre-loading be used?
  Will URL filtering be used?
  Will a directory be used for user authentication?
  What are the policies or legal issues regarding content access?
  What are the logging requirements for management, business, and subscriber reporting?

Internet relay chat questions for customers when designing ISP architectures may include one or more of, but are not limited to:
  Will chat service be offered?
  What percentage of users will be chatting?
  What percentage of users connected time will they be chatting?
  What are the anticipated traffic and usage patterns?
  How many channels are to be supported concurrently?
  Will the chat service be hosted or outsourced?
  Will web-based chat service be provided?
  What are the policies or legal issues regarding content access?
  What are the logging requirements for management, business, and subscriber reporting?

FTP questions for customers when designing ISP architectures may include one or more of, but are not limited to:
  What percentage of web users will be using the FTP service for web content upload?
  What is the storage allocated for spooling for content upload?
  What are the policies or legal issues regarding content access?
  What are the logging requirements for management, business, and subscriber reporting?

Internet News questions for customers when designing ISP architectures may include one or more of, but are not limited to:
  Will news service be in-house or outsourced?
  What percentage of users will be using the news service?
  What percentage of their time will be spent reading news?
  How are news groups stored, moderated, and filtered?
  How long will news content be kept?
  What is the average number of news articles that users read per hour?
  Will there be one or multiple news feeds? Upstream or downstream?
  What are the integration requirements with the email system?
  What are the integration requirements with the billing system?
  What are the integration requirements with directory services?
  Will a multilevel news server hierarchy be implemented?
  What are the policies and/or legal issues regarding content access?
  What are the logging requirements for management, business, and subscriber reporting?

Development and staging questions for customers when designing ISP architectures may include one or more of, but are not limited to:
  Is the production site different from the development/staging site?
  What are the specifications for the test site?
  What is the current development infrastructure?
  What are the tools and processes for source code control and content management?
  What are the requirements for supporting the development environment?
  What are the testing and acceptance standards?

Business requirements are commonly found in a business plan, which defines a business's purpose, vision, mission, and road map. To be useful in formulating design requirements, the business plan preferably provides detailed goals and objectives. Whether a business requirement is tactical or strategic, a business plan may be critical in facilitating an optimal ISP architecture design while aligning with business strategies, both short-term and long-term. A well-defined business plan preferably helps in designing an ISP architecture that enables customers to achieve corporate goals and objectives. Business plans may change over time, but the mission and vision are usually stable. No matter what the business might be, the essential elements may stay the same. It may be useful to talk to business and technical representatives at several levels of a customer's organization to make sure that ISP architecture requirements fit in with business requirements.

If a customer does not have a business plan, one is preferably developed. Formulating a business plan can be a monumental task; however, the time and effort required to create a detailed business plan may pay off in the long run. In the absence of a business plan, the customer may be interviewed to determine business requirements, and then the requirements may be reviewed with the customer and questions asked to validate an interpretation and assumptions. Factors that may be used to establish business requirements may include one or more of, but are not limited to: services, service availability, Time to market, future growth, new technologies, and capital investment Functional requirements set forth design characteristics and desired results. Functional requirements preferably define all functions required of an ISP architecture and provide guidelines for how each component works and integrates to form an entire system. Also referred to as functional specifications, functional requirements may be necessary or desirable in formulating the best design approaches and applying appropriate technologies to achieve a desirable architectural solution. A customer preferably provides detailed forecasts and requirements. A typical functional requirements specification may address one or more of, but not limited to, the following:
  Functionality—What is the system supposed to do?
  Interaction—How does each component interact?
  Performance—What are the speed, availability, response time, and recovery time of components?
  Attributes—What are the portability, correctness, maintainability, security, and other related considerations?
  Constraints—Are there any required standards, security policies, internationalization, etc?

An ISP architecture is preferably designed to meet functional requirements, and the design aligned with business strategies. To be effective and practical, a design preferably meets business objectives. Functional requirements may be provided in one or more of, but not limited to, the following methods:

As part of a detailed customer business plan
 Prepared by a customer, specifically for the project
 Prepared by one or more engineers (e.g. ISP architecture designers), after interviewing a customer for requirements and business strategies Typically, customers do not know all their requirements. For example, their core businesses may be less technology-oriented, or their familiarity of the subject matter may be less in-depth. The customers may rely on architects and implementers to guide them through the process and deliver high-quality ISP architectures that meet the customers' business needs. In cases where there is lack of requirements, market analysis, industry standards, and design assumptions may be used. Using this baseline, the customer may be interviewed to define and validate requirements. Preferably, the requirements are documented and presented to the customer as a functional specification.

Factors that may be used to establish functional requirements may include one or more of, but are not limited to:

Service uptime level expectations
 Concurrent active session projections
 Future growth predictions
 Customer has multiple sites and requires a modular and replicable solution
 Customer wants to integrate new systems with legacy systems and existing technologies Customer wants to offer new services on demand
 Customer requires automated service and user provisioning
 Customer requires online billing and customer care capabilities
 Architecture must be expandable to support multiple points of presence (POPs)
 Customer requests a centralized authentication and authorization mechanism As indicated at 32 of FIG. 3, after the business and functional requirements are obtained, the requirements may be evaluated, for example to determine how realistic each requirement is. One question to ask when evaluating requirements is: what would be the best design approach to satisfy each requirement and related requirements? Constraints such as cost, time to market, etc. are preferably considered, modifications to any of the requirements are preferably determined, and then changes to the requirements and possible solutions may be recommended to the customer. In the absence of requirements, assumptions may be made and validated later with the customer. Questions to ask as requirements are evaluated may include one or more of, but are not limited to:

Can an ISP architecture be designed to meet all requirements?
 Are any of the requirements unrealistic or unattainable within the constraints imposed by the customer or technology?
 Is the solution achievable with existing technologies?
 Will the design be cost effective?
 Does the solution rely on extremely complex technology that may be difficult to implement or manage?
 If technology is not readily available, would it be viable to develop a custom solution?
 Does the design integrate with customer's operating environment?
 Is the design scalable to handle additional services and subscribers?
 Is the design modular and replicable with minimum changes?
 Does the design depend on any proprietary technology?
 Will the design be adaptive to business and technological changes?
 How long is the hardware and software investment expected to last?

Each requirement may be analyzed, and how to meet the requirement may be determined. Several solutions may be considered for a single requirement, and alternative solutions may be needed in case a component cannot be used. As requirements are analyzed, ideas about making tradeoffs and addressing limitations may be formed. For example, if commercial off-the-shelf (COTS) or open source products cannot achieve the desired solution, resources such as time and skilled labor may be required to develop a custom solution, whether it is to be done in-house or outsourced. This constraint may have an affect on a business requirement (for example, time to market) and appropriate changes may need to be made to ensure that a solution aligns with the business plan. Ultimately, the choice is the customer's to either change the constraint or the requirement. In situations such as these, it may be desirable to have several options to present, thereby providing the customer some flexibility and insight into tradeoffs. An open dialogue is preferably maintained with the customer. If the customer has not prioritized requirements or some of the requirements conflict, the customer may be consulted in reviewing and prioritizing requirements.

As indicated at 34 of FIG. 3, during the design process, it may be necessary or desirable to establish and make assumptions. A factor in establishing good assumptions may be to base the assumptions on as much reliable data and expertise as is available. Assumptions may originate, for example from the customer, the ISP architecture designer, and other engineers. Reasons for making assumptions may include one or more of, but are not limited to:

Requirements are incomplete or lack sufficient detail
 Requirements do not accurately reflect industry data
 Missing data such as background information
 Inexperience with available technology
 Need a base line for capacity planning
 Need to anticipate future growth and usage patterns Even when requirements are available, some general design assumptions may need to be made by the ISP architecture designer and the customer. For example, a base line for capacity planning may need to be established. As an example, a customer may not be able to estimate the percentage of concurrent active sessions. Because this assumption is important in estimating many other design variables, such as average bandwidth consumption and number of high-speed trunks required for access servers, a percentage of concurrent active sessions may need to be assumed. A mechanism for calculating a percentage of concurrent active sessions is described later in this document.

Other assumptions may be based, for example, on market data, customer forecasts, and industry averages so that a design that is optimal and realistic may be created. Factors that may be used in establishing assumptions may include one or more of, but are not limited to:

Total number of subscribers
 Market forecast
 Concurrency percentage (total number of active sessions)
 Subscriber type (residential or business)

User expertise (beginning, intermediate, advanced, or mixed)

Expected growth and usage patterns

Web content (static, dynamic, or combination of both)

Storage for news (affects total storage requirement)

Backup retention policy (affects how long data can be archived on backup media)

Scale to next magnitude of subscribers (for example, 10K to 100K)

Service availability (critical or not critical)

Maximum quota (for example, email=5 Mbytes, web=5 Mbytes)

Email access protocol (POP3, IMAP4, or both)

Internal or outsourced provider for news, provisioning, management, etc.

Daily peak times (for example, 8 a.m. to 10 a.m., 2 p.m. to 4 p.m., and so on)

Preferably, all assumptions may be examined and evaluated, whether offered by the customer or established by the ISP architecture designer and/or other engineers. Assumptions are preferably made within a reasonable range so that actual results match or are close to intended results. To validate assumptions, a design prototype may be developed (designing a prototype is discussed later in this document). One goal may be to achieve minimal distortion or bias resulting from inaccurate assumptions. While capacity planning preferably covers expected growth, it may be desirable that ISPs monitor subscriber growth and system usage. Actual data may be compared with forecasts and assumptions to ensure that the capacity is capable of handling projected growth.

As indicated at 36 of FIG. 3, design tradeoffs may be determined. Design tradeoffs are benefits gained or lost from a substitution process that derives a "best-fit" solution, based on imposed design requirements and constraints. Design tradeoffs may be chosen where a benefit gained outweighs any benefit lost or reduced. Realistically, there may never be the best or ideal solution available to meet a challenge. However, design considerations and trade offs may preferably help to arrive at or near a best-fit solution. Risks for design trade off may be assessed and mitigated. How a trade off affects the overall design, as well as short-term and long-term business strategies, may be determined. Design tradeoffs are preferably documented, including the rationale for each decision, reasons, and possible outcomes. This information may be used later in the process.

Understanding design tradeoffs may be important in taking the appropriate design approach toward achieving an optimal solution. Typically, there is more than one way to arrive at a solution. An optimal approach may be one that achieves a desirable result, is simplistic in design, is straightforward to implement, and is easy to manage. It may be preferable to avoid approaches that rely on overly complex designs, complicated implementations, and proprietary technology.

The following presents some possible design considerations and provides information about tradeoffs. For ease of reference, the design considerations are organized by what they apply to, for example, scalability, availability, and security. Note that other design considerations than those discussed may be considered.

One consideration may be: is the design to use low-end network equipment? Small-scale ISPs may elect to use the smallest possible network equipment (routers and switches) to handle their current or projected number of subscribers. While this approach may satisfy a short-term goal of reducing up-front capital investment, it may not be a good approach if the ISP architecture is expected to scale multiple times to support more subscribers in the near future. In such a scenario, the network equipment may not scale vertically to support a higher port density, for example because the chassis is too small. To achieve a higher level of scalability, the network equipment may need to be replaced or upgraded. The costs in this scenario may include one or more of, but are not limited to: new equipment purchases, old equipment's rapid depreciation, labor, and service down time for installing and upgrading equipment.

In most ISP architecture designs, it may be preferable for an ISP to start with a larger network equipment chassis with a minimal configuration. Although this approach initially may cost more, it may save money and provide a more scalable ISP architecture in the long-term. (Cost may be dependent on the vendor and equipment the customer selects.) To minimize upfront costs with a larger chassis, the network equipment may be configured with the minimum configuration needed to handle the current subscriber level. As the ISP's subscriber base grows, new capacity may be added to scale.

Scalability applies to various components at different layers within an ISP architecture. In general, scalability applies to one or more of, but is not limited to, network, systems, applications, and data layers. For each component, scalability may be applied in one or two ways: vertical and/or horizontal. The level of scalability may be dependent, for example, upon the component and the layer of the infrastructure. Scalability is typically done in stages and is preferably realistic. For example, it may not be realistic to design a 10,000-subscriber ISP architecture that is scalable to 10 million subscribers. Allowing such exponential scaling may require significant up-front capital investment or redesigning an ISP architecture from the beginning. A factor of 10 may be a preferably approach in planning for scalability. Reasons the factor of 10 approach may be preferable may include one or more of, but are not limited to:

The level of scalability is realistic and achievable.

It requires the lowest cost in upgrading various components within an infrastructure.

It provides a life cycle that is viable to the business with the best return on investment.

No ISP architecture has unlimited scalability. In general, each ISP architecture has different levels of scalability. How much scalability an ISP architecture has may be dependent upon design requirements. It may be possible to design an ISP architecture with a very high level of scalability, but such an approach may not be feasible for several reasons including one or more of, but not limited to: the ISP architecture may not ever need to scale that high; the cost to have that level of scalability may be high and may not be justifiable to the business case; and an ISP architecture with too low a level of scalability may be costly because it has too short a life cycle, requiring it to be redesigned and redeployed.

Another consideration may be: is the ISP architecture to include redundancy? In ISP architectures, high availability may be expensive, and reliability may depend on what is implemented for availability. ISPs that deem availability and reliability to be critical to their business success and service offering may invest capital for purchasing redundant equipment. Some ISPs (e.g. Small ISPs) may not be able to afford to purchase redundant equipment, so instead they may choose to reduce up-front capital costs by excluding redundancy throughout the infrastructure.

Redundancy may be implemented in layers including one or more of, but not limited to: network, system, and data. At the network layer, redundant components such as Internet connections, switches, routers, load balancers, and firewalls may enhance availability and reliability. At the system layer, redundant components such as power supplies, fans, system boards, and servers behind load balancers may enhance availability and reliability. In addition, clustering technology may enhance availability and reliability. At the system layer, N+1 (extra server) may minimize overall cost while achieving higher availability. A complete failure may be avoided, with the major tradeoff being potential service degradation, depending on how much load the extra server handles. Another trade off is that N+1 may be complex to implement and manage. At the data layer, redundant components such as data paths and storage arrays may enhance availability and reliability.

Without redundancy, each component within a layer may represent a single point of failure, potentially resulting in a partial or complete failure of the infrastructure. Adding redundancy may be expensive, but so may be the consequences of relying on ISP architecture that is not redundant, and therefore which may be inherently unreliable. When designing an ISP architecture, it may be important to determine whether redundancy fits within the business model.

Another consideration may be: is the design to include a firewall? An ISP may choose not to implement firewalls, due to the bottlenecks firewalls tend to cause. Some security experts debate whether firewalls are useful for ISPs, based on the cost and collateral impact, among other considerations. Architects and their customers may make a strategic decision to omit a firewall. Reasons for not implementing a firewall may include one or more of, but are not limited to:
 A firewall may introduce a single point-of-failure to the infrastructure.
 A firewall may add to performance and scalability issues.
 A firewall may not provide substantial security compared to cost for an ISP environment.

Another consideration may be: is the design to include a router Access Control List (ACL) and packet filters? Many ISPs choose to omit firewalls and implement router ACL and packet filters instead. Considerations on whether to implement a firewall or router ACL and packet filters may include one or more of, but are not limited to, the following: routers are stateless and do not examine payload, and firewalls are necessary for stateful applications.

For small ISPs that have static content, a router ACL and packet filters may be sufficient. However, for dynamic content and state preservation, a firewall may be necessary. Routers may only examine packet headers; they may not examine payload. Stateful firewalls do examine payload. Many ISPs may not need stateful firewalls unless they have stateful applications to be managed, such as portals. Implementing a router ACL and packet filters may offer some protection; however, serious security breaches may occur. If an extreme assault against its infrastructure occurs, an ISP may experience downtime or system failure, resulting in lost revenue and subscribers. Firewalls may be important, for example, because they provide an additional layer of security beyond router ACLs and simple packet filters.

Another consideration may be: is the design to include an intrusion detection system (IDS)? Hardware and software to implement an IDS may be costly. However, without an IDS, an ISP may not be able to respond to attacks in a timely manner. Depending upon the security attack and an ISP's business, the cost may be substantial. Security breaches may cost organizations billions of dollars every year. Small-scale ISPs may desire to exclude implementing an IDS for the infrastructure. This strategic business may be based on one or more of, but not limited to: IDS is not mission-critical to the business, and IDS does not fit within budget constraints.

Although excluding an IDS may reduce capital cost, it may expose an ISP to potential loss and liability. Implementing an IDS may allow an ISP to monitor who accesses data and services. If an extreme assault against an IDS's infrastructure occurs, for example, a distributed denial of services (DDoS) attack, the ISP may experience down time or system failure, potentially resulting in lost revenue and/or subscribers. In addition to these costs, there may be other costs such as litigation costs, for example, if subscribers take legal action.

Another consideration may be: what are preferred design techniques for accommodating manageability? Preferred techniques for accommodating manageability may include, but are not limited to, designing a modular ISP architecture and keeping the ISP architecture simple. Using these techniques, an ISP architecture may be designed that is preferably manageable and scalable. A guiding principle, which may be referred to as "Occam's Razor," is that no more assumptions than the minimum needed should be made. This principle may be used to choose a simplest model from a set of otherwise equivalent models of a given phenomenon. In any given model, Occam's Razor may help to "shave off" those concepts, variables, or constructs that are not really needed to explain a phenomenon. By doing that, developing the model preferably becomes easier, and there may be less chance of introducing inconsistencies, ambiguities, and redundancies.

A modular design preferably allows an ISP architecture to scale on demand and to be easily replicated with minimal changes. Changes may be confined within a module so that the changes preferably do not affect the operation of other components. Modularity preferably makes it easier to control and manage the infrastructure. For example, a modular design may allow additional front-end Web servers to be replaced or replicated relatively effortlessly without significantly affecting operations or modifying the ISP architecture. In contrast, with a non-modular approach, a simple change may require modifying many components, and the change may affect many other components.

When an ISP architecture design is based on a common operating environment and/or operating platform, it may be easier to manage. The skills and knowledge required to maintain the system may be less than those required when a system is comprised of components from many vendors.

In many cases, there may be multiple approaches for deriving a solution. However, some approaches and techniques may be less complex than others, yet provide similar outcomes and satisfy an ISP's requirements. An ISP architecture design is preferably kept as simple as possible. A simple design typically costs less and is typically easier to implement. In addition, a simple design is typically easier to manage and troubleshoot.

Another consideration may be: is the ISP architecture to be designed to meet standards for open systems? In an ISP architecture design, many components may need to be tightly integrated to create a seamless infrastructure. If an ISP architecture is designed where many or all components, both hardware and software, are designed and produced based on industry open standards, the customer may achieve benefits including one or more of, but not limited to: relatively seamless integration with current technology, little or no dependence upon a single vendor and/or proprietary standards, and increased flexibility in adopting new technologies If components in a design are based on proprietary technology (e.g. Technology produced or supported only by a single vendor, or operated only within a proprietary operating platform or environment), it may be preferable to minimize the amount of proprietary technology and the impact the proprietary technology has on the entire system. Where proprietary components are used is preferably documented, and a back-up plan may be determined in case the customer needs to replace one or more proprietary components with another vendor's components. After implementation, correcting or changing an infrastructure that was designed with non-standard and/or proprietary technology may be difficult and expensive because the ISP architecture must be redesigned.

Another consideration may be: when an ISP has significant cost constraints, is there an alternative way to meet some requirements? Outsourcing represents one way to reduce up-front capital investment, to reduce ongoing operational and management cost, and to maintain a reliable service level agreement (SLA) with business subscribers, for example. The outsourcing alternative provides ISPs, especially small- to mid-sized companies, an opportunity to enter the market without minimal or no investment of capital in resources and management staff. This alternative may work, for example, when applied to meeting requirements such as subscriber care, billing, and registration. Establishing and maintaining an internal solution may sometimes be cost prohibitive, and the ISP may not have qualified staff with the expertise and experience necessary for implementing, operating, and maintaining the system. For this example, a cost-saving approach may be to outsource to an application service provider (ASP).

Another consideration may be: are open source applications a viable alternative? Purchasing commercial off-the-shelf applications for Internet business can be very expensive, especially for small- to mid-sized ISPs entering the market. Developing applications in-house is very expensive too. Sometimes, open source applications are a good design trade off. The advantage is that applications and their source code are available at no cost and are freely distributed over the Internet. The disadvantages are lack of technical support, features, performance, security, scalability, and reliability.

As indicated at 38 of FIG. 3, in formulating and evaluating design requirements, it may be necessary or desired to address ISP architectural limitations. In general, ISP architectural limitations result from constraints imposed on an architectural design. Specifically, these limitations may reflect what can and cannot be achieved. Limitations may be encountered initially when evaluating requirements, or later, for example, due to changes requested by a customer. An example of an ISP architectural limitation is the inability to scale to support a larger number of subscribers. Another example is the inability to safely handle a higher level of transaction processes.

In at least some cases, addressing ISP architectural limitations may include documenting limitations and communicating them to the customer. In other cases, requirements and strategy may be clarified with the customer, concerns presented, risks addressed, and solutions recommended, and then a resolution agreed on. It may be preferable to make any changes now, before progressing with further design work. If one or more changes result from these meetings, the affected areas may be re-evaluated.

An ISP architecture design may have limitations, whether the limitations result from requirements, tactical business decisions, inaccurate assumptions, and/or other causes. Preferably, ISP architectural limitations may be evaluated so that risks of the limitations can be assessed and mitigated. In addition, it may be preferable to consider future limitations of an ISP architecture.

Customers may be unfamiliar with the technology included in their requirements. Customers may request features that are not possible with current technologies. Limitations are preferably addressed early in the design phase so that changes may be made with minimal impact. The customer may be advised of limitations, and one or more alternatives may be recommended. Challenges during the requirements evaluation may include one or more of, but are not limited to:
  Budget constraints.
  Requirement cannot be satisfied with technology available or applicable to a customer's operating environment.
  Technology exists; however, tools, applications, or solutions are proprietary, and, therefore, are not available or recommended for an open system environment.
  Unrealistic requirement that cannot be met.

If a major limitation is encountered in meeting a business requirement, and it cannot be addressed with alternatives, the customer may be asked to reassess the requirement and/or business plan.

Challenges encountered after a design is completed and/or implemented may include one or more of, but are not limited to:
  Customer expects ISP architecture to do things beyond its original purpose and design.
  Forecast contained inaccurate data, resulting in a non-optimal design.
  Changes occur in business or functional requirements after a design is completed, for example, the customer changes the requirements for scaling, and now wants to go from 100,000 subscribers to 1,000,000.
  More services added or running on infrastructure than planned (changes level of resource utilization, which puts the design at risk).
  Lack of qualified personnel and detailed procedures to manage infrastructure.
  Tactical business decisions affect long-term strategies, for example, deploying a short-term solution to minimize cost, then later needing to scale to a larger solution (in these cases, the customer might have to replace the original solution rather than scaling it).
  Company representative strongly favors a vendor even though the vendor's technology would not provide an optimal design.

Although initially the focus may be on evaluating limitations based on requirements presented in a business plan and a functional specification, other limitations may surface later. If a customer may change expectations later (for example, some of the company's representatives are suggesting they expect the subscriber population to grow more dramatically than stated in the requirements), it may be preferable to query the customer concerning possible later changes in expectations and to present scenarios showing options and associated costs.

Establishing an ISP Architectural Model

As indicated at 12 of FIG. 2, an ISP designer or design team establishes an architectural model. An ISP architectural model may be used as a framework for designing an ISP architecture. Establishing an ISP architectural model may include one or more of, but is not limited to: identifying core components, and applying architectural principles. In addition, building upon information presented earlier, e.g. in the subsection titled Formulating Requirements for a Design, this subsection shows how to apply the architectural model and principles to design requirements.

An ISP architectural model provides a design framework for ISP architectures, which may be complex and comprised of multiple components requiring careful consideration and design. When designing an ISP architecture, it may be helpful to use or create a model, and then apply the requirements, assumptions, and design trade offs. One embodiment of a model is presented that is based upon experience in design and resulting best practices. Although there may be other architectural models, principles, and ways of approaching a design, this embodiment focus on selected core components and principles. Note that other attributes and principals that are appropriate for a particular design may be selected from a pool of architectural design standards, and that other embodiments of architectural models may be used.

Figure 4:
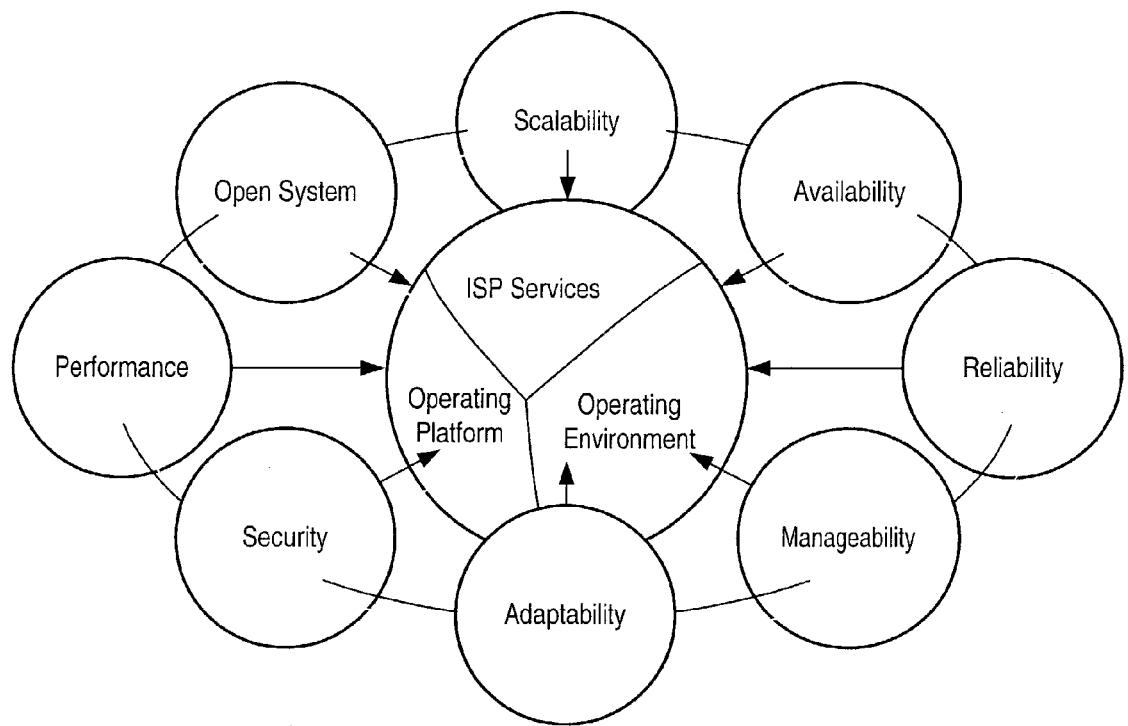
FIG. 4 illustrates an exemplary architectural model according to one embodiment.

FIG. 4 illustrates an exemplary architectural model according to one embodiment. In the center of the model are core components. Core components may include one or more of, but are not limited to: an operating platform, an operating environment, and one or more ISP services. Surrounding these core components are architectural principles. As shown in FIG. 4, core components may serve as the core for the architectural design. In the outer layer, architectural principles provide structure and considerations for making design decisions, then adhering to a design.

FIG. 5 illustrates establishing an ISP architectural model according to one embodiment. The method illustrated in FIG. 5 illustrates means for establishing an architectural model according to one embodiment. As indicated at 40 of FIG. 5, in modeling an ISP architecture, core components of the ISP architectural model may be identified. In general, core components are uniform among most designs; at the minimum, there are preferably ISP services running within an operating environment on an operating platform. As shown in FIG. 4, the core of this model may include one or more of, but is not limited to, ISP services, operating environment, and operating platform. Differences in designs are typically in the selection of services, an operating environment, and the operating platform, all of which may be based on business requirements and preferences, and potentially other factors.

ISP services may be categorized into two or more types including, but not limited to: basic services, value-added services, infrastructure services, and operation and management services. The following describes each of these types of ISP services.

Figure 6:
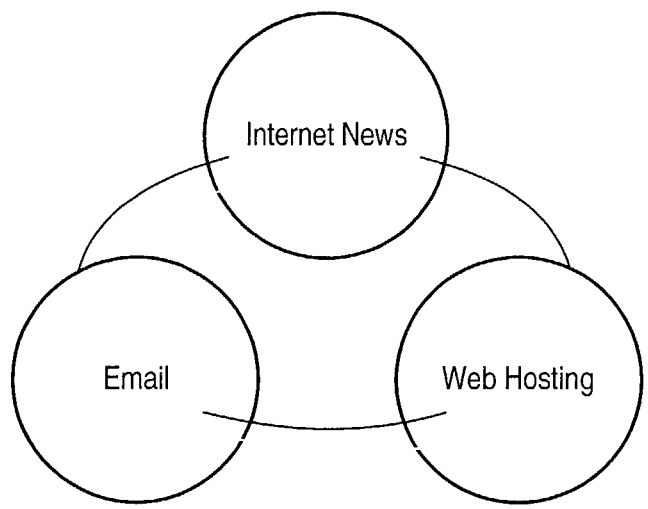
FIG. 6 illustrates basic services according to one embodiment.

FIG. 6 illustrates exemplary basic services according to one embodiment. Basic services may be defined as common services offered by ISPs to residential and business subscribers. As shown in FIG. 6, basic services may include one or more of, but are not limited to: email, web hosting, and Internet news. Although not shown, Internet access and FTP (file transfer protocol) may be considered basic services; they are required for connectivity and content uploads, respectively. Internet News may be used to post news on the Internet. Web hosting may be used to post personal Web pages. Email may be used to send and receive email.

Figure 7:
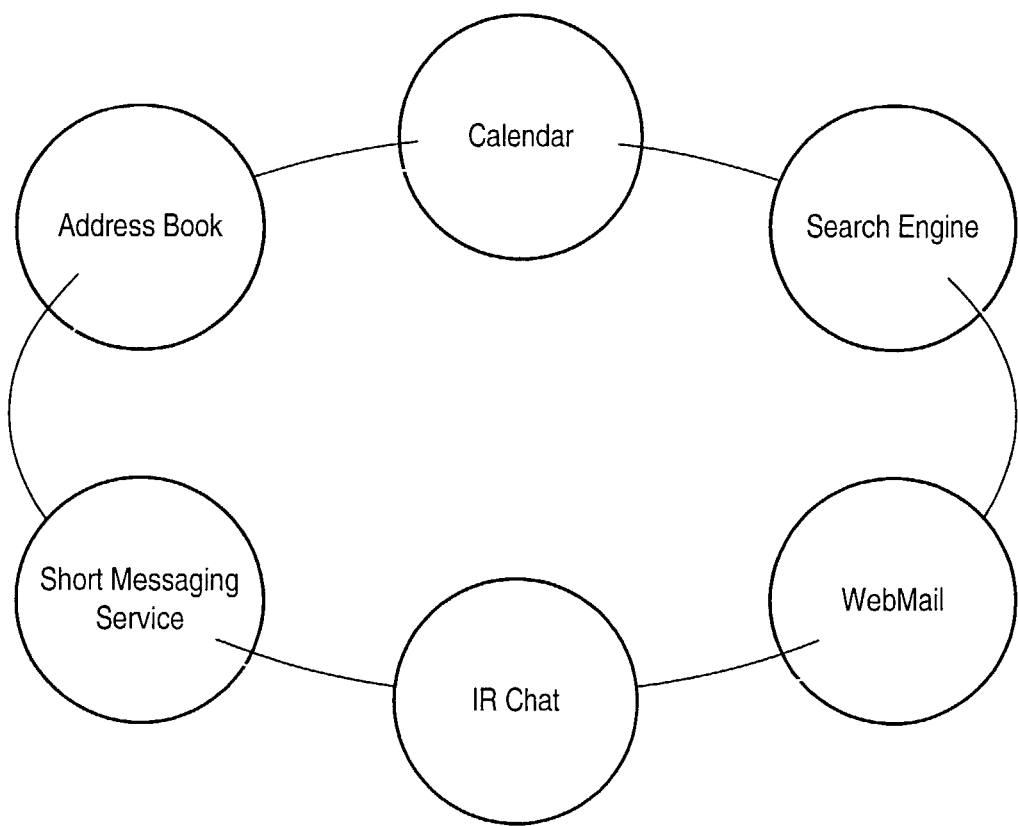
FIG. 7 illustrates exemplary value-added services according to one embodiment.

FIG. 7 illustrates exemplary value-added services according to one embodiment. Value-added services may be defined as special services offered to provide additional value to existing subscribers, to attract new subscribers, and/or to differentiate services from those offered by competitors. FIG. 7 shows a sample of value-added services, one or more of which an ISP may offer. What constitutes value-added services may vary among ISPs, and may change as competitors follow leaders. Samples of value-added services are calendar, search engine, WebMail, Internet Relay Chat (IRC), Short Messaging Service (SMS), and address book. Other value-added services may also be offered. A calendar may be used by subscribers, for example, to schedule appointments. A Search Engine may offer Online search capabilities to subscribers. WebMail may be used by subscribers to Email via a web browser. IR Chat may provide Internet relay chat (IRC) to subscribers. A Short Messaging Service (SMS) may be used by subscribers to send text messages. An Address Book service may be used to provide personal address books to subscribers. To add value, these services may enhance a user's experience and may provide tools that users want conveniently at their fingertips. Large ISPs typically aim to be one-stop portals for everything from web surfing to online shopping. As new services become more common, ISPs may convert value-added services to basic services.

Figure 8:
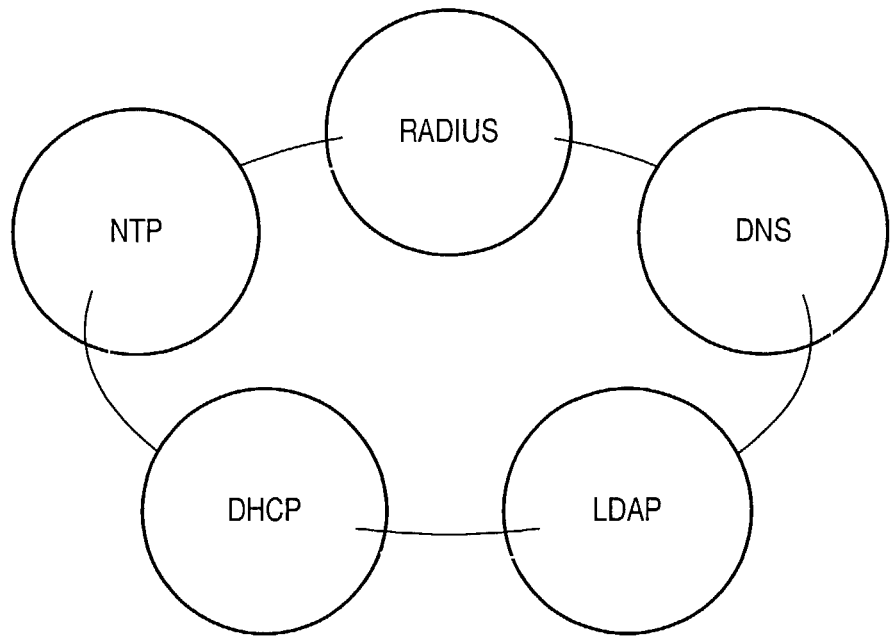
FIG. 8 illustrates exemplary infrastructure services according to one embodiment.

FIG. 8 illustrates exemplary infrastructure services according to one embodiment. Infrastructure services may be defined as services that are critical to support other ISP services running within an infrastructure. These services may run in the background and are typically transparent to users. Infrastructure services are the workhorses of infrastructure functions. Infrastructure services may include one or more of, but are not limited to:

DNS—Domain name system is for name resolution.
LDAP—Lightweight directory access protocol (LDAP) is for authentication and authorization
RADIUS—Remote access dial-in user service (RADIUS) is for remote access authentication.
NTP—Network time protocol (NTP) is for time synchronization.
DHCP—Dynamic host configuration protocol (DHCP) is for dynamic host configurations for client systems.

Figure 9:
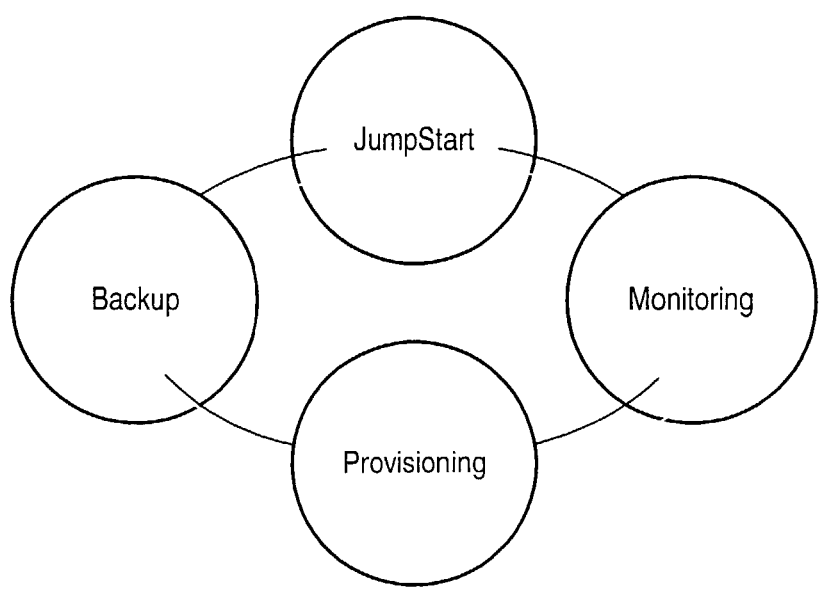
FIG. 9 illustrates exemplary operation and management services according to one embodiment.

FIG. 9 illustrates exemplary operation and management services according to one embodiment. Operation and management services may be defined as services that allow system administrators to maintain an environment and provide business continuity through uptime. These services are critical to the operation and management of an ISP. Routine tasks such as performing nightly backups, changing tapes, restarting services, installing software patches and upgrades, and monitoring ensure that the environment is working well. Although operation and management services may be technically a form of infrastructure services and play a support role within an infrastructure, one or more of these services may not be an absolute requirement, depending upon an ISP's business requirements. Operation and management services may include one or more of, but are not limited to:

JumpStart—Automates system installation and management tasks.
Monitoring—Monitors system utilization, intrusions, service availability, etc.
Provisioning—The two categories of provisioning are user and services. User provisioning may include, but is not limited to, new user registration, care, and billing. Service provisioning may include, but is not limited to, installing new software, patch updates, and software upgrades.
Backup—Nightly backup for data protection and disaster recovery.

An operating environment (OE) may include one or more of, but is not limited to, an operating system (OS) and bundled tools and applications to provide a total solution with seamless integration. Vendors may offer a wide selection of packages for their OS, with different tools and applications. Many Internet tools are developed in UNIX before they are ported to other platforms, which may be a consideration when choosing an OE. Vendors may include applications with an OE. These applications may be commercial, open source, or a combination of both. Commercial applications are typically high-end applications for enterprise environments, and licensing for these applications varies among vendors. Open source applications are typically lower-end applications with limited functionality and features, and licensing agreements are commonly provided under general public license (GPL).

An operating platform is the underlying hardware platform that supports the operating environment. This hardware may include one or more of, but is not limited to: network equipment, server systems (e.g. enterprise servers), storage, etc.

As indicated at 42 of FIG. 5, in establishing an architectural model, after core components are identified, architectural principles may be applied to the model. Referring again to FIG. 4, supporting core components of the sample ISP architectural model are architectural principles. Architectural principles are major design considerations that may help to qualify advantages and disadvantages of each design option, so that at a solution that best fits business requirements, functional requirements, and available technology may be developed. Architectural principles may include one or more of, but are not limited to: scalability, availability, reliability, manageability, adaptability, security, performance, and open systems architectural principles. These architectural principles are further discussed below. Note that there may be other architectural principles and/or design considerations than these that may be uses or considered. These architectural principles (and any others that may apply) are preferably considered when evaluating design issues and tradeoffs for core components. For example, scalability may be applied to different layers within an ISP architecture. Scalability may be addressed at the network, system, and application layers, for example. Failing to address scalability at each layer may result in non-optimal scalability for an ISP architecture.

In some cases, some architectural principles may not apply to a particular design. However, it may be preferable to initially consider the architectural principles as part of the design process, especially for large-scale environments with higher levels of complexity. For example, if cost is a significant design constraint, then adding expensive layers of redundancy to enhance availability is most likely not applicable.

Scalability is the ability to add additional resources, for example, routers, switches, servers, memory, disks, and CPUs to an ISP (or other) architecture without redesigning it. A good design takes into account the need for scalability so that, within reason, as a business grows and user demand increases, new computing resources can be added as needed or desired. Some customers may have a clear idea of their plans for growth and indicate such at the beginning, while others may need scalability to be suggested and/or built in based upon an interpretation of the customers' current and future business requirements.

FIG. 10 illustrates exemplary scaling models that may be used when addressing scalability according to one embodiment, depending upon which model is applicable to a particular design. These (a vertical and a horizontal scaling model) are simplified models that may be used to address scaling for hardware and software at the same time during the ISP architecture design process. Both models (vertical and horizontal) may apply to core components. Note that each major component within an infrastructure, for example, network, system, application, storage, etc., may have its own scaling model.

Multithreaded applications are typically more complex in their scaling model. Typically, the first line of scaling for a multithreaded application within a single system is to achieve the maximum vertical scalability by adding more resources such as CPU, memory, and I/O. Vertical scaling may be appropriate for applications that scale well within a single large server, such as database servers. In one embodiment, multithreaded applications may be scaled vertically first. When maximum vertical scaling is achieved, the same applications may be scaled using horizontal scaling techniques, for example, running the applications on multiple boxes behind a load balancer.

For single-threaded applications, the preferred model for scaling may be horizontal. In the horizontal model, a vertical scaling limitation of the server may be replaced with a more scalable load distribution paradigm. This technique may be deployed at a system level by adding more servers to increase scalability. Unlike multithreaded applications, single-threaded applications may not achieve optimal benefits from vertical scaling. For example, adding more memory may benefit single-threaded applications; however, adding another CPU typically does not. In one embodiment, scaling horizontally may be done by running multiple instances on multiple boxes behind a load balancer.

In contrast to availability, which is typically designed for failover, the purpose of multiple system redundancy in scalability is to provide a model for adding resources to increase capacity.

Availability may have many definitions within Internet architectures. In this document, availability may include the concept that resources and access to those resources are available upon request. Availability design may be predicated on the removal of any single point-of-failure within an architecture to ensure a desired level of uptime. This uptime is typically expressed in percentages and often referred as the "number of 9s." For example, many mission critical systems have a desired uptime of "five 9s," meaning that the system is available 99.999 percent of the time. FIG. 11 illustrates several availability levels according to one embodiment. Allowable downtime may be determined using the following formula:

$$\text{Availability} = \frac{MTBF}{MTBF + MTTR}$$

where MTBF is mean time between failure and MTTR is mean time to repair.

For marketing reasons, some ISPs may calculate the level of availability over a 12-month period instead of monthly. This practice yields an overall higher average level of availability than calculating it monthly, because monthly calculations may fluctuate from month to month.

For design purposes, availability may be preferably calculated monthly because system administrators typically perform maintenance monthly; therefore, monthly calculations may be more beneficial for determining allowable downtime to perform maintenance and upgrades. This practice is common among system administrators of ISPs. Other reasons for calculating monthly availability may include one or more of, but are not limited to: revenue, usage, stats, spending, etc. Are typically done monthly; and waiting for one year to find out the level of availability may be unrealistic.

An important attribute of availability design may be redundant hardware and/or software within the ISP architecture, such as network, server, application, and storage. Preferably, a design may be such that, if a component fails, it does not cause the entire ISP architecture to fail. To achieve this design objective, a modular approach may be used in the design, which preferably allows components to be replaced at any time without affecting the availability of the system.

Layers within an ISP architecture may include one or more of, but are not limited to, a network layer, a system layer, an application layer, and a data layer. At the network layer, availability may be achieved with redundant physical links to the Internet. This redundancy preferably ensures that if there is a link failure, for example, due to hardware failure, access is still available via a surviving link. In addition, redundant network components such as routers, switches, load balancers, and firewalls may be necessary or desired to preferably ensure access availability in the event of hardware failure. To enhance reliability at the network layer, most or all single points-of-failure are preferably removed from the network. For the Solaris Operating Environment (Solaris OE), IP multi-pathing (IPMP) may be used to achieve redundant network connections from the same server to multiple switches.

At the system layer, availability may be achieved with redundant servers in stand-alone or cluster configurations. For front-end servers such as those deployed in web farms, load balancers may be used to ensure availability in the event that one or more servers fail to respond to service requests. In a cluster environment, two or more servers may be configured to provide high availability. The number of nodes configured in a cluster may depend upon the software and hardware. If one server fails, one of the surviving servers may take over and respond to service requests. A fundamental difference between stand-alone servers and clustered servers is the ability to maintain session states. If a stand-alone server fails while a session is active, the connection may be reestablished from the client. However, if a clustered server fails, the session state and connection may be maintained by a standby server.

The cost of redundant servers and software licensing may be expensive for small-to mid-size ISPs. However, without redundancy, ISPs may lose subscribers and revenue to competing ISPs because of subscriber dissatisfaction from service interruptions. Subscriber expectations for availability and reliability are typically high, and many ISPs offer high availability and reliability.

At the application layer, availability may be achieved with clustering and high availability software. Applications may be configured with clusters or high availability to enhance availability in the event of service failure. Service failure and restart may be automatically invoked through service failure detection and monitoring. In addition, availability at the application layer may be enhanced by using a load balancer with multiple servers.

At the data layer, availability may be achieved with redundant storage arrays coupled with logical volumes. Redundant storage arrays may allow data to be accessible in the event of a controller or storage array failure. Logical volumes and RAID (redundant array of independent disks) may ensure the accessibility of data in the event of disk failure.

At the data layer, RAID 0+1 (stripping and mirroring) and/or RAID 5 (stripping with parity) may be used to achieve availability and reliability in case of disk failure. RAID 0+1 may be a more expensive solution because more hardware (e.g. Storage arrays and disks) is needed. However, one advantage of RAID 0+1 is that no performance degradation occurs due to a disk failure. RAID 5 may have performance degradation if a disk fails, because data may have to be rebuilt from parity.

Reliability is best defined from the perspective of end users. Users want network services and servers to be available when they access them. Reliability for users is consistency of service uptime and availability. To users, a system is reliable when they do not frequently encounter busy signals on their modems, network connection error messages, etc. From an architect's perspective, reliability is uptime and service response time for users, so that a system is available when users access services. For businesses today, especially service providers, reliability of service has implications beyond customer satisfaction. Because service providers typically establish and maintain their reputations based on availability and reliability of their services, many may require carrier-class grade high availability and reliability.

Reliability may depend upon and be affected by the design for availability; therefore, a design for an ISP architecture preferably balances a customer's requirements for both availability and reliability, within any constraints imposed by customer or technology.

Dependent upon availability design, reliability may be increased through an infrastructure based on redundant servers. Functionally componentized ISP architecture preferably results in more intrinsic redundancy and fewer inherent single points-of-failure. Furthermore, any damage to an individual service is preferably unlikely to affect other services. The constructs of redundancy may be useful in achieving many aspects of reliability, scalability, and availability.

Manageability addresses how an infrastructure can be managed during its life cycle. One key to manageability may be to keep an ISP architecture design simple, yet effective. A goal may be to meet all functional and business requirements without adding unnecessary complexity. If a design is too complex and difficult to manage, there is typically a higher likelihood of operation and management failure, and troubleshooting typically becomes more difficult and time consuming. In addition, management tools, management plans, and methods of monitoring services are preferably considered. It is preferable to ensure that devices and components that need to be monitored are managed. If a system goes down and there is nothing monitoring the device or component causing the outage, customer satisfaction and subscriber satisfaction may be at risk, in addition to associated costs and potential loss of revenue.

Adaptability. For any architecture, change during a life cycle is probable if not inevitable. An ISP architecture is preferably adaptable enough to accommodate growth and changes in technology, business, and user needs. Within the customer's financial constraints and growth plans, an ISP architecture that allows for adaptability is preferably designed. Modular ISP architectures may support flexibility in one or more of, but not limited to, the following ways: in a modular ISP architecture, individual components may be easily augmented; and, because components are independent, new components may be added without disturbing or revamping other components within the modular ISP architecture.

Security. From a larger perspective, security is a combination of processes, products, and people. Security may be achieved by establishing effective policies and implementing procedures that enforce the policies. Security policies may be useless without control over who has access to and can affect security on servers and services. Securing access may require establishing an appropriate authentication regime. From an ISP architecture perspective, security is access to network, system, and data resources. At the network layer, security may be achieved with one or more of, but not limited to, the following: an access control list (ACL) on routers, packet filters, firewalls, and/or network-based intrusion detection systems (IDS). At the system layer, security may be achieved with one or more of, but not limited to, the following: system hardening, access permission, host-based IDSs, scanners, and file checkers. At the data layer, security may be achieved with one or more of, but not limited to, the following: authentication and authorization.

Functional decomposition (separating functional components) may contribute to security by making it easier to build security around different components. In addition, if one component is compromised, the security breach may be more easily contained.

Adapting to evolving threats is a never-ending cycle of processes. The strategy of responding to security threats has to evolve as potential intruders gain knowledge and discover new attack techniques. It may be preferably to design security strategies with great flexibility in approaches to provide the best security against present and future threats.

Performance. In this document, performance may include the notion of the "expected" response time after a user requests a service. Depending upon an ISP's requirements, response time may be critical or non-critical, and these distinctions may be further refined by service type. Causes of slow response times may include one or more of, but are not limited to: network latency, server degradation, and application responsiveness. Degradation at any of these layers may result in poor overall performance.

Individual services use system resources, for example, memory, CPU, and I/O, in different ways. A modular ISP architecture may provide the ability to independently monitor and tune each service. A system may be easier to tune when it is running only a few applications. When many applications are running on a system, the applications typically share resources, and tuning may become more complicated and challenging.

There are commercial products that may be useful in managing resources; for example, Sun Microsystems offers Solaris Resource Manager (SRM) and Solaris Bandwidth Manager (SBM). SRM manages resources for users, groups, and enterprise applications. SBM controls bandwidth allocated to applications, users, and organizations. Other commercial products may be available for managing resources.

Open System. Preferably, design is performed using an open system approach so that an ISP architecture is not dependent upon a single hardware or software vendor. An ISP architecture may be less flexible when built upon proprietary specifications. Building upon a set of open system standards that are accepted by a recognized consortium may provide greater flexibility for business changes and growth, such as adding users and services and integrating new technology.

Creating a Logical Design

As indicated at 14 of FIG. 2, after evaluating an ISP's requirements and applying an architectural model as described above, an ISP architecture may be designed. To achieve the architectural principles and preferably arrive at an optimal ISP architecture, the user may start with a logical design, and then move into the physical design described later in this document. In this document, the term topology may refer to both network and service components. In general, network topology is hierarchical and service topology is not hierarchical.

This subsection describes several elements for creating a logical design. These elements may provide a high-level framework that provides a logical structure for designing an ISP architecture from the top level down. Elements for creating a logical design may include one or more of, but are not limited to, identifying high-level topology, identifying services within the topology, defining service flows, and defining networking components.

A high-level framework may serve as a logical structure within which the top-level elements of an architecture may be designed. Without a high-level framework, creating an optimal ISP architecture design may be based more on trial-and-error than science and methodology. Elements for creating a high-level framework may include one or more of, but are not limited to, identifying a high-level topology, identifying services within the topology, defining service flows, and defining networking components.

Figure 12:
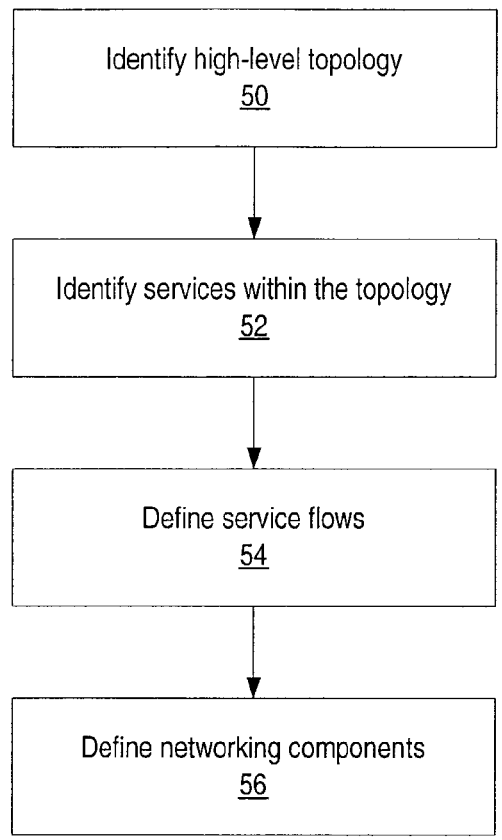
FIG. 12 illustrates creating a logical design according to one embodiment.
Figure 13:
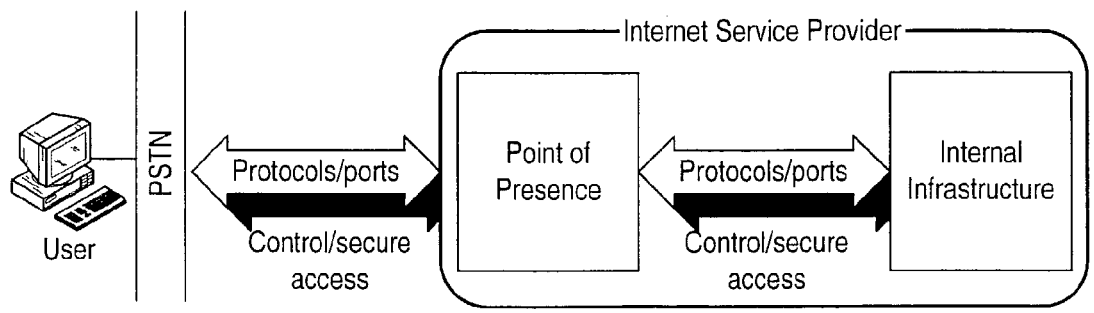
FIG. 13 illustrates a generic, high-level topology for an ISP architecture according to one embodiment.

FIG. 12 illustrates creating a logical design according to one embodiment. The method illustrated in FIG. 12 illustrates means for generating a logical design according to one embodiment. As indicated at 50 of FIG. 12, in one embodiment, creating a logical design may begin with identifying a high-level view of the topology. FIG. 13 illustrates an exemplary generic, high-level topology for an ISP architecture according to one embodiment. Depending upon a customer's requirements, the topology for an ISP architecture may include additional elements and/or may exclude one or more of the elements illustrated in FIG. 13. At a minimum, an ISP configuration typically includes two elements: point of presence (POP) and internal infrastructure. As shown in FIG. 13, a user may connect to an ISP via a public switched telephone network (PSTN). Access between a user and POP may be controlled and secured. Preferably, only infrastructure services and associated protocols/ports that are necessary to facilitate connectivities to an ISP may be enabled. The internal infrastructure represents an ISP's internal environment where services are run and physical servers reside. Services running on the internal infrastructure may include one or more of, but are not limited to: basic services, infrastructure services, and value-added services (where applicable). After subscribers connect to an ISP, they may access internal services and the Internet.

Figure 14:
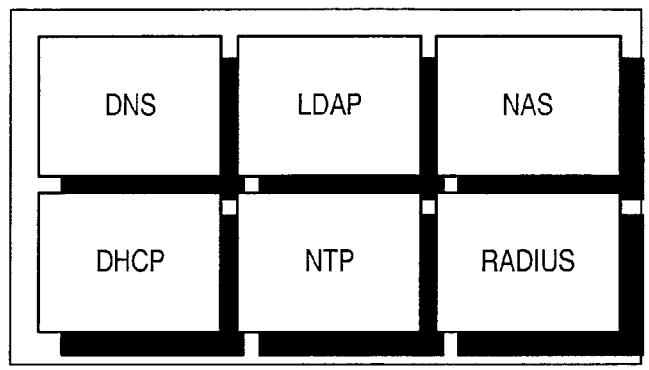
FIG. 14 illustrates an exemplary POP topology and indicates which services are required for POP according to one embodiment.

FIG. 14 illustrates an exemplary POP topology and indicates which services are required for POP according to one embodiment. POP (point of presence) is the access point where subscribers connect to an ISP via a PSTN. The POP may ensure proper authentication and authorization for subscribers accessing an ISP's services. In one embodiment, services running at the POP may include infrastructure services only. The infrastructure services at the POP typically include one or more of, but are not limited to: domain name system (DNS), lightweight directory access protocol (LDAP), network access server (NAS), remote authentication dial-in user service (RADIUS), network time protocol (NTP), and dynamic host configuration protocol (DHCP). All of these infrastructure services are typically transparent to subscribers, yet may be necessary or desired for providing seamless access to an ISP and its services. Generally, an ISP has at least one POP as a point-of-access to the ISP and its services.

For a single-site configuration, a POP typically resides at the ISP's data center and provides subscribers with access to an ISP when they are within the local coverage area (local POP). Additional POPs typically reside outside of an ISP's data center at remote locations that may be geographically dispersed (remote POPs). Additional POPS may be added enhance an ISP's capacity for supporting a larger number of concurrent subscribers. POP structure for remote locations may be similar to local POP, with the possible addition of cache and one or more console servers. Because remote POP resides remotely from an ISP's data center, a cache server is typically necessary to cache frequently accessed data, thereby reducing network traffic between the remote POP and the ISP. A remote POP may require one or more console servers for remote servers and network devices. A console server may be preferably located close by the devices managed because, for example, console server cabling has short signal attenuation. System administrators at an ISP may be able to access a console server remotely through the network. When additional POPS are added, they are typically remote POPS to support the subscriber population beyond local subscribers and to maintain low cost and convenient access for remote and nomadic subscribers. Adding remote POPS preferably increases access points to an ISP and capacity for supporting more, potentially concurrent, subscribers. In addition, ISPs may offer roaming access in addition to local access.

Within an internal infrastructure, network topology may be divided into logical tiers or layers. In one embodiment, access through each tier or layer may be secured by separate sets of firewalls. Network segmentation preferably simplifies an ISP architecture design, where various modules work together to form a complex design that is preferably highly scalable and easy to manage. Reasons to divide network infrastructure into multiple layers may include one or more of, but are not limited to: enhancing network performance by segmenting collision and broadcast domains; enhancing security through tier separation with multiple levels of secure firewalls; achieving N-tier ISP architecture by functionally decomposing services; and simplifying management and troubleshooting through compartmentalizing tiers.

Figure 15:
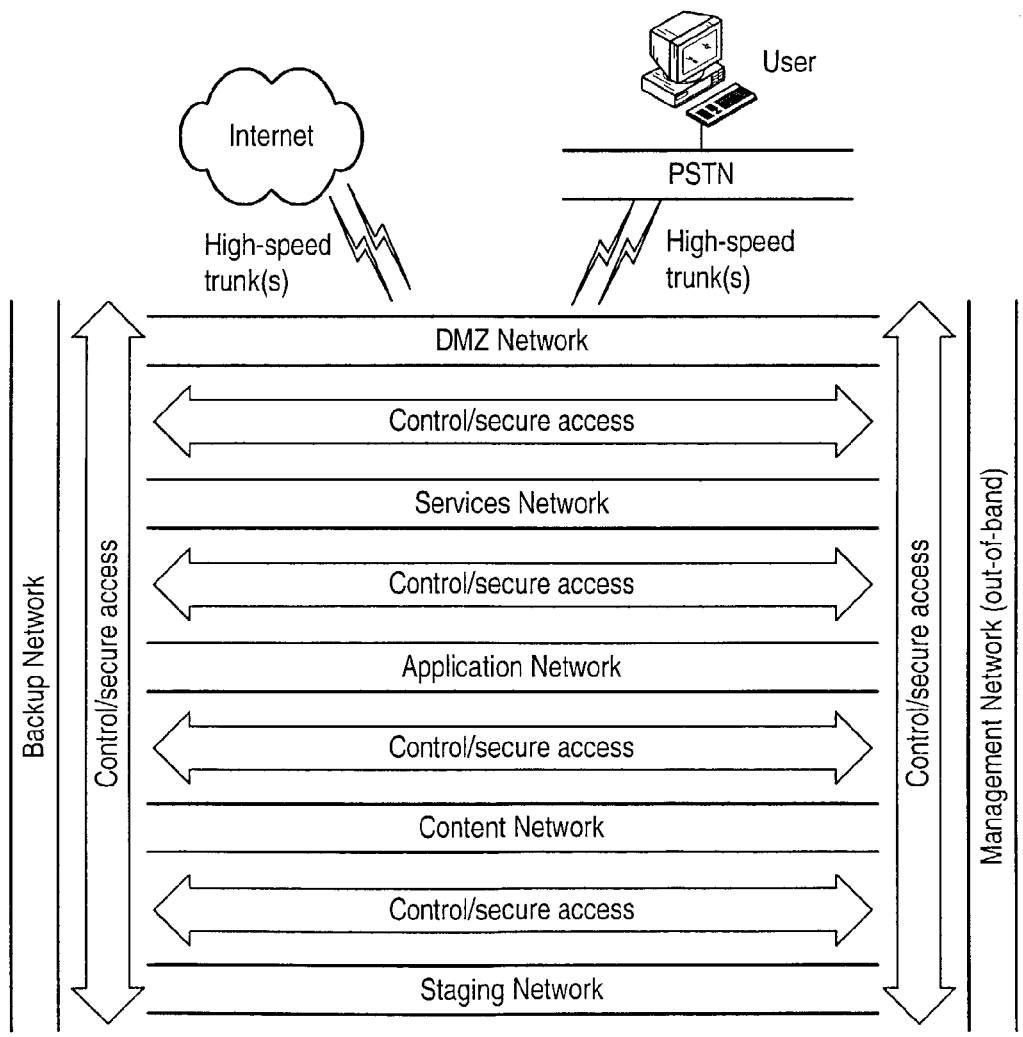
FIG. 15 illustrates an exemplary network infrastructure partitioned into layers according to one embodiment.

FIG. 15 illustrates an exemplary network infrastructure partitioned into layers according to one embodiment. These layers may include one or more of, but are not limited to: demilitarized zone (DMZ) network, services network, application network, content network, staging network, backup network, and management network. Each network layer may have its own function(s), and each service is preferably strategically placed on one or more layers, based on its function. Depending on a service's function, a service may run on one or more layers, resulting in an intricate structure that preferably facilitates optimal security and performance.

In addition, network segmentation preferably divides broadcast and collision domains. This structure isolates traffic types to preferably enhance network response and reduce network latency. For example, a broadcast storm and resulting performance degradation may be contained within a network segment so that other network segments are unaffected.

As indicated at 52 of FIG. 12, one or more services within the topology may be identified. In one embodiment, services within each layer may be identified based on the logical network topology identified using the subsection Establishing an ISP Architectural model. As illustrated in FIG. 15, network infrastructure may be partitioned into layers of networks including one or more of, but not limited to DMZ, services, application, content, staging, backup, and management.

Services may be preferably partitioned or functionally decomposed into multiple layers, whenever possible, to achieve an N-tier ISP architecture. Isolating each layer may allow architectural elements to be modular, and employing this approach preferably enhances security and manageability. Depending on the services, some services may be partitioned into two or more layers. For example, mail service may be functionally decomposed into the following exemplary layers:

Mail relay at the DMZ network to accept incoming mail from the Internet and relay outgoing mail to the Internet Mail proxy at the services network for users to access email service Mail server at the content network to contain a MailStore (back-end server for email)

Figure 16:
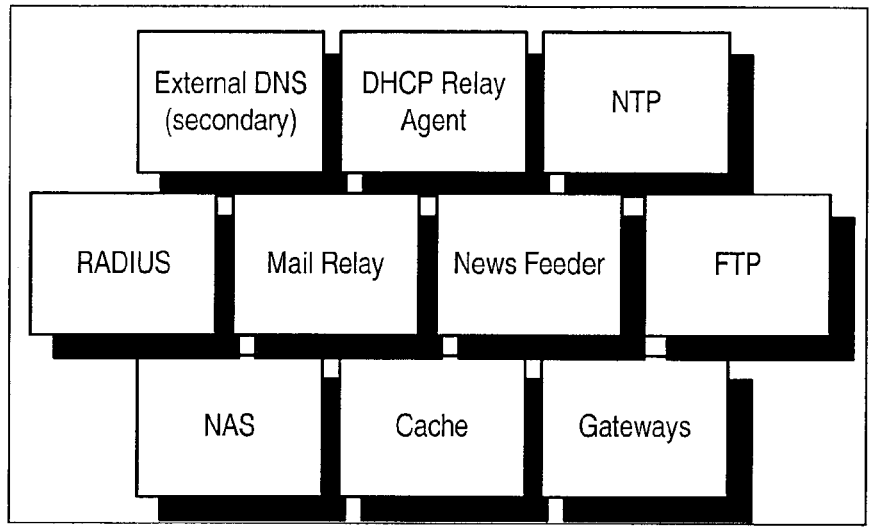
FIG. 16 illustrates an exemplary DMZ network according to one embodiment.

FIG. 16 illustrates an exemplary DMZ network according to one embodiment. The DMZ network is the intermediary network between the public Internet and an ISP's internal networks. The DMZ network preferably separates the "trusted" internal networks from the "untrusted" networks-those that are accessible to the public. Services running at the DMZ network are typically public services that may require or desire direct Internet access. For example, one or more of the services in FIG. 16 may require direct access because the services are communicating with external services from the Internet. For security reasons, servers from the Internet preferably are not able to directly connect to an ISP's internal servers.

POP services may be integrated on the DMZ network. Acting as intermediaries between the Internet and ISP, POP services may provide open communication channels to the Internet while maintaining secured and controlled access to ISP services.

The external DNS may be required for name resolution of external hosts from the Internet. A traditional DNS configuration may work for most ISP environments; however, a better configuration may be a split DNS. This configuration splits DNS into internal and external domains, and is an example of separating tiers by dividing the line between internal and external access. Separating DNS into internal and external domains may offer advantages including one or more of, but not limited to, the following: a split DNS prevents internal host names and IP addresses from being revealed over the Internet, preferably allowing a higher level of security, safeguarding internal hosts from some external attacks, such as denial of services (DoS); and a split DNS preferably enhances security and preserves public IP addresses where addresses are critically diminishing.

While having a primary external DNS server reside at the DMZ is common, it may be preferable to move the primary external DNS server to the content network or at least somewhere on the internal networks, because in those locations the DNS may be protected by multiple firewalls, and to configure only secondary external DNS servers at the DMZ network. All zone transfers may be one-way from a primary server to a secondary server. A list of secondary servers may be specified to ensure that only authorized servers are allowed for zone transfers.

Mail relay may be used for relaying incoming and outgoing mail messages between the Internet and an ISP. One purpose of mail relay is to accept inbound email from the Internet and send outbound email to the Internet. For inbound mail, the mail relay may play a role in enhancing security by functioning as an intermediary layer between the Internet and the MailStore. Hardware required for mail relay servers is typically lightweight and may be replicable horizontally with minimal configuration change and effort. Mail relay servers may be load balanced to provide a higher level of availability.

DHCP may be used for dynamic network configurations for client systems. These network configurations may include, but are not limited to: hostname, IP address, net masks, domain name, DNS server(s), and default gateway. Automatically configuring these parameters may be important in maintaining a centralized administration environment. A preferable location for a DHCP server is at the services network. A DHCP server may be placed at the DMZ network; however, for security reasons, it may be preferable to include a DHCP relay agent with this configuration. DHCP at the DMZ network is typically configured with a DHCP relay agent. This configuration may be done in several ways, including the following. One way is to have a dedicated server running DHCP relay agent software. Another and preferable way is to enable a DHCP relay agent on the router to forward DHCP messages. With this configuration, a router forwards DHCP messages to connected networks without needing a dedicated DHCP relay/server on every network.

A news feeder may receive incoming feeds from UseNet providers or upstream news servers, as well as propagate new articles and newsgroups to downstream news servers. For security reasons, the news feeder is typically configured at the DMZ network. News feeders are typically responsible for content management and storage. Hardware requirements for news storage may be large. For example, an estimate for news storage is that approximately 300 Gbytes of storage is required for daily news from a full feed. Due to the sheer volume, most ISPs either outsource news service to a UseNet provider or filter news feeds and moderate newsgroups to keep content manageable and minimize cost.

RADIUS may be used for authentication of remote users connecting to an ISP. RADIUS may interface with a wide variety of NASs and authenticates remote users against various databases, including relational databases and LDAP RADIUS is typically configured at the DMZ network, on the same network as NASs.

NTP may be used for time synchronization with external clocks. The external clock may be, for example, a hardware clock or NTP server. A dedicated hardware clock is rarely configured for small ISPs. NTP may be important in ensuring that time is accurate and synchronized between servers in an infrastructure. This synchronization may be critical for firewalls to maintain proper access to an ISP, based on time of the day. In addition, this synchronization may be necessary for the NFS server to maintain proper file access for network file systems.

FTP (file transfer protocol) may be used for uploading web content from a subscriber's system to an ISP. For security reasons, the FTP server may be configured at the DMZ network only.

NAS is a highly concentrated digital modem pool with high-speed connections, such as T1 and channelized T3. Each T1 connection can provide 24 channels (23B+D), where each B channel provides 64 Kbit/sec and each D channel provides 16 Kbit/sec. The D channel is for signal provisioning and cannot be used for connection purposes. A channelized T3, also known as CT3, is a multiplex of 28 T1s. For small ISPs, one or more T1s may be sufficient, depending upon the number of concurrent users to be supported. For larger ISPs, a CT3 may be more economical because a single CT3 costs less than the equivalent multiplex of T1s. Because an access server provides access to an ISP for remote users, NAS is commonly configured at the DMZ network. However, NAS for larger sites is typically attached to a separate access network instead of the DMZ.

A cache server may be used to cache frequently accessed data such as web content, thereby preferably enhancing performance by reducing network traffic. A cache server may be preferably located close to subscribers for optimal response time. A cache server may be omitted for local POP, because data resides locally at the ISP. However, for remote POP, a cache server may be preferable. For every remote POP, a cache server may be important to preferably ensure an acceptable level of performance, because data resides remotely.

A gateway is a point of interconnect between a data network and other networks that require protocol conversion. Interfacing networks may be voice or wireless networks, as well as legacy systems. For example, a wireless application protocol (WAP) gateway may be used between a wireless network and a data network, where wireless markup language (WML) may be converted to/from HTML format. (A WAP gateway is typically needed for serving wireless services.) Gateways typically are configured at the DMZ network. All access to an ISP's data network is preferably done at the point of interconnect to an ISP, that is, the DMZ network.

Figure 17:
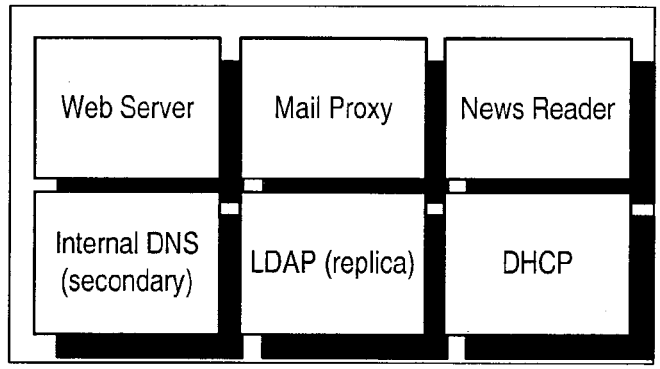
FIG. 17 illustrates exemplary service components that may be configured at the services network according to one embodiment.

FIG. 17 illustrates exemplary service components that may be configured at the services network according to one embodiment. The services network may provide front-end access to ISP basic services for subscribers. Front-end servers at the services network are typically small, and configured to replicate and scale horizontally with minimal changes. Front-end servers typically do not contain data, and typically reside behind one or more load balancers, preferably ensuring continuous services to subscribers through traffic distribution and redirection in the event of server failure.

Each service such as email, web, or news may be installed on separate servers. However, for management purposes, it may be preferable to install all services onto a single server. Configuring all services on a single server may provide advantages including one or more of, but not limited to, the following: single configuration for all front-end servers; ease of replication for horizontal scalability; and minimum configuration and effort required for replacement Services running at the services network may include one or more basic services and one or more infrastructure services that, for example, may be too vulnerable to run at the DMZ network. The following describes each service typically placed on the services network.

A collection of web servers, called a web farm, are front-end servers that provide access to users' personal web pages. Web content may be either static or dynamic, depending on an ISP's service offering. Static web content usually resides either locally on the same server as the web server or on a centralized content server, such as an NFS server. Dynamic web content typically does not reside locally. Instead, dynamic web content may be generated by an application server, and may reside on an application server or a content server. In general, hardware configurations for front-end web servers are lightweight and replicable horizontally with minimal configuration change and effort.

At the front-end of the DMZ network, one or more mail proxies may interface with users for accessing email. For mail retrieval, post office protocol v3 (POP3) and Internet mail access protocol v4 (IMAP4), for example, are offered to subscribers as methods for accessing email. Simple mail transfer protocol (SMTP), for example, may be offered for sending mail. Advantages of POP3 which make it popular among ISPs may include simplicity of the protocol and the modest demand on the mail server (because most of the work is done on subscribers' systems). IMAP4 may be advantageous to business users due, for example, to its rich features and functionality, and IMAP4 is becoming more common among ISPs. Hardware required for mail proxies may be lightweight and may be replicable horizontally with minimal configuration change and effort. Note that a mail proxy running an IMAP4 server may require more CPU and memory than POP3.

A news reader is a front-end news server where subscribers read and post news articles. A news reader typically does not have local content. A news reader may interface with the news feeder for news articles, history, and index. Although both news reader and news feeder may be installed on the same server, a preferred approach may be to functionally decompose the news service into two tiers. News readers may be responsible for service requests at the front end. The hardware required for news readers may be lightweight and replicable horizontally with minimal configuration change and effort.

The internal DNS is typically used for name resolution of hosts on internal networks only. The tier separation of external and internal DNS preferably enhances security. Internal DNS servers may be configured almost anywhere on an ISP's internal network. A common configuration for internal DNS is placing a primary server on the content network and one or more secondary servers on the services, application, or content network. For security reasons, it may be preferable to not place an internal DNS server on an external network such as the DMZ network.

Internal secondary DNS servers may be preferably configured to serve as forwarders. All systems on internal networks preferably have resolvers configured to point to internal secondary DNS servers for name resolution. If an external name needs to be resolved, the internal DNS server forwards the query to an external DNS server. For systems on internal networks that do not require DNS, it is preferable that they be configured to use a local hosts table. This configuration preferably reduces the impact on DNS servers and limits security risks, for example by only opening port 53 where required. For reliability, multiple secondary servers are preferably strategically placed on various networks to preferably ensure service access. These servers may be coupled with front-end load balancers to preferably provide availability, because DNS is critical to an ISP. If designed improperly, DNS service may represent a single point-of-failure to an ISP architecture.

LDAP is a centralized method of authentication and authorization. All accesses are authenticated against LDAP, including, but not limited to, RADIUS, FTP, and email. Billing systems may use LDAP, for example, for user provisioning, registration, and customer care. LDAP is designed for read-intensive purposes. For optimal performance, it may be preferable to direct all LDAP queries (read/search) to replica directory servers. It may be preferable to use a replica for read-only purposes. Even though a master directory server can answer LDAP requests, the master directory server's system resources may be better used for LDAP writes, updates, and data replication. In one embodiment, different directory indexes may be included on the master and replicas. Indexing may speed up searches, but may slow down updates. Indexes typically use more memory and disk. Each replica directory server may be capable of supporting millions of entries and thousands of queries per second. The directory service preferably enables key capabilities such as single sign on (SSO) and centralized user/group management. Some services, such as email, FTP, and RADIUS may access LDAP as read-only. Preferably, few services access LDAP with read-write permission. Services that may access LDAP with read-write permission may include one or more of, but are not limited to: calendar, webmail, billing, and directory replicas.

Similar to internal DNS servers, directory servers may be configured almost anywhere on an ISP internal network. For security reasons, it may be preferable to place the master directory server on the content network. A common configuration for directory replicas is to place them on the network where LDAP queries are intensive, such as the services and content networks. If multiple replicas are designed, they may be preferably strategically placed on various internal networks to enhance reliability. It may be preferable to avoid placing directory replicas on the DMZ network, because the DMZ network may be less secure than the services network or other internal networks, where firewalls may provide additional security. The hardware configuration for a directory replica is typically a multiprocessor system with a large amount of memory. For a directory master, CPU and RAM requirements may be less than directory replicas if the master is dedicated to perform only LDAP writes, updates, and data replication.

The following is an exemplary process for planning for LDAP according to one embodiment, and is not intended to be limiting. Note that other embodiments may include additional elements and/or exclude one or more of the elements listed here. Also note that, while the elements of the process are shown in an order, the elements may be performed in other orders, and/or two or more of the elements may be performed simultaneously or overlapping:

Perform business and technical analysis.
Plan directory data.
Plan directory schema.
Plan directory tree.
Plan replication and referral.
Plan security policies.
Plan indexes.
Evaluate the plans.

DHCP may be used for dynamic network configurations for subscribers' systems. These network configurations may include, but are not limited to: hostname, IP address, net masks, domain name, DNS server(s), and default gateway. Dynamic configuration of these parameters may be important in maintaining a centralized administration environment. For an ISP environment, DHCP may only serve dial-up users. ISP servers typically do not require DHCP service, and static configuration may be preferred. For redundancy, it may be preferable to have a backup DHCP server on the internal network. DHCP relay agents may be placed on various networks so that the agents may relay DHCP messages to a DHCP server on the services network. For a preferred configuration, enabling DHCP relay agents at the router may eliminate the need for having dedicated DHCP relay agents or servers on every network. For security reasons, it may be preferable to not place a DHCP server on the DMZ network.

For environments where content may be dynamically generated when requested, an application server may be required. Application servers may be placed on the content network; however, it may be preferable to place application servers on their own network. This configuration may be useful if an ISP wants to offer application service provider (ASP) services in the near future. For smaller ISPs, the application network may be omitted if web content is static and application servers are thus not required. This design approach may apply to smaller ISPs offering basic services with personal home web page hosting. Another option for smaller ISPs may be to combine the application network with the content network.

Figure 18:
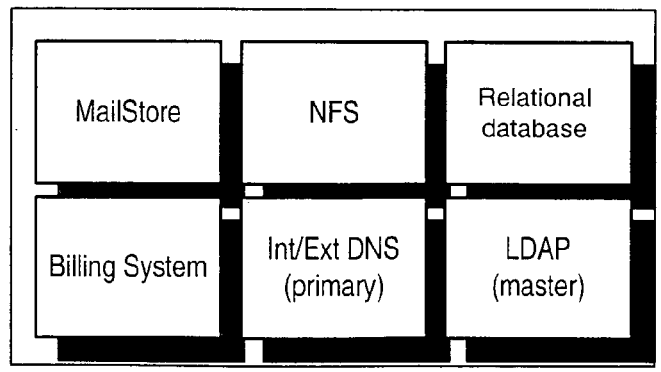
FIG. 18 illustrates an exemplary content network according to one embodiment.

FIG. 18 illustrates an exemplary content network according to one embodiment. A content network is considered the "pot of gold" by many ISPs because it is where all ISP content typically resides. A content network is preferably highly secure. An ISP architecture is preferably designed so that no servers or services from the Internet directly communicate with services or servers on the content network. Content and data on the content network is preferably centralized to increase manageability and security.

The MailStore is the back-end server for email. The MailStore may contain email messages for all ISP subscribers. For medium-sized and large ISPs, it may be preferable that some form of high availability (HA) or clustering be implemented with MailStore to enhance reliability and availability. The MailStore interfaces with front-end mail proxies (POP3 and/or IMAP4 servers) for subscriber access to email. Unlike web servers and news servers, large-scale mail servers typically do not use NFS servers for storage. Large-scale mail servers may have their own methods of indexing and storing email messages. File systems configured for MailStore are typically configured with very large numbers of inodes in the inode table due to an inherent characteristic of email: a large number of small files.

An NFS may allow file access across a network. NFS servers are commonly used for web content and news storage. For ISP environments with static web content, storing content locally on every web server may not be economical or manageable. In these cases, centralized storage on an NFS server may be preferable. For large ISPs, NFS servers are typically configured with high availability (HA) or in clusters for reliability and availability. This design principle may hold true for most, if not all, servers residing in a content network.

A database is a collection of related information, and databases come in many varieties. Inverted list, hierarchic, and network database models are all types of database systems.

These are typically inflexible and difficult to work with. In today's world of information technology, relational databases dominate information management. Relational databases store and present information in tables and hide the complexity of data access from the user, making application development relatively simple. For an ISP infrastructure, a relational database typically resides on the content network. This placement preferably provides fast access to information by users and applications within the infrastructure, while maintaining a secure and centralized environment for data storage. A relational database is typically implemented in a large-scale environment where performance, availability, and manageability are critical to the business and dynamic content generation is required. For static content in a small-scale environment, an NFS server may be sufficient.

The billing system may be a critical infrastructure service. A billing system, for example, facilitates new subscriber registration, customer care, user provisioning, and bill presentment. To achieve a seamless integration, it may be preferable to tightly integrate the billing system with the directory server. In addition, relational databases may be needed for billing platforms and are preferably integrated with billing software. For small environments, the cost of the billing system may be too steep and not cost-effective to maintain in-house. Therefore, many small ISPs outsource this function to application service providers (ASPs).

The primary DNS may be required for zone transfers and zone updates. Preferably, primary DNS servers for both internal and external domains are placed on the content network. While a primary external DNS server may reside at the DMZ, it may be preferable to locate the primary external DNS server on the content network and to locate only secondary external DNS servers on the DMZ network. All zone transfers are one-way from a primary server to one or more secondary servers. A list of secondary servers may be specified to preferably ensure that only authorized secondary servers receive zone data and dynamic updates. Guidelines for configuring DNS servers may include one or more of, but are not limited to, the following: use primary DNS servers for zone updates and zone transfers only; use secondary DNS servers for name resolution; to increase performance, point all systems to one or more secondary DNS servers for name resolution; for availability, use front-end load balancers for load distribution.

The LDAP master directory is the core of authentication, authorization, and accounting for an ISP directory service may be critical for an ISP. If not designed properly, an LDAP master directory may be a single point-of-failure. Preferably, the LDAP master directory is designed so that it is secure and highly available. The master directory server is typically configured with high availability (HA) or clusters to ensure availability and reliability. Preferably, at least a portion of the directory information tree (DIT) may be replicated to authorized replica servers. For optimal performance, preferably point systems to the nearest replicas for LDAP searches and reads and not to the master directory server directly for LDAP queries.

FIG. 19 illustrates an exemplary staging network according to one embodiment. The staging network is for installing, developing, and testing services. Before a product, service, or upgrade is rolled out for production, the product, service, or upgrade is preferably tested for usability, functionality, and performance. As illustrated in FIG. 19, a staging network typically includes areas including one or more of, but not limited to: a developing area for developing or installing software; and a testing area for testing. Although these areas do not have to be on the same network, in one embodiment these areas may be placed on the same network, with different servers for each.

The developing area may include one or more servers on which system administrators and engineers develop software for an ISP, whether the software is for managing infrastructure, offering services, or other purposes. The developing area typically does not require high-performance servers, but it preferably has adequate resources (e.g. CPU, memory, storage, etc.) and tools (e.g. Compiler, content management, source code repository, version control, etc.). Having adequate amounts of these resources may be important, for example, when multiple administrators and engineers are modifying the same code.

The testing area is for simulating how an application performs under conditions representative of a production environment. In addition, the testing area may be desired or necessary for use-case testing to verify that an application functions and works as expected in a scripted scenario. It may be preferable to configure the environment as closely as possible to the production environment, everything from hardware to software setup to preferably ensure that all metrics, such as benchmarks, accurately represent and correlate with the production environment.

FIG. 20 illustrates an exemplary management network according to one embodiment. A management network is a secure environment dedicated for systems, network, and security administration of an ISP. The management network is typically configured out-of-band, that is, the administration environment is isolated from the subscriber environment through secure access. Such segregation may be achieved, for example, through separate network switches residing behind a secure firewall. Access to the management network is preferably restricted to operations and management personnel only.

A console server may be used for managing system and network device consoles. Access to console servers is preferably secure; access is preferably only from the administration network by authorized system administrators. The console server may be preferably located in close proximity to the servers being managed by the console server, for example because console server cabling typically has a distance limitation.

The log server is for managing system logs. All system logs may be preferably directed from all servers to a centralized log server. The log server may be preferably configured with sufficient storage for logs. Scripts may be automated to rotate and archive old logs for later analysis when required. Preferably, access to the log server may be granted only from the management network by authorized system administrators. Applications that are incompatible with syslogd(1m) may be logged to local systems, but log files are preferably transferred via secure copy or other secure mechanisms to a centralized log server for archiving.

The boot/install server may be used for network booting and installation. The install server may include, for example, boot images, software images, and install scripts. Although the boot server is different from the install server, they may be configured on the same system. When configuring a boot server for small ISPs with few virtual local area networks (VLANs), preferably configure a multihomed boot server (a system with more than one network interface). This approach may be preferable to having a boot server on each network. A boot server may be required for each network because BOOTP packets cannot be forwarded beyond the first hop. Note that small ISPs typically configure a multi-homed boot server to keep costs down; however, this may represent a significant security risk. Other alternatives are available. When configuring a boot server for large ISPs with a large number of VLANs, routers may be preferably configured to relay BOOTP packets. This approach preferably eliminates the need for having a boot server on every network segment.

The management server may be used for general-purpose systems and network management of an ISP. One or more management servers may be required or desired, depending on the environment. Examples of management tasks may include one or more of, but are not limited to, monitoring services, systems, and networks. Management software such as Tivoli®, PATROL® by BMC Software, Best/1®, and OpenView® may be used. In addition, resource management software such as Solaris Bandwidth Manager (SBM), Solaris Resource Manager (SRM), and Sun Management Center (SunMC) may be used.

A backup network isolates backup traffic from other network traffic so that the backup traffic does not adversely affect response time and create network latency for other services. For most ISPs, a dedicated backup network is preferred. If an ISP has relatively little data to back up and has sufficient network bandwidth for backup traffic, a dedicated backup network may not be necessary. For small ISPs that do not have a backup network, a backup server may be preferably located on the management network. Access to the management network may need to be open to allow back-up traffic to traverse in and out of the management network. Note that this configuration may have potential security risks. For large ISPs, the backup server may be preferably located on a backup network. Preferably, only back-up traffic is allowed to traverse in and out of the backup network. Preferably, other services are not allowed to access the backup network directly. A backup network does not have to be out-of-band like the management network; however, access to the backup network is preferably limited to backup services only, such as communication between backup agents and backup servers. Separating backup traffic from other ISP traffic preferably alleviates potential network contention, ensuring appropriate response times for ISP services while minimizing network latency.

As indicated at 54 of FIG. 12, service flows may be defined. Service flow is the interaction (communication) between a client and server. In addition, service flow identifies the inbound traffic type and what is allowed or not allowed to flow into an ISP's network. By fully understanding and identifying service flows, an ISP architecture may be designed that is preferably modular and that preferably optimizes integration, security, and availability. Additionally, it may be preferable to understand service flow so that firewall rules and security policies may be established that are appropriate for the environment. To understand communication and dependency between different services, detail the service flow for each service and document it. To implement architectural principles and achieve an optimal design, service flows for each service are preferably studied and identified. The following are examples of service flow diagrams and descriptions of flows.

FIG. 21 illustrates domain name system (DNS) service flow according to one embodiment. An external secondary DNS server communicates with DNS servers on the Internet to provide name resolution for external host names. External hosts are preferably only allowed to query an external secondary DNS server. An internal secondary DNS server preferably serves only internal hosts. An internal secondary DNS server may provide name resolution for internal host names. When an internal DNS server needs to resolve an external Internet name, it may forward a query to the external secondary DNS server. For security reasons, it may be preferable to not allow an external system on the Internet to be able to resolve internal names. The environments of primary and secondary servers are preferably separated. Secondary servers may be preferably located on networks where services reside. A primary server may be preferably located on a secure network such as the content network. Content updates such as dynamic updates and zone transfers flow one-way. Secondary servers may include read-only data, whereas the primary server may read and write data. Requests for updates flow to the primary server. The primary server may communicate zone data updates to secondary servers.

Figure 22:
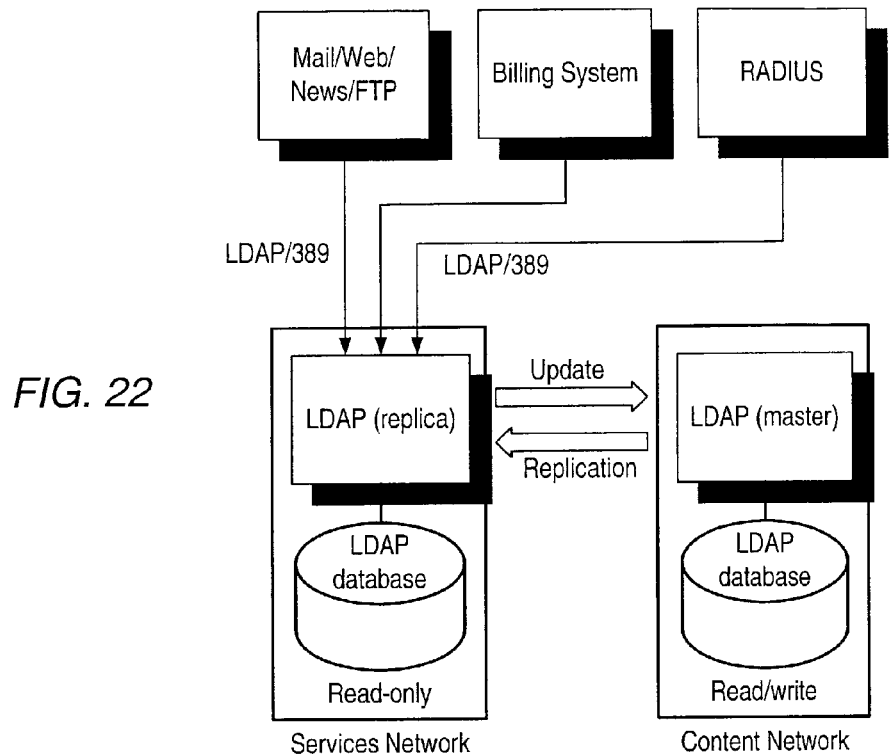
FIG. 22 illustrates service flow for a Lightweight Directory Access Protocol (LDAP) server according to one embodiment.

FIG. 22 illustrates service flow for a Lightweight Directory Access Protocol (LDAP) server according to one embodiment. Applications such as email, web, news, FTP, RADIUS, and billing may be designed to communicate with LDAP, which preferably provides centralized authentication, authorization, and accounting (AAA). All LDAP queries are preferably directed to replica servers, because LDAP servers are preferably optimized for read-intensive applications. Replica directory servers may be multithreaded and capable of processing thousands of queries per hour. Actual performance may depend on specific software and hardware being benchmarked. Replicas may answer queries and accept requests for updates; any modifications to LDAP entries flow to the master directory server. If an update request flows to a replica, the replica forwards the request to the master. Although it is possible to have a master directory server answer queries, it is preferable for performance reasons to have the master only handle writes, updates, and data replications. When the master updates the database, updates flow to replica servers based on how a system administrator set up the event. For example, updates may be sent to replicas on demand, on a regular schedule, or whenever an update is completed.

Figure 23:
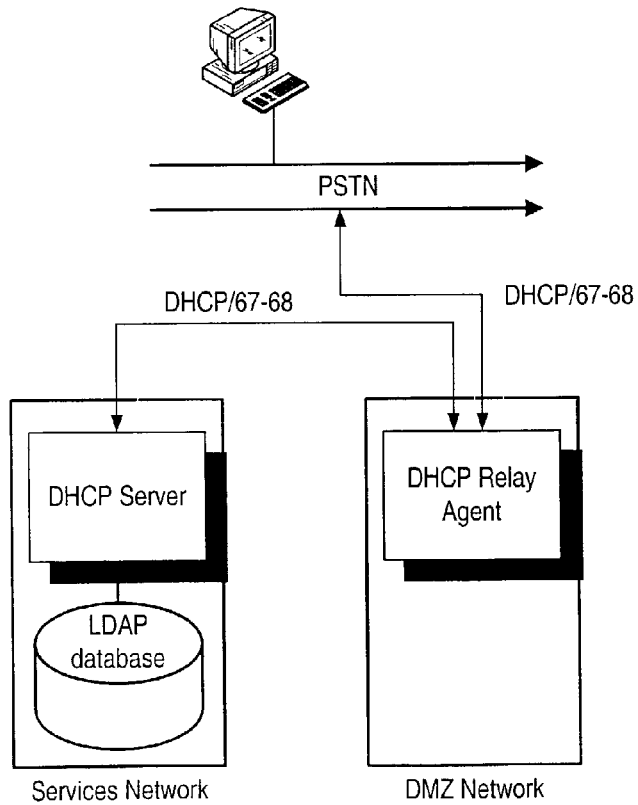
FIG. 23 illustrates service flow for a Dynamic Host Configuration Protocol (DHCP) server according to one embodiment.

FIG. 23 illustrates service flow for a Dynamic Host Configuration Protocol (DHCP) server according to one embodiment. All DHCP requests flow into the DHCP relay agent. The DHCP relay agent relays messages to the DHCP server. Requests are typically for IP address leases and some common network configurations. A subscriber's system may communicate with the DHCP relay agent server to request an IP address, and the DHCP server responds by assigning an address for a period, for example for one day (24 hours), depending upon the environment. The DHCP relay agent server is typically configured on the DMZ network or the same network where the access server resides. The preferred location for a DHCP server is at the services network.

Figure 24:
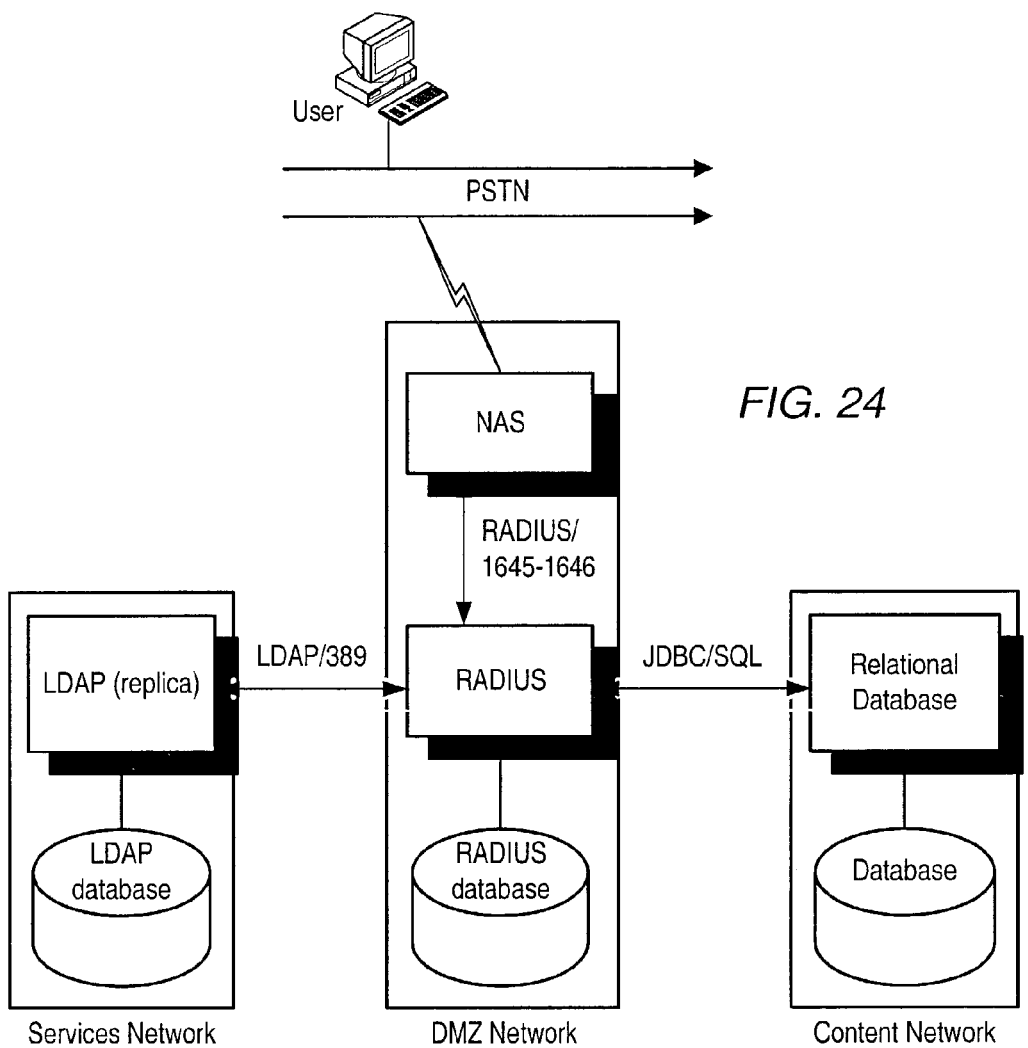
FIG. 24 illustrates service flow for Remote Authentication Dial-In User Service (RADIUS) according to one embodiment.

FIG. 24 illustrates service flow for Remote Authentication Dial-In User Service (RADIUS) according to one embodiment. When a subscriber dials in, the RADIUS server authenticates the user. The RADIUS server may have one of a local RADIUS database, a relational database, or LDAP for authenticating users. The RADIUS server may use any of these three. Note that other embodiments may use other mechanisms for authenticating users. If a centralized AAA service is desired, the RADIUS server may be configured to use LDAP. It may be preferable to use the LDAP server for authentication because it is designed for read-intensive performance. The access server's configuration tells it which RADIUS server to communicate with for authenticating users. The RADIUS server typically communicates with only two services: it receives requests from the NAS, and it communicates with the directory server to authenticate users.

Figure 25:
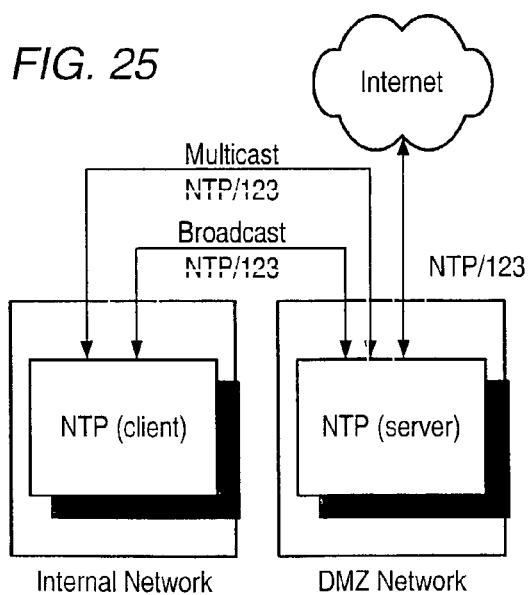
FIG. 25 illustrates service flow for the Network Time Protocol (NTP) according to one embodiment.

FIG. 25 illustrates service flow for the Network Time Protocol (NTP) according to one embodiment. In general, any or all systems may be configured as NTP clients. An NTP client may communicate with the NTP server to determine if the clock is synchronized. If necessary, an NTP client adjusts its clock based upon results of communicating with the NTP server. When users access an ISP, the firewall preferably has the correct time to allow or deny access based on the current time, if required. Servers such as the NFS server preferably have the correct time to maintain file handles for mounted file systems. An accurate time stamp is preferably maintained for all access recorded in log files. Synchronization between NTP clients and an NTP server may be done by either broadcast or multicast. In general, multicast is preferable because it has a lower overhead than broadcast.

Figure 26:
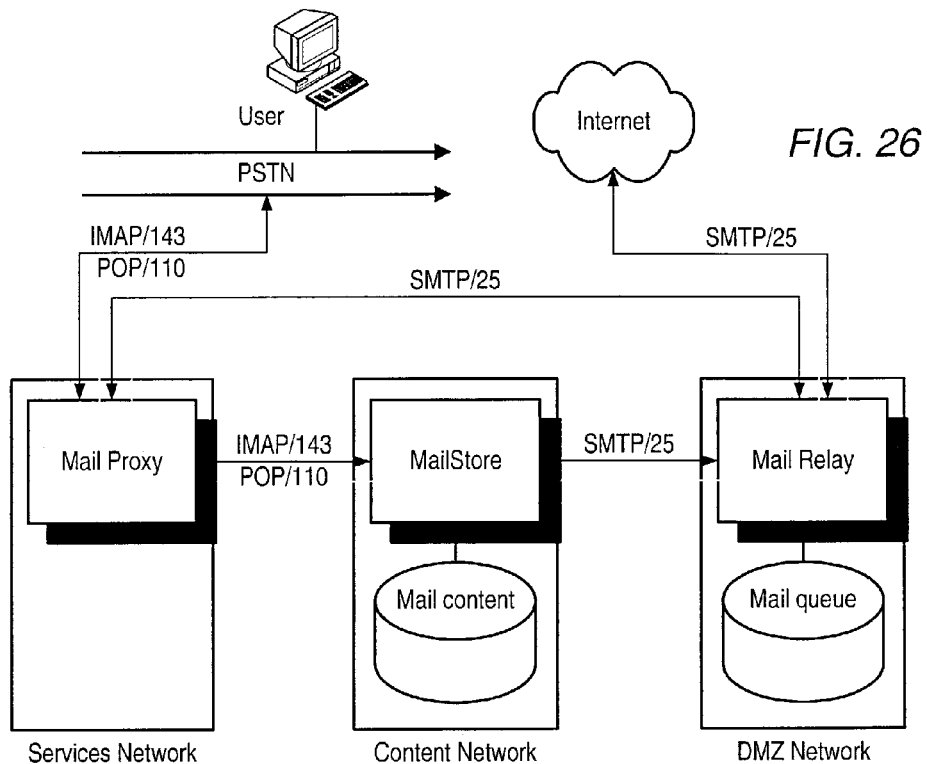
FIG. 26 illustrates service flow for an Email Service according to one embodiment.

FIG. 26 illustrates service flow for an email service according to one embodiment. Users may connect to a mail proxy server to send and retrieve email, using, for example, POP or IMAP. The mail proxy talks to a mail relay to send mail. The mail proxy talks to the MailStore to retrieve email for users. For incoming email, the mail relay server relays mail to the MailStore. For outgoing mail, the mail proxy server relays email to the mail relay. For retrieving email, the mail proxy retrieves email from the MailStore for users. Users typically only communicate with the mail proxy for accessing email services.

Figure 27:
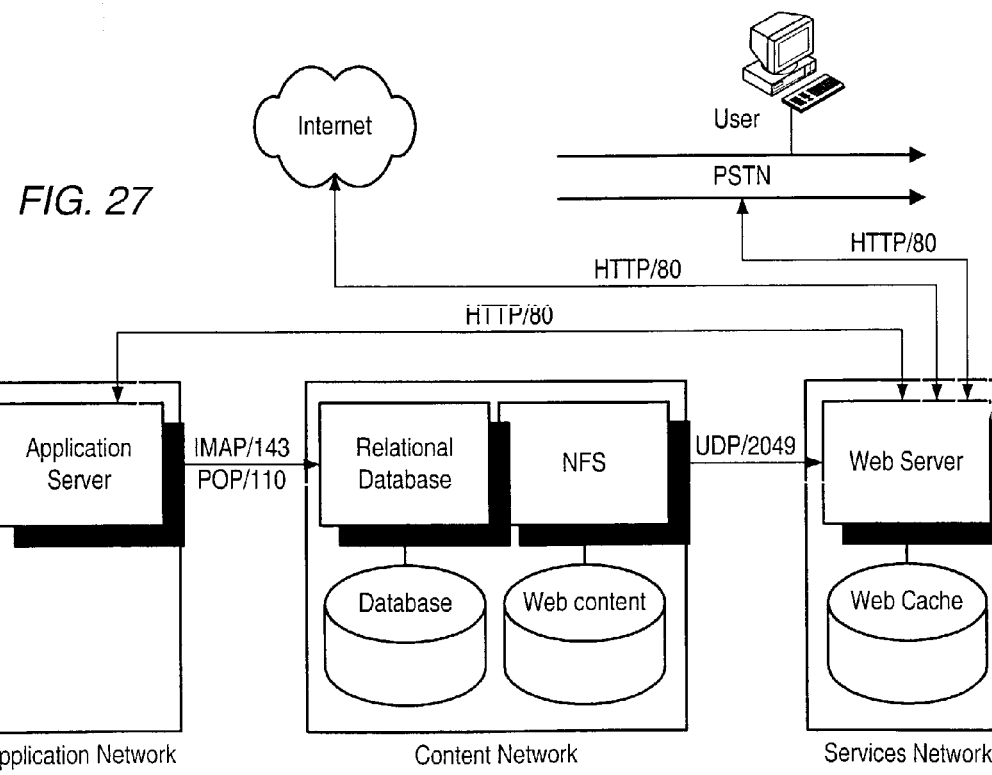
FIG. 27 illustrates service flow for web hosting according to one embodiment.

FIG. 27 illustrates service flow for web hosting according to one embodiment. To access web pages, subscribers connect to a web server via browsers. For frequently accessed data, the web server retrieves data directly from cache. Static content may be local or NFS-mounted. Dynamic content is typically generated by an application server from content residing in a relational database at the back end. For small environments with static content, NFS mounting is common. Note that NFS mounting may create heavy overhead for network traffic. For large environments, content is usually dynamic and, therefore, a relational database is commonly used instead of NFS mounting.

Figure 28:
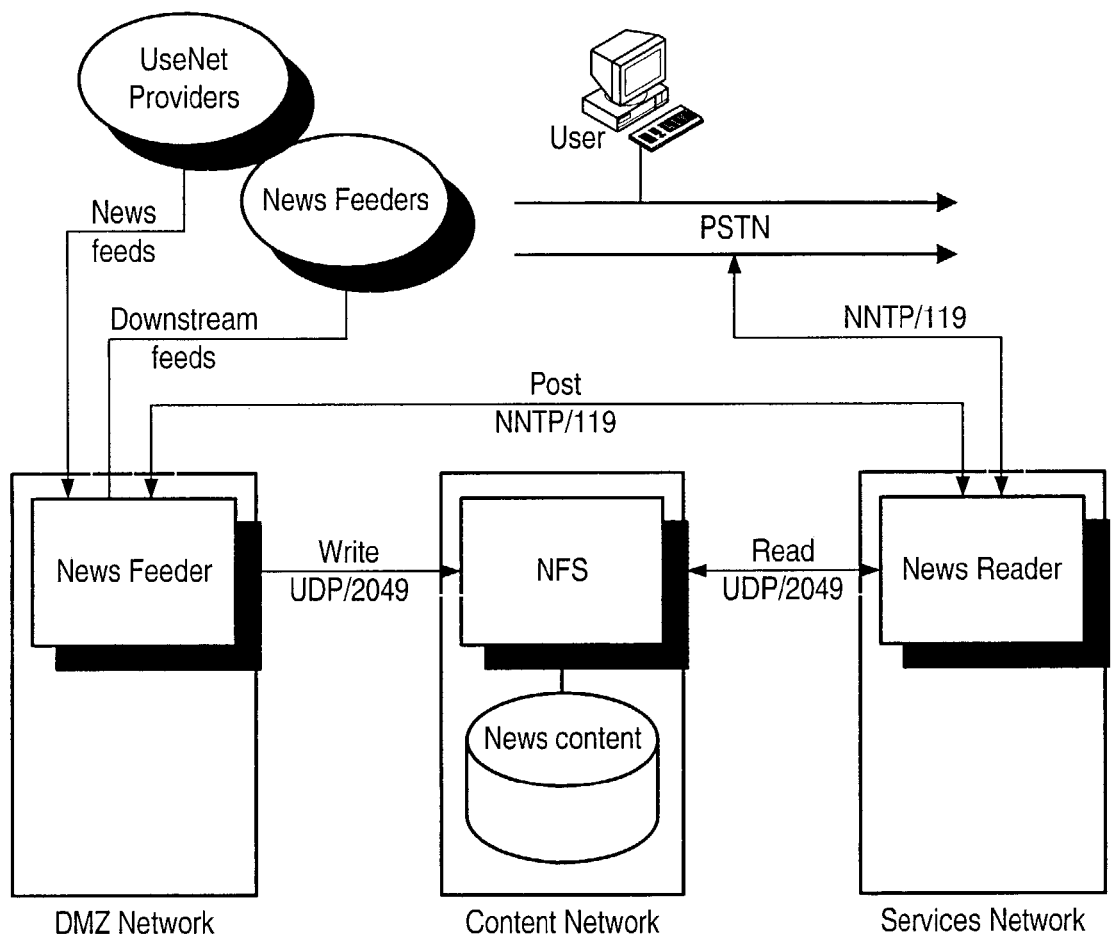
FIG. 28 illustrates service flow for a news service according to one embodiment.

FIG. 28 illustrates service flow for a news service according to one embodiment. To read or post news, subscribers may connect to a news reader, for example via browsers. The news reader may communicate with the news feeder to retrieve the content. In addition, the news feeder may communicate with a UseNet provider for news feeds. Content may reside locally on the news feeder server or on an NFS mounted file system. Multiple news feeders may be load balanced for availability. From a business perspective, it is typically not economical to run news service in-house. The resources (server and storage) required may be expensive. Therefore, news service may be preferably outsourced to a UseNet provider. If an ISP provides news service in-house, the ISP may preferably moderate and filter newsgroups as much as possible. To maintain quality and performance, the ISP may preferably remove stale news groups, restrict offensive materials (depending upon local and federal laws), and filter out duplicate news postings and expired articles.

Figure 29:
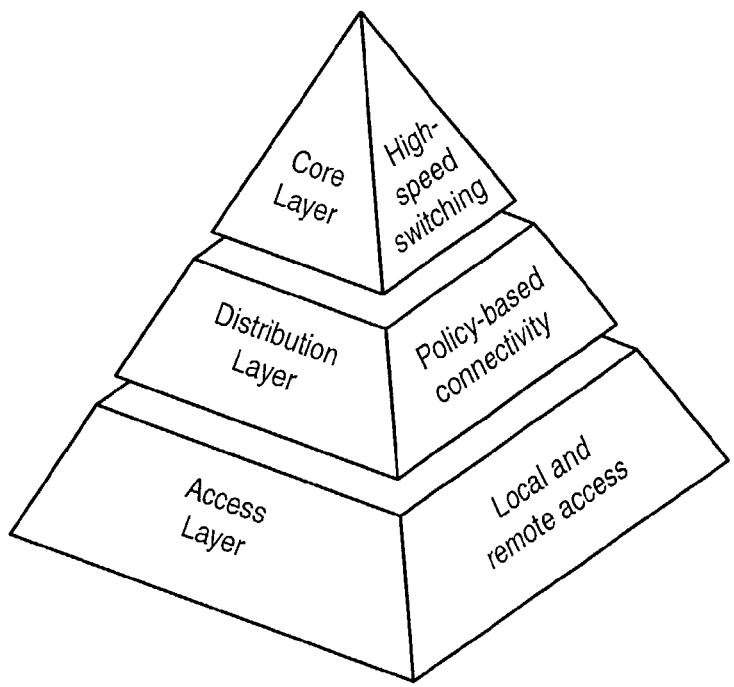
FIG. 29 illustrates an exemplary hierarchical Network Components model according to one embodiment.

As indicated at 56 of FIG. 12, the network components (e.g. routers, switches, load balancers, etc.) that fit the services and overall logical design may be defined. Earlier in this document, an ISP network design methodology for developing an overall network topology using an N-tiered hierarchical model was described. In this model, the overall network structure may be divided into multiple layers. Each layer of the model may have a function (or functions) that is independent in purpose from other layers in the hierarchical model. However, each layer is preferably designed to be fully compatible and complementary to other layers. By using the hierarchical design method and keeping each layer separate, a highly flexible and scalable network is preferably produced. A similar layered approach may be applied to an architectural design for network components. FIG. 29 illustrates an exemplary hierarchical network components model according to one embodiment. Each network component layer may provide necessary or desired functionality to the network. The layers may not need to be implemented as distinct physical entities. Each layer may be implemented with a combination of layer 2 (L2) switching and layer 3 (L3) routing devices. Although a layer may be omitted altogether, the hierarchy may be preferably maintained to achieve optimum performance.

FIG. 29 illustrates an exemplary hierarchal network components model with three layers: a core layer, a distribution layer, and an access layer. Note that other embodiments may include other layers and/or combine or exclude one or more of these layers. The core layer preferably provides optimal communication between sites. The core layer is the high-speed switching backbone of the network. The core layer may have characteristics including one or more of, but not limited to: reliability, redundancy, quick convergence, fault tolerance, and low latency. The core layer may provide wide-area links between geographically remote sites, connecting data centers or network operation centers (NOCs). Core links are typically point-to-point. Core services, for example, Optical Carrier level 3 (OC-3), frame relay, asynchronous transfer mode (ATM), and so forth, are typically leased from network service providers (NSPs). Systems typically do not reside in the core layer, and preferably are not placed at the core layer. The mission of core layer design may include focusing on redundancy and reliability while bearing in mind the cost of downtime. A function of the core layer is to provide optimal transport between remote sites. The core layer is typically implemented as a high-speed wide area network (WAN), for example ATM, OC-3, or frame relay. The wide-area characteristic of the link may indicate a need for redundant paths, so that the network can withstand individual circuit outages; without redundant paths, links may create single points-of-failure. Rapid convergence of routing protocols is generally considered an important core design feature.

The distribution layer of the network is the demarcation point between the core and access layers. The distribution layer may have roles including one or more of, but not limited to: policy, security, media translation, routing between VLANs, broadcast and collision domain segmentation, and demarcation between static and dynamic routing protocols. The distribution layer may represent the distribution of network services to multiple VLANs within a network environment. The distribution layer is where the backbone network is typically located and is typically based on fiber distributed data interface (FDDI), FastEthernet, or Gigabit Ethernet. The distribution layer is where network policy is typically implemented. Network evolution is occurring rapidly, and as newer and faster technologies emerge, existing technologies move downward in the hierarchical model. The distribution layer includes a network backbone with all its connecting routers. Typically, distribution layer devices serve a region by acting as a concentration point for many of its access tier sites. A benefit of the hierarchal model is fast problem isolation due to network modularity.

The access layer typically includes one or more VLANs that provide access to network services. The access layer is where almost all systems are attached to the network, typically via Ethernet, Token Ring, or FDDI. In ISP environments, including many corporate networks, the access layer is typically where servers such as web server, email, proxy, and firewalls are located. The functions of the access layer may include one or more of, but are not limited to: connecting various local area networks (LANs) to the distribution layer, providing logical network segmentation, and isolating broadcast traffic between segments. The access layer may be characterized by switched and shared bandwidth environment.

The decision to use L2 switching or L3 routing functionality in a network design may depend on which problems are trying to be solved, among other potential factors. These problems may be categorized as media or protocol. Media problems may occur when too many devices contend for access to a LAN segment, causing an excessive number of collisions and slow response time. Protocol problems may be caused, for example, by protocols that do not scale well. Protocol problems typically occur when a protocol that was designed for small networks is being used for larger networks. In general, if problems involve media contention, switching may be preferable; if problems are protocol related, routing may be preferable.

Broadcasts may be used by many protocols as part of their normal operations. However, network performance may suffer from too many broadcasts. L2 switches forward broadcasts and multicasts. This approach may become a scalability issue as flat networks become larger. If there are too many hosts on a LAN, broadcasts can cause performance degradation to the network. For example, when broadcasts are more than approximately 20% of the traffic in the LAN, network performance may degrade. In a single flat network, a rule-of-thumb is to avoid having more than 100 IP-based systems, due to broadcast radiation and performance degradation. The scalability of a switched network may depend on a number of factors, including the type of protocols used.

Routers, also known as L3 devices, are used for interworking communication. Routers may offer services including one or more of, but not limited to: broadcast domain segmentation, hierarchal addressing, inter-VLAN communication, fast convergence, and Quality of service (QoS). In the past, emphasis was put on the packets-per-second (pps) forwarding rate of routers. Today, less emphasis is placed on pps because routers can process packets so quickly, especially with new switching technology provided by multi-layer switches. Like switches, routers use tables of addresses to forward packets to their proper destination. Unlike L2 switches, routers typically maintain tables of L3 logical addresses. Thus, router configuration may be protocol-specific. Routers may use specialized protocols to share information about routes and destinations among each other. With routers, broadcast packets are typically not forwarded.

Switches, also known as L2 devices, may operate at the data link layer. However, recently, LANs have been revolutionized by the increased use of switching at L2. LAN switches may provide performance enhancements for new and existing data networking applications, for example by increasing bandwidth and throughput. One function of switches is to filter or forward frames. Switches typically work by examining frames seen on the network and by building a table that pairs the source hardware address of the frames with the switch port on which the frames were seen. By keeping local traffic local, switches may dramatically cut traffic on individual segments and improve overall network performance. Note that, typically, Ethernet collision packets are always filtered, but broadcast packets are always forwarded to all ports.

Ethernet is the most widely deployed LAN technology, and its use continues to grow because of its simplicity and low cost. A disadvantage of Ethernet is that it is based on Carrier Sense Multiple Access/Collision Detection (CSMA/CD), which is a bus arbitration scheme with the side effect of rapid degradation of available bandwidth in heavy traffic conditions. A bus arbitration scheme defines the mechanism by which a system transmits data across the bus. This limitation of Ethernet may be overcome through switching. CSMA/CD is associated with the creation of a collision domain, a concept unique to the Ethernet environment. Although collisions are normal events in Ethernet, an excessive number of collisions may reduce available bandwidth. In reality, the actual available bandwidth of Ethernet due to collisions is reduced to a fraction (e.g. About 40 percent) of the theoretical bandwidth (e.g. 10 Mbit/sec, 100 Mbit/sec, or 1000 Mbit/sec). This reduction in bandwidth may be remedied by segmenting the network using switches or routers. Segmentation is the process of splitting a single collision domain into two or more collision domains. L2 switching may be used to segment the logical bus topology and create separate collision domains. Therefore, more bandwidth is made available to individual systems. With switching technology, attached systems preferably receive dedicated bandwidth rather than shared bandwidth, because each system is in its own collision domain. Ethernet switches are devices that microsegment a collision domain, preferably eliminating the impact of packet collisions.

Traditionally, L2 switching was provided by LAN switches, and L3 networking was provided by routers. Increasingly, these two networking functions are being integrated into one common platform with multi-layer switches. Mirroring the integration of L3 networking technology into LAN switching devices, typically WAN switching equipment, may increasingly incorporate L3 networking capabilities. As traditional L3 routers gain support for higher capacity and bandwidth, the integration of L2 technologies preferably enables routers to achieve optimum performance levels. New features and technology may be added to switches; for example, some switches may now be able to perform load balancing. Switching sometimes results in non-optimal routing of packets because packets may only travel on paths that are included in the Spanning Tree Protocol (STP RFC 1493), which may be running to prevent broadcast storms in a switched network. When routers are used, the routing of packets may be controlled and designed for optimal paths. Routing and redundancy in switches may be done by allowing one instance of the STP per VLAN. Using STP preferably ensures that the network does not have any loop. However, a drawback of using STP is that the convergence time may take much longer. A good network design eliminates loop where possible so that STP does not need to be used. In general, it may be preferably to incorporate switches in network design to provide high bandwidth.

Load balancers are network appliances with secure, real-time, embedded operating systems that intelligently load balance IP traffic across multiple servers. Load balancers preferably optimize the performance of a site by distributing client requests across a cluster of multiple servers, preferably reducing the cost of providing large-scale Internet services and accelerating user access to those applications. Load balancing solutions, in general, are successful because they may provide one or more benefits in server-farm environments including, but not limited to: the ability to manage, scale, and reduce the variability of traffic loads, a low-cost, easy-to-implement, high-availability strategy for managing server traffic, and an ability to intelligently manage connections between clients and servers. Preferable for mission-critical applications, load balancers may preferably allow the building of a highly redundant and available server farm. Servers may be automatically and transparently placed in and out of service, providing availability. Each load balancer may be equipped with an optional hot-standby failover mechanism, which preferably builds increased redundancy for the server farm system.

In today's high-speed computing environment, such as large ISP infrastructures, load balancing with solutions such as Cisco LocalDirector, Resonate Dispatch Manager, Resonate Dispatch Monitor, and F5's 3-DNS® Controller may no longer be sufficient, because these solutions may represent a single point-of-failure within a large-scale infrastructure. This limitation is due to the inability of many load balancers to support high bandwidth and fast switching. Load balancing is now typically done using multi-layer switches with load balancing capabilities.

A firewall may be defined as a single point between two or more networks through which all traffic preferably passes and where traffic can be controlled, secured, and logged. The earliest firewalls were routers that segmented LANs and filtered traffic based on rules defined in access control lists (ACLs). As more businesses connected to the Internet, awareness of Internet security issues grew. The need for better security caused some vendors to develop their own solutions. Subsequently, some of these solutions were made into commercial products. Firewalls may be network-based, host-based, or hybrid. Typically, firewalls are implemented to secure access to networks and systems that are connected to networks. While firewalls typically have many attractive features and qualities, it is important to note that security and complexity are often directly proportional.

No single product or technology can provide an optimal solution for every environment. No security system is 100 percent secure; someone, somewhere, may find a way to exploit vulnerabilities. In one embodiment, security guidelines that may be followed to limit security risks may include one or more of, but are not limited to:

In addition to router ACLs and packet filters, firewalls may be used to control access to networks and systems.

Firewalls may be used to segment and control access to network layers.

Firewall products are preferably diversified throughout an infrastructure. Through diversifying, if a security problem occurs on a single firewall product, security is preferably not compromised on the entire infrastructure.

Because firewalls can be a single point-of-failure within an infrastructure if not designed properly, high availability at firewalls is preferably implemented.

For large-scale environments where heavy throughput is required or desired, firewall load balancing is preferably implemented with multi-layer switches.

Intrusion detection systems (IDSs) can be either network-based, host-based, or hybrid. Network-based IDSs may be used to examine passing network traffic for signs of intrusion. Host-based IDSs may examine user and system activity on local machines for signs of intrusion. Hybrid IDSs may combine both hardware and software for an end-to-end solution. Each type of IDS has its strengths and weaknesses. In the following, strengths and weaknesses of network-based and host-based IDSs are described. For small ISPs serving residential users, an IDS may provide limited value or return on investment. Because there are typically no service level agreements (SLAs) for residential users, the data are typically not considered sensitive or classified, and capital investment on IDS may be too expensive. For ISPs operating on a national level, supporting both residential and business users, the demand for service availability, reliability, and security may be critical to business. To proactively respond to security incidents, large ISPs preferably implement an IDS.

Creating a network diagram may be a valuable tool for planning intrusion detection. When reviewing the diagram, key network choke points (e.g. Routers, switches, load balancers, and firewalls) or collections of systems that are sensitive to business operations are preferably evaluated. A detailed network diagram may provide intrinsic clues as to the right location for sensors, and such a diagram may be useful later for troubleshooting during the implementation phase.

If an IDS intends to monitor front-end web servers for penetrations, then a preferred position for the sensor is on the services network, where web servers reside. If web servers are compromised, the best chance of detecting an intrusion may be the target network or system. If the IDS is to monitor internal servers such as application servers, then a preferred position for the sensor may be inside the firewall on the application network. The logic behind this approach is that the firewall prevents the vast majority of attacks aimed at internal servers, and that regular monitoring of firewall logs may identify attacks. The IDSs on internal networks preferably detect some or all attacks that manage to get through the firewall. Some organizations may use IDSs to monitor internal resources that contain sensitive information. In this case, a preferred location for the sensor is on the choke point between those systems and internal networks.

Note that some security experts advocate placing sensors outside the firewall to monitor intrusions from the Internet. The firewall itself preferably logs any attacks it stops, assuming that logging is enabled and that the logs are monitored. Note that intrusions stop at the firewall; therefore, an IDS outside the firewall may be redundant. Therefore, it may not be a productive use of resources and time to install and monitor intrusions outside a firewall.

A network-based IDS examines passing network traffic for signs of intrusion. If it is determined that a network-based IDS is the solution for an ISP customer, a decision on where to place the sensor(s) is preferably made in advance. The placement of the sensor(s) may depend, for example, on what kind of intrusion the ISP wants the system to detect, among other factors.

A network-based IDS typically has two logical components: sensor and management station. The sensor resides on a target network and monitors the network for suspicious traffic. The sensor(s) are typically dedicated systems that exist only to monitor the network. The sensor(s) typically have network interface in promiscuous mode, which means the sensor(s) receive all network traffic, not just that destined for their IP address, and the sensor(s) capture passing network traffic for analysis. If the sensor(s) detect something that looks unusual, it is passed back to the management station. The management station typically resides on the management network (out-of-band), and receives alarms from sensors for analysis and response. The management station displays the alarms or performs additional analysis. Some displays are simply an interface to a network management tool, but some are custom graphical user interfaces (GUIs) designed to help system administrators analyze problems.

Network-based IDSs typically do not require modification of target systems. This may be beneficial because installing additional software may exceed system capacities and degrade performance. Network-based IDSs typically are not on a critical path for any service; thus, IDS failure typically does not have a significant impact on the infrastructure. Network-based IDSs tend to be more self-contained than host-based IDSS. Network-based IDS typically runs on a dedicated system that is preferably simple to install and configure. A network-based IDS typically examines network traffic only on the target network to which it is directly connected. This is particularly true in a switched Ethernet environment. Using network-based IDSS, many sensors may be required to meet coverage on all critical network segments. Because each sensor costs money, broad coverage may be prohibitively expensive. A network-based IDS typically uses signature analysis to meet performance requirements, which means that it detects common attacks, but may be inadequate for detecting more complex information threats. A network-based IDS may be limited on processing power (CPU) and memory. Processing engines for network-based IDSs are often not powerful enough to analyze traffic. Network-based IDSs may drop packets if they do not have enough buffer space and processing power to analyze the large amount of traffic. A network-based IDS may have a difficult time handling attacks within encrypted sessions.

A network-based IDS may need to communicate large volumes of data back to the management station. In many cases, monitored traffic may generate a larger amount of analysis traffic. Some systems may use data-reduction processes to reduce the amount of communicated traffic. Some systems may push much of the decision-making process out into the sensor itself and use the management station as a status display or communications center, rather than for actual analysis. A disadvantage of this approach is that it provides little coordination among sensors, that is, any given sensor may be unaware that another has detected an attack. Such a system cannot typically detect synergistic or complex attacks.

A host-based IDS may examine activity on the local server. Host-based IDSs may use the system's audit and logging mechanisms as a source of information for analysis. A host-based IDS looks for unusual activity that is confined to the local host such as failed login, unauthorized file access, or system privilege alterations. A host-based IDS generally uses rule-based engines for analyzing activity. A host-based IDS typically provides more detailed and relevant information than a network-based IDS.

If it is determined that a host-based IDS is the preferred solution for an ISP customer, the host-based IDS is preferably installed on a test/development system in advance of planned installation on a production system. Even on a quiescent system, some files change regularly, so the IDS may report some changes. Some host-based systems may report when a user process alters the system password file. This report may happen if an intruder added an account; however, it may also happen when an authorized user changed his or her password. System administrators are preferably given time to become familiar with the operation of host-based IDS so that alarms can be properly diagnosed, before a production system is implemented.

When using a host-based IDS, the host-based IDS is preferably monitored frequently. If the target system is compromised, an intruder may alter system logs and suppress alarms. Logging is preferably not logged locally to the target system. All logging is preferably directed to one or more dedicated log servers residing on the management network.

Host-based IDSs may be a powerful tool for analyzing possible attacks. A host-based IDS may be able to indicate exactly what an intruder did, which commands the intruder ran, what files were opened and/or modified, and what system calls were executed, rather than just rather vague guesses. A host-based IDS may have lower false positive rates than a network-based IDS. The range of commands executed on a specific target system may be more focused than the types of traffic flowing across a network. This property may be used to reduce the complexity of host-based analysis engines. A host-based IDS may be used, for example, in environments where broad intrusion detection is not needed, or where the bandwidth is too high for sensors to handle the large volume of data to be analyzed. A host-based IDS may be less risky to configure with an active response, such as terminating a service or logging off an unauthorized user, than a network-based IDS. A host-based IDS may be more difficult to spoof into restricting access from legitimate users and sources.

A host-based IDS may require installation on a particular target system being protected. This approach may pose capacity and performance problems on the target system. In some cases, this approach may pose security problems because the security personnel may not ordinarily have access to the target server. Another problem associated with host-based IDSs is that host-based IDSs may rely on the innate logging and monitoring capabilities of the target system. If the target system is not configured to do adequate logging and monitoring, system administrators may have to change the configuration, which may result in a higher level of complexity for change management. A host-based IDS is relatively expensive. Many ISPs do not have the financial resources to protect the entire network infrastructure using host-based IDS. These ISPs preferably carefully choose which specific set of target systems to protect. These choices may leave wide gaps in coverage. A host-based IDS may suffer from isolation, in some instances to an even greater degree than a network-based IDS. A host-based IDS may be almost totally ignorant of the network environment. Thus, the analysis time required to evaluate damage from a potential intrusion may increase linearly with the number of target systems covered.

Creating a Physical Design

As indicated at 16 of FIG. 2, after creating a logical design, a physical design may be created. Creating a physical design may include constructing a high-level network design and planning for capacity. This subsection provides information to assist in formulating estimates for how much capacity a design needs. The information in this subsection may be used as a general sizing guideline for estimating storage and memory for services. It may be preferable to approach this part of the ISP architecture design process with the objective of performing initial capacity planning, based upon factors such as estimated usage and/or industry averages. In addition, it may be preferable to plan to scale to maximum capacity, based on an ISP's requirements.

Because of potential unknown variables in an ISP's environment and potentially changing traffic, load characteristics, and subscriber usage patterns, it may be unrealistic to calculate exact capacity amounts during the design phase. Preferably, reasonable estimates that can later be refined using actual resource utilization data may be planned for. In one embodiment, creating a physical design may include one or more of creating a network design, creating an IP address schema, and capacity planning, though it is noted that other embodiments may include other functions or exclude one or more of these functions. Although there may be other methods for creating a network design and addressing capacity planning, it may be preferable to approach the process by creating a physical network design, then planning capacity for software and hardware.

In one embodiment, this network design may be a high-level network design. In one embodiment, the process for creating a physical network design may start with generating a generic high-level network design that includes as many tiers or layers as may be needed or desired. Preferably, all major network components within the infrastructure are identified during this process. It may be preferable to create a diagram of the network design to document the network components during this process. Then, the capacity required for software and hardware may be planned. Next, for each tier or layer, the network components required, such as routers, switches, and load balancers, may be determined. Next, the level of redundancy and availability appropriate for the architectural design may be selected. Next, the number of fire ridges required for separating tiers or layers may be determined. For each fire ridge, the number of firewalls needed or desired may be determined. Next, whether an Intrusion Detection System (IDS) is required or desired may be determined. If IDS is required or desired, the appropriate places to locate the sensors may be determined. Then, the number of modems and high-speed trunks for Internet connectivity and dial-up access may be determined. Next, how many network access servers (NASs) are needed or desired to handle concurrent users may be determined. Then, whether cache servers are required or desired may be determined. Finally, servers may be placed at appropriate layers, for example, web servers at the services network, database servers at the content network, and so on.

While the elements of the above embodiment of a process for creating a physical network design are described as progressing in an order from start to finish, it is to be noted that one or more of the elements may be performed in different orders, and/or one or more of the elements may be performed simultaneously or overlapping to some extent. One or more other elements may be included, and/or one or more of the elements described above may be excluded.

Note that detailed information for making decisions related to the elements in the process for creating a physical network design are described previously in this document. In this subsection, that information is built upon to guide users through the process of modeling capacity for software, servers, and network components. Later in the document, mechanisms for selecting software and hardware components to satisfy the generated physical design are described.

Figure 30:
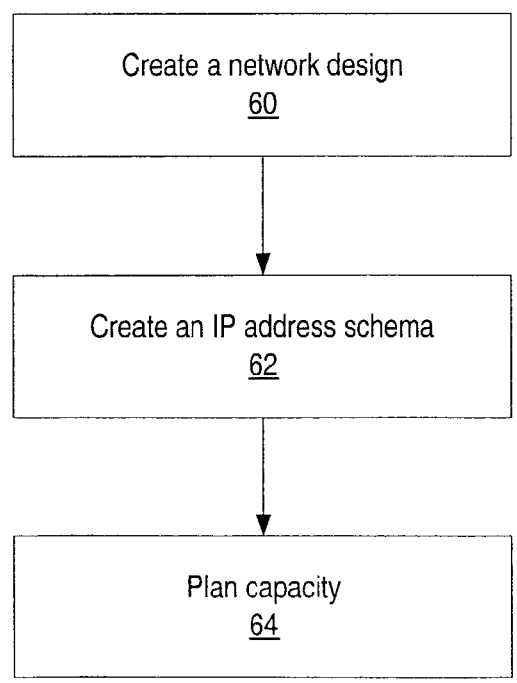
FIG. 30 is a flowchart of a method of creating a physical design according to one embodiment.

FIG. 30 is a flowchart of a method of creating a physical design according to one embodiment. The method illustrated in FIG. 30 illustrates means for generating a physical design according to one embodiment. As indicated at 60 of FIG. 30, a network design may be created. Before planning software and hardware capacity, it may be preferable to create a high-level network design diagram. Creating a network design diagram may assist in ensuring that a design satisfies all of an ISP's requirements. In addition, creating a network design may assist in capacity planning for components, because the components are preferably identified and documented in the diagram.

Figure 31:
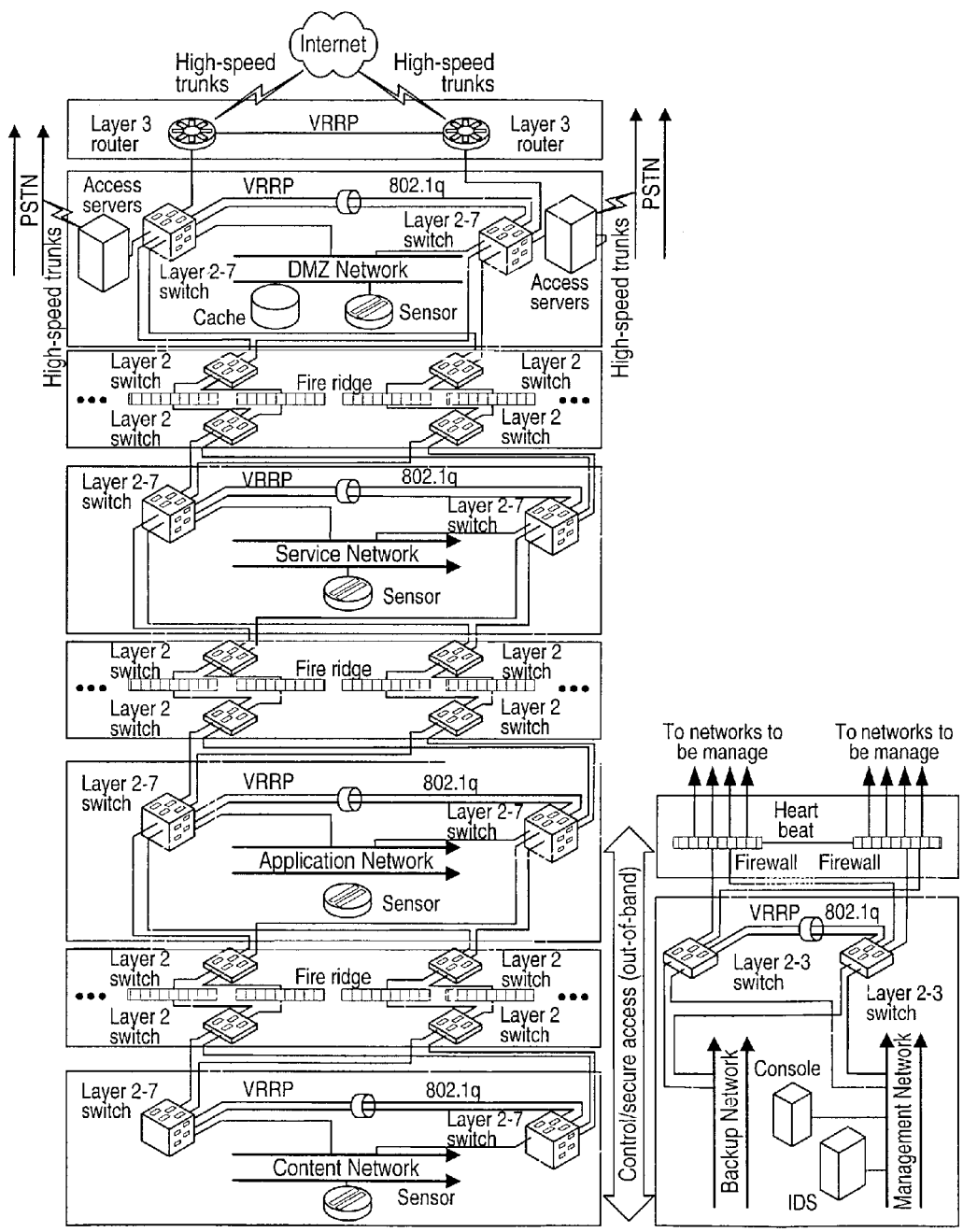
FIG. 31 illustrates an exemplary redundant, scalable N-tier network architecture design according to one embodiment.

FIG. 31 illustrates an exemplary redundant, scalable N-tier network architecture design according to one embodiment. This generic design example details each layer, including components at each layer. Characteristics of this design may include one or more of, but are not limited to:

The core routers have multiple Internet connections for availability in the event of link failure.

All network devices, such as routers and switches, throughout the infrastructure are preferably fully redundant to ensure availability and eliminate all single points-of-failure.

Separating each layer is a fire ridge, which is a firewall complex consisting of two or more load-balanced firewalls. This approach preferably ensures maximum security, availability, and scalability. The firewalls may be configured in stand-alone or in high availability (HA) mode and can be scaled horizontally to provide an overall aggregate throughput.

If session state preservation is required, the firewalls may be configured in HA pairs or clusters with active-active configuration. In the event that any of the firewalls fail, session states are preserved.

Multi-layer switches (L2 to L7) are used throughout the infrastructure, preferably eliminating all single points-of-failure from simple load balancing devices. Multi-layer switches are preferably capable of wire-speed switching, gigabit performance, and traffic distribution based on load or content type.

Caching engines are placed at the DMZ network for performance enhancement, especially for ISP environments with multiple POPs.

IDS sensors may be strategically placed throughout the infrastructure for security monitoring.

Management network is out-of-band.

Figure 32:
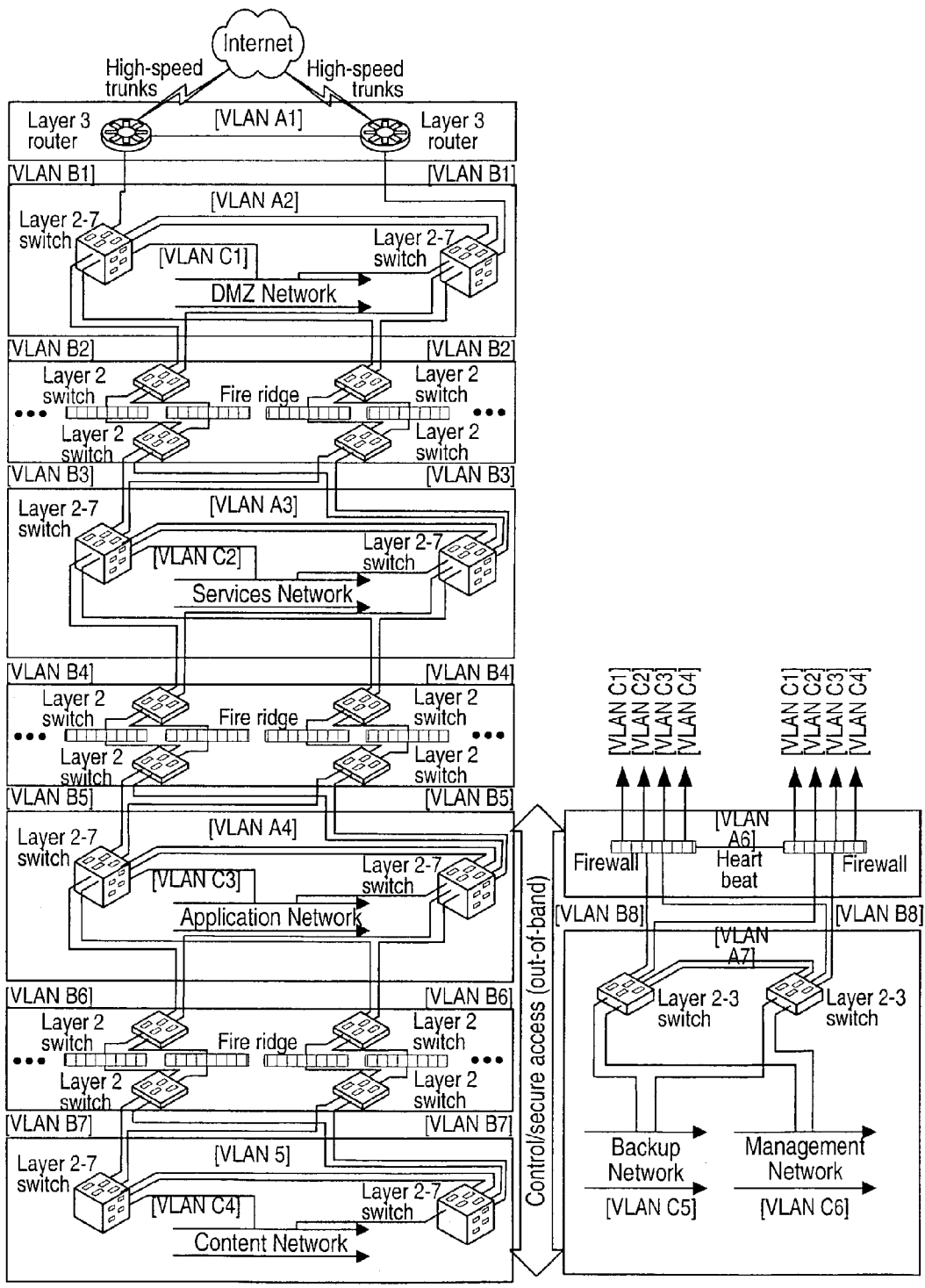
FIG. 32 illustrates an exemplary IP address schema based on the exemplary ISP network design illustrated in FIG. 31.

As indicated at 62 of FIG. 30, an IP address schema may be created. An IP address schema is preferably created so that network addresses are scalable to handle growth. Using the network design created in the previous subsection Creating a Logical Design, the types and ranges of IP addresses required for a design may be identified. FIG. 32 illustrates an exemplary IP address schema based on the exemplary ISP network design illustrated in FIG. 31. In any ISP network topology, an IP address schema may include different address ranges, including one or more of, but not limited to:

Small address ranges (/29 to /30 masking) for point-to-point connections between network devices for management purposes (core layer).

Medium address ranges (/26 to /28 masking) for connections between layers of network devices such as between a router and firewall (distribution layer).

Large address ranges (/24 masking) for servers connecting to the network (access layer).

FIG. 33 illustrates sample address masking at the core layer according to one embodiment. At the core layer, the 30-bit mask (/30 prefix) may be used for heartbeats, which are point-to-point connections between two network devices of the same type, such as between two routers. This connection may be required or desired for link status checking in preferably ensuring high availability. Traffic on this network is preferably strictly for link management purposes only. Addresses used for this purpose are typically private addresses (RFC 1918). With this approach, the 30-bit masking yields up to 64 ($2^6$) possible subnets where each subnet can have up to three possible addresses, but only two addresses ($2^2-2=2$) are usable because one address is reserved for network numbers (all zeros) and one address is reserved for broadcasts (all ones).

FIG. 34 illustrates sample address masking at the distribution layer according to one embodiment. At the distribution layer, the 28-bit mask (/28 prefix) may be used for interconnecting network devices between layers, such as between routers and firewalls or between firewalls and switches. With this approach, the 28-bit masking yields up to 16 ($2^4$) possible subnets where each subnet can have up to 16 possible addresses, but only 14 ($2^4-2=14$) addresses are usable, because one address is reserved for network numbers (all zeros) and one address is reserved for broadcasts (all ones).

For large-scale environments where high availability and multiple load-balanced firewalls are needed, it may be preferable to mask a lower number of bits, such as 27 bits, to ensure enough IP addresses are allocated. The type of addresses used at the distribution layer may depend upon the topology. Public addresses are typically used on the distribution layer adjacent to the core layer. This approach preferably ensures that addresses used at the DMZ network are registered addresses. For other networks (for example services, content, etc.), private addresses may preferably be used for security enhancement and public address preservation.

FIG. 35 illustrates sample address masking at the access layer according to one embodiment. At the access layer, the default Class C address with 24-bit mask (/24 prefix) may be used for interconnecting servers to a network. With this approach, the 24-bit masking yields up to 256 ($2^8$) possible subnets where each subnet can have up to 256 possible addresses, but only 254 ($2^8-2=254$) addresses are usable, because one address is reserved for network numbers (all zeros) and one address is reserved for broadcasts (all ones). Addresses used at the access layer are typically private addresses (RFC 1918), with the exception of the DMZ network. This approach preferably conserves IP addresses and enhances security.

For environments with a large number of hosts on a single network, a higher order of masking, such as 25 bits or higher, may be beneficial in preventing broadcast storms, thereby creating a more manageable network. Note that for Class A address space, there are 128 ($2^7$) possible networks. However, only 126 networks are usable ($2^7-2=126$) because all zeros and all ones are reserved and may never be used for actual network numbers. For Class A address space, network 0.0.0.0 is reserved for default route and network 127.0.0.0 is reserved for loopback. For Class B address space, there are 16,384 ($2^{14}$) possible networks. Only 16,382 ($2^{14}-2=16,382$) networks are usable. For Class C address space, there are 2,097,152 ($2^{21}$) possible networks, but only 2,097,150 ($2^{21}-2=2,097,150$) networks are usable.

As indicated at 64 of FIG. 30, capacity for software and hardware may be planned. Planning for appropriate levels of capacity preferably ensures that design requirements, such as scalability and resource availability, are met. Capacity planning may help in determining how much an ISP architecture needs to scale, and may aid in selecting appropriate software and hardware (e.g. Network, servers, and storage). Capacity planning may be preferably performed before selecting software and hardware. A common mistake is to first select hardware and/or software, and then try to make the selected hardware and/or software fit into capacity requirements. In modeling capacity planning, initial capacity planning may be formulated based upon estimated usage or industry averages. Preferably, capacity planning is modeled to support scaling for maximum capacity. In one embodiment, capacity planning may be performed by first estimating software capacity, then estimating server capacity, and finally estimating network capacity. Note that in other embodiments, the above elements of capacity planning may be performed in other orders, other elements may be performed, and/or one or more of the elements may be performed simultaneously or overlapping.

Preferably, the software capacity, including the operating environment, is estimated before planning capacity for servers and network equipment. Capacity for basic services such as email, web, news, and FTP may be estimated. In this document, estimation for several common basic services is discussed. Note that an ISP architecture design may have other basic services. Estimation for other basic services may be performed similarly to the estimations for basic services discussed here.

In one embodiment, to plan capacity for email, the storage and memory may be estimated using the information in FIG. 36 and FIG. 37. Storage for email software and other plug-ins (e.g. Antivirus, antispamming, etc.) is typically negligible in comparison to storage for MailStore and mail queue. The mail queue is the temporary storage area for outgoing email messages that cannot be sent immediately and that need to be queued until the next retry. It is preferable to configure the mail queue on the MailStore and the mail relay. Mail proxy may not need mail queue. It is preferable to allocate the email queue to be approximately 20 percent of the email storage. While this value may vary with environments, 20 percent may be sufficient for an initial sizing, and may be adjusted accordingly as needed. In most ISP environments, approximately 40 percent of subscribers are active mail users. The mail proxy typically requires a large amount of memory and sufficient CPU to handle post office protocol (POP) and Internet mail access protocol (IMAP) connections when users retrieve email. The mail relay typically does not require as much memory or CPU as the mail proxy. The message store may require large CPU and memory for email storage and management. FIG. 36 illustrates information that may be used in estimating storage for email service according to one embodiment. Using the information in FIG. 36 to estimate storage for an email service ($S_{ms}$):

$$S_{ms(proxy)}=S_{mss}$$

$$S_{ms(relay)}=S_{msp}+S_{mss}$$

$$S_{ms(average-mailstore)}=S_{msa}+S_{msp}+S_{mss}$$

$$S_{ms(maximum-mailstore)}=(T\times S_{msn})+S_{msq}+S_{mss}$$

FIG. 37 illustrates information that may be used in estimating memory for email service according to one embodiment. Using the information in FIG. 37 to estimate memory for an email service ($M_{ms}$):

$$M_{mp}=T\times P_{con}\times P_{act}\times P_{pop}\times M_{msp}$$

$$M_{mi}=T\times P_{con}\times P_{act}\times P_{ima}\times M_{msi}$$

$$M_{mt}=T\times P_{con}\times P_{act}\times M_{mst}$$

$$M_{ms(proxy)}=M_{mp}+M_{mi}+M_{msb}$$

$$M_{ms(relay)}=M_{mt}+M_{msb}$$

$$M_{ms(mailstore)}=M_{mp}+M_{mi}+M_{mt}+M_{msb}$$

In one embodiment, to plan capacity for web service, the storage and memory may be estimated by using the information in FIG. 38 and FIG. 39. Storage for the web server may be relatively minor in comparison to storage required for web content. Additionally, the storage requirement may depend on factors including one or more of, but not limited to, software selected, additional modules or plug-ins required, and online documentation. The sizing may depend on the vendor's recommendation. After selecting software, refer to the vendor's installation manual for web storage sizing recommendations. In large-scale ISPs with multiple POPS, cache server may be used to cache data that are frequently accessed, especially in environments where content is static. Web caching may also be performed at the web server. Storage for web cache is estimated to be 20 percent of the overall web page storage. While this value may vary in different environments, it may be sufficient for initial sizing and can be adjusted accordingly. FIG. 38 illustrates information that may be used in estimating storage for a web service according to one embodiment. Using the information in FIG. 38 to estimate storage for a web service ($S_{ws}$):

$$S_{ws(average)}=S_{wsa}+S_{wsd}+S_{wss}$$

$$S_{ws(maximum)}=(T\times S_{wsw})+S_{wsc}+S_{wss}$$

Sizing models for web servers may include, but are not limited to, threads and fork/exec model. The difference between these models is how memory is initially allocated when a web server is instantiated. FIG. 39 illustrates information that may be used in estimating memory for a web service according to one embodiment. Using the information in FIG. 39 to estimate memory for a web service ($M_{wm}$):

$$M_{wm(thread)}=(N_{web} \times N_{thr} \times M_{wst})+(N_{con} \times M_{wsc})$$

$$M_{wm(fork)}=(N_{web} \times (N_{par}+N_{pro}) \times M_{wss})+(N_{con} \times M_{wsc})$$

In one embodiment, to plan capacity for news service, the storage and memory may be estimated using the information in FIG. 40 and FIG. 41. Storage for news service tends to be large, and tends to grow larger. News service may be outsourced to a UseNet provider, such as UUnet, to reduce an ISP's up-front and on-going costs. To have enough storage to handle a large number of files, the file system is preferably designed with a sufficient number of inodes. For example, estimating based on 300 Gbytes of disk and 1.5 million news articles, a file system must have at least 200,000 inodes per gigabyte of disk space. News spooler, history, and index are estimated to be 10% of news storage. This value may vary in different environments and may depend upon factor including one or more of, but not limited to, how newsgroups are moderated, how stale newsgroups are managed, and how many upstream and downstream feeds are made. Overhead is preferably adjusted accordingly. FIG. 40 illustrates information that may be used in estimating storage for a news service according to one embodiment. Using the information in FIG. 40 to estimate storage for a news service ($S_{ns}$):

$$S_{ns}=S_{nsa}+S_{nsh}+S_{nss}$$

The Internet Software Consortium (ISC) recommends that systems with less than 256 Mbytes of RAM use a tagged hash table for history database. This approach, although somewhat slower, consumes less memory. How much RAM is required for the news server may depend on factors including one or more of, but not limited to: is the news feed received from a UseNet provider a full feed or partial feed?; are there any downstream feeds?; and, how are newsgroups moderated, filtered, maintained, etc? InterNetNews$^{SM}$ (INN) administrators recommend one Gbyte of memory for the news reader. If the history hash does not fit in memory, article expiration may take longer. The news feeder typically requires a lot of memory, at least in part because of the high number of sockets open to handle the volume of data. FIG. 41 illustrates information that may be used in estimating memory for a news service according to one embodiment. Using the information in FIG. 41 to estimate memory for a news service ($M_{nm}$):

$$M_{nm}=M_{nss}+(N_{nfd} \times M_{nfd})+(N_{nco} \times M_{nco})$$

In one embodiment, to plan capacity for FTP (file transfer protocol) service, storage and memory may be estimated using the information in FIG. 42 and FIG. 43. How much storage is required for a spooler may vary in different environments. An FTP spooler typically does not have to be very large, but it is preferably cleared regularly, for example with shell scripts and/or cron jobs. Content updates for subscribers' personal web pages may be infrequent, and concurrency for FTP sessions may be very low, at least in part because typically only a small percentage of subscribers have web pages and a smaller number of those subscribers update their web pages. Memory required for FTP may be minimal. For example, each FTP process may be approximately 400 Kbytes. FIG. 42 illustrates information that may be used in estimating storage for FTP Service according to one embodiment. Using the information in FIG. 42 to estimate storage for FTP service ($S_{fs}$):

$$S_{fs}=S_{fss}+S_{fsu}$$

FIG. 43 illustrates information that may be used in estimating memory for FTP Service according to one embodiment. Using the information in FIG. 43 to estimate memory for FTP service ($M_{fs}$):

$$M_{fs}=M_{ftp} \times N_{ftp}$$

Capacity for infrastructure services such as domain name system (DNS), remote authentication dial-in user service (RADIUS), lightweight directory access protocol (LDAP), dynamic host configuration protocol (DHCP), and network time protocol (NTP) may be estimated. In this document, estimation for several common infrastructure services is discussed. Note that an ISP architecture design may have other infrastructure services than those discussed here. Estimation for other infrastructure services may be performed similarly to the estimations for infrastructure services discussed here.

In one embodiment, to plan capacity for a DNS service, the storage and memory may be estimated using the information in FIG. 44 and FIG. 45. In general, DNS consumes limited CPU and memory resources. FIG. 44 illustrates information that may be used in estimating storage for DNS Service according to one embodiment. Using the information in FIG. 44 to estimate storage for DNS service ($S_{dn}$):

$$S_{dn}=S_{dns}+S_{dnd}$$

FIG. 45 illustrates information that may be used in estimating memory for DNS Service according to one embodiment. Using the information in FIG. 45 to estimate memory for DNS service ($M_{dn}$):

$$M_{dn}=M_{dns}+M_{zon}$$

In one embodiment, to plan capacity for RADIUS service, the storage and memory may be estimated using the information in FIG. 46 and FIG. 47. RADIUS typically does not require a large amount of memory. In one embodiment, preferably allowing for variances based on the software and the vendor's recommendation, the following guidelines may be used: 64 Mbytes of RAM for a small- to mid-sized ISP; 128 Mbytes for a larger ISP. FIG. 46 illustrates information that may be used in estimating storage for RADIUS according to one embodiment. Using the information in FIG. 46 to estimate storage for RADIUS ($S_{rs}$):

$$S_{rs}=S_{rsd}+S_{rss}+S_{rsl}$$

FIG. 47 illustrates information that may be used in estimating memory for RADIUS service according to one embodiment. Using the information in FIG. 47 to estimate memory for RADIUS ($M_{rs}$):

$$M_{rs}=M_{rsa}+M_{rss}$$

In one embodiment, to plan capacity for Directory service, the storage and memory may be estimated using the information in FIG. 48 and FIG. 49. The storage requirement for directory software is typically large, at least in part because of the complexity of the application and availability of support for various platforms and applications. The size of the directory application may be dependent upon the vendor. The LDAP database may be large; however, the size may depend at least in part on one or more of the number of entries in the database, number of fields populated per LDAP entry, and complexity of directory schema. FIG. 48 illustrates information that may be used in estimating storage for Directory service according to one embodiment. Using the information in FIG. 48 to estimate storage for Directory service ($S_{ds}$):

$$S_{ds}=S_{dsd}+S_{dss}+S_{dsi}$$

Index databases may tend to get large, depending at least in part on what attributes are indexed and what type of indexing is used. In many cases, how much space the entries take up may be estimated, and the estimate doubled to allow for indexing. Note that this calculation may affect memory requirements. A typical configuration for directory servers is to put more memory on LDAP replicas, because these servers are used for LDAP searches and queries. If the LDAP master is dedicated for replication only, less memory may be configured for it. Memory requirement for a directory server may be based at least in part on the number of entries in the LDAP database. FIG. 49 illustrates information that may be used in estimating memory for directory service according to one embodiment. Using the information in FIG. 49 to estimate memory for Directory service ($M_{ds}$):

$$M_{ds} = M_{dss}$$

In one embodiment, to plan capacity for DHCP service, the storage and memory may be estimated using the information in FIG. 50 and FIG. 51. Storage for DHCP is typically relatively small. Even for larger ISPs, the storage requirement may be minor compared to other services. Note that an average entry in the DHCP database is approximately 256 bytes. FIG. 50 illustrates information that may be used in estimating storage for DHCP service according to one embodiment. Using the information in FIG. 50 to estimate storage for DHCP service ($S_{dh}$):

$$S_{dh} = S_{dhd} + S_{dhs}$$

Memory sizing for DHCP may be different from other services, at least in part because the memory may be allocated up-front for leases. How much memory is required may depend at least in part on how many leases are allocated in the lease table. The size of the DHCP database may not dictate the amount of memory required for DHCP. Preferably, enough memory is allocated for the lease table to serve the number of concurrent users. Anything larger than that may provide no additional benefit. In general, a relatively small, single-CPU system with limited (e.g. 32 Mbytes) RAM may be configured as a DHCP server for small- to mid-sized ISPs. FIG. 51 illustrates information that may be used in estimating memory for DHCP service according to one embodiment. Using the information in FIG. 51 to estimate memory for DHCP service ($M_{dh}$):

$$M_{dh} = M_{dhd} + M_{dhs}$$

In one embodiment, to plan capacity for NTP service, storage and memory may be estimated by using the information in FIG. 52 and FIG. 53. Storage and memory required for NTP may be relatively small. There are typically few or no special considerations for NTP service and typically no extra storage and memory requirements other than for the software. In a Solaris environment, memory use for NTP may be estimated from looking at the output of the following command: pmap -x <PID>. FIG. 52 illustrates information that may be used in estimating storage for NTP service according to one embodiment. Using the information in FIG. 52 to estimate storage for NTP service ($S_{ns}$):

$$S_{ns} = S_{nts}$$

FIG. 53 illustrates information that may be used in estimating memory for NTP service according to one embodiment. Using the information in FIG. 53 to estimate memory for NTP service ($M_{ns}$):

$$M_{ns} = M_{nts}$$

In one embodiment, the capacity needed for operation and management services such as backup, firewalls, and logging may be estimated according to the following. In one embodiment, to plan capacity for backup service, the storage and memory may be estimated by using the information in FIG. 54 and FIG. 55. For backup servers such as Sun Solstice Backup™, VERITAS NetBackup Datacenter™, and Legato NetWorker®, the majority of storage required may be for backup index. The backup index is used to track files that are backed up online. The browse policy may be used to determine how long files are kept on index for online browsing. The size of the backup index may depend on factors including one or more of, but not limited to: the volume of data being backed up; the level of backup; the frequency of backup; and browse and retention policies.

To conserve disk space, an ISP may need to establish a shorter browse policy. Complementing the browse policy is the retention policy, which tracks save sets stored on each backup volume, thus consuming less storage for indexing. For ease of administration, it is preferable that the browse and retention policies be set equally. FIG. 54 illustrates information that may be used in estimating storage for Backup service according to one embodiment. Using the information in FIG. 54 to estimate storage for Backup service ($S_{bs}$):

$$S_{bs} = S_{bsi} + S_{bss}$$

In general, memory requirements may be dictated by the number of backup instances and the number of clients backed up simultaneously. After selecting software, the vendor's recommendation may be referred to for memory sizing for backup. FIG. 55 illustrates information that may be used in estimating memory for Backup service according to one embodiment. Using the information in FIG. 55 to estimate memory for Backup service ($M_{bs}$):

$$M_{bs} = M_{bsd}$$

In one embodiment, to plan capacity for firewall service, the storage and memory may be estimated using the information in FIG. 56 and FIG. 57. If a design uses a network-based firewall, storage for firewall software may be omitted, but storage for firewall logs may still be required. Logs are typically directed to a log server, at least in part because there is no local storage. FIG. 56 illustrates information that may be used in estimating storage for Host-Based Firewall service according to one embodiment. Using the information in FIG. 56 to estimate storage for Host-Based Firewall service ($S_{fw}$):

$$S_{fw} = S_{fws} + S_{fwl}$$

How much memory is required for a firewall server may depend upon factors including, but not limited to, one or more of the following: graphical remote administration; short or long logging; encryption; network address translation; and Firewall state table size. After selecting firewall software, the vendor's recommendation may be referred to for memory sizing. FIG. 57 illustrates information that may be used in estimating memory for Host-Based Firewall service according to one embodiment. Using the information in FIG. 57 to estimate memory for Host-Based Firewall service ($M_{fw}$):

$$M_{fw} = M_{fws}$$

In one embodiment, to plan capacity for log service, the storage and memory may be estimated using the information in FIG. 58 and FIG. 59. The log spooler is the temporary storage area for new logs that have not been archived. Storage for the log spooler is typically small compared to storage for log archives. How much storage is required for archives may depend at least in part on the volume of logs and how long logs are kept. There may be no special considerations for log service. Preferably, sufficient memory is present to support the underlying operating environment, with some overhead. FIG. 58 illustrates information that may be used in estimating storage for Log service according to one embodiment. Using the information in FIG. 58 to estimate storage for Log service ($S_{ls}$):

$$S_{ls}=S_{lss}+S_{lsa}$$

FIG. 59 illustrates information that may be used in estimating memory for Log service according to one embodiment. Using the information in FIG. 59 to estimate memory for Log service ($M_{ls}$):

$$M_{ls}=M_{lss}$$

In one embodiment, the capacity planning for the file system layout for system disk, file system layout for data, and system disk storage may be modeled according to the following. FIG. 60 illustrates information that may be used in estimating storage capacity for the operating system/system disk (e.g., root file system, swap space, log archive, and applications) according to one embodiment. A consideration for sizing the system disk is allocating enough disk space for swap and log archive. A rule of thumb for swap space is twice the amount of physical memory or RAM. Note that swap space does not necessarily always equal twice the amount of physical memory, especially for systems that have a large amount of memory where swap may never be needed. In such cases, swap space may be set to less than twice the amount of physical memory; for example, swap space may be set to equal the amount of memory. Preferably, swap space is not set below the amount of physical memory so that, for example, in the event of a system crash, a complete core dump may be saved. In general, it is preferable to set swap space to at least equal physical memory.

Based upon the environment, the amount of log archive storage needed may depend on one or more of, but not limited to, the following factors: how many logs are generated, the type of logging that is performed, and how long logs are kept. In general, less disk space is needed for applications than for logs. Using the information in FIG. 60 to estimate storage capacity for the operating system/system disk ($S_{os}$):

$$S_{os}=S_{oss}+S_{swp}+S_{osf}+S_{app}$$

FIG. 61 illustrates an exemplary file system layout for a system disk according to one embodiment. In one embodiment, the file system layout for the system disk may be planned using the information in FIG. 61. The file system layout is preferably planned to ensure availability and scalability. If there is not enough room for growth, the system may run out of disk space. For example, if the /var partition were to run out of disk space, the system may freeze because logs could not be saved. In UNIX, a disk may be partitioned into up to eight partitions. Partition numbering is from 0 to 7. Partition 0 is always root partition. Partition 1 is typically swap. Partition 2 to 7 are operating system dependent. It is preferable to spread multiple swap partitions, if available, across multiple physical disks for performance enhancement. For optimal performance, it is preferable to allocate partition 1 for swap. Partitions 2 to 7 may be allocated for /usr, /var, /export, etc., generally in no particular order. The /usr/local is commonly configured for open source applications. For Solaris environments, it is preferable to use /opt for native and third-party applications. Note that some vendors may prefer a different scheme for partitioning and allocating disk space. After selecting an operating environment (described below), the vendor's documentation may be consulted for recommendations applicable to the operating environment.

FIG. 62 illustrates an exemplary file system layout for data according to one embodiment. In one embodiment, the file system layout for data may be planned using the information in FIG. 62. For management purposes, it may be preferable to separate data from the system disk. Isolating data from the system disk may ensure, for example, that if the system disk fails, data are not affected. Additionally, if data become corrupted, the corrupted data does not affect the system disk. If the design includes using VERITAS Volume Manager™ (VxVM), then it may be preferable to plan to have data reside separately from the root diskgroup (rootdg). The rootdg is a disk group that contains system volumes only for VxVM. The rootdg is specific to each system and cannot be exported from one system and imported to another system. Separating data from rootdg may allow the export of data from one system and import of the data to another system when necessary or desired, for example in case of a system failure.

In one embodiment, after planning software capacity, what kind of server is appropriate to support the software design may be determined. A benefit of server capacity planning is that it may help in understanding application usage and resource utilization required, which may help in selecting the applicable hardware as described later in this document. For an ISP's infrastructure, enterprise servers may be the preferred servers. Enterprise servers may vary in size at least in part depending on the intended usage. Enterprise servers may be designed for scalability, performance, NEB-compliance, and rack mounting, among other factors. In one embodiment, the information in FIG. 63 may be used to estimate the type, size, and specification of enterprise servers for an ISP customer.

Front-end servers are typically small and lightweight, such as web servers, mail relays, and mail proxies. Front-end servers are typically uniprocessor servers with sufficient RAM, and may be coupled with front-end load balancers for load distribution. Front-end servers may scale horizontally; therefore, multiprocessor systems are not typically required. Servers for middle tier, such as application, management, and LDAP replica servers, are typically multiprocessor systems and may have limited scalability. While application servers may take advantage of a multiprocessor system, they typically do not require as much vertical scalability as back-end servers. Back-end servers, such as the MailStore, NFS, database, and LDAP master, are typically large-scale multiprocessor systems with typically more vertical scalability than middle tier servers. How much scalability is required may depend at least in part on the environment in which the servers will be used and on customer requirements.

In one embodiment, network capacity for the infrastructure may be estimated so that the design preferably provides bandwidth to support traffic load, and preferably sufficient modems and high-speed trunks are available for Internet connectivity and dial-up access. In one embodiment, the average utilization per user may be calculated, and the calculated average utilization may then be used in estimating bandwidth, modem, and trunk capacity.

FIG. 64 illustrates information that may be used in estimating network bandwidth for users according to one embodiment. Using the information in FIG. 64 to estimate network bandwidth for users (B):

$$B=(T\times P_{con}\times B_{usr})+B_{ove}$$

In one embodiment, the total number of modems to support the projected number of concurrent users may be determined. Using this number, the number of high-speed trunks needed for dial-up and Internet access may be determined. In one embodiment, the number of modems required for dial-up access may be estimated based on the projected number of concurrent users. Percentage of concurrency may be calculated from modem-to-user ratio. This value represents how many users a single modem can support. If it is not feasible to estimate the number of concurrent users, the number may be based on current estimated industry usage for ISPs. For example, a minimum ratio of 1:8, representing a 12.5 percent concurrency, may be an estimated industry usage for most ISPs. FIG. 65 illustrates information that may be used in estimating modems needed for dial-up access according to one embodiment. Using the information in FIG. 65 to estimate the number of modems needed for dial-up access ($N_M$):

$$N_M = T \times P_{con}$$

In one embodiment, to estimate trunk capacity, the number of links needed for Internet connectivity and dial-up access may be determined. FIG. 66 illustrates information that may be used in estimating links needed for Internet connectivity according to one embodiment. One relatively simple approach is to determine the average bandwidth that may be consumed by concurrent users. The number of Internet connections required may depend at least in part on the expected environment. Multiple links are typically required or desired to preferably ensure availability. Using the information in FIG. 66 to estimate the number of links needed for Internet connectivity ($N_{LI}$):

$$N_{LI} = \frac{T \times P_{con} \times B_{usr}}{L}$$

FIG. 67 illustrates information that may be used in estimating links needed for dial-up access according to one embodiment. Network access servers may, for example, support multiple T1 links and one channelized T3 (CT3) link. If a link estimate calls for a small number of T1 links, it may be cost-effective to use T1 links. However, if a link estimate calls for many T1 links, it may be more cost-effective to use one CT3 link. CT3 links may be preferred for large-scale environments where a large number of channels are required to support a large number of concurrent users. A single CT3 typically supports up to 672 channels, where each channel supports 64 Kbit/sec. Using the information in FIG. 67 to estimate the number of links needed for dial-up access ($N_{LD}$):

$$N_{LD} = \frac{T \times P_{con}}{C}$$

The major network components of a network design may be identified. Identifying components preferably helps to ensure that the network is scalable and performs at or above the desired level. In one embodiment, the port capacity for routers, switches, and consoles may be estimated.

FIG. 68 illustrates information that may be used in estimating the number of ports for routers according to one embodiment. Capacity planning for routers may be different than that for switches. When planning for routers, one or more of, but not limited to, the following factors may be considered: the number of WAN interfaces; the type of high-speed trunks; and the number of fixed LAN ports.

Planning WAN interfaces and associated high-speed trunks preferably ensures that the appropriate bandwidth is achieved for WAN backhaul with corresponding types of high-speed trunks. In addition, planning support for WAN interfaces preferably ensures that redundant Internet connections can be achieved for high availability (HA) in the event of link failure. In addition to planning for WAN interfaces, LAN interfaces are preferably planned for. When multiple routers and switches are interconnected for availability, planning for LAN interfaces may be critical. Using the information in FIG. 68 to estimate the number of ports for routers ($P_R$):

$$P_R = N_{wan} + N_{lan}$$

In one embodiment, the number of network ports (10/100 Mbit/sec) needed, plus overhead for immediate and future growth, is preferably planned for. In one embodiment, it may be preferable to add overhead (e.g. 20 percent) for immediate growth. For future growth, overall scalability of the switches is preferably planned for. FIG. 69 illustrates information that may be used in estimating the number of ports for switches according to one embodiment. Switches typically have at least one dedicated port for uplink, typically Fast Ethernet (FE) for small switches and Gigabit Ethernet (GE) for larger switches. The serial port is typically for failover, but 10/100 Mbps may be used as well. It may be preferable that the uplink port be large enough to handle upstream and downstream traffic. In one embodiment, capacity planning for switches may be performed by network layer. Depending on the role of each network layer, the total number of network ports may vary. For example, switches at the services network may require a larger number of network ports than switches at the content network, at least in part because the services network may have many small servers compared to the content network, which typically has a few large servers. Using the information in FIG. 69 to estimate the number of ports for switches ($P_S$):

$$P_S = N_{ser} + N_{apt} + N_{adm} + N_{ove}$$

In one embodiment, capacity planning for console ports may start by using the same number as the total number of devices to be managed by the console server. Then, an appropriate amount of overhead for immediate growth may be added. FIG. 70 illustrates information that may be used in estimating the port capacity for console servers according to one embodiment. Using the information in FIG. 70 to estimate the port capacity for console servers ($P_{CS}$):

$$P_{CS} = N_{ser} + N_{apt} + N_{ove}$$

Selecting Components

As indicated at 18 of FIG. 2, components of an ISP architecture may be selected. This subsection describes guidelines for selecting software, server, and network components for an ISP architecture design, and includes topics on selecting components including software, servers, network components, and equipment including hardware rack equipment. There are various available commercial and open source products appropriate for ISP infrastructures; several exemplary products may be mentioned herein, but note that other commercial and open source products than those mentioned may be available for consideration and selection. Product versions change and new products are released; therefore, exemplary products mentioned in this subsection may not be comprehensive.

In one embodiment, based upon the requirements arrived at using the mechanisms described in the subsection Formulating Requirements for a Design, the applications and operating software appropriate for desired or required services and the underlying operating environment (OE) and operating platform may be selected. Software selection may include selecting one or more of, but not limited to: software for basic services, software for value-added services, software for infrastructure services, software for operation and management services, and an operating environment. It may be preferable to identify and select the software for each service first, before selecting hardware. Limitations and oversights may result when hardware is selected before software.

FIG. 71 illustrates selecting components according to one embodiment. The method illustrated in FIG. 71 illustrates means for selecting one or more components of the ISP architecture in light of the logical design and the physical design according to one embodiment. As indicated at 70 of FIG. 71, software may be selected. The following are guidelines, one or more of which may be used when selecting software. Note that other guidelines than those listed may also be used:

Available solutions—Does a vendor offer a commercial off-the-shelf product? If so, does the product meet all or most of the requirements without a complex development or integration effort?

Success stories—References for successful implementations may be researched. How successful are the implementations? Is there continuing development of the product? Is the product designed well?

Expertise in market—Does the vendor have a good record of accomplishment for working with customers in this market segment? Does the vendor understand the business requirements for the market? Does the product support the required features and functions?

Global presence—Does the vendor have a global presence? Is the product supported in other languages? Does the vendor partner with system integrators?

Support—Does the vendor provide support after the purchase and throughout the product life cycle? Does the vendor provide training to make customers self-sufficient?

Integration—Are the APIs available for integration with other products? Is the product interoperable with other products and/or operating platforms?

Scalability—Does the application scale to support a large number of subscribers (e.g. From hundreds of thousands to millions)?

Performance—Does the vendor conduct benchmarks to test and demonstrate the product's performance?

Manageability—Is the product manageable, yet flexible? Is the web interface supported for ease of management? Is this interface integrated with the management server?

Internationalization—Does the vendor provide the product in all needed languages?

Quick time-to-market—How long does it typically take for implementation?

To support basic services, software may be selected for one or more of, but not limited to: Mail Servers, Web Servers, News Servers, and FTP Servers.

Exemplary commercial and/or open source mail servers may include, but are not limited to: iPlanet Messaging Server (iPlanet), Openwave® Email mx (Openwave Systems Inc.), Sendmail®, and Qmail®. The product sendmail is available both as a commercial product and as open source. Other commercial and/or open source mail servers may be considered. Commercial mail servers typically have post office protocol/Internet mail access protocol (POP/IMAP) servers integrated with the enterprise software. Some, such as open source sendmail and Qmail, may not have POP/IMAP server integrated. If a mail server is selected that does not have POP/IMAP servers built-in, a POP/IMAP server may be selected. Exemplary POP/IMAP servers may include, but are not limited to: UW IMAP (University of Washington), Cyrus (Carnegie Mellon University), Qpopper™ (Eudora/Qualcomm), and Pop3d (gnu.org). Other commercial and/or open source POP/IMAP servers may be considered.

Exemplary web servers may include, but are not limited to: iPlanet Web Server (iPlanet), Apache, and WebSphere® (IBM). Some web servers are based on a fork/exec model, while others are based on a threaded model. Other commercial and/or open source web servers may be considered.

Exemplary news servers may include, but are not limited to: Breeze™ (Openwave), Typhoon™, InterNetNews, and Dnews (NetWin). Typhoon is a carrier-class UseNet solution that may scale to support thousands of simultaneous readers accessing hundreds of gigabytes of news, while keeping up with multiple full UseNet feeds. Breeze News Server may be suited for small- to medium-sized ISPs on a budget. Breeze™ News Server has a ½ Terabyte spool capacity and can support up to 50 concurrent news clients per license. InterNetNews (INN) is an open source news server. Other commercial and/or open source news servers may be considered. If an ISP is outsourcing news service, a UseNet provider may be selected. Exemplary UseNet providers may include, but are not limited to: Supernews® (CriticalPath), NewsGuy® News Services (NewsGuy.com), Randori News (Randori News), and NewsFeeds.com. Service offerings and pricing may vary among UseNet providers. Other commercial and/or open source UseNet may be considered.

Exemplary FTP (file transfer protocol) servers may include, but are not limited to: WU-FTP (University of Washington), ProFTPD (proftpd.org) and NcFTPd (NcFTP Software). UNIX operating systems typically include one or more FTP servers. Other FTP servers than those listed may be available. After features and functionality, an important consideration in choosing an FTP server may be LDAP-compatibility. It may be preferable to select a server that supports LDAP for centralized authentication. For example, both WU-FTP and ProFTPD are LDAP-enabled. Both of these FTP servers are bundled with Solaris 8 Operating Environment (Solaris 8 OE).

What constitutes value-added services may vary among ISPs and may change as competitors follow leaders. Examples of value-added services may include calendar, address book, search engine, short messaging service (SMS), IR chat (IRC), and WebMail. If an ISP identifies value-added services, software may be chosen to meet the customer's requirements. If an ISP plans to roll out value-added services, for example within the next twelve months, appropriate software may be selected and recommendations made to the customer for planning purposes. For guidelines in selecting software for value-added services, refer to the guidelines for selecting software listed above. To support value-added services, software may be selected for one or more of, but not limited to: Application Servers and Database Servers.

Exemplary application servers for value-added services may include, but are not limited to: iPlanet Application Server (iPlanet), BEA® WebLogic® (BEA), Vignette® (Vignette), and PeopleSoft (Peoplesoft). Product features and pricing may vary among vendors. Other application servers may be available for consideration.

Database servers are typically only required for large-scale environments. Exemplary database servers may include, but are not limited to: Oracle 9i™ (Oracle), IBM® DB2® (IBM), IBM Informix® OnLine (IBM), and Sybase™ Adaptive Server™ (Sybase, Inc.). Features, performance, pricing, and other information may vary among vendors. Other database servers may be available for consideration.

To support infrastructure services, software may be selected for one or more of, but not limited to: Domain Name System (DNS) Servers, Lightweight Directory Access Protocol (LDAP) Servers, Dynamic Host Configuration Protocol (DHCP) Servers, Remote Access Dial-In User Service (RADIUS) Servers, and Network Time Protocol (NTP) Servers.

Exemplary domain name system (DNS) servers may include, but are not limited to: BIND v8 (isc.org), BIND v9

(isc.org), CheckPoint Meta IP™, and Shadow IPserver™ (Efficient Networks™). Product features, performance, and pricing may vary among vendors. Note that performance differences in BIND versions may affect decisions about the version that best suits an ISP architecture design. BIND v8 is single-threaded, while v9 is multithreaded. Examples of design tradeoffs between BIND v8 and v9 are performance and functionality. Other DNS servers may be available for consideration.

Exemplary lightweight directory access protocol (LDAP) servers may include, but are not limited to: iplanet Directory Server (iPlanet), Novell® eDirector® Server (Novell), openLDAP$^{SM}$ (openldap.org), and Active Directory™ (Microsoft®). Other LDAP servers may be available for consideration.

Exemplary dynamic host configuration protocol (DHCP) servers may include, but are not limited to: CheckPoint Meta IP™, Shadow IPserver™ (Efficient Networks™), and IOS© DHCP (Cisco Systems). OEs, such as Solaris 8 OE, may have DHCP integrated. If an OE is selected that does not have DHCP server integrated with the operating system, select a DHCP server such as one of the exemplary servers listed above. Note that other DHCP servers may be available for consideration.

Exemplary remote access dial-in user service (RADIUS) servers may include, but are not limited to: Steel-Belted RADIUS (Funk Software), NAVISRADIUS™ (Lucent Technologies), AAA RADIUS Server (Interlink Networks), and freRADIUS (freRADIUS). It may be preferable to select a RADIUS server that is LDAP-enabled. All of the exemplary RADIUS servers listed above are LDAP-enabled. Note that other RADIUS servers may be available for consideration.

Exemplary network time protocol (NTP) servers may include, but are not limited to: Xntpd (University of Delaware), Praecis™ Cntp (EndRun Technologies LLC), and CoBox® (Lantronix). Note that Xntpd software is part of Solaris 8 OE. Other NTP servers, including public NTP servers, may also be available for selection.

To support management services, software may be selected for one or more of, but not limited to: Backup Servers and System Management Servers.

Exemplary backup servers may include, but are not limited to: Solstice Backup (Sun Microsystems), Legato Networker® (Legato), and NetBackup products (VERITAS). Note that other backup products not listed may be available for selection.

Exemplary management software may include, but is not limited to: Sun Management Center (SunMC) (Sun Microsystems), Tivoli (Tivoli), hp OpenView® (Hewlett-Packard), PATROL by BMC Software, Best/1 (BMC Software), Netcool® (MicroMuse), TeamQuest© Performance Software (TeamQuest), and BMC Patrol (BMC Software). Other system management products not listed may be available for selection.

For internet infrastructure, UNIX is predominantly used as an operating environment, although other operating environments may be used. There are many UNIX flavors available from vendors. Exemplary operating environments for service providers may include, but are not limited to: Solaris (Sun Microsystems), AIX® (IBM), HP-UX™ (Hewlett-Packard), Compaq True64™ UNIX (Compaq), Linux (e.g. Red Hat® Slackware®, Caldera®, Corel®, Debian™, Mandrake™, SuSE©, etc.) open source (linux.org), and BSD (e.g. FreeBSD, NetBSD™, OpenBSD) open source (bsd.org). Note that selecting an operating platform is not described, because the operating platform is essentially the underlying network and servers that support the operating environment. Other operating environments for service providers not listed may be available for selection.

As indicated at 72 of FIG. 71, server components may be selected. Servers that support the OE and services are preferably selected so that components integrate to deliver the desired reliability, availability, scalability, and performance as in the architectural model established according to the above description of Establishing an ISP Architectural Model. Selecting servers may include one or more of, but is not limited to: determining server types, selecting enterprise servers, and selecting storage equipment.

To support services, server type and tier for each class of server (front-end servers, mid-range servers, and back-end servers) may be selected. FIG. 72 lists server types, specifications, and associated tiers according to one embodiment.

Enterprise servers may be selected to support services. Exemplary Enterprise servers may include, but are not limited to: Sun Enterprise servers (Sun Microsystems), HP Enterprise servers (Hewlett-Packard), IBM Enterprise servers (IBM), and Compaq Enterprise servers (Compaq). Other Enterprise servers not listed may be available for selection.

To support backup, recovery, and storage services, hardware may be selected for one or more of, but not limited to: data storage and tape libraries. Features to consider when choosing data storage may include one or more of, but are not limited to: scalability (storage capacity), availability (e.g. Multipathing, alternate pathing, redundant hardware controllers, redundant power supplies, hot-swap disks, etc), performance (e.g. UltraSCSI, Fibre Channel, disk access speed, etc.), and manageability (e.g. Rack-mountable, FRU components, etc. Storage arrays used for ISP environments may include, but are not limited to: high-performance RAID with UltraSCSI (40 MB/s) and Fibre Channel (200 MB/s full-duplex) support. Disk drives used in a storage array are typically high-speed (e.g. 10,000 RPM) drives. Some storage arrays may have an integrated hardware-RAID controller, while other storage arrays rely on a server's RAID software. Exemplary storage solutions may include, but are not limited to: Sun StorEdge™ (Sun Microsystems), Hitachi® SAN (Hitachi SAN Technology Laboratory), MetaStor® SAN, (LSI Logic Corporation), and EMC® Networked Storage (EMC). Other storage solutions not listed may be available for selection. When selecting the appropriate type of storage for an application, it is important to understand the nature of the application and its needs, for example, read-intensive, write-intensive, high I/O rate, etc. FIG. 73 illustrates exemplary services and their characteristics according to one embodiment. For an ISP, which applications require fast disk access for storage are preferably determined.

Features that may be considered when selecting an enterprise tape library may include one or more of, but are not limited to, the following:
  Reliability—Tape drives are moving components within tape libraries and often are the first components to fail. The reliability of the tape library directly correlates to how reliable the internal tape drives are.
  Manageability—Important factors that may be considered in managing large-scale environments may include one or more of, but are not limited to: management interface, heterogeneous client support, technical support, etc.
  Functionality—Supported product features that may be considered when choosing a product, which may include, but are not limited to: compression rate, tape drive read/write speed, number of slots, media types, indexes, snap-shot image, parallelism, etc.
  Scalability—The library permits adding backup servers and/or storage nodes to back up a larger volume of data.

Exemplary tape libraries available for selection may include, but are not limited to: Sun StorEdge libraries (Sun Microsystems), Exabyte® autoloaders (Exabyte), DynaTek autoloaders (DynaTek), Quantum® tape libraries (ATL Products, a subsidiary of Quantum Corporation), and Qualstar® tape libraries (Qualstar). Other tape libraries than those listed may be available for selection.

As indicated at 74 of FIG. 71, network components may be selected. Network components are preferably selected that support the OE, services, and servers in such a manner that all components work together to deliver the desired reliability, availability, scalability, and performance as in the architectural model established according to the above description of Establishing an ISP Architectural Model. To support networking services, network components may be selected including one or more of, but not limited to, the following: routers, switches, load balancer, firewalls, Intrusion Detection System (IDS), Console Servers, and Network Access Servers (NASs).

Routers and switches may be selected. Networking vendors in the telecommunication and service provider market may include, but are not limited to: Foundry Networks®, Cisco Systems, Extreme Networks®, Alteon WebSystems™ (Nortel), Nortel Networks™, Arrowpoint™ Communication, Lucent Technologies®, and juniper Networks™. These and other vendors may produce a range of networking products, including routers and switches.

Load balancers may be selected. Load balancers may be software-based, hardware-based, or switch-based solutions. For large-scale infrastructures with heavy traffic, switch-based balancers may be preferable for performance and scalability and are often used to minimize single points-of-failure. Exemplary load balancers available for selection may include, but are not limited to: Resonate Central Dispatch® and Resonate Global Dispatch® (Resonate), RainWall™ (Rainfinity), Local/Distributed Director (Cisco Systems), Big-IPO and 3-DNS® (F5 Networks), ServerIron™ (Foundry Networks), and ACEdirector (Alteon Websystems). Other load balancers than those listed may be available for selection.

Firewalls may be selected. Many commercial firewall solutions may be available, and tend to be comparable based upon performance and support features. A firewall may be either software-based or hardware-based. Vendors may be contacted for specific features and pricing. Exemplary firewalls available for selection may include, but are not limited to: Check Point™ Firewall-1® (Check Point Software Technologies, Inc.), Gauntlet® Firewall (Network Associates, Inc.), Raptor® Firewall (Symantec), PIX® Firewall (Cisco Systems), VPN Firewall Brick™ (Lucent Technologies), and Firebox® (Watchguard Technologies). Other firewall solutions than those listed may be available for selection.

Intrusion Detection System (IDS) may be selected. An IDS solution may be software-based, hardware-based, or a hybrid. An IDS solution may be expensive, and is typically not applicable to small environments such as those providing services only to residential subscribers. An IDS may be more applicable to large-scale environments and/or environments providing services to business subscribers where security, confidentiality, and service level agreements (SLAB) are a high priority. Exemplary IDS solutions available for selection may include, but are not limited to: NetRecon® and NetProwler™ (Axent Technologies, a subsidiary of Symantec), Secure IDS (Cisco Systems), Real Secure™ (Internet Security Systems (ISS), Inc.), Cybercop™ (Network Associates Technology, Inc.), and Network Flight Recorder™ (Network Flight Recorder, Inc.). Other IDS solutions than those listed may be available for selection.

Console Servers may be selected. Console servers are preferably selected that have enough port density to support the number of servers that require management. Exemplary console servers available for selection may include, but are not limited to: Access Server (Cisco Systems), Console Server™ (Lantronix, Inc.), Secure Console Server™ (Lantronix, Inc.), and Perle™ Console Server (Perle Systems, Inc.). Other console servers than those listed may be available for selection.

Network Access Servers (NASs) may be selected. A NAS may only be required when an ISP is offering dial-up access to subscribers. Exemplary network access servers available for selection may include, but are not limited to: Network Access Servers (Cisco Systems), Remote Access Servers (Lucent Technologies), Nortel™ Access Servers (Nortel Networks Limited Corporation), and SuperStack© 3 (3COM© Corporation). Other network access servers than those listed may be available for selection.

As indicated at 76 of FIG. 71, equipment including rack equipment to hold the hardware may be selected. Exemplary universal hardware racks for use in data center environments and available for selection may include, but are not limited to: Sun Racks (Sun Microsystems), SharkRack® (SharkRack, Inc.), Server Racks (SouthWest Data Products), and Server Racks (LanStar). Other hardware racks than those listed may be available for selection.

Implementing a Solution

As indicated at 20 of FIG. 2, an ISP architecture developed according to the above subsections may be implemented. This subsection describes general practices and recommendations for implementing a design generated using the mechanisms previously described, including recommendations for developing and implementing a prototype prior to implementing a solution. This subsection also describes considerations for adapting to change after an ISP has implemented a solution. The general information in this subsection may apply to all ISPs. It may be preferable to address all dependencies before implementing a design. By following the incremental approach presented in this subsection, the user is preferably able to address all implementation dependencies.

Figure 74:
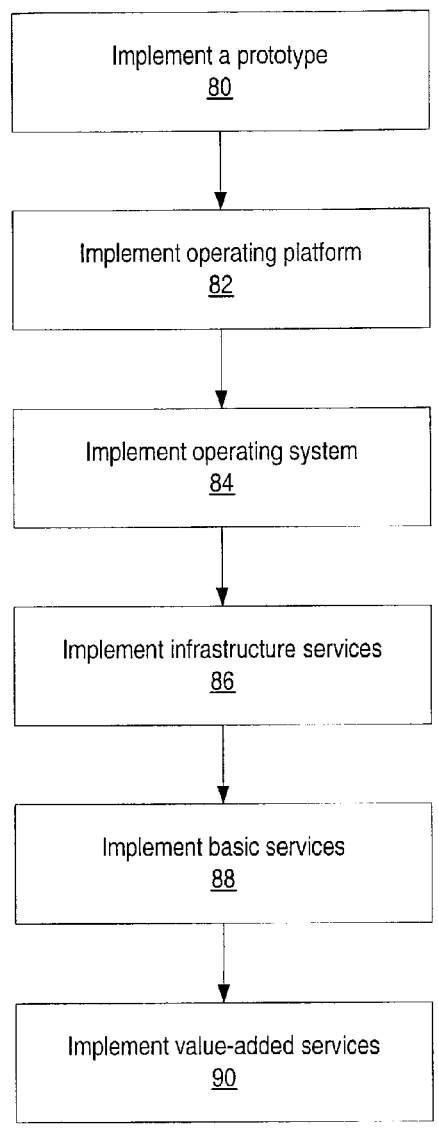
FIG. 74 illustrates implementing a solution according to one embodiment.

In one embodiment, implementing a solution may include one or more of, but is not limited to: implementing a prototype, implementing an operating platform, implementing an operating system, implementing infrastructure services, implementing basic services, and implementing value-added services. FIG. 74 illustrates implementing a solution according to one embodiment. The method illustrated in FIG. 74 represents means for implementing the ISP architecture according to the logical design and the physical design according to one embodiment. As indicated at 80 of FIG. 74, a prototype may be implemented. It may be preferable to develop and implement a prototype of an ISP architecture design before implementing the full-scale design. A prototype may be developed to test and validate the solution to preferably ensure that it achieves all the functionality required. Design attributes to test may include one or more of, but are not limited to, performance, scalability, and compatibility. Developing and testing a prototype may provide one or more of, but is not limited to, the following benefits:

Preferably validating that the design works and satisfies the requirements.

Preferably ensuring that the solution achieves the desired level of performance.

Establishing profiles for systems and network utilization.

Developing a use-case to test for functionality and usability.

Identifying design flaws.

Allowing fine-tuning of the design where needed.

The process of implementing a prototype may be similar to that for implementing a full-scale design. It is preferable to develop and implement a prototype that matches the design as closely as possible to preferably help ensure that the result represents the performance of the production environment.

The following describes general guidelines, process, and recommendations for implementing an ISP architecture design. Operational processes, quality assurance, and the complexity of ISP architectures may vary among different environments and may require additional steps. In one embodiment, to implement a design, an incremental approach may be applied, and the implementation may then be tested and optimized.

When implementing a design, an incremental approach may preferably be used. The overall implementation process is preferably planned before beginning implementation. It may be preferable to implement a design in phases. An incremental approach may provide benefits including one or more of, but not limited to: providing a more manageable implementation, making it easier to troubleshoot and refine the implementation, and ensuring that services which have dependencies are implemented in the correct sequence. In one embodiment, services may be implemented in the following phases, based on dependencies: operating platform, operating system, infrastructure services, basic services, and value-added services. Note that other embodiments may include other phases, exclude one or more of the phases, combine or overlap one or more of the phases, or have the phases in other orders.

An implementation may be preferably tested and optimized. During each phase of an incremental approach, each component may be installed and configured, and then tested for functionality. After implementing a phase (e.g. Infrastructure, basic services, and/or value-added services), the overall functionality and performance may be tested, and then optimized. This incremental approach preferably streamlines the implementation process and simplifies troubleshooting.

In one embodiment, an implementation may be tested to validate that it performs as expected. In one embodiment, testing may be performed to determine the baseline performance; then, using this baseline performance data, areas that may need optimization may be determined. Typically, the preferred practice of testing is first functionality, then performance. When performing performance tuning, the environment is preferably known and how the systems or applications can be tuned to enhance performance is preferably understood. In general, default settings apply to most configurations. If tuning is done incorrectly, then systems or applications may negatively affect overall performance. In one embodiment, after each test, the design may be optimized as necessary or desired until the desired functionality and performance is achieved.

It may be preferable to start with a generic configuration, and then fine-tune it. It may be preferable to add complexity and customize one service at a time, testing each new service as added, and then optimizing the service until the desired or required performance is achieved. When optimizing an implementation, characteristics of overall performance including one or more of, but not limited to, the following may be considered Network characteristics—Examine the actual level of bandwidth utilization and determine if the network is able to support the traffic load.

System utilization—Review system performance and utilization (e.g. CPU, system memory, and storage usage) to determine if resources are sufficient to support subscribers.

Application proficiency—Review the application configuration and determine if and how it may be tuned for better performance.

As indicated at 82 of FIG. 74, the operating platform may be implemented. The operating platform may be considered the foundation for an ISP. Preparing to implement the operating platform may include one or more of, but is not limited to: allocating space at the data center for racks, ensuring that there is enough air ventilation, appropriate temperature control, and enough power distribution for the servers, etc. These tasks typically deal with the physical aspects of the data center. For purposes of implementing an operating platform for an ISP architecture design, the focus below is on network and system components.

In one embodiment, to implement the operating platform, the networking components may be installed and configured. These components may include one or more of, but are not limited to: console servers, routers, switches, load balancers, firewalls, and network access servers. After the network is in place, the systems components may be installed and configured. These components may include one or more of, but are not limited to: internal hardware components of a system such as the installation of CPU, memory, internal disk, CD-ROM drive, storage, cabling, etc. In general, it may be preferable to implement and configure all hardware before moving to the next phase, installing the operating system and relevant software.

As indicated at 84 of FIG. 74, in one embodiment, after the operating platform is implemented, the operating system and associated software may be installed. The operating system is preferably properly configured and operational before infrastructure services are installed and configured.

As indicated at 86 of FIG. 74, the infrastructure services may be implemented. It may be preferable to implement infrastructure services before implementing basic services and value-added services, both of which may depend on the infrastructure. In one embodiment, start with a generic or basic configuration for the infrastructure services. It may be preferable to not impose complex policies or sophisticated customizing during the initial implementation process. In one embodiment, after testing the basic configuration, components may be optimized one at a time. Note that changes are preferably done one at a time, and each revision is preferably fully tested and documented for change management.

Figure 75:
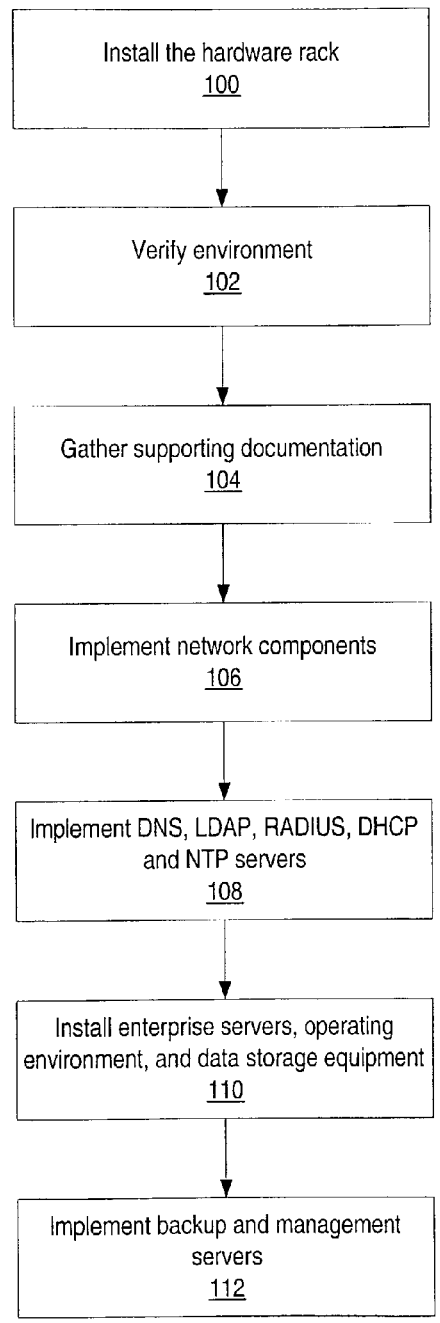
FIG. 75 illustrates a method of implementing infrastructure services according to one embodiment.

FIG. 75 illustrates a method of implementing infrastructure services according to one embodiment. As indicated at 100 of FIG. 75, the hardware rack may be installed. As indicated at 102 of FIG. 75, the environment may be verified. Before proceeding with implementation, it may be preferable to ensure that Internet data center (IDC) components such as power, air, and space, are in place and meet the specifications required for the ISP architecture design. In verifying the environment, it may be preferable to ensure that the power supply is available from two or more power distribution units (PDUs), and that the environment has adequate air ventilation and temperature control.

As indicated at 104 of FIG. 75, supporting documentation may be gathered. The overall network design diagram (which may have been developed according to the method described above in the Creating a Physical Design subsection) may be used to identify and implement each design element and network component. The IP address schema (which may have been developed according to the method described above in the Creating a Physical Design subsection) may be used to configure the addresses for network design. In addition, security policies may be developed or otherwise obtained for use in the infrastructure implementation process.

As indicated at 106 of FIG. 75, network components may be implemented and/or installed. In one embodiment, implementing network components may include one or more of, but is not limited to: implementing console servers; installing and configuring routers; installing and configuring switches; installing and configuring network access servers (NASs); installing and configuring load balancers; installing and configuring firewalls; and installing and configuring intrusion detection systems (IDSs).

In one embodiment, the above network components may be preferably implemented in the given order. In other embodiments, one or more of the network components may be implemented in other orders, and/or implementation of two or more of the network components may be performed simultaneously or with some overlap.

As indicated at 108 of FIG. 75, one or more of DNS, LDAP, RADIUS, DHCP and NTP servers, if necessary or desired, may be implemented. In one embodiment, these servers may be preferably implemented in the following order: Domain Name System (DNS) servers; Lightweight Directory Access Protocol (LDAP) servers; Remote Access Dial-In User Service (RADIUS) servers; Dynamic Host Configuration Protocol (DHCP) servers; and Network Time Protocol (NTP) servers. Note that in other embodiments, one or more of these servers may be implemented in other orders, and/or implementation of two or more of the servers may be performed simultaneously or with some overlap.

As indicated at 110 of FIG. 75, enterprise servers, operating environment, and data storage equipment may be installed. As indicated at 112 of FIG. 75, backup and management servers may be installed.

Again referring to FIG. 74, as indicated at 88, in one embodiment, after implementing infrastructure services, basic services may be implemented including one or more of, but not limited to: Mail servers, Web servers, News servers, and FTP (file transfer protocol) servers. In one embodiment, at a minimum, DNS and LDAP servers are preferably implemented before implementing basic services. It may be preferable that the entire infrastructure is implemented before proceeding to basic services. While implementing basic services, the basic services may be configured to fit the specific environment.

As indicated at 90 of FIG. 74, in one embodiment, after implementing basic services, value-added services may be implemented, if any. What constitutes value-added services may vary among ISPs and may change as competitors follow industry leaders. Examples of value-added services may include one or more of, but are not limited to, calendar, address book, search engine, short messaging service (SMS), IR chat (IRC), and WebMail. Vendor documentation for the value-added services may be referred to for dependencies and implementation recommendations.

After an ISP architecture design is implemented, the ISP becomes responsible for managing the environment. Questions that an ISP may have after implementation may include one or more of, but are not limited to:
　Where to go from here?
　How to insure that the environment can scale to the next level?
　How can market trends be forecasted and market changes be responded to?
There may be factors that may directly or indirectly affect an ISP architecture. Everything from tactical business decisions to technological advances in software and hardware may have an impact on an ISP architecture and an ISP's business. Navigating these changes and responding appropriately may require periodic and careful evaluation of many factors. The following are high-level descriptions and guidelines for addressing usage pattern changes, technology changes, and business strategy changes.

Examining changes in usage patterns may allow an ISP to target new markets, expand existing markets, forecast subscriber interest in new service offerings, and increase scalability. It may be beneficial for an ISP to periodically evaluate usage patterns to determine if it needs to anticipate changing the ISP architecture, business plan, services, pricing, and operation and management. Usage patterns may depend upon many factors, including one or more of, but not limited to:
　Geographic (technology availability based upon location; for example, network traffic may be faster or slower because higher-speed broadband is typically available only in larger cities)
　Demographics (age, gender, income level, etc.)
　Events (cause short-term and long-term increases in traffic)
　User type (residential or business)
Hardware and software vendors may improve their products and create new products. Because the ISP application space tends to change and mature, new solutions may frequently become available. It may be preferable for an ISP to keep up-to-date with changes in technology and new solutions. As new technologies become available, the new technologies may be evaluated for inclusion in future releases. One way to keep up-to-date is to establish and maintain relationships (partnerships) with key vendors.

ISPs may need to change their business strategies to remain competitive and move ahead of competitors. ISPs preferably strive to be more efficient and cost effective, reaching new subscribers and adding or enhancing service offerings. ISPs may redefine their strategies in reaction to the market, positioning themselves for new opportunities. In addition, when market conditions change dramatically, such as a market downturn or sudden growth, ISPs may need to revise or redefine their business plans.

Subscribers' expectations may increase in response to competitor offerings and new technology. To retain subscribers and win new ones, it may be preferable that ISPs meet these higher expectations. The following are exemplary changes an ISP may consider to gain and maintain a competitive edge over its competitors:
　Offer improved customer care.
　Offer new value-added services.
　Provide higher service level agreements (SLAs).
　Maintain or increase reliability.
　Manage operations more efficiently.
　Lower costs while preferably increasing profitability.
In a competitive market, business subscribers may tend to seek out higher-quality customer service experiences. Typically, business subscribers want the best service offerings available combined with the highest level of customer service, for the least amount of money. Business subscribers obviously do not want to pay any more than they have to, and the Internet has simplified comparison-shopping. In a competitive market, those ISPs that have better and more reliable service offerings paired with higher-quality customer care are typically the ones that will fare well in acquiring new business subscribers and retaining current subscribers. As an ISP moves into offering SLAs or meeting higher service levels, it may be beneficial for the ISP to consider one or more of the following:

Infrastructure is preferably highly reliable to support mission critical business.

Infrastructure is preferably scalable to support new service offerings.

More stringent security policies may be required to ensure that subscriber data remains confidential.

ISP Architecture Development System

Embodiments of a method for designing, developing and implementing ISP architectures, such as the exemplary method illustrated in FIG. 2 and further described in FIGS. 3 through 75, may be implemented as an at least partially automated system. This subsection describes embodiments of an ISP architecture development system that may be used in facilitating the design, development and implementation of ISP architectures according to embodiments of the method for designing, developing and implementing ISP architectures described above.

Figure 76:
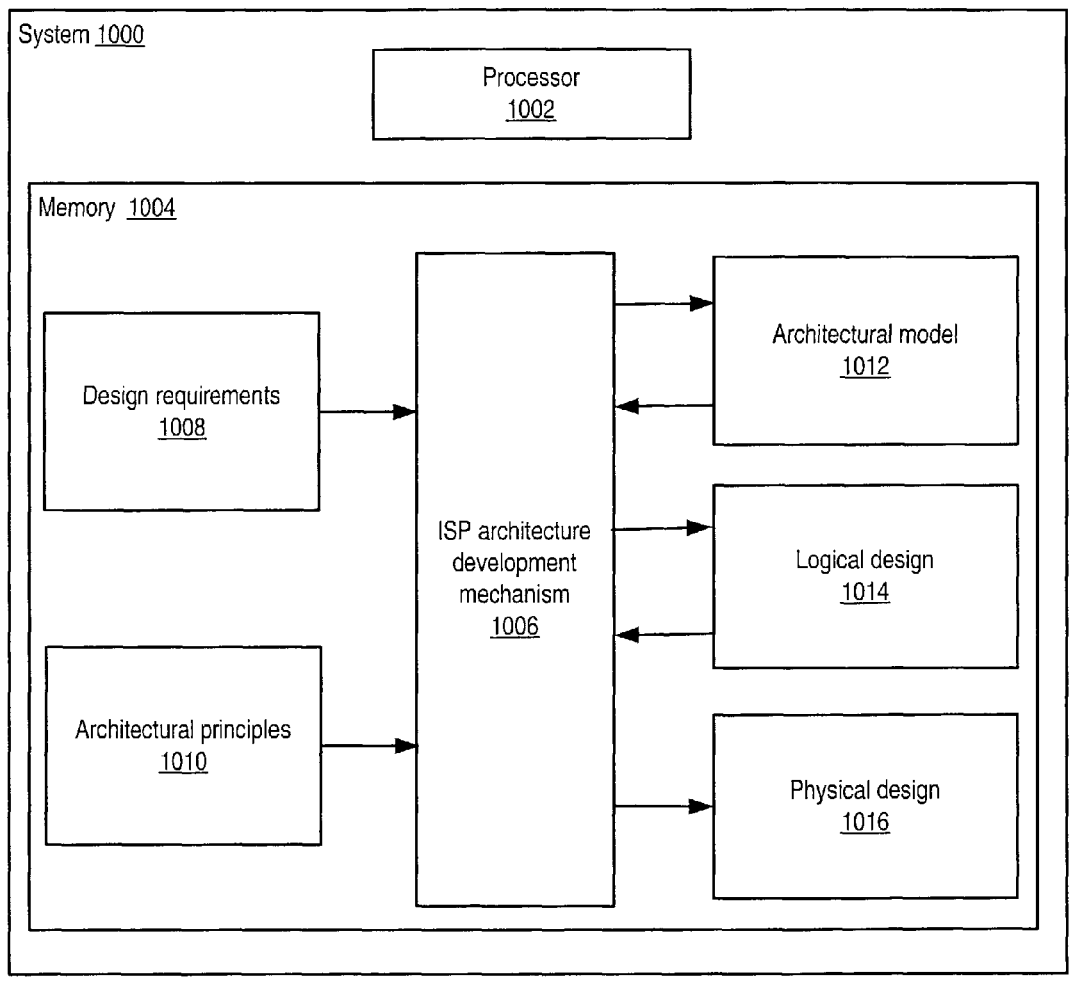
FIG. 76 illustrates an ISP architecture development system according to one embodiment.

FIG. 76 illustrates an ISP architecture development system according to one embodiment. System 1000 may be any of various types of devices, including, but not limited to, a personal computer system, desktop computer, laptop or notebook computer, mainframe computer system, workstation, network computer, or other suitable device. System 1000 may include at least one processor 1002. The processor 1002 may be coupled to a memory 1004. Memory 1004 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. System 1000 may couple over a network to one or more other devices via one or more wired or wireless network interfaces (not shown).

System 1000 may include, in memory 1004, an ISP architecture development mechanism 1006. System 1000 may also include one or more display devices (not shown) for displaying output of ISP architecture development mechanism 1006 and/or one or more user input devices (e.g. keyboard, mouse, etc.; not shown) for accepting user input to ISP architecture development mechanism 1006.

In one embodiment, one or more design requirements 1008 for an ISP architecture may be input into the ISP architecture development mechanism 1006. In one embodiment, these design requirements 1008 may be generated according to the method described in the above subsection titled Formulating Requirements for a Design. Design requirements 1008 may include, but are not limited to, business and functional requirements. In one embodiment, ISP architecture development mechanism 1006 may include one or more mechanisms to facilitate the obtaining and/or evaluation of design requirements 1008. In one embodiment, ISP architecture development mechanism 1006 may include one or more mechanisms to facilitate and/or automate establishing assumptions for the set of design requirements and/or for determining design tradeoffs and addressing architectural limitations in light of the evaluations of the set of design requirements and the assumptions for the set of design requirements.

In one embodiment, ISP architecture development mechanism 1006 may generate an architectural model 1012 for the ISP architecture using the set of design requirements 1008. In one embodiment, architectural model 1012 may be generated according to the method described in the above subsection titled Establishing an ISP Architectural Model. In one embodiment, generating an architectural model 1012 may include identifying one or more core components of the architectural model and applying one or more architectural principles 1010 to the architectural model. In one embodiment, one or more architectural principles 1010 for ISP architectures may be input into or specified in the ISP architecture development mechanism 1006. Architectural principles 1010 may include one or more of, but are not limited to: scalability, availability, reliability, manageability, adaptability, security, performance, and open systems.

In one embodiment, ISP architecture development mechanism 1006 may generate a logical design 1014 for the ISP architecture using the generated architectural model 1012 and the set of design requirements 1008. In one embodiment, logical design 1014 may be generated according to the method described in the above subsection titled Creating a Logical Design. In one embodiment, generating a logical design may include identifying a high-level topology for the ISP architecture, identifying one or more services within the topology, defining one or more service flows for the ISP architecture, and defining one or more network components for the logical design 1014 according to the identified one or more services and the logical design 1014.

In one embodiment, ISP architecture development mechanism 1006 may generate a physical design 1016 for the ISP architecture using the generated architectural model 1012 and the generated logical design 1014. In one embodiment, physical design 1016 may be generated according to the method described in the above subsection titled Creating a Physical Design. In one embodiment, generating a physical design may include generating a network design diagram for the ISP architecture and planning for capacity of the ISP architecture. In one embodiment, generating a physical design may include generating an IP address schema for the ISP architecture.

In one embodiment, after generating the physical design 1016, one or more components for the ISP architecture may be selected using the generated logical design 1014 and physical design 1016. In one embodiment, the one or more components may be selected according to the method described in the above subsection titled Selecting Components. In one embodiment, ISP architecture development mechanism 1006 may include one or more mechanisms for facilitating and/or automating one or more aspects of the component selection process.

In one embodiment, after selecting components for the ISP architecture designed by the above process using the ISP architecture development mechanism 1006, the ISP architecture may be implemented according to the generated logical design 1014 and the physical design 1016. In one embodiment, the ISP architecture may be implemented according to the method described in the above subsection titled Implementing a Solution. In one embodiment, ISP architecture development mechanism 1006 may include one or more mechanisms for facilitating and/or automating one or more aspects of the ISP architecture implementation process.

In one embodiment, one or more functions of the ISP architecture development mechanism 1006 may be at least partially automated. In one embodiment, one or more functions of the ISP architecture development mechanism 1006 may be performed in response to user input and/or may accept user input to the function(s) by the ISP architecture development mechanism 1006.

Internet Architecture for Service Providers

Embodiments of an Internet architecture are described. Embodiments of this Internet architecture may be developed using embodiments of the method and system described above in the section titled Designing, Developing, and Implementing ISP Architectures. This Internet architecture may establish a framework for guiding the development of, for example, multi-service ISPs, Application Service Providers (ASPs), advanced E-commerce sites and mission critical Intranets. This Internet architecture represents an Internet infrastructure design that preferably provides highly scalable services, and preferably improves the efficiency and manageability of the Internet technology infrastructure. For example, higher levels of system availability may be achieved with lower investment in physical system redundancy. This Internet architecture may establish a versatile foundation that may reliably and effectively support anticipated growth and the rapid deployment of new services. Embodiments of the Internet architecture described herein may be applied to establish well-defined, flexible IT infrastructures that fully integrate Internet technologies with core business systems to meet challenges faced by enterprises and service providers in today's increasingly Net-driven markets. Embodiments of this Internet architecture may help both service providers and enterprises address the requirements of improving factors of their IT infrastructures including one or more of, but not limited to, time-to-market, scalability, security, reliability, and flexibility.

Embodiments of the Internet architecture may offer enterprises and service providers a unique approach to restructuring their Internet Technology environments for preferably optimal reliability, security, and scalability while reducing time-to-market and operational costs. While not every project will require every component of the Internet architecture, the architectural approach lends itself to all types of advanced Internet services and business systems. Embodiments of the Internet architecture may offer an approach that accommodates the specific requirements of each implementation, offering benefits to different types of customers. For enterprises that have extensive existing information and computational resources, legacy system integration may be a critical issue. Other enterprises may implement services in a new infrastructure and may be more concerned about integrating multiple delivery channels. Design and implementations utilizing embodiments of the Internet architecture may be developed to meet each of these different business needs.

Embodiments of the Internet architecture may offer competitive advantages to creating shared application environments that can deliver the high performance required for new delivery mechanisms. Technologies such as ISDN, XDSL, ATM and satellite delivery channels may provide significant challenges to quality of service. Embodiments of the Internet architecture may enable shared application hosting while providing for quality of service controls. Embodiments of the Internet architecture preferably enable new levels of service provisioning coupled with efficiency and return on investment.

Embodiments of the Internet architecture may employ a combination of products, standards, techniques, and methodologies to enable enterprises and service providers to offer innovative business services while alleviating many of the risks and costs associated with restructuring an IT environment. Embodiments of the Internet architecture may deliver elements including one or more of, but not limited to:

Scalability on demand to allow for peak usage periods and future growth
   Common services infrastructure to lower service rollout costs and accelerate time-to-market
   Security to provide measurable integrity and optimize revenue generation
   Reliability for consistent access to data and smooth transaction processing
   Versatility for fast deployment of new, more sophisticated service offerings
   Integration to protect investments in existing systems and applications
   Global availability with universal (e.g. Java™) technology interfaces
   Lower overall cost of ownership through more manageable, software-centric architecture Embodiments of the Internet architecture may incorporate a range of technologies and industry standards to give customers an open, flexible architecture tuned to deliver optimal performance and service quality. In one embodiment, solutions such as Sun Solaris™ Operating Environment software, Java technology, and Sun Enterprise™ servers may play a strategic role in the heterogeneous platform design.

Embodiments of the Internet architecture may be based on the application of Internet design principles derived from combined best of breed and industry standard design practices. The Internet architecture may incorporate these principles into specific design elements and technologies in distinct areas including one or more of, but not limited to:

N-tier architecture
   Service-based infrastructure
   Distributed server complexes
   Multi-level security model
   Heterogeneous legacy integration
   Multi-platform Java technology Internet and general information systems design has evolved from the traditional client/server model to a layered design model that augments the three-tier Presentation/Business Logic/Data model with additional common services functionality. N-tier architecture design integrates application environments, transaction systems with both traditional RDBMS and object technologies such as CORBA (Common Object Request Broker Architecture). These additional tiers or layers may include, but are not limited to: transaction monitors, messaging middleware, and directory-based authentication and authorization mechanisms. The actual implementation may separate logical from physical design, while the resulting mapping of system functionality may be designed to mediate the diverse, heterogeneous environments encountered in advanced Internet systems.

The N-tier architecture preferably enables organizations to create a complex, yet integrated computing platform preferably allowing optimum performance, scalability, and the flexibility to adapt to ever-changing business and technical requirements. Each tier may be designed, sized and tuned to best support the services within it. These architectures may provide advantages in QTTM (quick time to market), reusability of application components, and in transaction volumes. These logical tiers may not be implemented in a strictly ordered layering, and the nature of common services may rely on N-tier interactions that communicate across layers. Embodiments of the Internet architecture may present an approach to N-tier application design implementation that divides complex application architectures into architectural zones or layers that may be implemented across aggregate server resources.

The success of service providers, whether ISPs or enterprises, may be defined by their ability to rapidly deploy new services that are independent of the infrastructure. Network growth and application design disciplines are converging on requirements for middleware solutions that are based on a common denominator of network services. These new middleware solutions may provide an interface for enabling services. True scalability over multiple applications may be achieved through the implementation of a services-based infrastructure. This may be achieved by dynamically mediating services across the infrastructure based on the actual performance patterns and heuristics of the services-based architecture. Object and Java technologies may be key enablers of this new service model for ISPs.

In the services-based infrastructure, underlying IP services and infrastructure components may be implemented as a Common Services layer upon which applications are developed. This may transcend traditional Internet services of Web, mail and news by providing solutions for file services, H.323 video conferencing, video on demand, voice over IP and other multimedia applications. The Common Services infrastructure may provide directory, authentication and messaging services, and may also serve as an application development platform that preferably improves both programmer productivity and the ability to integrate functionality between core services applications and external delivery partners.

While prior art designs typically required dedicated systems for application components, designs based on embodiments of the Internet architecture described herein may employ technology such as advanced server clustering, network disk technologies and service management software to preferably help increase leverage from the system infrastructure. This may preferably provide improved scalability and easier introduction of new services, and may preferably enable the development of multi-site complexes with appropriate load distribution and data synchronization capabilities.

Multi-site distributed systems architectures may preferably provide inherent disaster survivability, enhanced user responsiveness and improved scaling for mission critical applications. In one embodiment, application component technology may be integrated with advanced server technology (e.g. server clustering and highly available disk subsystems) into architectures that provide the capability for multi-site synchronous operation and WAN-based geographic failover.

Intra/Internet infrastructures may require the integration of a number of disciplines and technologies that address protection, authentication, authorization, encryption, and preventative monitoring, and potentially other aspects of security. These disciplines and technologies may include one or more of, but are not limited to: firewalls, fire ridge, network partitioning, encryption (PKI) and tunneling techniques. A goal for the "new" infrastructure may be to provide defense in-depth and protection of internal as well as user data. Analysis of security is an exercise in reducing opportunities for attack, and building in "comfort" levels that can be counted on by both marketing and users of the system.

Security technologies and techniques may include one or more of, but are not limited to:
  Firewalls
  Private Networks
  Virtual Private Networks (using encryption)
  SSL via Web Browsers
  Network partitioning and "air gaps" of internal and external systems
  Multi-layer security for commerce systems
  Certificate Authority and Public Key Infrastructures
  Registration systems
  Secure E-mail and messaging systems
  Secure Logging and detection systems
  Router configuration
  Data encryption
  Server Lockdown Advanced Internet services security may be achieved through the integration of these complementary security technologies. These tools may be used to implement multilevel security around the underlying service infrastructure. This may be based in part on the use of fire ridges and/or increasing levels of security between the tiers within the service infrastructure. For example, Internet users may connect directly to front-end Web servers while the business logic application environment receives higher security and isolation with a higher level of security applied to back-end data resources. This model may incorporate identification and authentication technologies, such as client certificates, smart cards and biometrics.

A requirement in implementing advanced Internet services may be the ability to integrate a variety of back-end and external systems. Embodiments of the Internet architecture may aid customers in moving from a conceptual N-tier design to a production-ready implementation that extends legacy systems into the web delivery arena. Issues such as reliability, availability, serviceability, scalability, manageability, multi-platform interoperability, and legacy system integration may be addressed in order to create integrated server complexes. In one embodiment, this may be accomplished via a toolbox of technologies (e.g. protocol gateways) and encapsulation-programming paradigms (e.g. abstract APIs and application component wrapping). This preferably enables the integration of a wide range of existing services, as well as independence from specific implementation of these services, so that, for example, services may be replaced as technology or business relationships evolve.

In one embodiment, Sun Java technology may be used to support web-optimized, object-oriented design and a common services-based infrastructure to improve the efficiency of developing and deploying new services. Java technology may provide a platform-independent mechanism for integrating heterogeneous back-end resources into a heterogeneous service environment. In addition, Java technology may enable a Common Services infrastructure both via APIs that encapsulate diverse resources and via a programming paradigm that enables rapid, WAN-side (or Internet-wide) development of N-tier applications.

Figure 77:
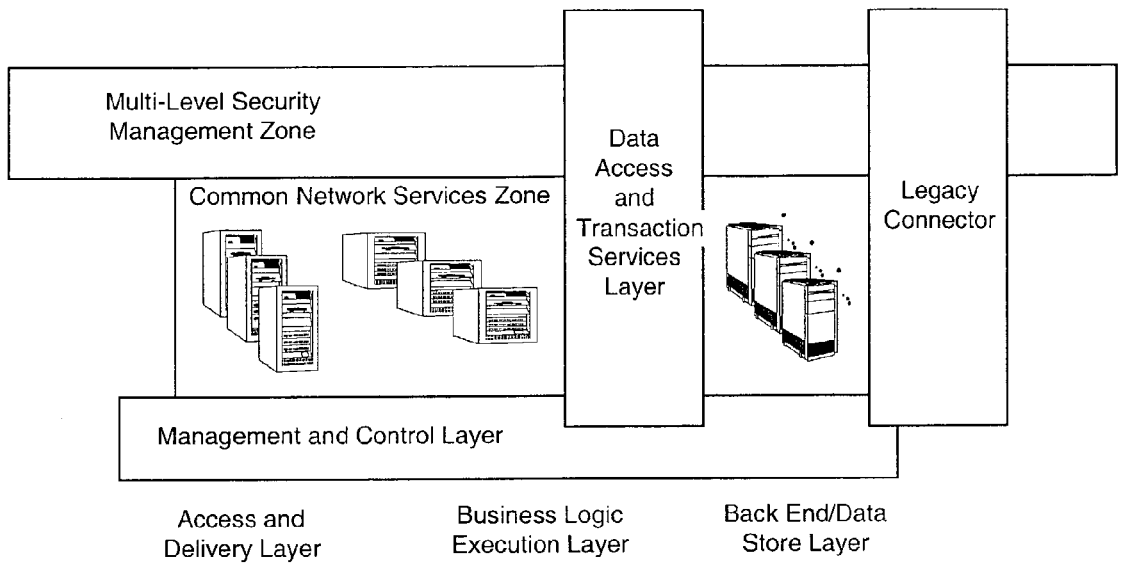
FIG. 77 illustrates framework function zones and zonal relationships among the zones according to one embodiment of an Internet architecture.

FIG. 77 illustrates framework function zones and zonal relationships among the zones according to one embodiment of the Internet architecture. Embodiments of the Internet architecture may follow an N-tier architecture encompassing a number of functional layers for client access and delivery systems, network and platform topologies, application and data access, security, legacy data integration, middleware, and management tools. In one embodiment, based on an open platform, the Internet architecture approach may be valid for all types of IP-based applications and may span LANs, Intranet, Extranet, and Internet "geographies." Embodiments of the Internet architecture may be used, for example, for customized, large-scale Internet environments that anticipate both volatile growth and rapid addition of new applications and services.

The three-tier architecture model and some representations of N-tier platforms may be represented as layered diagrams. This may imply that all communication between separated layers must pass through the intervening layers. In a common services architecture based on switched networking technology, this is not a strict requirement. In embodiments, the Internet design architecture may represent the logical tiers as zones instead of strict layers. These zones may have all of the expected characteristics of traditional "layers", e.g., security conformance, reinforcing subnets, and common scaling mechanisms, while the communication and interoperability model may be extended to include various secure n-party interaction models between the components in each of the zones. This use of zonal architecture techniques may free Internet infrastructure designers from at least some of the constraints of prior art architectural models that enforced topologies such as 2-tier, stovepipe, hardwired, function-point, hardware-centric, and/or LAN-centric topologies.

Referring to FIG. 77, the access and delivery layer may include one or more systems responsible for accepting and maintaining network connections directly with the users. Typical access and delivery systems may include networking equipment (e.g., modems, switches, routers, and hubs) and server equipment (e.g., Web servers, directory/name servers, authentication servers, and messaging relays). Specialized access equipment may also be required to support specialized devices. For example, a mobile service provider offering Small Message Service (SMS) to cellular phone subscribers may require gateways to the cellular infrastructure.

Embodiments of the Internet architecture may preferably assume that client systems are heterogeneous, including, but not limited to, personal computers, workstations or network computers, and also appropriately enabled mobile devices, cellular phones, personal digital assistants (PDA), or even intelligent embedded devices. Any of these services may also act as a client. Using embodiments of the Internet architecture, service providers and enterprises are preferably positioned to take full advantage of Web-based services to deliver diverse client interfaces, applications, and entry points.

Referring to FIG. 77, the business (or application) logic execution layer is the core of the Internet application or service. In one embodiment, the open nature of the Internet architecture preferably supports virtually any configuration of systems and application software required to achieve desired business goals, while preferably preserving the flexibility of the overall Internet infrastructure. The application logic may be a set of proprietary and/or commercial off-the-shelf software, and may include existing applications residing on legacy systems outside of the formal Internet infrastructure. Applications may be accessed via interfaces such as CGI-BIN, Netscape API (NSAPI, Java Remote Method Invocation (RMI) and Common Object Request Broker Architecture Interface Description Language (CORBA IDL), among others.

In addition, application servers such as Sun's NetDynamics™ 5 product or Netscape's Application Server (NAS) may offer reusable object-oriented application logic components (accessible, for example, via RMI and/or CORBA) that may facilitate incorporating common operations into Internet-ready applications. Such operations may include one or more of, but are not limited to: access control, database and legacy system connectivity, session management, and transaction monitoring. Once the applications are built, the application server may also provide infrastructure services including one or more of, but not limited to: application partitioning, multi-threading, automatic load balancing, and failure recovery. Using these services, developers may preferably tune features for optimal performance, scalability, and reliability of their applications within the Internet architecture.

Referring to FIG. 77, the data access and transaction services layer is a middleware layer. Data access and transaction services may be offered to the application developer to preferably simplify the task of interfacing with heterogeneous back-end databases and transaction execution systems. In addition, these services may allow newly developed Internet applications to interface easily with existing enterprise systems that may be distributed among a number of disparate platforms.

In terms of data access, applications can make use of data abstraction interfaces such as transaction monitors, RDBMS APIs, Object-relational mapping systems, or Java Database Connectivity (JDBC™) and Open Database Connectivity (ODBC) to provide uniform access methods to a large variety of databases. This abstraction preferably allows the developer to easily integrate external data into an application.

Referring to FIG. 77, the back end/data store layer may include networked storage elements including one or more of, but not limited to, local disk arrays, file servers (e.g. NFS™ or other), relational and/or object-oriented database management systems (DBMS), and data warehousing systems containing any data associated with the platform. Storage may be accessed either directly (as in the case of a local disk) or by way of the Data Access layer. In one embodiment, the Internet architecture preferably does not require that all data be located centrally. Data may be located where it makes sense. The systems architect may consider factors such as overall performance, sensitivity, value and the persistence of the data. These systems are preferably equipped and tuned to perform their tasks well, and may include specialized technologies, such as RAID arrays for continuous availability, failure recovery, and automated backup. Techniques such as write caching, remote mirroring, hot sparing and swapping, and storage area networks (SAN) may provide additional levels of storage reliability and performance, for example for mission-critical Internet infrastructures.

Referring to FIG. 77, the common network services zone may support advanced networking services that may enable interactive and collaborative relationships between all parts of the N-tiered Internet design model, including, but not limited to, legacy applications and data. This middleware area may specify and execute service behavior through a set of APIs, preferably providing network architects flexibility in structuring the network to complement business processes. This category of service management middleware preferably improves the time-to-market and flexibility of service provider delivery systems. The availability of common network services preferably allows applications to be brought to market quickly without sacrificing features. In addition, applications that utilize common network services preferably remain flexible and are preferably modifiable to conform to changing business climates. Each functional layer in the Internet architecture preferably has access to common services for simple queries to other layers and/or for more sophisticated operations involving the entire infrastructure.

Applications and services delivered through the Internet architecture may require access to existing systems within the enterprise or service provider network but outside the formal Internet architecture. Although these existing systems are utilized by the Internet application or service, they may not be dedicated to serve the Internet application or service. As a result, changing the interfaces to these systems to suit the needs of the Internet infrastructure may not be a viable option. Middleware services such as those provided by the common network services and data access and transaction services layers preferably provide connectivity between the Internet architecture and existing systems. Middleware services may offer one or more of, but not limited to, session control, transaction monitoring, and full security management activities, thus preferably allowing integration with the existing environment while protecting the integrity of data and applications residing outside the Internet architecture.

Referring to FIG. 77, embodiments of the Internet architecture may include a separate zone for security management features (the multi-level security management zone). Security management may be defined as the implementation and maintenance of policies, procedures, and technology to ensure business continuity and protect system integrity. The depth and breadth of the security management features offered by an Internet architecture may depend at least in part on the application and/or service and the sensitivity of the systems, data and processes associated with the application or service, among other factors. Security may pervade all aspects of architecture, implementation, and administration. Embodiments of the Internet architecture may also include one or more of, but not limited to: authentication, authorization, certification, non-repudiation, transaction monitoring, threat detection, integrity and penetration testing, event logging, and alarm generation.

The interfaces between the different functional zones are the most important places to implement security management. Because these interfaces are where one layer requests the services of another, authenticity and authorization preferably occurs at the interfaces. Some interfaces may be so critical that a physical boundary, or firewall, may be required. In one embodiment, the individual architectural zones may be reinforced by security provisioning.

Referring to FIG. 77, the management and control layer of the Internet architecture may include those components that allow for the administration and operation of the network, systems, and applications that comprise the platform. This may include, but is not limited to: provisioning, configuration, availability and performance monitoring, event logging and correlation, alarm generation, management reporting, and recovery services. Generically, these services may be referred to as Operations, Administration and Maintenance (OA&M).

In one embodiment, intelligent agents may be installed on all Internet architecture components. These agents may be accessed via standard protocols, such as SNMP, CMIP, DMI and JMAPI from a centralized console (which may also be viewed securely on remote, heterogeneous clients, if desired). Some systems may rely on proprietary management interfaces where standards may be non-existent or lacking. The centralized console may poll the Internet architecture components for statistical information as well as actively controlling the component by sending messages to the agent. This may preferably allow the operations staff to configure, start, stop, and monitor all services provided by the Internet architecture from a unified interface. The component parts of the Internet architecture may support remote management through the standards mentioned above and the use of browser-based management interfaces that make remote management feasible and economical.

An architectural challenge for service providers and for Internet-based services is how to build an underlying platform that is flexible enough to add new and innovative services and functionality over time, while delivering scalability and consistent performance. In the past, Internet services have been typically built on a "stove pipe" model with hardware dedicated to each separate service component and little common infrastructure. This model may make it difficult and/or costly to add new services.

Advanced service providers and E-businesses have evolved to a model built on a common services infrastructure that enables the quick and easy introduction of new services and functionality. In addition, these architectures typically allow better integration and improve the inherent scalability and manageability of the services.

Second generation Internet services may achieve higher performance and scalability through the functional decomposition of application functionality into separate modules and the dedication of these modules to dedicated hardware. Web server engines may be separated from data storage and business logic; E-mail storage and client connections may be separated from Internet mail transfer agents. Each application component may be made resilient and scaled in an appropriate manner, such as Web servers in a horizontal model vs. vertically scaled clusters for database servers.

While some of this was necessary due to early limited CPU scalability of Internet application components, one purpose was to enable the continuous monitoring of the performance of independent components, and the rapid scaling to respond to volatile growth of users and customers. Each component was isolated on separate hardware, and this typically imposed limitations of cost and flexibility of system resiliency implementations. Most services utilize the design criteria that 100% of systems target capacity should be available under any component failure.

This means that many of these individually separate components with dedicated hardware must also have dedicated failover resources. This begins to approach 100% redundancy cost and, more importantly, the redundant capacity is tied to specific functions and cannot readily be reallocated. Embodiments of the Internet architecture may use functional decomposition to preferably maximize performance, while also taking advantage of mechanisms to preferably provide maximum leverage of the system assets. Some examples of these features are Domains, processor sets, clusters, resource managers and bandwidth allocators.

Processor sets and domains may be used to make one server behave like several. Processor Sets may be used, for example within Solaris, to bind specific CPUs to a given process. In one embodiment, this is a hard limit mechanism, and it provides that the CPU resources specified will be available for that process. The exclusive binding preferably prevents other processes in the system from using those processors. The use of processor sets may give increased performance by reducing thread migration between CPUs. For example, an application server and a database could coexist in a twelve-CPU server with specific CPUs dedicated to each function. This preferably helps ensure that each application has the system resources it needs, and prevents each from interfering with or limiting the other's performance. Domains preferably enable the system to be partitioned into completely independent server images, each with its own operating system and system resources. In addition, dynamic reconfiguration preferably enables on-the-fly reallocation of resources in a running system.

While Domains and processor sets may allow one server to perform like several, a cluster enables several servers to act as one. Cluster technology may be especially appropriate to application components that contain statefulness or data that must be shared across the redundant servers in the cluster. In addition to sharing the disk resources, the servers in the cluster are controlled by software that can migrate applications across the server cluster in the event of the failure of any single node.

Resource manager software may provide the ability to control the allocation of resources (e.g., CPU, memory, and processes) between users, groups and applications. The control mechanism may be based on a "fair-share schedule" concept that allocates shares of available resources, as opposed to fixed percentages. This application may be used to prevent individual applications on a single server from locking out or starving other applications. Resource manager software may also be used, for example, to provide specific levels of service to different categories of users, enabling differential charging for higher levels of service. In addition to the allocation of resources, the resource manager may provide detailed usage data which can be used to support accounting/billing and capacity planning.

A bandwidth allocator may provide a fair-share control mechanism to allocate network bandwidth over multiple web servers on a single web host system, for example. A bandwidth allocator may preferably allow the IT professional to control the bandwidth assigned to particular applications, users, and departments that share the same intranet or Internet link. A bandwidth allocator may preferably manage any type of IP-based traffic.

While server resources have become ubiquitous through technologies such as domains and clusters, disk resources have also migrated from server resources to network resources. Where much of today's disk storage is tied to individual islands of servers, storage devices may be made ubiquitous across the data center by placing intelligence in the Storage Area Network to preferably allow data access across the data center or enterprise. In one embodiment, the disk technology may integrate with server features to preferably provide a flexible platform that may provide logical isolation of application components within a highly leveraged shared resource environment. In one embodiment, this disk technology integrated with server features preferably enables the Internet architecture to deliver high performance, combined with service resilience and quality of service controls.

Internet Service Provider Configuration Guidelines

This section describes guidelines and principles that may be applied to ISP architectures, as well as services that ISPs may be expected to deliver and some principles behind the network architectures that support them. Exemplary approaches to ISP configuration are described that may be used to position ISP infrastructures for performance, scalability, security, and flexibility, focusing on areas which are of common interest to ISPs, ASPs, and NSPs. As the Internet Service Provider market matures, a growing number of companies are providing specialized services. ISPs continue to be the on-ramp of the Internet for most subscribers; Network Service Providers specialize in high-bandwidth connections and supporting Internet backbones; Application Service Providers host services ranging from sophisticated Web sites that conduct electronic commerce transactions to Enterprise Resource and Planning services; and finally, many ISPs are covering all niches and acting as Full Service Providers. The guidelines and principles described in this section may be used, for example, in designing, developing, and implementing ISP architectures according to the methods and systems described above in the section titled Designing, Developing, and Implementing ISP Architectures.

Internet Service Providers preferably deliver packages that provide functionality including one or more of, but not limited to: the ability to store and retrieve mail; to access huge numbers of netnews articles; to view and host Web sites; to view streaming video clips; to interact in chat rooms and to communicate using voice over IP. In order to provide these value-added services, companies entering the ISP marketplace preferably ensure that their infrastructure includes a full range of basic functionality: Applications that ISPs may be expected to provide to their users may include one or more of, but are not limited to: electronic mail, netnews, World Wide Web access, and Web page hosting. More sophisticated users may also demand access to other Internet services such as Virtual Private Networks (VPNs), chat, phone servers, FTP, telnet, gopher, and archie. Decisions are preferably made regarding which services will be provided by an ISP to its customers, and in large part these choices are what differentiate one ISP from another.

ISPs preferably ensure both the availability and integrity of customer data. Therefore, the network through which an ISP provides services is preferably protected against breaches of security and against hardware and software failures. Firewalls may be used in protecting an ISP's core services from intrusion from both the Internet and its customers. High availability (HA) for ISP applications may be achieved by deploying multiple-server clusters, which may provide integrated configurations for NFS™ and many Internet server applications. For system integrity, ensured backups are preferably performed.

ISPs typically provide dial-in service using the public switched telephone network (PSTN). Cable-based ISPs provide access through cable modems and routers at the head-end site. High-bandwidth connections using ISDN, ADSL, leased lines, ATM, and Frame Relay are needed to support more sophisticated residential and home office customers, as well as most commercial subscribers. Points of Presence (POPs) may preferably extend an ISP's home service area, reaching a broader customer base, and allowing customers to access ISP services while traveling. Some ISPs may establish roaming arrangements with other service providers, allowing national or even worldwide access to a uniform set of services.

Service Providers preferably have well thought-out strategies for managing their network and the potential for growth that may result from providing a high level of service to customers. Basic facilities such as Domain Name Service (DNS) are preferably established to provide addressability to ISP services and customer-owned domain names. Lightweight Directory Access Protocol (LDAP) may be used to coordinate subscriber information across a variety of services and operating system platforms. Network management tools may help to manage routers, firewalls, and the core servers themselves. Effectively managing users and creating new accounts may become increasingly critical as an ISP grows.

Internet Service Providers may be categorized by size. Local ISPs typically begin with configurations for 5,000 to 10,000 subscribers and scale upwards from this range. Regional ISPs typically begin in the range of 50,000 to 75,000 subscribers. National ISPs typically have 150,000 to 200,000 subscribers, and sometimes more than one million subscribers. Each category of provider may have its own characteristics and challenges.

ISP Infrastructure

The following is a discussion of Internet Service Provider components and infrastructure from a software standpoint. Many software components typically need to be selected and assembled to provide a full range of ISP services, and the deployment of each service may vary substantially depending on the subscriber base, workload, and expectations of growth. Solutions that are appropriate for small Internet Service Providers may not scale acceptably into mid- and large-sized configurations. Given that scalability is key, it may be preferable to make up-front investments in tools and infrastructure that will carry an ISP well into the future. Software components that ISPs may deploy may include one or more of, but are not limited to: electronic mail, netnews, the World Wide Web, domain name service, routers, and firewalls. The ISP infrastructure may include one or more of, but is not limited to: operating environments, high-availability components, billing, and network management.

Electronic mail is one service an ISP typically provides to subscribers. Establishing a mail service may require making choices on one or more of, but not limited to: mail server software, storage of user mail files, assigning mail accounts, and selecting a mail reader for customers: There may be many mail server software solutions available for consideration. The choice of server software to support electronic mail may depend at least in part on the size of the ISP and the requirements for scaling to a greater number of users. When selecting this server software, ISPs preferably consider factors such as, for example, increasing demands to support a greater number of different mail access protocols beyond the Internet standard SMTP, POP, and IMAP protocols. Anti-spam features are preferably also considered.

One rule of thumb is that users typically consume, on average, up to 1 MB of disk space each for queued mail messages, depending somewhat on the mechanisms used to store the messages. Some mail systems may allow flexible storage limits, and others may support fixed limits. The ability of a mail system to bill for actual disk space used is one way to manage users with large mail files. In estimating disk space for mail users, additional space is preferably estimated for incoming and outgoing system-level queues.

Assigning mail accounts may require considerable administration time. Therefore, whichever registration mechanisms the ISP uses, automatic creation of mail accounts and repositories may be preferable. Mail accounts are preferably automatically deleted when user accounts are terminated. In general, there are preferably mechanisms to ensure consistency between the ISP's billing information and the existence of user accounts. Lightweight Directory Access Protocol (LDAP) is an exemplary mechanism for maintaining user information across multiple services and operating environments.

An exemplary method that may reduce support costs is to provide a bundled Web browser and mail reader to clients with preconfigured addresses. Some ISPs may configure products such as Netscape Communicator for these purposes. Bundled packages preferably simplify the process of bringing new customers on-line, and the reduced administration overhead preferably results in a net savings to the ISP. With many customers wishing to access their e-mail using Web browser interfaces, mail server software that provides a Web-based subscriber interface may be a preferred choice.

One decision in establishing mail service is the choice of mail server software. Different mail server packages may allow for varying numbers of users and scalability.

There may be "standard" utilities available for supporting electronic mail for small ISPs. Small ISPs are commonly configured with an implementation of the Simple Mail Transfer Protocol (SMTP) (e.g., standard Solaris sendmail) for transmitting e-mail for outgoing mail, and public domain Post Office Protocol (POP) and Internet Message Access Protocol (IMAP) servers for providing incoming mail to subscribers. The SMTP implementation accepts outgoing mail from the customer's mail client software using SMTP, and may transfer and queue mail messages to SMTP agents at other sites. POP and IMAP servers may be used to provide access for mail clients to read, save, and delete messages from their mailboxes. IMAP enables clients to compose, delete, and send mail while disconnected from the server, synchronizing changes once the connection is reestablished. POP and IMAP protocols are used for mail retrieval only.

Some SMTP implementations may not scale well beyond a relatively limited number of subscribers, for example 10,000 subscribers. An exemplary product that scales to a larger number of users is Software.com's Post.Office. Post.Office and other similar products may scale from 30-50,000 subscribers per mail host machine. Post.Office and other similar products may support mail accounts for users without login IDs, eliminating a restriction of the standard utilities described above. Another advantage of Post.Office is that it may provide increased functionality and simplified administration. Account management may be handled by a mail or Web-based forms interface. Post.Office does not run with root permissions, which enhances security. Post.Office supports size limits on individual mail messages, mailboxes, and for the entire mail system. Post.Office's ability to handle mail for multiple domains makes it easy to support commercial and small business customers with their own domain names. Performance may be enhanced over the standard utilities in that Post.Office's servers are multi-threaded, allowing multiple simultaneous connections. One limitation of Post.Office is that it is designed to run on a limited number of configurations, which may make it difficult to deploy, for example, across a national ISP architecture.

Sun Internet Mail Server (SIMS) is an exemplary product that may be used by ISPs of all sizes, and that may be appropriate for regional and national ISPs because it can scale easily to large numbers of subscribers. SIMS and other similar products may provide the features that larger ISPs need, including support for multiple mail domains and mail quotas. The multi-threaded nature of SIMS provides vertical scalability. SIMS also supports multiple servers with the messaging proxy option, enabling horizontal scalability as an option. Multiple hosts may be configured to create high-availability mail delivery systems, and the individual server processes that make up SIMS may be established on separate physical servers, providing flexibility that may allow an ISP's architectural choices to be made independent of the mail system's architecture. This flexibility may be important in designing architectures based on the principles of functional decomposition and security discussed below.

Netscape Messaging Server Hosting Edition is an example of a high-performance messaging solution that preferably delivers scalability, performance, and ease of administration. Netscape Messaging Server can support 500,000 active users on mid-range UltraSPARC servers, with advanced feature sets for prevention of spam and relaying. Concurrent access to a centrally managed, scalable universal message store, accessible via IMAP, HTTP, or POP, makes it possible for ISPs to offer messaging applications such as location-independent access via HTTP and unified messaging. Integration with Netscape Directory Server, an LDAP-based server, may allow service providers to centrally manage and store user and account information. User management is simplified by storing all information in the Netscape Directory Server, thus allowing administrators one-stop access to user, group, services, and shared data management through a browser interface. The modular architecture of Netscape hosting may allow each server to be independent of the Directory Server, thus enabling multiple servers to share a single directory. A shared-directory architecture preferably reduces both the number of directories and the amount of replication among directories. Support for SNMP agents enables integration of SNMP-based systems and network management products.

An exemplary high-end mail server is Software.com's InterMail, which is able to support thousands of concurrent connections to more than one million mailboxes. InterMail is designed to be deployed across a number of servers, a necessity in national ISP architectures. InterMail is multi-threaded and can exploit multi-processing servers. InterMail can be configured to coordinate mail delivery with multiple peers, allowing additional servers to share heavy workloads. InterMail integrates with relational databases as the back-end storage retrieval mechanism for messages. InterMail supports standard SMTP, POP, and IMAP protocols for client mail access and delivery.

Hosting a netnews service is typically a high-bandwidth proposition. Each ISP supporting netnews typically has one or more news feeds from which it obtains new articles and newsgroups. New articles may be distributed using a flood model, where the ISP receiving new articles is responsible for weeding out duplicates. ISPs may also host local news groups containing information and discussions of local interest. Sufficient Internet bandwidth is preferably allocated to handle netnews data rates, and, when designing an ISP, it may be preferable to consider how much bandwidth commercial customers will require if they establish private news feeds. The amount of disk space required by netnews tends to be large; however, the disk space required may be adjusted to accommodate the disk space available, for example by tuning expiration times for messages.

Many ISPs use netnews server software based on Inter-Network News (INN). An ISP may choose to use the public domain version, and may modify it to suit the particular news server architecture. Another option is to use Sun™ Internet News Server™, which is part of Solaris ISP Server™ that was developed using INN as a base. INN's main daemon process handles all of the news feed connections and configuration commands. A separate news reader daemon is spawned for each client connection request, and transfers news articles to the client using Network News Transfer Protocol (NNTP). Some modifications to public domain INN may be necessary or desired to handle the demands of large ISPs. These modifications may include, for example, multi-threading the daemon to improve news throughput handling, and multi-threading to handle client processes more efficiently than through heavyweight UNIX forks.

It may be preferable for ISPs to provide high-performance Web services for their clients using architectures that will scale as Web use expands and changes. Providing a Web service may require, for example, sufficient Internet bandwidth for low-latency browsing and hosting local Web pages for residential and commercial subscribers. Note that it may be preferable for an ISP to use one or more configuration techniques to open different avenues of Web page access to each subscriber depending on the level of service purchased. Web page design and custom Web page hosting services are examples of revenue-generating areas for ISPs. ISPs may preferably offer varying levels of Web server performance appropriate for businesses wishing a high-performance Web presence on the ISP's side of their leased-line connections.

Exemplary packages for supporting Web hosting services and electronic commerce transactions may include, but are not limited to: Netscape Web Servers, Sun™ WebServer™, and Apache (public domain). Web server software is just one part of an effective Web service. Other considerations that an ISP preferably makes may include one or more of, but are not limited to:

Proxy Servers. Proxy servers act as an intermediary between the ISP's subscribers and the Internet. HTTP requests issued from client Web browsers are directed to the proxy server that in turn fetches the requested data from the Internet site. By acting as an intermediary, proxy servers preferably limit the impact of hijacking attacks on TCP sessions.

Content Filtering. Although used primarily for security, proxy servers may also provide the capability to filter content, allowing an ISP to provide subscriber-specific packages that limit access to sites having content inappropriate for children.

Caching. The larger the ISP, the more likely it is that Internet bandwidth may be used to request the same Web pages on behalf of many different users. A caching server may make efficient and cost-effective use of Internet resources while hiding network latency from subscribers. Typically, all Web pages cannot be cached, with dynamic documents generated by CGI scripts being a common example. When used in conjunction with caching servers, transparent proxies such as the Altheon Switch may allow ISPs to reap the benefits of caching without requiring subscribers to configure proxy servers in their browsers.

These services may be deployed on one or more physical servers. The particular architecture may depend on factors including one or more of, but not limited to: the ISP's size, growth curve, and target markets. The Inktomi Proxy Server and the public domain SQUID are examples of packages that may provide mechanisms for implementing proxies, content filters, and caches.

Domain name service (DNS) maps domain names to host addresses for business and residential customers as well as for clients on the Internet. In order for a client to access any Internet service, an address for its server typically is obtained through DNS. One function of DNS in an ISP network is to provide a limited view of the ISP network so that clients are only allowed to access a small set of servers. Some ISPs may have a client DNS that reveals only a small number of addresses, while an internal DNS provides mappings that make all of the ISP's systems accessible to their staff.

Separate domain names are typically defined on a per-service basis. For example, a news service might be accessed through the domain name news.isp.net, and a Web service might be accessed through www.isp.net. These domain names may provide a layer of abstraction that an ISP may use, for example, for ease of configuration, load balancing, and fail-over. For example, a small ISP might have the names news.isp.net and www.isp.net mapped to the same physical server. As the ISP grows, these two services may be hosted on separate servers and with only a change in DNS, customers will correctly access the new configuration.

Local ISPs may use a standard domain name service supplied with an operating environment, for example the Solaris operating environment. Regional and National ISPs often begin with the public domain Berkeley Internet Name Daemon (BIND) and modify it to suit their particular needs. Variations in using DNS and modifications to DNS may include one or more of, but are not limited to:

Static Load Balancing may be achieved with both versions of DNS. When multiple servers are used to host a single service, DNS may be configured to provide different addresses for the same domain name on a round-robin basis. The effect of round-robin DNS is to statically balance the workload across multiple servers.

Dynamic Load Balancing may be achieved by modifying BIND to monitor the load on various servers and map addresses based on measured server loads. ISPs may create dynamic load balancing schemes using the public domain lbnamed package, or alternatively using load-balancing routers. Load balancing routers may be simple to configure, and may avoid one or more of the drawbacks of DNS modifications.

Fail-Over may be supported by modifying BIND to interact with fail-over software on the hosts that provide a particular service. If, for example, mail is hosted on two servers, and one fails, DNS would stop providing address mappings for the failed server and route all traffic to the second server—which could be either a hot spare or part of a load-balanced set of servers. One problem with DNS approaches to fail-over is that many Web browsers cache DNS responses as long as they are running. In the event of a server failure, new addresses are not obtained and a failed-over Web site continues to appear dead to the user. Load balancing routers and IP address fail-over are examples of solutions which avoid this issue.

Client-Sensitive Mappings may be established, for example, to provide access to different services for different subscribers depending on the package of services they have purchased. This may be done, for example, based on the IP address of the entity requesting a name mapping, and may require modifying BIND.

One shortcoming of the current versions of DNS is the lack of intuitive user interfaces to simplify configuration, which may make DNS administration a tricky and error-prone activity. One solution to this problem is to integrate the name mapping tables with a DBMS. A graphical user interface may be developed for the DBMS to allow entries to be added, deleted, and modified; and back-end software may periodically generate new configurations for the DNS service and re-start the daemons. This solution may simplify administration overhead, and may be useful, for example, for ISPs with customer domain names that are frequently added and modified.

It may be preferable for ISPs to establish mechanisms and policies that preferably reduce or minimize the occurrences and the effects of intrusion into their ISP networks. ISPs preferably control access to each server in their network. Packet-filtering routers and firewalls are examples of tools for controlling access. Packet-filtering routers and firewalls may be used to provide multi-layer protection between the various sub-networks that make up an ISP installation.

Packet filtering routers may be the first line of defense, and allow packets to be routed based on source and destination IP addresses, and also based on source and destination TCP or UDP port numbers. Packet filtering routers provide a mechanism by which an ISP may preferably ensure, for example, that only HTTP requests can be made of a Web server. Packet filtering routers may be necessary for establishing a secure ISP network. However, one shortcoming of packet filtering routers is that the routers typically do not provide a logging facility that can be used to detect and track intrusion attempts. In addition, rule sets may be quite complex and prone to error. Further, since routers are stateless, they cannot perform complex analysis of transactions with internal hosts.

Firewalls, when deployed in conjunction with packet filtering routers, may be used to establish multi-layer, secure gateways throughout the ISP network. With routers configured to block all connections except those appropriate to specific servers, firewalls may be used to perform more fine-grained filtering of traffic. Firewalls may perform stateful inspection of packets using knowledge of the specific application protocols being used. As a result, firewalls may allow easily-spoofed protocols, for example FTP and most UDP-based protocols, to pass safely through the firewall while dropping suspicious packets which are not received in the correct context. Firewalls may be used to perform detailed logging of traffic to internal hosts, which may be used for detecting any intrusion attempts. Encryption-enabled firewalls may be used to set up virtual private networks (VPNs) that may be used, for example, in electronic commerce applications and/or for interconnecting remote corporate customers. Finally, Network Address Translation (NAT) features may be used to hide internal network addresses, preferably enhancing security and enabling an ISP to allocate more private IP addresses than are actually available. Although firewalls can host proxy services, a more secure network configuration may be one protected by a server hosting only the firewall software.

Firewall options which may be used in ISP configurations may include one or more of, but are not limited to: CheckPoint FireWall-1, SunScreen SPF-200 and SunScreen EFS.

The ISP infrastructure may include one or more of, but is not limited to: operating environments, high-availability components, billing, and network management. Selections in these components of the ISP infrastructure may have significant impact on an ISP's ability to deliver services and scale with a growing subscriber base.

Selection of an operating environment is one decision typically facing Internet Service Providers. Depending on the choice, ISPs may constrain their architectures to a limited number of possibilities, or alternatively may maintain a greater amount of flexibility for future growth. Scalability may be an important factor to consider for many ISPs, for example because an ISP's subscriber base may grow substantially. Both horizontal and vertical scalability may be important factors to consider in ISP architectures. Another factor that may be considered is that multi-platform environments are common in ISP organizations, so it may be preferable to select an operating environment that is useable across multiple platforms. Reliable systems are preferred for ISPs. Hardware failures may be expected, and therefore an operating environment that supports features such as hot-pluggable components, management of individual processor sets, and separate operating environment domains on potentially different platforms may be preferred. Support for standard Internet protocols for an ISP's operations may be another important factor to consider when selecting an operating environment.

It may be preferable for some ISPs to select an operating environment that is configurable to provide multiple services (e.g., mail, file, and Web services) at the same time to many simultaneous users. Multi-user systems may result in more cost-effective computing because the resources of networked systems can be shared remotely. Authorized users can log in and access services as needed. Client systems can access a wide range of facilities on servers including one or more of, but not limited to: file, print, and name services, Web pages, and database services. Administrators can manage networked systems remotely, resulting in significantly lower cost of ownership.

Ease of administration is another factor that is preferably considered when selecting operating environments for ISPs whose architectures may be characterized by distributed points-of-presence. Security in ISP networks is another factor that is preferably considered when selecting an operating environment. Security feature to consider may include facilities that enable servers to be locked down and made impervious to attack.

High Availability (HA) may be preferred in ISP networks, for example in telco and cable ISPs where subscribers have the expectation that Internet services will be as available as normal telephone and cable services. For ISPs, high availability may be achieved by implementing fail-over mechanisms that allow backup servers to take on the load for a failed server, with more sophisticated solutions allowing multiple servers in a cluster configuration to share the workload equally. HA solutions typically have a small time lag from the time a failure is recognized to the point at which the service is restored on other servers.

Clusters, for example Sun Clusters, may be used in environments requiring high-availability data, file, and application services. When services are managed in a cluster environment, the services may be provided with rapid detection and recovery from hardware, network, operating system, or application software failure. Clusters may support software that utilizes the clusters' high-availability features, such as NFS, database, and Internet services including mail, news, and Web servers. Clusters may also provide an HA toolkit with which ISPs can create their own HA solutions.

Network management functions may be handled with network management products including one or more of, but not limited to: Sun's Solstice™ Enterprise™ Manager, Sun™ Enterprise SyMON™, and HP's OpenView. Components from other vendors, such as router vendors, may provide specific management modules for their products. Network management may be a particular challenge in telco environments, where both IP and OSI protocols are prevalent. For these environments, a network management product that supports the specific needs of telco ISPs may be preferable.

Authentication and billing may be critical functions for ISPs. Authentication services preferably ensure that only valid subscribers can gain access to the network, that subscribers' access to the network is controlled, and that reliable details relevant to the customer's use is provided to the billing system. Billing systems may vary in complexity from those that simply print invoices, to those that integrate with credit card companies and with legacy Telephone Company billing systems.

Architectural Principles

ISP architectures may be unique, and may be determined by variables including one or more of, but not limited to, the number of subscribers, the services to be offered, the workload expected, and the degree of scalability, availability, and security that is needed. Scalability is one aspect of an ISP configuration, and may be achieved, for example, by architectures that support both vertical and horizontal scaling. The benefits of functional decomposition (e.g. by service, task layer, and special function) may accrue by deploying a number of smaller servers rather than a single large server. One or more of the techniques described herein may be superposed, realizing ISP architectures that utilize the best of all of these techniques.

The architectures utilized by Internet Service Providers may include a set of sub-networks having different functional responsibilities, for example user access, services, and administration. These sub-networks may be connected via routers and/or firewalls that may be used, for example, to control access from one sub-network to another. There may be different ways in which services can be deployed onto a physical network of machines. The choice of which architectures to use may depend on a number of factors including one or more of, but not limited to: the number of subscribers, expected workloads, services to be provided, desired performance level, expectations for growth, and security concerns. The factors influencing ISP architectures may vary from one installation to another so that no two architectures are the same. Architectures that are appropriate at one point may be superseded by architectures that exploit new developments in hardware and software. However, there are underlying principles that may be used in the design of ISP architectures. The following is a description of how these underlying principles may be used in guiding the development of ISP architectures.

Scalability is one issue facing new and existing Internet Service Providers. When growth is expected, ISP architectures are preferably designed to handle the growth, which may include making a heavy initial investment in a scalable architecture, and the hardware and software infrastructure to support it. In one embodiment, ISP architectures are preferably designed to grow with both horizontal and vertical scalability. Vertical scalability is the ability to increase the processing power of a single server. This may be done by adding processors and memory to an existing server, or by upgrading to a more powerful platform. Some ISP applications (e.g., netnews) may not be inherently multi-threaded and thus do not scale well with additional CPUs, so horizontal scalability may also be considered. Horizontal scalability provides the ability to add more servers to a particular service area, such as mail, Web, or news services. Since scaling an ISP installation typically includes adding more machines, an ISP architecture that provides for horizontal growth may be preferred to one that depends on vertical scalability alone. In fact, horizontal scaling is typically the first approach to growing an ISP installation.

The services for an entire medium-sized ISP may be based on a single multiprocessor server. One approach for hosting enterprise-wide databases is to deploy one or two fully configured servers. This 'big box' approach may not be the most effective in the Internet realm, however. Decomposing an ISP's services onto a set of smaller servers may provide advantages including one or more of, but not limited to:

Scalability. The use of multiple (multi-processor) servers may support both vertical and horizontal scaling. ISP architectures that support growth may begin with software architectures that allow a single service to be spread across more than one server. It may be initially more difficult, for example, to configure a mail service to allow all subscribers to access their mailboxes from any mail server. However, once the initial work is done, the architecture preferably will sustain growth well into the future. For those ISP applications that do not scale well on multi-processor systems, horizontal scaling may be necessary or desired at some point in the growth cycle, and it may be more cost-effective to address these issues early on. In contrast, the "big box" approach may limit scaling to the performance that can be achieved using a single large server.

Performance. Different services may require different server configurations to provide optimum performance. By hosting each service on separate servers, CPU, memory, I/O bandwidth, and operating system parameters may be tuned for the task at hand. It may sometimes be desirable to split different aspects of a single service onto separate servers; for example Web servers providing dynamic content may respond more quickly to user requests when they farm out specific requests to servers specially tuned for that purpose.

Reliability. With multiple small servers, reliability may be enhanced because the number of single points-of-failure is reduced. For example, if a news server fails for some reason, the loss may not affect the mail service. With one service down, the ISP may still be able to operate in a degraded mode. In more sophisticated architectures, each service may have multiple servers, further increasing reliability.

Security. Even with packet-filtering routers and firewalls protecting an ISP network, it may be possible for some previously unknown attack to succeed in compromising security. An ISP configuration having separate servers for each service may limit the effect of such intrusions. If security is compromised on one server, the intruder may not necessarily gain access to any other server. In addition, if firewalls limit network traffic to only the protocol for which the server is responsible, penetration attempts are only possible using that protocol. For example, guessing passwords through a telnet connection is not possible if that protocol is restricted from news, Web, and mail servers.

Flexibility. An ISP where services are spread across multiple servers may be more flexible. With a domain name service configured to dynamically allocate users to different servers, additional platforms may be configured, tested, and then turned on for subscribers by simply changing DNS configuration. This may be difficult to accomplish with an ISP with a limited number of larger servers.

Larger servers may be used in an ISP as long as they fit into a plan that supports both horizontal and vertical scaling. Larger servers may be needed, for example, as vertical scaling is exploited to gain higher performance. For example, a Web service that uses multi-threaded Web server software and which has been vertically scaled may be hosted on a large server. It is preferable to maintain the capability to scale in both dimensions, and one factor in maintaining this capability may be to decompose ISP services into separate components that can operate and scale independently. Ways to implement functional decomposition may include one or more of, but are not limited to: by services, task layer, and by special function. These techniques may be used separately, or one or more may be used together.

Figure 78:
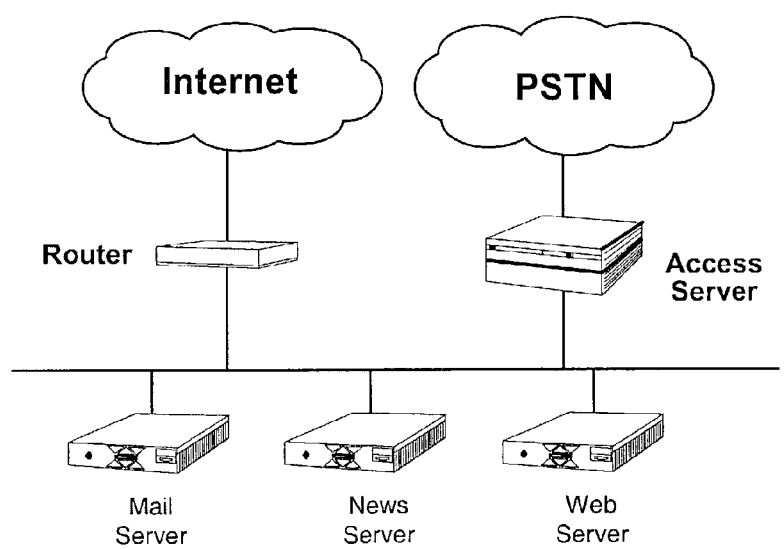
FIG. 78 illustrates partitioning by service according to one embodiment.

FIG. 78 illustrates partitioning by service according to one embodiment. One technique to functionally decompose an ISP's services is to partition each service onto a separate machine, as illustrated in FIG. 78. This example illustrates independent mail, news, and Web servers. Each server can be configured and tuned for the service it is to host, preferably yielding the best possible performance for each service. Because each service is independent, management is preferably easier and the ISP may preferably flexibly reconfigure each server, for example by increasing main memory, while affecting only one service at a time.

Figure 79:
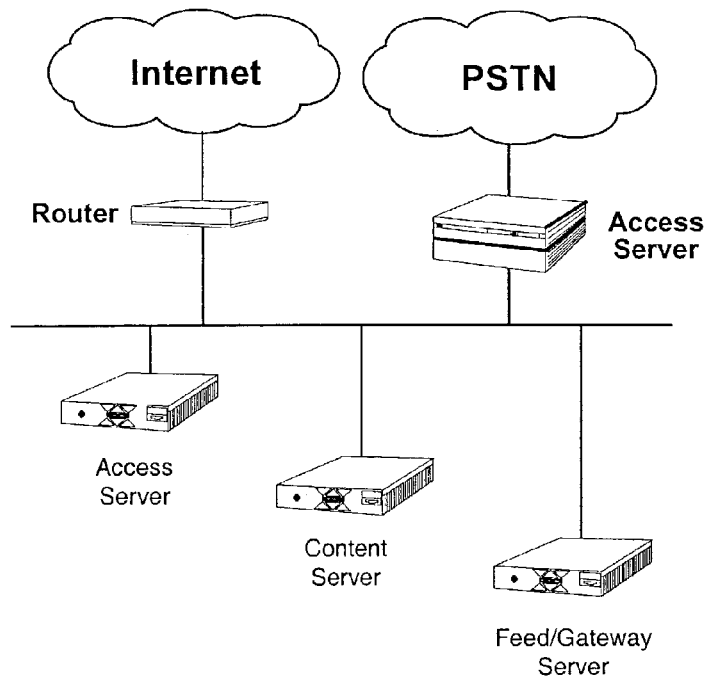
FIG. 79 illustrates partitioning by task layer according to one embodiment.

FIG. 79 illustrates partitioning by task layer according to one embodiment. Another technique to decompose ISP services is by task layer, as illustrated in FIG. 79. In this example, each of the three basic services (mail, news and Web) may have functions that may be layered into a three-tier architecture. An access server may provide the interfaces with which clients may interact. As an example, for mail, this may be a POP/IMAP server that enables users to read their mail. An Network News Transfer Protocol (NNTP) server may reside here for a news service. For Web services, the HTTP daemon may reside on the access server. A content server may include the data accessed by each service, and may host a database server to store user mailboxes and to provide dynamic Web content, and an NFS server for news articles and static Web pages.

The feed/gateway server may provide the interface between the ISP and the Internet. The feed/gateway server may accept incoming mail, e.g. via SMTP, and deliver mail to user mailboxes on the storage server. The feed/gateway server may handle news feed from an upstream site and place articles into a spool area. For Web services, a proxy server may be used instead of a feed/gateway server.

Figure 80:
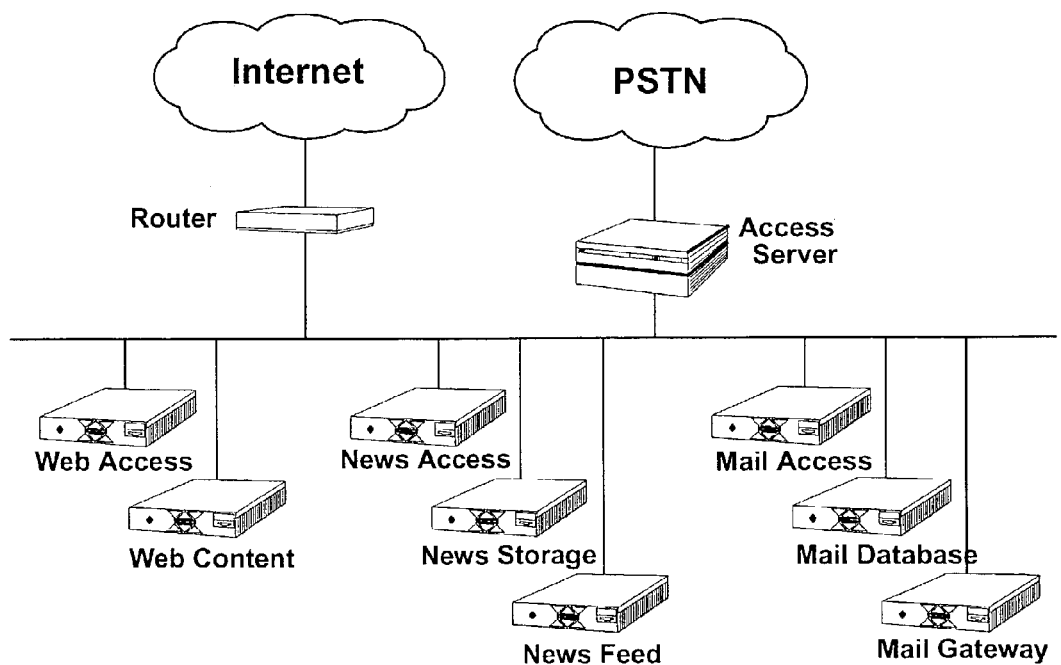
FIG. 80 illustrates partitioning by service and by task layer according to one embodiment.

FIG. 80 illustrates partitioning by service and by task layer according to one embodiment. This exemplary architecture may provide advantages including one or more of, but not limited to: performance tuning may be done by the service and by the function within the service that requires optimization; and security may be improved because penetration of one host does not necessarily yield access to the entire ISP network. This architecture may be both vertically and horizontally scalable, and may offer the ISP increased flexibility in configuring and managing the network.

Another technique to partition ISP services is by special function. For example, splitting a Web service between an HTTP server and dynamic content delivery may allow each function to be allocated the computing resources it needs as it potentially grows and changes over time. Other examples of partitioning by special function may include, but are not limited to, hosting DNS, network management, authentication, and billing functions on separate servers.

Figure 81:
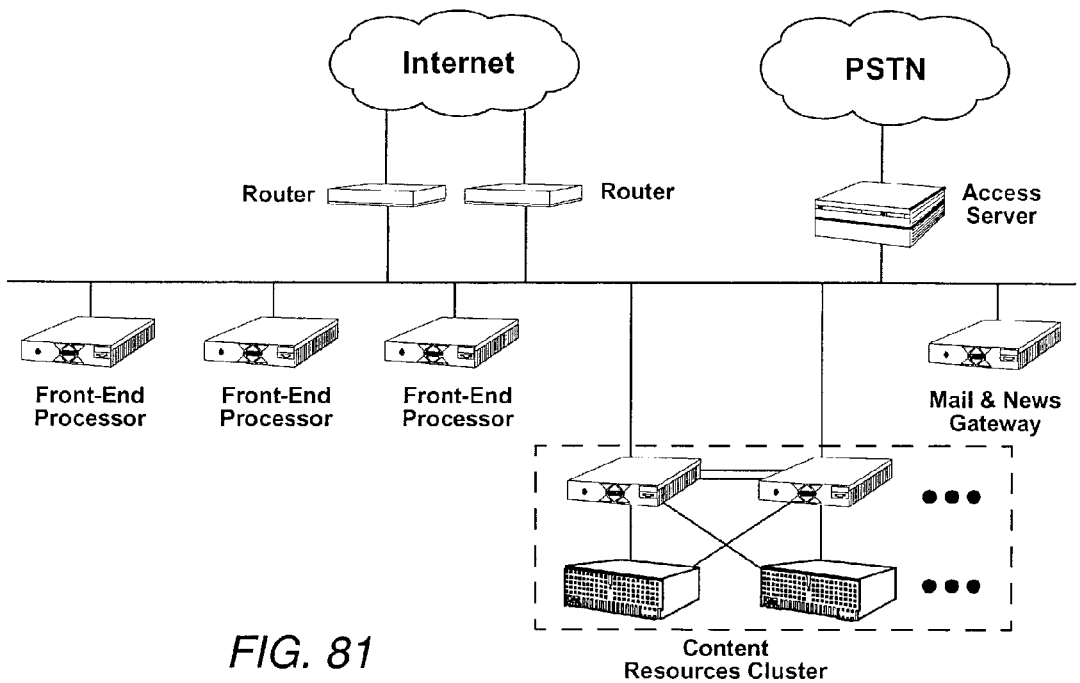
FIG. 81 illustrates an exemplary architecture that illustrates adding redundancy into the ISP architecture to preferably improve reliability and availability, according to one embodiment.

FIG. 81 illustrates an exemplary architecture that illustrates adding redundancy into the ISP architecture to preferably improve reliability and availability, according to one embodiment. Multiple Internet connections may be established to different external networks (Sprint and MCI, for example) to preferably ensure that, if one link fails, the other link can carry traffic to and from the Internet (potentially with reduced performance). Multiple connections may also be partitioned by function. For example, a news feed may be supported on a dedicated connection so that fluctuations in news traffic do not affect performance of other services. Multiple routers may be required or desired in the ISP network to accrue the reliability benefits of multiple Internet connections.

Multiple front-end processors may provide access to each ISP service, for example mail, news, and Web services. Alternative ways to configure the systems deployed as in the exemplary architecture of FIG. 81 may include one or more of, but are not limited to:

One service may be allocated to each front-end processor, which may not significantly improve availability over the exemplary architecture illustrated in FIG. 80. The failure of one front-end processor may cause the service that it hosts to be unavailable.

Every service may be provided on each front-end processor, which may tend to make performance and security more difficult to manage. In this case, however, round-robin DNS may be used to provide static load balancing between front-end processors.

Note that a potential drawback of the exemplary architecture of FIG. 81 is that only one mail and news gateway system is configured. In the event of a failure, incoming mail and news would not be handled; however, clients may still access existing data in all services.

In one embodiment, content storage may be made more reliable by employing clusters hosting high-availability data services. In the exemplary architecture of FIG. 81, for example, two servers may be clustered using high-availability NFS software to provide high-availability network file services. Each server may be configured with two interfaces, one to each disk array. Using RAID level 5 or mirroring, each array may be impervious to single disk failures. In the case of catastrophic disk or controller failures, mirrored content may be quickly accessible to each server. A solution for reliability and availability may be to configure clusters to handle each service.

Figure 82:
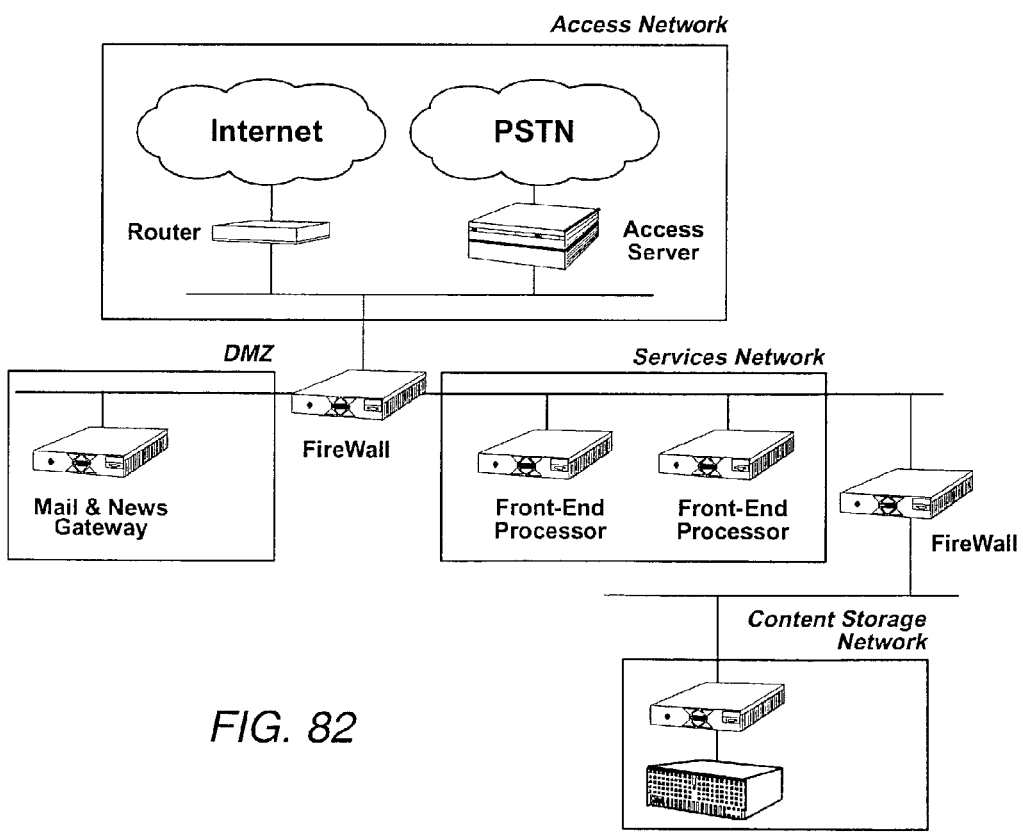
FIG. 82 illustrates an exemplary ISP configuration including an access network, demilitarized zone (DMZ), and services network according to one embodiment.

FIG. 82 illustrates an exemplary ISP configuration including an access network, demilitarized zone (DMZ), and services network according to one embodiment. Architectural support for security may be provided by creating multiple sub-networks that are isolated by firewalls. One of the advantages of partitioning services by task layer is that firewalls can be interposed between layers. In this example, a firewall controls access between the front-end processors and the content storage.

The access network may provide the connection through which services may be used by both Internet and dial-up users. A packet-filtering router may allow Internet traffic to proceed only to the access servers and the DMZ. The DMZ may create a "moat" between the Internet and the services network. The exemplary architecture of FIG. 82 shows a mail and news gateway in the DMZ. All SMTP and NNTP traffic from the Internet may be examined by the firewall and routed only to the gateway server. Once the mail and/or news are deposited on the gateway server, the gateway server may transfer the mail and/or news to the storage server. The DMZ preferably makes direct penetration into the services or content storage network more difficult. A fully configured DMZ may include one or more of, but is not limited to: separate news feed servers, mail gateways, proxy caching servers, DNS, and authentication servers.

The services network may provide access to mail, news, and Web services. The combination of router and firewall may be configured to allow only subscribers connected via the access server to access the mail and news servers. Internet access is typically provided to Web servers. In the exemplary architecture of FIG. 82, the firewall may allow only HTTP service to a specific front-end processor. This limitation of protocols to specific hosts preferably makes intrusion via multiple protocols difficult to achieve.

Because the content storage network preferably satisfies requests from the DMZ and the services network, a separate firewall may be configured so that performance is not limited. This firewall, which may be interposed between the access and the storage aspects of each service, preferably limits traffic to NFS requests from the authorized front-end processors.

ISP Security

ISP security may be an important concern for Internet Service Providers. Potential intrusions may be launched, for example, from customer connections, from the Internet, and sometimes even from internal sources. An ISP's internal network, which may include billing, network management, security logging, and customer service functions, is preferably locked down as tightly as any major corporation's networks. Components that an ISP may need to protect the most may include the data that controls customer access and bills for services. In contrast, the front-end of the ISP network, which provides network access and services to customers, is preferably relatively open. ISPs may allow unrestricted traffic between dial-up customers and the Internet, which gives the customers freedom to utilize whatever protocols they wish in accessing services over the network. ISPs also preferably allow access to customer Web pages by both dial-up users and those accessing services from the Internet. In one embodiment, these security concerns (open at the front, closed at the back) may be preferably addressed in the ISP architecture through a set of carefully constructed and access-controlled sub-networks.

Figure 83:
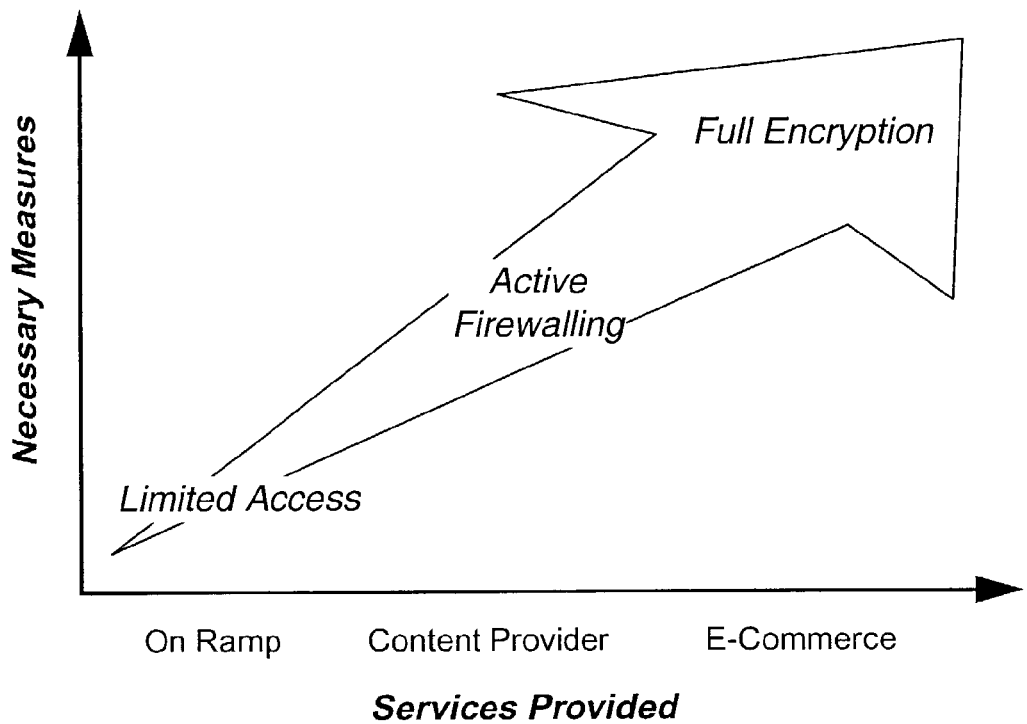
FIG. 83 is a graph illustrating changing security needs over time.

Complicating the open/closed nature of ISP networks is that the security requirements of ISPs may change over time. FIG. 83 is a graph illustrating changing security needs over time. Initially, ISPs acted as simple "on ramps," offering little or no value-added services to customers. Many ISPs now provide content in some capacity, and may offer various levels of service from hosting customer Web pages to providing multimedia interactive games and entertainment-based sites. Some ISPs may serve as clearinghouses for electronic commerce transactions. This evolution in ISPs may require increasing security measures, as illustrated in FIG. 83:

On-ramp ISPs preferably ensure the security of user authentication and billing information, and may do so with relatively simple security measures.

Content provider ISPs preferably establish multiple sub-networks having carefully controlled access from one security layer to the next. These ISPs may make extensive use of firewall technology to implement their security policies.

ISPs that support electronic commerce preferably provide a higher level of security for financial transactions. For example, these ISPs may make extensive use of encryption from Secure Socket Layer (SSL) connections between the ISP and the user. As another example, these ISPs may use Virtual Private Networks (VPNs) that establish encrypted IP tunnels between layers in the ISP network.

In one embodiment, an ISP preferably establishes a written security policy. Implementation of the policy preferably evolves along a path that begins with network design principles and techniques to deny unauthorized access, to active firewalling, and finally to the deployment of encryption technology for internal and external VPNs and electronic commerce transactions. It may be preferable to secure both the networks and the individual servers within the ISP installations.

In one embodiment, a first task in determining what security measures are necessary in an ISP network may be the development of a security policy, a statement of what the ISP is attempting to accomplish. Preferably, this statement may declare a general policy, and may provide precise information regarding the points between which network traffic is allowed to flow. Without a security policy, it may be difficult or impossible to determine which security measures to deploy. In addition, it may be difficult or impossible to assess whether the various components of the security measures (routers and firewalls, for example) are properly configured without such a policy statement.

Two possible security policies are to allow access to all services unless expressly denied, or alternatively to deny access to all services unless expressly permitted. The first policy, allowing all services unless expressly denied, may allow the widest range of services with the least amount of intervention and security mechanisms. This policy, for example, may be appropriate for ISPs that provide connectivity to the Internet with no value-added services. A problem with this policy is that, as new protocols and services become available, ISPs may become vulnerable until explicit action is taken to prevent them from being exploited. For this reason, many ISPs, especially those providing more than just Internet connectivity, preferably choose to implement a security policy that involves denying all services unless they are specifically allowed. As new services and protocols become available, the ISP may need to assess whether to allow them and what measures may need to be taken to prevent unauthorized use and/or intrusions.

A security policy preferably takes into account cost and convenience tradeoffs. For example, an ISP may need to consider whether customers are to be protected from intrusion originating from the Internet, or whether this is to be a value-added service provided at extra cost, particularly to corporate customers who may require or desire this level of security. Similarly, ISPs may preferably consider the cost/benefit of electronic mail security. Password-protection of customer mailboxes is obviously worth the cost; however, for example, is the cost of providing completely encrypted SMTP, POP, and/or MAP mail connections and mail storage worth the benefit to the potentially few customers who need this level of security?

Once a security policy is written, network designers may begin implementing the security policy. In one embodiment, security measures may be established at levels including, but not limited to:

Establish access control to each network element. This may be accomplished by controlling traffic to each of the ISP's sub-networks with packet-filtering routers and firewalls. This preferably ensures that, for example, only HTTP requests reach a Web server, limiting the reliance on the security of each individual host.

Secure each network element itself. This may involve simple measures such as removing support for unapproved protocols, for example removing telnet from a Web server. A more sophisticated approach may involve restricting traffic to a small set of authenticated and encrypted connections between servers. This kind of "lock-down" may require state-of-the-art encryption technology.

Where to begin to implement a security policy is preferably considered. A preferred sequence for implementation is for an ISP to first ensure the security of the internal network, then the services network, and finally the subscribers.

As part of an ISP's security policy, it may be preferable to incorporate plans for ongoing, targeted audits of network security. This is an area where third-party perspectives may be valuable, and specialized security consultants may be helpful. Public domain packages such as SATAN can be utilized by ISPs for their own security audits, as well.

The concept of separate firewall-protected sub-networks as an architecture for security was introduced earlier in this document. This concept may be referred to as a perimeter defense. Perimeter defense effectively creates a series of concentric layers of security, preferably making the services network most accessible and the internal network the least vulnerable to intrusion. These practices are typically used in ISP installations, however they are not the only set of security measures available.

In considering a security policy and the range of security measures that an ISP could deploy, several types of attacks to guard against may need to be considered. Denial-of-service attacks may be aimed at making parts of the network unavailable by flooding it with superfluous requests, for example, the ICMP requests that result from pinging hosts on the network. Denial-of-service attacks may also include, but are not limited to, gaining root access to a server and making its services unavailable. Confidentiality attacks may compromise the privacy of user or ISP data by gaining unauthorized access to servers on the network. At the user level, these attacks may result, for example, in an intruder gaining valuable information from a subscriber's mail messages. At the core of the ISP internal network, confidentiality attacks may, for example, result in an intruder gaining access to subscribers' credit card numbers. Integrity attacks occur when an intruder gains access to unauthorized data and then modifies the data. For example, a subscriber's Web page might be compromised and modified. More serious integrity attacks may invalidate credit card information or eliminate billing data, resulting in a loss of revenue, for example. Attacks on authenticity occur when an intruder replaces a standard part of the system with one that compromises security in some way. For example, a Trojan Horse login program might accept user passwords and pass them through a covert channel to an intruder who could use them to gain unauthorized access to the ISP network.

There are mechanisms that an ISP may use to preferably reduce the success rate of these attacks. These mechanisms range from straightforward network design principles to the application of encryption technology. Mechanisms to increase security of ISP networks may include one or more of, but are not limited to: router Access Control Lists (ACLs), switched Ethernet, and separate administration networks. Router ACLs, switched Ethernet, and separate administration networks may be relatively simple and effective mechanisms to increase security of ISP networks and are based on the principle of isolating network traffic so that it can pass, and thus can be snooped, only between a limited number of hosts.

Even without active firewalls, routers are preferably configured with access control lists that allow only necessary protocols to be routed to particular hosts. For example, packet-filtering routers may be used to limit only HTTP traffic to a specific Web server, and to deny all other access from the Internet. This is an important level of protection that can be accomplished by ISPs; however, as access control lists become more complex, router performance may be significantly impacted. Therefore, it may be preferable to use combinations of routers and firewalls to control network traffic.

Ethernet switches may be used to limit traffic on each ISP network segment to only the packets that are directed to, or have originated from, the host on that segment. As an example, consider a switched Ethernet in a services network that contains a Web server, a mail front-end server, and a news server. For a network configured with shared Ethernet hubs, an intruder who gains access to the news server may put the host's network interface into promiscuous mode and snoop mail and Web server traffic, compromising the privacy of user mail messages, and ultimately obtaining passwords, which may result in penetration of the mail and Web servers. Using switched Ethernet, mail and Web server traffic is not visible on the network segment containing the news server, and therefore snooping cannot yield the same information to the intruder. In addition to its security benefits, switched Ethernet preferably increases network throughput by partitioning traffic between network segments.

When administration traffic is allowed to co-exist on the same physical network as user traffic, intrusions may be accomplished by snooping administration traffic, including passwords, and then masquerading as an administrator using the compromised information. When root logins and administrative access are allowed only over a separate network, the ability to obtain and use administrative privileges is preferably significantly curtailed. Making ISP administration commands out-of-band to normal users preferably limits the pathways by which security may potentially be compromised. Methods to do this may include, but are not limited to: console networks and separate Ethernet networks.

Figure 84:
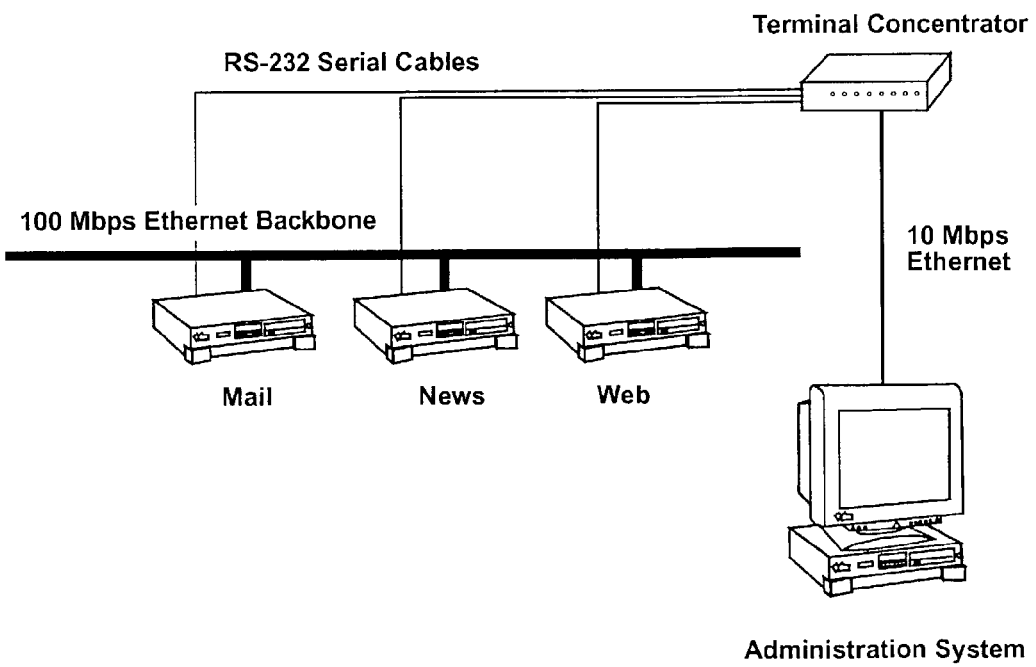
FIG. 84 illustrates an exemplary console network including a terminal concentrator according to one embodiment.

FIG. 84 illustrates an exemplary console network including a terminal concentrator according to one embodiment. An effective but low technology approach is to utilize the serial port of each server in the ISP network. Each serial port may be wired to a terminal concentrator that is configured onto the ISP's internal network. From any host in the internal network, a telnet session may be established to the appropriate port on the terminal concentrator to obtain access to one of the server's serial ports. This approach may be used, for example, in installations where it is preferable to provide access to the consoles of a large number of servers. Using this technique in an ISP network involves allowing root access, and hence administrative access, only to logins on the serial port, thus limiting a set of intrusion paths from the Internet.

A drawback of the serial port approach is that TCP/IP-based administration protocols may not be easily utilized over the serial port network. For this reason, ISPs with separate administration networks may use a 100 Mbps Ethernet segment for ISP network traffic, and a separate, low-cost 10 Mbps Ethernet segment for administration traffic. This approach may require more careful implementation than the serial port approach; for example, some services may be restricted to respond only to requests from the administration network. This approach may be more flexible than the serial port approach. When implementing a separate Ethernet segment, it is preferable to limit the extent of the network so that it cannot, for example, be used by an intruder to gain access to all of the ISP sub-networks at once.

Access control lists, switched Ethernet, and separate administration networks are examples of ways to control network access to each host on the ISP network. Methods to control the functions that each host on the network will provide may include one or more of, but are not limited to:

Access Control. Each server preferably only allows connections appropriate for the service that it is to provide. For example, telnet and FTP access are preferably turned off on a Web server so that any weaknesses in these protocols cannot be exploited to gain access to the server.

Removing Non-Essential Applications. Further control may be achieved by removing the software used to implement non-essential services.

Non-Standard Ports. Services used within the ISP network preferable use non-standard port numbers. In this approach, standard port numbers are preferably used for services, for example Web and mail, provided to subscribers and Internet clients. Non-standard port numbers may be used where traffic using standard protocols may be generated within the ISP network. For example, where SMTP is used to transfer mail from a mail gateway server to a mail storage server, using a non-standard port number may make it more difficult for intruders to gain access to lower layers of the ISP network from a higher-level machine that has been compromised.

A firewall may help with the process of controlling access to servers. Individual services may be configured or denied, and stateful packet filtering can further limit access to the server by adding an additional level at which packets are inspected before being accepted by the host.

Firewalls may be most effectively deployed once the first two measures, network design and limiting access, are implemented. Active firewalls typically include a combination of packet-filtering routers and firewall systems.

Packet filtering routers are the first line of defense for an ISP, as they allow packets to be routed based on their source and destination IP addresses and TCP or UDP port numbers. This is a mechanism by which, for example, an ISP may preferably ensure that only HTTP requests are made of a Web server. Packet filtering routers are preferred, but not sufficient, measures for establishing a secure ISP network. A shortcoming is that routers are stateless, which means that they do not inspect the contents of each packet in a protocol stream to ensure that they are valid and consistent over time. Another shortcoming is that routers generally do not provide a logging facility that can aid in the detection and tracking of intrusion attempts. Finally, complex rule sets may dramatically decrease the performance of routers and may severely limit the available bandwidth over costly leased-line connections. A preferred way to use packet-filtering routers is to use the simplest access control lists possible, and leave the more complex filtering activities to the firewall.

Firewalls may be used to establish secure gateways in and out of the ISP network, and to control access from one level of the ISP installation to the next; for example, from the DMZ to the services domain. With routers taking the first line of defense by dropping packets that have invalid source addresses or whose destinations are not allowed by the ISP, firewalls may handle a more fine-grained filtering of traffic. Since firewalls inspect application-specific data inside packets, firewalls may be viewed as a form of access control list for the application domain. Services provided by firewalls may include one or more of, but are not limited to:

Stateful Inspection. Firewalls typically inspect the contents of packets and validate the connection type, address, protocol, and port numbers. Firewalls may perform stateful inspection of packets, which means that they can ensure that each packet is valid within the context of the protocol stream in which it is contained. Consider, for example, filtering of FTP requests. When an outgoing FTP request is made, a firewall notes that it is expecting a response from the remote FTP server. When the response is received, the firewall inspects it and then passes it on to the client. Incoming FTP packets that are not responses to outgoing requests are dropped, eliminating the possibility of FTP spoofing. Since firewalls typically contain knowledge of application protocols, they may also filter UDP requests based on the packet contents. For example, requests to the port mapper may be filtered by protocol, adding an additional layer of assurance that disabled applications cannot be accessed from improper sources. This stateful handling of protocols may not be possible with packet filtering routers alone.

Logging and Detection. It may be preferable to detect and log intrusion attempts, and to sound alarms as intrusion attempts occur. This preferably allows the source of intrusion attempts to be localized, for the intruder's methods to be monitored, and for the firewall to be hardened against future attempts using similar techniques. An exemplary architecture for ISPs to use is for the firewall logs to be stored on a server in a protected internal network. It may be preferable for firewalls to have a dedicated administration server to which log data is transferred over a secure channel.

Address Translation. ISPs may use firewalls to translate private, internal addresses to public, external addresses at the firewall. Private addressing may help to obscure the ISP's network configuration to any would-be intruders, and may be used to ease the shortage of IP addresses by mapping a large number of private addresses to a smaller set of external addresses, and also may be used in server load balancing strategies.

Encryption. Encrypted communication with remote firewalls may be preferable to support the creation of virtual private networks. Encrypted communication with remote clients may be preferable as well.

The market offers a variety of firewall security options, each of which may be considered for use in implementing ISP security policies. Sun's SunScreen family of products and CheckPoint FireWall-1 are examples of firewall security options that may be considered, among others.

Once a secure set of sub-networks is established, Internet Service Providers may then utilize encryption technology to move network security from perimeter-based defense to security that is distributed throughout the ISP network. The level of security afforded by encryption technology may be important considerations for both the ISP and its corporate and individual subscribers.

Figure 85:
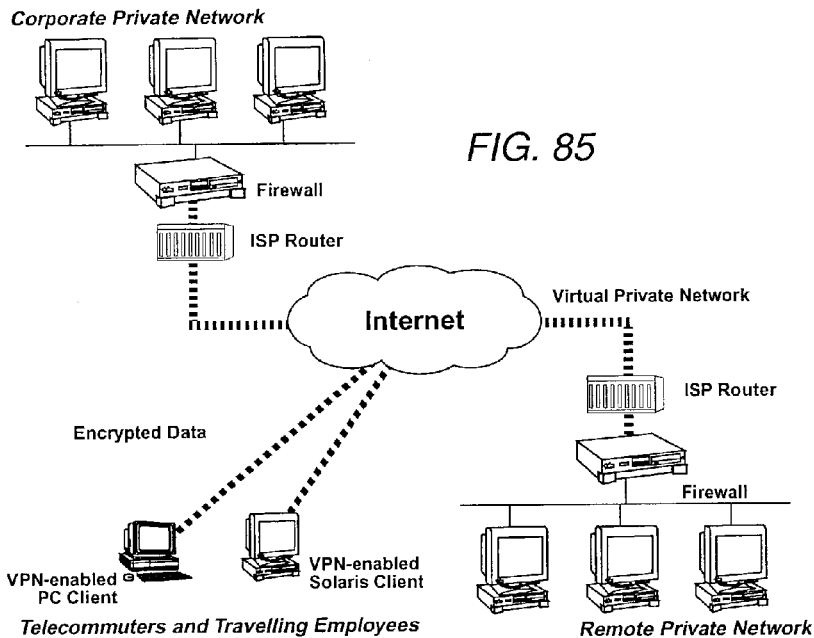
FIG. 85 illustrates an exemplary corporate Virtual Private Network (VPN) according to one embodiment.

FIG. 85 illustrates an exemplary corporate Virtual Private Network (VPN) according to one embodiment. ISPs may deploy secure VPNs as value-added services for corporate subscribers. As shown in the exemplary network of FIG. 85, an ISP may use a firewall to encrypt all traffic between a local company office and a remote office connected via the Internet. This may be referred to as an encrypted IP tunnel. Traffic within each company office may be un-encrypted, but once a packet addressed to a remote office passes through the firewall, the packet is encrypted and may preferably cross through the Internet in complete privacy. The corporate customer can enjoy the same security benefits as an expensive leased-line connection between remote offices at a fraction of the cost by using a VPN over the Internet.

VPN software may be available for client systems, which means that individual users may join their company's VPN and enjoy the same level of privacy that remote offices have. These clients may access the Internet through the same ISP providing the virtual private network, or alternatively via dial-up connections through other ISPs. A result is that companies preferably have increased flexibility in supporting the computing resources of telecommuters and traveling employees.

Figure 86:
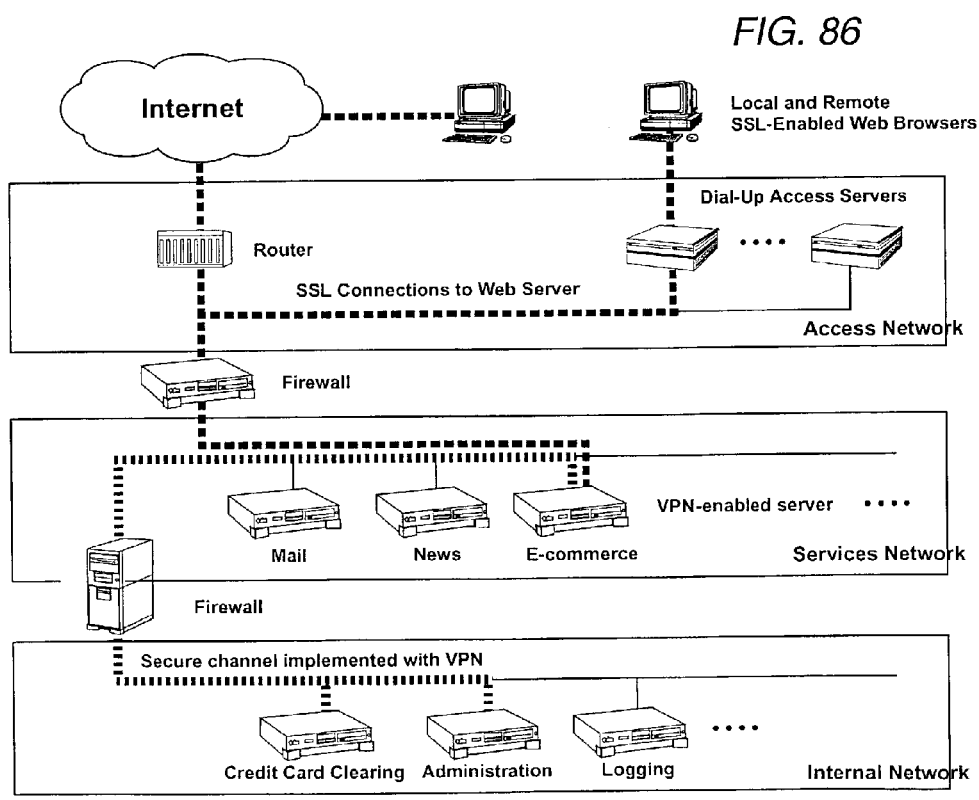
FIG. 86 illustrates an exemplary architecture using encrypted channels for increased security within an ISP network according to one embodiment.

FIG. 86 illustrates an exemplary architecture using encrypted channels for increased security within an ISP network according to one embodiment. Virtual private networks may be used to preferably ensure authenticated, secure traffic between sub-networks and between hosts in the ISP network itself. Benefits of secure communication between a Web server and systems on the ISP's internal network, as illustrated in FIG. 86, may include one or more of, but are not limited to:

Administration of the Web server may be accomplished over a Virtual Private Network, limiting the ability of an intruder to hijack the encrypted administration channel. In one embodiment, VPNs may be used to administer firewalls so that only authenticated, secure channels can be used to modify firewall parameters.

Billing information such as credit card data may be passed into the secure internal network with little risk of an intruder using the channel to gain access to enterprise-critical data stored at this level. Corporations may use VPNs in their internal networks to ensure secure transmission of sensitive data between departments; for example, corporate financial data or payroll records. A benefit for corporate intranets as well as for ISPs is that even internal users preferably are restricted from viewing data that is meant to be private.

Virtual private networks may be used to implement a security policy in which all access is denied unless specifically allowed. By "hard-wiring" the allowed connections between servers, a successful intrusion into one server may be stopped short of affecting other servers in the same or more secure sub-networks, preferably effecting a highly-secure "lock-down" of the ISP's servers. This may be used, for example, to secure all servers at a particular layer, for example the DMZ or the services network. This may also be used between layers to provide secure communication between the central ISP location and a remote point-of-presence.

An ISP network that is properly wired for secure virtual private networks may support electronic commerce transactions. Because any loss in security in an electronic commerce environment may have direct and immediate financial implications, it may be preferable to make the deepest data more secure than in any other application. Encryption between network elements, for example between a Web server taking credit card numbers and a credit card clearing server, is preferred.

Secure Socket Layer (SSL) connections may be used for secure communication between Web browsers and Web servers. There are a variety of electronic commerce servers available from different vendors which may provide services including one or more of, but not limited to: catalog management, search engines, automatic generation of product pages from catalog databases, sales analysis, and automated shipping and sales tax calculation. In regards to security, commerce servers typically provide one or more of, but not limited to: secure ordering and payment methods, secure payment processing methods, and additional restrictions on access to the commerce server itself.

Strategies for passing encrypted information between Web browsers and Web servers may include, but are not limited to: Secure Socket Layer (SSL) and Secure-HTTP. Browsers typically include integrated support for SSL, the secure socket layer. Because of this support, SSL may be used to communicate private information such as credit card numbers and purchase orders between Web browsers and Web servers. SSL connections are illustrated in FIG. 86. As with SKIP, SSL verifies that a client is communicating with the intended server, and encrypts the data to prevent its use by an unauthorized party. Secure-HTTP is an application-layer encryption mechanism that provides encryption one layer above the TCP/IP layer. Although Secure-HTTP offers similar encryption mechanisms to SSL, it may not be as flexible because it is specifically built only for use with HTTP.

There are other protocols for passing payment information between browsers and banks. MasterCard and Visa's SET protocol is one example. Having support from both Netscape and Microsoft, an advantage of SET is that only the card holder and the bank are able to see the actual credit card numbers. The merchant never sees the plain-text credit card numbers, providing a high degree of security for these transactions.

High-Availability Solutions for ISPs

Today's Internet users may have high expectations about the availability of the services they purchase. Providing highly available services may be preferable to ISPs, but it may be especially essential, for example, to telephone company ISPs, where customers expect Internet services to be as reliable as their dial tones. Providing high-availability Internet services may involve one or more of, but is not limited to: coordinating interactions between DNS, load balancing mechanisms, and horizontally scaled server configurations. A three-tier approach using gateway servers, front-end processors, and content servers is a flexible approach for ISPs because scaling of different functions, such as HTTP and dynamic content support, front-end services, and storage, may be handled independently. In one embodiment, high-availability services for ISPs may be delivered with clusters, which preferably tightly integrate load balancing mechanisms with HA services.

The notion of high availability is not to be confused with fault tolerance. Fault tolerant computers are specifically designed to provide uninterrupted service even after catastrophic system or environmental failures that would completely shut down other configurations. Fault tolerant systems typically employ specialized hardware with processors running in lock-step execution. Applications requiring fault tolerance, such as telephone switching and air traffic control, cannot sustain any interruption in service. High availability (HA) is used when the uninterruptibility of fault tolerance systems is not needed, but a much higher degree of service is required than is typically expected, for example, from a single system. The processors in HA systems may run asynchronously, may be loosely coupled, and preferably execute separate copies of the operating system. HA environments preferably provide full hardware and software redundancy, and recovery from failures preferably takes only seconds or minutes. While fault tolerant systems may provide a very high level of hardware availability, they typically provide no coverage for application software failures. Because the servers in HA configurations may run asynchronously, and preferably execute their own copies of the operating system, a software problem in one host, such as an application failure, is unlikely to affect the other host in exactly the same way. Since the system failures are typically due to software faults, servers which can quickly detect and recover from hardware and software failures may be preferable, at least in some environments, to fault tolerant systems.

Figure 87:
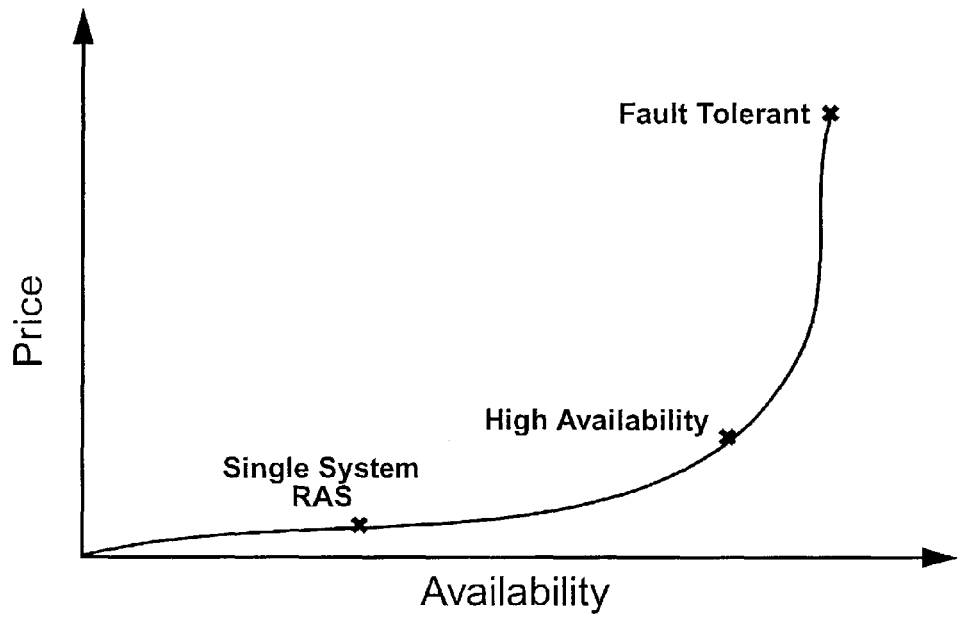
FIG. 87 is a graph illustrating the price-performance tradeoff of single system RAS, high-availability, and fault tolerant configurations for Internet Service Providers.

FIG. 87 is a graph illustrating the price-performance tradeoff of single system RAS, high-availability, and fault tolerant configurations for Internet Service Providers. A high-availability system may be preferably built with low-cost, scalable, off-the-shelf servers. Clusters, which may allow fast recovery from failure, may provide nearly the same levels of total availability as fault tolerant systems, but at a much lower cost, and without compromising the flexibility and scalability that may be preferable in Internet Service Providers.

Among the options for providing high-availability services, load balancing and HA may be tightly coupled. Horizontal scaling is the preferred way to grow any one service, because the failure of one server does not necessarily mean the loss of the entire service. An ISP architecture that has services split across a set of servers best poised may lend itself to growth. ISPs with horizontally scaled services preferably have mechanisms for balancing the workload between servers, and load balancing systems are one way to provide services with greater availability.

Figure 88:
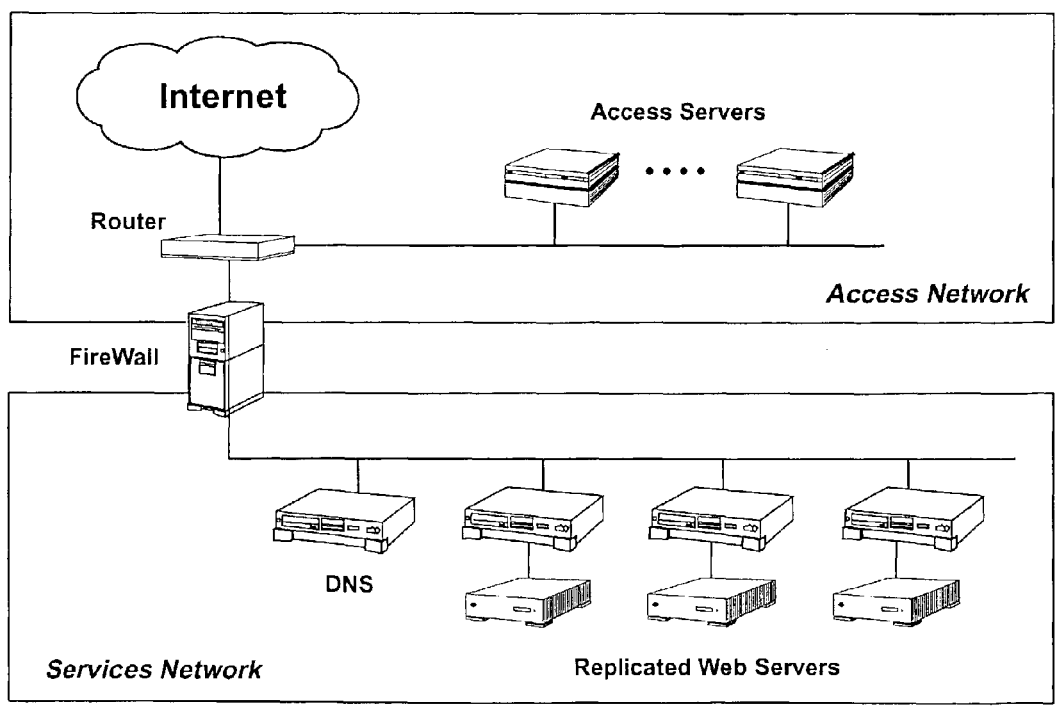
FIG. 88 illustrates an exemplary network diagram illustrating a configuration for a high-availability Web service according to one embodiment.

In one embodiment, ISPs may combine horizontal scaling and addressing schemes to provide both high performance and high availability. For example, an ISP may desire to provide both high performance and high-availability Web service. FIG. 88 is a network diagram of an exemplary configuration for a high-availability Web service according to one embodiment. This network diagram illustrates an access network and a services network. The access network includes a router with an Internet connection and a set of access servers. The services network includes a DNS server and three Web servers, which each may include exact replicas of the static Web page data that they serve. When more than one server is deployed to handle a single service, the set of servers may be referred to as a service group. Traffic between the access network and the services network may be controlled with a firewall system. Note that high-availability services may also include one or more of, but not limited to: redundant Internet connections, routers, firewalls, DNS servers, and backbone network.

For performance, an ISP preferably balances incoming Web server requests across the service group. Techniques to balance workloads may also be used to improve the availability of the service because a failed server is functionally the same as one that is overloaded; preferably, neither is allocated any more client requests. There are several approaches to load balancing across a service group including, but not limited to: round-robin DNS, load balancing DNS, and routing techniques that dynamically balance workloads using network address translation.

Some products (e.g., Standard Solaris DNS, Berkeley BIND, etc.) may be configurable to resolve a single name used for the service group (e.g., www.isp.net) to one of the three Web server addresses. This is known as Round-Robin DNS, and involves configuring IP addresses for the same domain name. DNS rotates through the three addresses each time a name resolution is performed, and the result is that each Web server is allocated every third client. The address records provided by DNS may have their time-to-live (TTL) set to zero, so DNS clients preferably do not cache the address records. This is static load balancing, which is preferably independent of the actual workload on the Web servers, and preferably independent of whether the servers are even available.

The Round-Robin DNS technique for high availability may have limited usefulness because it may depend on an administrator manually modifying the DNS tables in the event of a server failure. During the time that the server is down and the DNS configuration is unchanged, one third of the clients will receive an address for the failed server, and will find the Web service unavailable. This window may be narrowed, for example, by modifying BIND to periodically check on server availability and to automatically modify its address resolution tables to account for failed servers. However, some Web browsers may cache resolved addresses independently of the TTL in the DNS address records. Users experiencing a failure on their HTTP connection will not receive a new, valid, IP address unless they completely quit and restart their Web browser.

The public domain lbnamed (Load balancing Name Daemon) software may be modified and used it in place of BIND. Lbnamed heuristically allocates addresses for the service group depending on each server's workload. The DNS server hosts two programs, lbnamed and a poller. The poller contacts a client daemon running on each server in the service group. Each time that the poller completes polling the client daemons, it creates a new configuration file and sends a signal to lbnamed that notifies it to read the new configuration. If the poller does not receive a response from any client, it removes its entry from the configuration given to lbnamed. The configuration given to lbnamed includes the one-minute load average on each server. Lbnamed uses this information to calculate a weight for each server, and it changes the server's weight each time a request is assigned to it. This mechanism achieves a basic form of dynamic load balancing, and has an advantage that it can quickly and automatically remove a failed server from its configuration list. However, some users may experience a disruption in service when a server fails.

In one embodiment, only a single public address for the service group may be advertised, and network address translation mechanisms may be used to route network traffic. This approach ensures that a given IP address, once obtained by a client, will always point to an operational server, overcoming the limitations of the previous two schemes. Load balancing address translation mechanisms may be implemented using load balancing routers, or alternatively with software approaches bundled with cluster solutions.

Load balancing routers may measure each server's latency in handling requests and use response times to calculate a performance index, which may be used to decide how to route incoming requests. Routers vary in their load balancing mechanisms. Some routers may make their decisions based purely on routed traffic, while others may also factor in data obtained by agents running on the servers themselves. Some products, for example, Cisco's LocalDirector, may be configured to provide simple round-robin load balancing that distributes the load to the next available server regardless of load. These products may allocate requests to the server servicing the least number of connections, and may allocate requests to the server with the lowest response times.

Load balancing routers may be used to create high-availability service groups by not routing requests to servers that are down. Some routers may be configured in HA pairs so that service continues uninterrupted through any single router failure. Other load balancing routers are available from vendors including, but not limited to, F5 Labs, HydraWeb Technologies, and RND Networks. Routers may vary in load balancing capabilities, administration capabilities, network interface speeds, and their ability to handle protocols beyond HTTP.

Service groups may be hosted on cluster configurations that handle load balancing and routing decisions internally. Clusters may provide a general purpose cluster computing environment where existing applications can run unchanged; additionally, packages may be available that provide HA-enabled Web, mail, and news servers. Clusters may appear as a single server to the outside world, while internal load balancing mechanisms route requests to appropriate servers. Clusters may provide a unique solution that combines load balancing and HA services, and may support two or more servers in both symmetric and asymmetric configurations.

Many approaches to providing high-availability services make the assumption that one server can potentially take on its workload plus the entire workload of a failed server. This may result in a dramatic decrease in overall performance in the event of a failure. However, there are techniques to deploy Internet services in high-availability configurations: Asymmetric Configurations and Symmetric Configurations.

Asymmetric configurations use one server as a hot standby that has access to, or includes a copy of, the data that is needed in order to take over the operation of a failed server. Asymmetric configurations preferably provide consistent performance in the event of a server failure, as the workload of the failed server is assumed by a hot standby server with no other users to support. This approach may provide performance at the cost of having an idle server to handle fail-over.

Symmetric configurations use all servers to handle user requests which all continue to share the workload in the event of a server failure. In symmetric configurations, each server may be master of a different set of data, and may support different services. Traditional HA solutions deploy only two servers; however, cluster approaches to HA preferably enable the workload to be allocated across N servers, with N–1 servers available in the event of a single server failure. Typically, the larger the number of servers, the less the impact may result from a single server failure. This preferably provides ISPs with increased leverage of their hardware investment, and preferably enables ISPs to bring servers down for maintenance without dramatic performance loss for their customers.

Internet Service Providers typically use symmetric configurations in their networks, as degraded performance in the event of a server failure may be preferable to the additional cost of a hot standby server.

The Web server example of FIG. 88 may host identical, replicated, Web pages. This configuration is simplified; in actual use, consideration is preferably given to the deployment of server data across high-availability servers. These data management issues are common regardless of whether simple or full-featured high-availability solutions are implemented. When multiple servers are used to provide a single service, their data is preferably replicated, partitioned, or shared.

In environments where the data used by the application does not change much over time, and does not require a large number of disk volumes, replication may make HA simpler to implement. DNS is an example of a service where a small amount of data may be replicated so that one server can take over without having dual-ported access to the underlying data. News servers may use replicated databases by having news feed servers provide incoming articles to each server in a service group simultaneously. If a server goes down, the standard mechanisms provided by INN preferably ensures that all articles are propagated to it when it comes back on-line. If Web server data does not change frequently, replicating content is a reasonable approach.

When the volume of data is large and the changes are frequent, partitioning is a preferred approach. User mailboxes are frequently partitioned by ISPs because it may be too costly to maintain replicated copies of user mailboxes on each server in a mail service group. Instead, user mailboxes are typically allocated to individual servers, each of which may be required to handle storing and retrieving mail for a partition of the ISP's subscriber base. In some mail servers, LDAP databases may be used to manage the allocation of users to mail servers.

Figure 89:
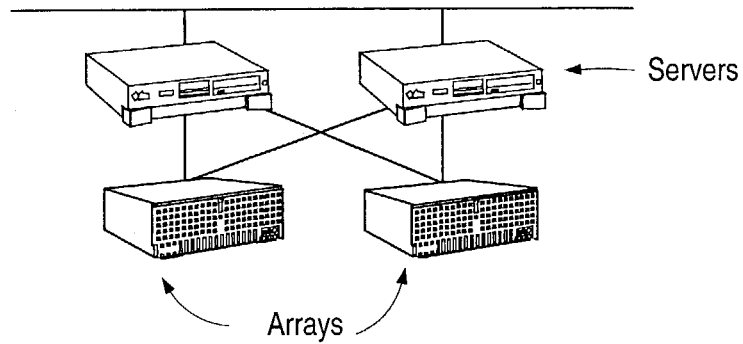
FIG. 89 illustrates an exemplary architecture where partitioned data is deployed using clusters according to one embodiment.

One approach to partitioning the mailboxes is to deploy server clusters. The remaining servers in a cluster take over in the event of a failure. FIG. 89 illustrates an exemplary architecture where partitioned data is deployed using clusters according to one embodiment. Shown is a two-server cluster with dual, mirrored, arrays. For a simple, two-server cluster, one could deploy a pair arrays. Each array may be configured with two sets of disks, with one set on each array for both mail partitions. Each server may be master of its own set of disks, each of which is mirrored on the other array. In the event that one server fails, the other server can immediately take over the mail partition on the failed server's disk array. In the event that an array fails, each server can access all of its data on the remaining array. Managing data consistency between multiple mirrors may be a complex problem, and may handled by mechanisms provided in clusters.

When there is a large amount of data to be provided by the service group, and file-locking mechanisms are implemented to prevent inconsistent data from being used by members of a service group, shared data solutions may be deployed. Web traffic may be dynamic, requiring a back-end set of servers that provide dynamic content to all of front-end processors. Dynamic content may be provided by database management systems. Mail servers may utilize this architecture, enabling a large number of user mailboxes to be stored on back-end servers, reducing the number of partitions required. Another approach is to store user mailboxes as files on a back-end set of NFS servers.

Figure 90:
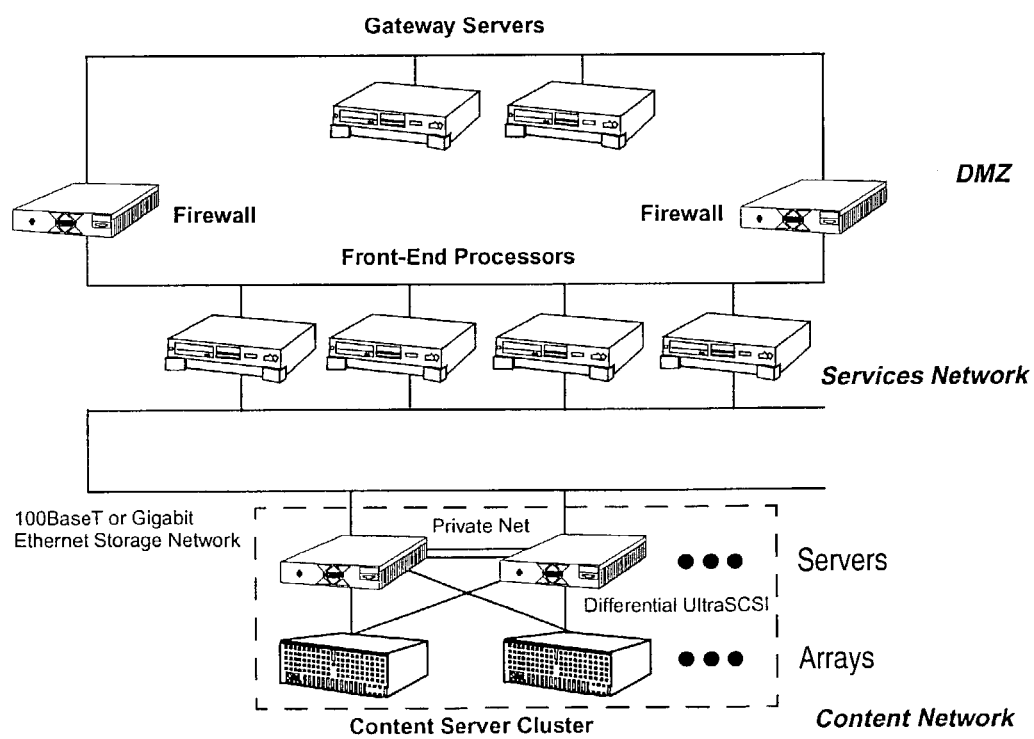
FIG. 90 illustrates an exemplary three-tier solution with content provided using a content server cluster according to one embodiment.

With the majority of Web server traffic provided by dynamic back-end content servers, a three-tier approach may be preferable for ISPs. FIG. 90 illustrates an exemplary three-tier solution with content provided using a content server cluster according to one embodiment. This architecture is based on shared data on a back-end content servers, a set of front-end processors, and gateway servers in the DMZ.

The gateway servers may be configured in the DMZ, and route incoming data between the Internet and the content servers. Mail gateway servers may store incoming mail, for example with Secure Mail Access Protocol (SMAP), and may store the incoming mail briefly on disk before standard sendmail passes mail to the storage servers using SMTP. News gateway servers may store incoming articles and pass them on to the storage servers using NNTP. Web proxy servers, if configured, may work in both directions. Access may be allowed to proxy servers in the DMZ from Internet users and from ISP subscribers on the access network. Proxy servers may access Web sites located within the ISP's services network and those on the Internet. Gateway server approaches preferably serve to isolate vulnerable systems from attack by requiring all requests to go through one level of indirection before a server in the services network handles them.

Although gateway servers may be deployed in pairs, they may not necessarily require a high-availability configuration because the failure of a gateway server may simply delay the arrival of mail or news rather than making a service completely unavailable to subscribers. The workload of incoming mail may be statically balanced or dynamically balanced to the mail gateway servers with load-balancing routers or other techniques previously described.

For incoming news, separate feeds from different sources may be statically partitioned to specific news gateway servers. News servers may utilize separate leased-line connections so that bursts of incoming news do not interfere with the Internet bandwidth needed by other ISP services. A bandwidth manager may also be used to partition bandwidth so that news is allotted only its share of bandwidth.

A set of front-end processors (FEPs) may handle user requests for data. For a mail service, the FEPs provide mail to users with SMTP, POP3, and IMAP4 protocols, accessing user mail files from the back-end NFS or database servers. Similarly, Web and news front-end processors may interact with the ISP subscribers and access dynamically created content from back-end database servers. Benefits of using front-end processors for interacting with users may include, but are not limited to: many inexpensive systems can be deployed, and the service may be expanded by horizontal scaling as the ISP requires. Large ISPs with many racks of front-end processors may consider using the multiple-domain features provided by some platforms in order to reap the benefits of horizontal scaling in an easy-to-maintain reliable, and cost-effective package. In one embodiment, each of domains in a sever may host a separate copy of the operating system, preferably leveraging the advantages of functional decomposition with the convenience of large servers.

Regardless of platform, a range of high-availability solutions may be deployed with front-end processors, ranging from the use of load balancing routers to the use of FEP clusters. Because the FEPs share the same back-end content, the complexity of failing-over partitioned data is preferably reduced.

The front-end processors may be connected to the content network over the ISP's backbone network. The exemplary solution illustrated in FIG. 90 utilizes a separate network in order to dedicate as much bandwidth as possible to the content servers. For security, ISPs may preferably use a pair of firewalls between the two network layers to preferably ensure that only content requests come in to the content network, and that responses are provided only to the authorized front-end processors.

The content server may be a cluster configured with HA database or NFS software. Clustered architectures may be suited for providing high-availability solutions in ISPs. Clusters may provide redundant paths between all systems, between all disk subsystems, and to all external networks (redundant external networks are not shown in FIG. 90). Preferably, single point of failure (hardware, software, or network) can bring a cluster down. In one embodiment, fully integrated fault management software in the cluster preferably detects failures and manages the recovery process without operator intervention, thus preferably allowing failed components to be replaced on-line, without affecting availability. These configurations may provide high levels of service without requiring costly, proprietary technology. The architectural approach taken clusters may include one or more of, but is not limited to:

Redundant Disk Systems. Clusters may utilize multiple redundant, multi-homed disk systems, which may be mirrored to allow uninterrupted operation in the event that one of them fails.

Redundant Servers. Clusters may be deployed with two or more servers. ISPs may deploy clusters in symmetric configurations, which preferably allows all servers to satisfy content requests from a partitioned data set. Note that, even though the content provided by the back-end servers is partitioned, each front-end processor may have access to all content, so partitioning of mail users (for example) to FEPs may be unnecessary. A symmetric configuration may combine the performance of N servers for normal operation, and degrades to the performance of N−1 servers in the event of a failure.

Private Redundant Network. A cluster may utilize redundant private interconnects to monitor the status of each server.

Cluster Software. The capabilities of clusters may be preferably integrated as standard features of an operating environment. Clusters may preferably provide the intelligence by which the hardware, operating environment, and applications are monitored, and may also preferably provide the mechanisms by which failures are detected and resolved. Clusters may preferably provide a global operating environment in which any ISP service may be executed.

The three-tier solution may be highly scalable. ISPs may use multiple content server clusters in their content network, further increasing their storage capacity. This approach may be convenient for ISPs because they do not have to enter into the complications of creating static partitions of user data such as mailboxes, requiring different sets of users to attach to different mail servers to retrieve their mail.

The three-tier approach may be flexibly scalable because different layers and separate functions may be scaled independently, preferably affording ISPs an increased amount of freedom in their configurations. The services network may be horizontally scaled, for example, by adding more front-end processors. When content servers become saturated, new clusters may be added to absorb the workload. Using the three-tier approach to deploy separate Web and content servers preferably allows a high degree of functional scalability; HTTP and content servers may be scaled independently, preferably giving ISPs hosting large amounts of dynamic content a high degree of flexibility.

Value-Added Web Hosting

Beyond the basic ISP core services (e.g. mail, news, Web, Internet access, etc.) ISPs may provide other value-added services to enable competitive distinction and supply additional revenue. An exemplary additional service is Web page/site hosting. Web hosting is a specific case of general application hosting, and it may require ISPs to consider whether to provide dedicated or shared hosting. Management facilities, ranging from site management to automatic provisioning, may be provided to ensure effective administration of services. Finally, security against attack on the application services and the user data itself is preferably established.

Web hosting services may be categorized into three types: non-commercial, or 'vanity' pages, light commercial, and commercial. Each of these three categories may have at least some different requirements for service and management. Issues to be considered in Web hosting may include one or more of, but are not limited to: performance, availability, and security surrounding proprietary data and electronic transactions.

A factor that may influence the design of Web hosting services is whether the sites deliver static or dynamically-generated content. The most straightforward Web hosting service to offer is static content hosting. Static content does not change, or is only changed manually by the Web site creator. This content may include, but is not limited to, HTML files, text files, pdf files, graphical images, and other media.

Customers may be allocated disk space according to their service level, and given FTP or direct access to their own document root directory.

Dynamically-generated Web pages, in contrast, typically use some programmatic method to create content. These pages may include one or more of, but are not limited to: dynamic content such as stock quotes and customer-specific information such as order status. An example of a dynamically-generated page is an application where the viewer can query the Web site and cause the material to be assembled using some template mechanism. Dynamic pages may be generated using a wide range of facilities including, but not limited to: basic Common Gateway Interface (CGI) and Web server APIs. One approach is to use an application or process, separate from the Web server, to process a request and perform some function. This is a fundamental difference from static pages, for which the Web server simply delivers the file content.

Static content typically presents little infrastructure demand on an ISP. Static content is generally easily hosted in a shared environment. In addition, there may be relatively few security concerns. Dynamic content, on the other hand, may have special security considerations, both on the part of the ISP and its customers. Since various programming methods may be used to provide dynamic content, there is the possibility that these programming methods may cause problems within the site. The source of these problems may include one or more of, but are not limited to: programming errors generated by the customers and attacks mounted on the site by hackers.

For these reasons it may be preferable for commercial Web sites to use dedicated resources such as servers and disk systems for hosting each customer's dynamic content. In addition, dedicated resources may preferably provide specific hardware methods for preferably ensuring quality-of-service levels for each customer. Dedicated resources may also preferably ensure that each customer's programs and data do not interfere with, or physically intermingle with, those of other customers.

In addition, different Web server software may be used for different application functionality. For example, some sites may intermix the use of commercial servers such Netscape's for hosting and electronic commerce functions with the use of high-performance servers such as Zeus or Apache for GIF delivery. Servers such as Apache may be suitable for light commercial use where static pages such as catalogs are hosted.

Static Content using CGI is an architecture for dynamic content generation that includes Web pages created by CGI processes that access static file content. While this architecture does provide dynamic content, it may not maximize performance, generality, and maintainability. There are several alternatives which provide additional functionality and performance, but which also increase the application architecture complexity.

Another architecture for dynamic content generation is for an interface from the page generation mechanism to be utilized to access a generic database system. This can be done, for example, via standard SQL interfaces or a JDBC interface. An advantage of this model may be that the database content is readily linkable (e.g. with other applications) and easily maintainable. This may allow for an increase in the sophistication of the underlying data resources, but may not result in significant increase in application functionality.

Application servers, for example those from Net Dynamics and Netscape, may provide improvements in application functionality. There are drawbacks to using a proprietary programming model; however, these drawbacks may be outweighed by the potential improvements in programmer productivity resulting from using these servers in Web applications. In addition, the use of application servers preferably provides improved performance and scalability.

In complex Web applications, the Web server may interact with several back-end resources, and may involve complex, high-value transactions. In large-scale Web applications, transaction servers such as BEA's Tuxedo and M3 may improve the performance of complex transactions and may accommodate multi-phase commit. The additional transaction-processing monitor may preferably improve performance and reliability.

While each of the above application architectures may be deployed on a single, monolithic server, there may be advantages to multi-tier models. Each layer of the architecture (Web server, application server, transaction server, and database server) may provide specific server resources that may be tuned and scaled. While the resulting multi-tier application architectures may seem quite complex, a multi-tier environment may offer improved scalability, system performance, and availability. Each tier may use the scalability approach best suited to the function. For example, Web servers may be made horizontally redundant using multiple servers, while database servers may be made highly available using clusters. In addition, the multi-tier model may support geographic distribution and multiple-site operations.

The mechanism used to provide dynamic content may affect system performance. CGI is a basic dynamic content mechanism, and may offer rapid and easy-to-code functionality. However, the use of, for example, C, Perl, and shell programming, may create the performance impact. The CGI mechanism may spawn additional processes that may be constrained by basic operating system resources. A Web server engine that waits on CGI functionality may deliver only a fraction of the Web server performance (in hits per second) of a similar, static Web page server.

One alternative for improved performance is the use of a Web server that allows compiling of the application code into the Web server base. For example, Apache allows the compiling of application code (e.g., C, modPerl) into the Web server itself. This may result in an increase in performance. On the other hand, while Apache offers improved performance, it is a public domain server and does not have the commercial support that ISPs may desire.

A preferred combination of performance and commercial support may be provided using proprietary Web server APIs such as the Netscape API NSAPI. Use of proprietary APIs may result in code for dynamic content or other application functionality that may deliver higher performance than CGI, and nearly the performance of static Web page serving. Another way to flexibly manage services is through the public domain Servlet API, which may be supported by Web servers.

The decision on whether to offer static or dynamic content may be accompanied by a decision regarding how to allocate hardware resources to each hosting customer. Application hosting may include both dedicated and shared-hardware resource hosting models.

Vanity hosting is generally provided via a shared, static content model. A user authoring tool may be supported and pages may be uploaded using simple FTP or even e-mail. Light commercial hosting may include either static or dynamically-generated content. This level of service is typically provided in a shared environment, although some ISPs may offer dedicated light hosting on small server platforms. Heavy commercial hosting generally includes dynamic page generation and uses a dedicated platform that preferably provides both isolation of load impact and higher quality of service.

In both the shared and dedicated models, the platform operator may determine system hardware and software configurations. Customers may select components, but typically cannot interpose their own configurations or products. It is preferable that the operator be familiar with all components of the platform. For this reason, predefined, standard configurations are preferably prepared and tested.

Figure 91:
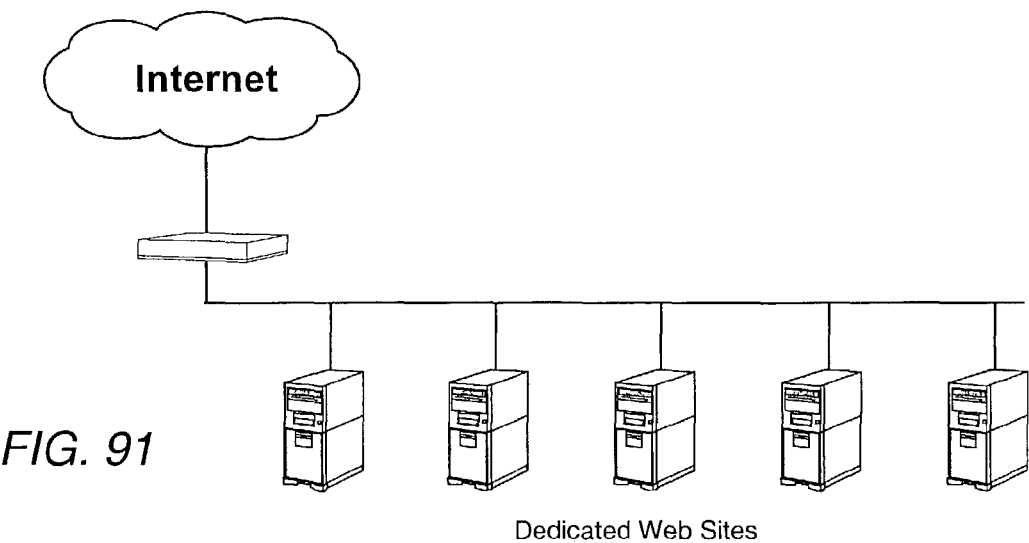
FIG. 91 illustrates an exemplary network architecture illustrating dedicated hosting according to one embodiment.

FIG. 91 illustrates an exemplary network architecture illustrating dedicated hosting according to one embodiment. Dedicated hosting preferably provides specific, independent hardware resources for each Web site that is hosted. Dedicated hosting preferably provides dedicated hardware for each customer application. Dedicated hosting preferably provides a mechanism for physically outsourcing Web sites and for offering independent quality-of-service levels to each customer. Any service interruptions, whether due to system failure, maintenance, Web site data or programming, preferably affect only the individual customer. Management of these dedicated Web sites tends to be straightforward, but the administration of a very large number of systems may result in some inefficiency, for example, the time it takes for upgrading the OS on multiple systems. Advantages of dedicated hosting may include one or more of, but are not limited to:

Ease of administering individual sites. Each customer is an independent unit with its own configuration. Preferably, no additional management framework is required beyond normal system administration and customer provisioning.

No cross-contamination between customers. All event, configuration, and performance impacts are preferably confined to individual customers. Compromises in security, the overloading of an application, or application failure preferably only affect a single site.

Isolated quality of service. The dedication of hardware preferably enables specific quality-of-service levels to be offered to individual customers according to a pre-set fee structure.

Disadvantages of dedicated hosting may include one or more of, but are not limited to:

Cost of dedicated hardware. The entry-level cost to support a customer may be a disadvantage because each site must be allocated a server and disk resources.

Administration overhead of large server farms. While the administration of dedicated hosting is typically straightforward and preferably does not require a specialized framework, it may be more difficult to perform basic tasks (e.g., software upgrades) over a large number of servers.

No flexible allocation of resources. Dedicated hosting may result in a lack of flexibility in re-allocating resources between customers. For example, in addition to the core servers for a customer, any redundant system components must also be allocated to each customer. This means sophisticated additional services may not be offered because they may not be cost effective for individual customers.

Figure 92:
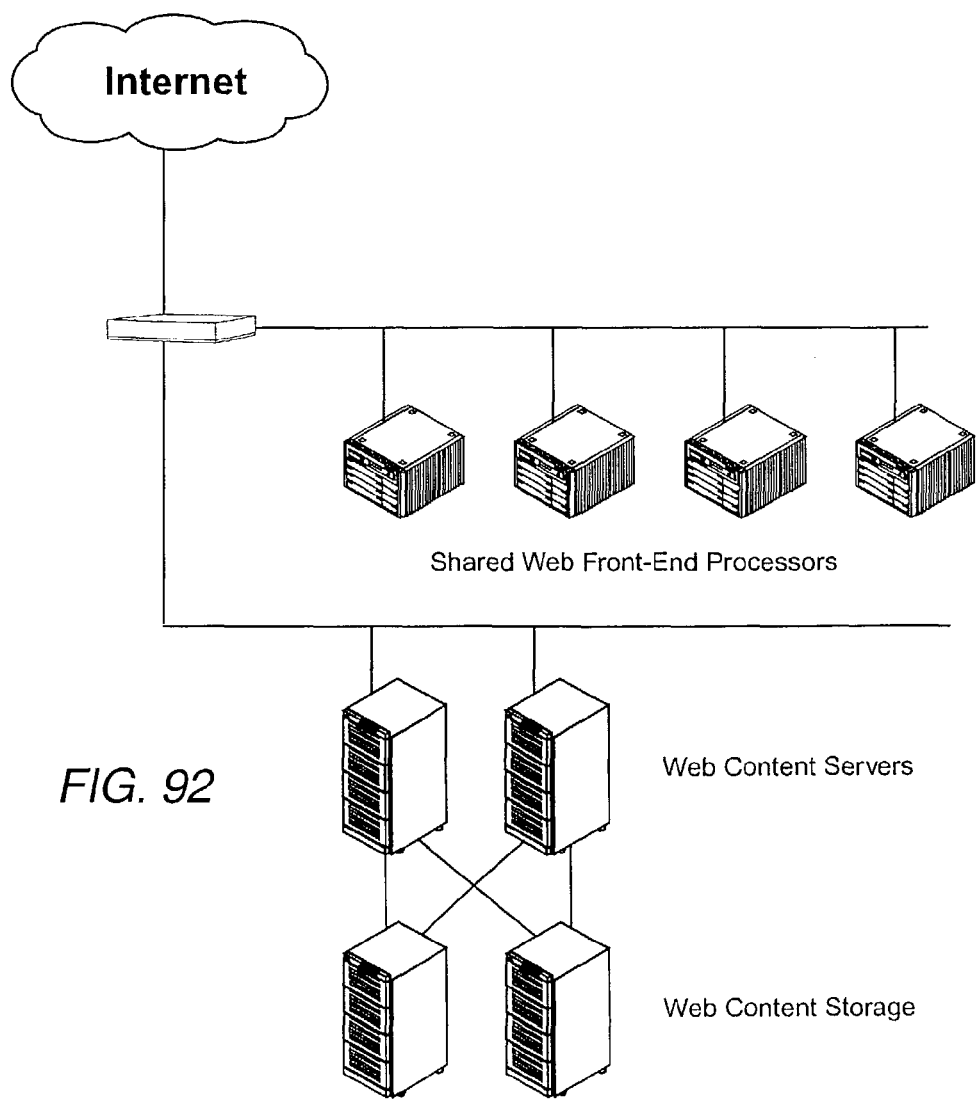
FIG. 92 illustrates an exemplary shared hosting environment according to one embodiment.

FIG. 92 illustrates an exemplary shared hosting environment according to one embodiment. A shared hosting environment preferably may exploit the economies of scale and reduced cost of ownership of larger servers and disk arrays. Individual users may require Web sites hosted with their own domain names, and Web servers may offer the capability to provide many virtual sites from one server. Shared hosting preferably provides an improved outsourcing model with additional economies of scale, lower cost of entry, and potential interoperability. Larger, more cost-effective servers and disk arrays may be utilized. Advantages of shared hosting may include one or more of, but are not limited to:

Lower cost. An advantage of shared hosting is the resulting lower cost of supporting individual customers.

Improved leverage of resources. Inherent in the shared hosting model is the ability to flexibly allocate hardware and other system resources across customers. Adding more disk resource to a customer site may be performed by changing a configuration setting for a pooled disk resource, rather than the actual installation of additional hardware.

More advanced services. In addition to lower cost for basic core hosting services, the economies of shared hosting may make it possible to offer advanced service functionality. This includes both point technologies, such as electronic commerce transactions or disk caching, as well as the ability to offer more functional application architectures.

Disadvantages of shared hosting may include one or more of, but are not limited to:

Requires special administrative framework. In general, both server hardware and application software are managed for individual customer utilization, not for shared hosting. For example, shared Web hosting may require the ability to run multiple virtual Web servers answering to different names all on one system.

Possible cross-contamination. While dedicated hosting means that one customer's problems preferably will not affect other customers, shared hosting potentially may result in a security compromise or performance problem affecting one customer affecting other customers.

Issues in site management of Web hosting facilities may include one or more of, but are not limited to: provisioning, content development, and facilities for meeting quality-of-service guarantees.

Provisioning may include various activities to create and configure a hosted customer and their environment. Dedicated hosting environments may involve significant intervention by systems support staff. Shared hosting environments may often be provisioned directly by the customer. In addition to the configuration of hardware, provisioning may include one or more of, but is not limited to: the configuration of appropriate identity and naming conventions (e.g., DNS entries, and user profiles), and the configuration of system services (e.g., billing).

Web hosting is typically provisioned directly by the ISP after the customer has selected the desired level of service and functionality. This may involve the configuration of any dedicated system resources, including the server itself, or simply the configuration of file space on a shared server for a shared hosting customer. An on-line service request form may be used to augment this process. Personal home page hosting may be implemented automatically, while more significant commercial Web site hosting may require the answers to many questions asked by a sales agent.

While basic provisioning may be accomplished using manual procedures and independent service applications, service providers may want to implement automated provisioning systems to improve this process. Automated provisioning preferably improves the speed at which the platform operator may implement services and reduces or eliminates the possibility of configuration errors. The use of automated provisioning preferably provides an audit trail of provisioning and administration activities. The delegation of certain customer care activities to the customer itself preferably reduces the platform operator's workload and enables the customer to effect and review service changes more easily. Automatic provisioning may be accomplished with custom scripts developed by ISPs. Alternatively, there may be products available that provide additional support for easy, automatic addition of hosted customers.

Self-provisioning may involve a framework and application that enables the delegation of specific provisioning capabilities to not just the ISP staff, but to customers themselves. Each delegated administrative authority may be given the ability to perform specific functions by means of a Web interface. For example, customers may change passwords without involving the sales agent or the system administrator. However, the system administrator is preferably engaged in order to create a new site.

The type of content development support offered may depend on the nature of the hosting being supported. Heavy commercial customers requiring dedicated hosting of dynamic content may preferably provide their own content creation platform. Light commercial users may preferably use content authoring support if it is offered. Vanity users preferably do not have a sophisticated content creation capability and may be offered content creation support including packages such as Home Site. For these users, ISPs may support server-side extensions such as those for Microsoft FrontPage. However, these extensions may have support, security, and performance implications to consider.

Staging involves the placement of Web content into a staging area, before it is placed on-line. This may involve the testing or analysis of the content. In addition to content creation tools, the ISP may offer log analysis capability to its commercial customers.

Quality of service is one differentiator between Web hosting services. Consideration is preferably given to controlling the quality of service offered to Web hosting clients, monitoring service levels, and managing resources. As a value-added service for which there may be additional service charges, ISPs may offer quality-of-service controls. The platform preferably includes one or more mechanisms that preferably ensure that customers get the performance for which they contract. To offer quality-of-service guarantees to customers, it may be necessary or desired for one or more of, but not limited to, the following mechanisms to be implemented: controls that limit the consumption of systems and network resources, and a measurement system that demonstrates the utilization of these resources One method of controlling the consumption of system recourses is by utilizing a multiple-tier architecture, and by partitioning services according to their relative impact on the underlying resources (i.e., resources are built to isolate load impact). Another method of controlling the consumption of system recourses is by applying system and network resource management within various systems (i.e., monitoring is used to control load impacts). These methods are discussed later in this section.

Another component of quality of service is reporting to the customer and to the platform operator's management. Metrics and statistics are preferably delivered to the customer in order to demonstrate compliance with contracted quality-of-service levels. Management reporting preferably enables the customer to determine which quality of service best suits the application while allowing the platform operator to tailor services to the customer's needs. For example, a customer who is consistently reaching their service limit is preferably offered an increased level of service and charged accordingly.

To gather sufficient information to check quality-of-service levels, it may be preferable to augment basic system monitoring with monitoring of the Web services themselves. For simple monitoring, ISPs may take advantage of basic system and network monitoring services. These services may include one or more of, but are not limited to, SNMP and native operating environment (e.g. Solaris) and server performance monitoring capabilities. Server hardware may continue to operate and fail to report alert conditions even though an application has hung or failed. In addition to basic server-level monitoring, the applications themselves are preferably monitored. In one embodiment, monitoring software may monitor the way ISP Internet services perform and appear to customers. This monitoring software may measure the performance of one or more of various Internet protocols including, but not limited to, HTTP, IMAP4, POP3, SMTP, NNTP, and LDAP (v2 and v3), and may report on performance metrics. This monitoring software may provide the administrator with information needed to take action before a service fails or degrades to an unacceptable level. For example, monitoring software may be configured to attempt an email or a specific URL request at user-defined intervals. It then reports the elapsed time for response, or if the service is even running (service failures may generate an email alarm to the administrator).

Additionally, monitoring software may trap response-time data and help the administrator to identify trends in service performance. For example, a plot of mail server performance showing an upward trend in response time may indicate the need to add additional server resources. In one embodiment, monitoring software clients may be started manually or automatically at remote locations, for example through a browser interface. ISPs may determine which services to test, which data to send and get, and how frequently the tests are to be made. After the information is collected, the results may be stored in files to allow loading into other graphical packages. As a result, monitoring software preferably increases the ability to meet customer-specific service-level agreements by giving information about network services before problems arise, preferably ensuring that a contracted quality of service is delivered.

Delivering specific service levels may be achieved by one or more of, but not limited to, the following mechanisms: partitioning services, carefully managing server resources, and allocating specific levels of bandwidth to customers.

In service partitioning, services may be separated according to their logic boundaries, such as Web server, application server, and database server, and then arranged in a multi-tier configuration on the available hardware. For example, there are several different types of application execution platforms including, but not limited to, CGI, JavaScript, Java servlet, and application server. It may be preferable to separate these platforms for reasons of performance, security, and feature set. For example, the CGI execution platform may preferably be separated from other application servers since this type of Web application presents specific concerns with respect to security. Therefore, CGI programs are preferably executed on their own server or a cluster of servers dedicated to this purpose.

Controlling resources within a shared server may be preferable in order to guarantee quality of service. In one embodiment, a resource manager may provide the ability to control and allocate one or more of, but not limited to: CPU time, processes, virtual memory, connect time, and logins. This control may be applied on a fine-grained, hierarchical basis, preferably making it possible to define a resource pool for each customer Web site. Each pool may be allocated a predefined portion of the available system resources. A resource manager preferably ensures, for example, that applications running on behalf of one customer Web site will not consume more than the predetermined amount of CPU and memory. This mechanism preferably allows applications belonging to other Web sites to run without being starved of resources.

Another capability of a resource manager may be to define hierarchical relationships between resource pools. Resources may be assigned to a parent pool that includes a number of subordinate pools, or children. The parent may be assigned resources as usual. The child pools may be assigned resources from the parent pool. This technique may be useful, for example, for creating classes of service. The parent represents the overall class of service and the children represent the individual customers that belong to the class.

A resource manager preferably ensures a fair sharing of the available system resources over hosted applications. With this system component, ISPs may preferably control costs and server resource consumption using methods similar to those found on costly mainframes. Multiple applications, groups, and individual users may be preferably provided with a consistent level of service on a single server. By dynamically allocating unused CPU capacity and virtual memory, resource utilization may be preferably increased. Systems are preferably easier to manage because of the ability to set and enforce policies that control how system resources are utilized, preferably ensuring that customers will receive the assigned service level within a shared resource environment.

Another method that may be used to provide quality service is to deploy a network-caching infrastructure. ISPs may place caches in their distributed Web hosting centers to preferably provide improved response time and to preferably level out peaks in user demand cycles.

Quality of service preferably starts with a reliable, scalable, high-performance network operating environment that can preferably quickly and safely deliver required services, and preferably enable customers to proactively manage their ISP-provided bandwidth and service-level agreements. A resource manager may provide system resource allocation that does not strictly control the use of network resources; however, without some control over the consumption of bandwidth, an application may consume excessive network resources.

In one embodiment, a bandwidth manager may perform a function similar to a resource manager, but may be specifically designed to allocate network bandwidth, ensuring a fair sharing of the network bandwidth available to each Web server. This preferably provides ISPs with a mechanism to deliver upon service-level agreements set with customers. Bandwidth allocation may be critical in the Web server front-end, since the bulk of network resources may be consumed by the delivery of static content. Users typically consume static content at a greater rate than they consume content resulting from the execution of applications. The Web server front-end may be more efficient at delivering content than applications in the middle tier and may therefore be the chief consumer of Internet and intranet bandwidth. A bandwidth manager may preferably limit the network bandwidth consumed by each customer's virtual Web server to thus provide fair sharing of the bandwidth. A bandwidth manager may also provide an effective solution for networks requiring or desiring regulation of internal bandwidth.

Because it involves customer access to content servers, an ISP's Web hosting environment is preferably part of a comprehensive security strategy. This strategy may include both the implementation of security features including firewalls, as well as a security policy.

Figure 93:
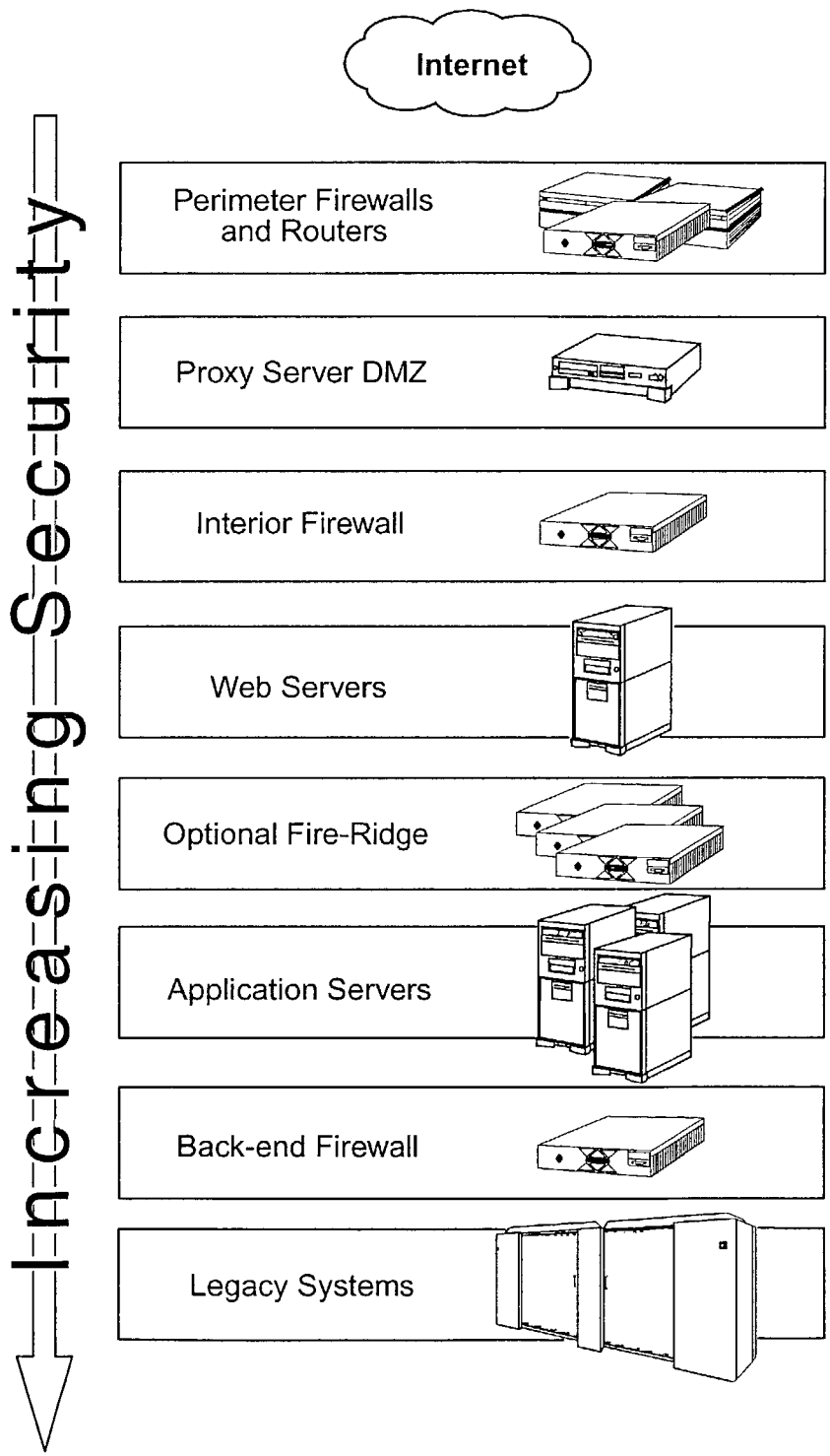
FIG. 93 illustrates security zones separated by firewalls according to one embodiment.

The implementation of the security policy may be facilitated over the ISP infrastructure in general, and the Web-hosting environment in particular, by dividing the systems architecture into security zones. FIG. 93 illustrates security zones separated by firewalls according to one embodiment. Security zones may be separated by firewalls, with consideration given to the accesses allowed from one layer to the next. A security zone may be defined as a collection of system, content, and processes that require the same, or similar, level of protection. Security zones may be used to compartmentalize access to systems by users authorized to update content. Security zones may be separated by firewalls that filter traffic entering and exiting the platform. In one embodiment, only authorized protocols, and source and destination addresses are accepted. All other attempted connections may be dropped, and the firewall software may generate log messages.

Although the Internet may be the least secure layer in the security model, and the legacy systems the most secure, the model may become divided when the legacy systems represent services such as stock ticker feeds that may be susceptible to outside intrusion. In this case, the Web hosting infrastructure is preferably protected from the legacy systems, with the backend firewall and optional fire-ridge providing the needed protection.

In addition to the careful deployment of firewalls, additional precautions may be taken, including one or more of, but not limited to:

Server hardening. Each server is preferably pruned of any unnecessary programs, services or configuration options. In addition, all security-related operating system and application patches are preferably installed.

Cryptographic file system integrity testing. Automated processes may be used to test the integrity of files and institute permissions. For example, several times a day, a cryptographic (MD5) signature may be computed for each critical system or application file. These signatures may be compared to a set of "known good" signatures stored in a read-only file system.

Event logging. System and application event messages are preferably forwarded to a centralized log facility.

Threat detection and risk mitigation. One or more public domain or other programs may be used to test systems periodically for known security weaknesses. Such programs are preferably run on a frequent basis.

Penetration testing. Security policies and their implementation may be most effective when augmented by periodic penetration testing by an outside service.

For Web applications that require authentication and encryption, centralized LDAP directory servers may be used to authorize users and applications. This directory service may allow for traditional password challenges as well as verification by way of digital certificate. In order to support authentication via X.509 certificate, the client browser and/or the server typically must obtain a digital certificate from a certificate authority (CA). Various commercial and non-commercial organizations generate and provide custody for digital certificates. In other cases, the ISP may establish their own certificate authority in order to maximize control over the issuance, custody, and revocation of certificates.

Encrypted Web site sessions using the Secure Socket Layer (SSL) are possible, with client-side and server-side certificate-based authentication (i.e. X.509) as necessary. Secure communication may include, but is not limited to, the following components: authentication, data concealment, and integrity. SSL may offer authentication based on a secure exchange of digital certificates and session encryption. Users selecting a secure page or site are directed to a Web server that supports SSL. Since the encryption process associated with supporting an SSL connection may be a drain on the Web server in terms of resources, it may be preferable to dedicate separate server systems to handle SSL sites. These front-end servers may be outfitted with additional CPUs or even hardware-based encryption accelerators, if desired.

Local ISP Configurations

Figure 94:
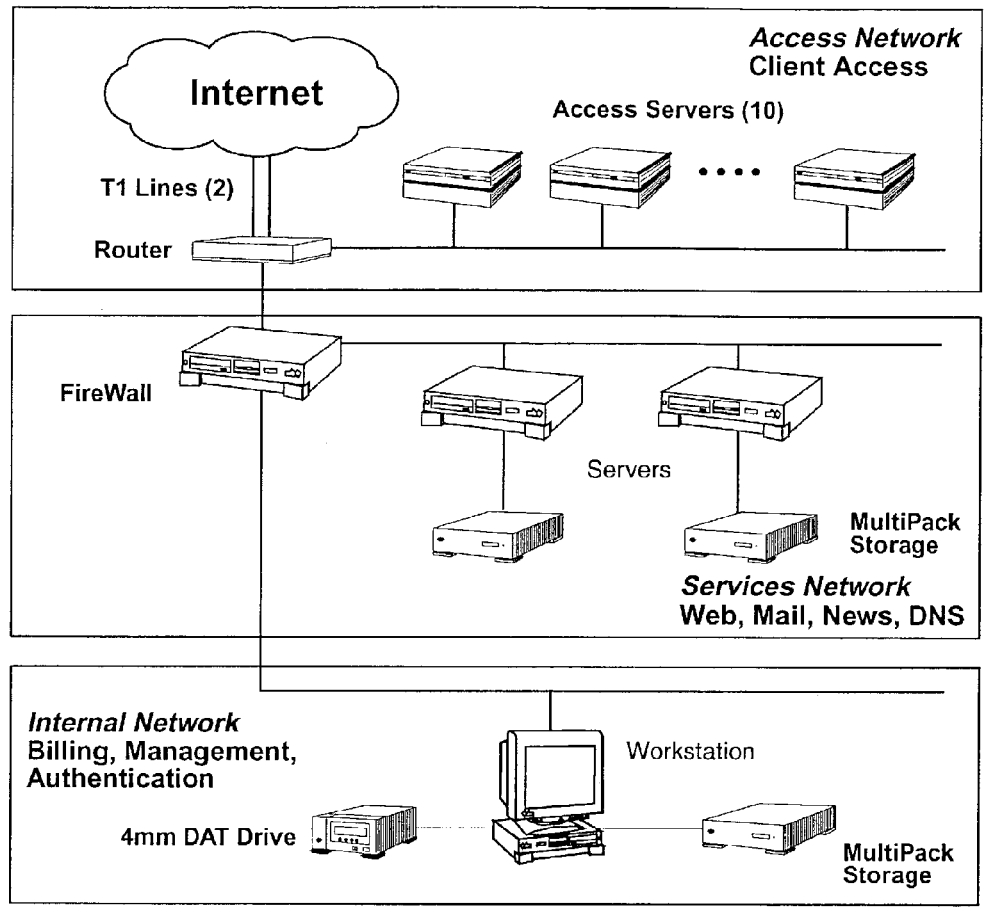
FIG. 94 illustrates an exemplary local ISP architecture according to one embodiment.

FIG. 94 illustrates an exemplary local ISP architecture according to one embodiment. Local ISPs typically handle between 5,000 and 10,000 subscribers. With a concurrency rate of, for example, 10 percent, this requires accommodating a maximum 500 to 1,000 simultaneous users. An exemplary local ISP architecture is described that may be considered typical of such architectures, and that may be used as a prototype or template for those considering entering the ISP market with approximately 5,000 subscribers. Local ISPs may use off-the-shelf products to configure services and quickly come on-line. Compromises in areas such as performance and security may be made to reduce costs; however, even with low-cost configurations such as the exemplary configuration discussed in this subsection, additional servers and CPUs that are more powerful may be added as needed.

Local ISPs may use standard tools to deploy small networks, often with entry-level servers. Although performance and reliability may be considerations, local ISPs may be able to tolerate compromises including one or more of, but not limited to:

Standard Tools. Local ISPs may use many standard (e.g. UNIX) tools and off-the-shelf software. The choices may range from standard utilities provided with an operating environment to more sophisticated packages that may preferably ensure future scalability.

Small Configurations. Local providers tend to use networks with a small number of servers to achieve maximum functionality at low cost.

Entry-Level Servers. Local ISPs may deploy low-cost, entry-level servers while preferably maintaining the ability to upgrade to more high-performance servers as needed.

Single Points-of-Failure. Compromises may be made in these ISP architectures, which may leave open areas in which a single failure may bring down some or all of the ISP's operations.

The exemplary architecture described in this subsection reflects a choice to provide a reasonable level of service at a low cost. The exemplary architecture's capabilities may be improved depending on particular performance, reliability, flexibility, and security needs, and the exemplary architecture may be scaled down if it is necessary or desired to further reduce costs or to handle fewer subscribers.

A local ISP architecture such as the exemplary architecture illustrated in FIG. 94 may include a set of sub-networks isolated by firewalls. In one embodiment, a local ISP may include a server (e.g. an Enterprise 5S server) configured with firewall software (e.g. SunScreen EFS software) and a preferably low-cost Ethernet card (e.g. a Quad FastEthernet™ card) that provides security and isolation between three basic networks. The access network may provide connectivity to the ISP from the Internet and from dial-up users, as well as routing between dial-up users and the Internet. The services network may provide mail, netnews, and Web access. Additionally, the domain name service visible to subscribers and the outside world may be hosted in this network. The internal network may provide authentication, billing, and network management services, and typically is the most protected sub-network in the ISP design.

The core of the access network is a router that handles network traffic to and from the Internet over a redundant pair of T1 connections. This Internet connectivity may provide an aggregate bandwidth of approximately 3 Mbps, and the two connections preferably attach to the Internet through two different providers to reduce the chance that a single network failure would cut off all outside access.

Dial-up access may be provided by a set of access servers, for example ten access servers that provide a total of 480 dial-up connections, sufficient for 4,800 dial-up subscribers at a 10 percent concurrency rate. Note that the access network enters the ISP facility through the core router to enable packet filtering between both dial-up and Internet users and the services network. The access network may be scaled to support more dial-up customers by adding more access servers. Configuring a redundant pair of routers so that a failure at this point preferably does not curtail Internet access may increase reliability.

Although this network is configured for dial-up users, the set of access servers may be replaced with access devices for different media including, but not limited to, wireless, satellite, and cable. Choice of media may affect ISP sizing, and is preferably considered if different head-ends are configured. For example, a dialup network such as that illustrated in FIG. 94 may have a built-in load limit; for example, it may be physically impossible for more than 480 subscribers to be connected at one time.

In contrast, cable company ISP subscribers are typically always attached through cable modems. For cable providers, it may be more difficult to limit peak workloads, and experience shows that cable ISP subscribers typically use ISP services more heavily than dial-up subscribers.

Because of the shortage of Class B and Class C addresses, some ISPs configure dial-up users with private IP addresses, translating them to public addresses as requests are passed to the Internet. This preferably allows sharing of a large number of private addresses on a small set of official, public IP addresses. This functionality may be added to this network by connecting the collection of access servers to a separate subnet attached to the firewall.

Note that the network diagram of FIG. 94 is a logical perspective that does not include the physical wiring details of the ISP. An Ethernet hub or switch may be needed for each of the three independent sub-networks. Small ISPs typically use Ethernet hubs in order to minimize costs. There are performance and security issues with hubs, however, making switched Ethernet connectivity preferable. Because Ethernet switches transfer packets only between source and destination interfaces, collisions may be minimized and throughput enhanced. This may have a security implication. In switched Ethernet configurations, each host sees only packets directed to it, not to any other hosts. If an intruder manages to compromise security on one host and attempts to snoop the network using promiscuous mode on the interface, packets destined for other hosts cannot be observed.

Although this network may be based on 10 Mbps Ethernet, it may be preferable to use 100 Mbps Ethernet backbones for ease of scalability. With many servers having 10/100 Mbps Ethernet as standard equipment, the incremental cost of hubs and router interfaces may be worthwhile.

The services network preferably provides ISP services to subscribers including one or more of, but not limited to: mail, netnews, and Web services. The services network is populated with two servers (e.g., Ultra 5S servers), disk storage, and one internal 4 mm DAT drive for backups using third-party backup software. The news server may, for example, be an Ultra 5S server configured with 128 MB memory, and 25 GB of disk space in an external storage pack. News software may be public domain Inter-Network News (INN) or commercially supported products such as Sun™ Internet News Server™. This host acts as a primary DNS server. The mail and Web server may, for example, be an Ultra 5S server configured with 128 MB memory and 25 GB of external disk space. This disk space allows for more than 2 MB per user for mailboxes, and 4 MB for each hosted Web page, assuming 10 percent of users host Web pages. Services on this host may be provided, for example, with Sun™ WebServer™ and Sun™ Internet Mail Server™ or similar products. This host acts as a secondary DNS server.

The allocation of services to these two servers may be somewhat arbitrary. The ISP's strategic business goals and expected workload are preferably used to determine the actual allocation at deployment time. The starting point given in this example was used because netnews typically has a heavy, constant bandwidth requirement that may limit the ability of the mail and Web services to handle the peak demands of their services. The 4 mm backup drive may be configured on the mail/Web server because backups for mail may be more important than for netnews. The Multi-Disk packs for each of these servers may be configured on their own Fast/Wide SCSI chain for performance and ease of configuration. At additional cost, a high-capacity DLT drive may be substituted for the DAT device. With a capacity of up to 20 GB, the DLT drive may reduce the amount of operator involvement necessary for backups.

The services network may be scaled up or down depending on the expected number of subscribers and the workload the ISP expects to encounter. Horizontal scaling is one possibility to consider in the services network. An additional server may be added to allow mail, news, and/or Web services to be hosted on separate systems. It may be possible to scale down to a single server; however, the existence of at least two hosts preferably ensures that the failure of one server does not bring down all of the ISP's services. Vertical scaling may be secondary to horizontal scaling in such a small configuration. A flexible starting point for this network may be to use two servers that support multiprocessors. As performance requirements dictate, additional processors may be added to each server as needed.

Reliability of the services network may be improved by the addition of more servers, more reliable storage subsystems, and high-availability clusters. Adding a third server may allow each service to be independently partitioned onto its own host. This may preferably ensure that the failure of a single server may cause the ISP to lose only that function, and users could still access the remainder of the ISP's services.

Figure 95:
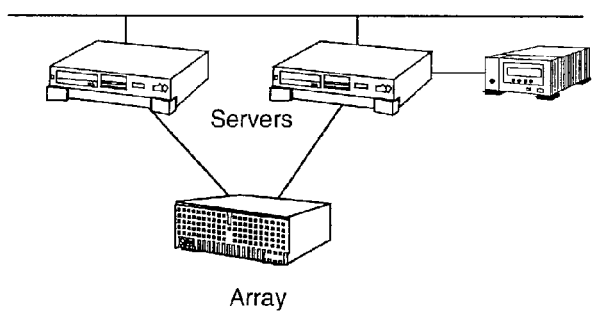
FIG. 95 illustrates adding reliability with a dual-ported array according to one embodiment.

The storage systems specified in the services network may be low-cost multi-disk packs where the failure of a single disk has the potential to make the server unavailable. An upgrade to this storage solution may be to use a unit with RAID capabilities of a Sun to eliminate the disk farm as a single point-of-failure. FIG. 95 illustrates adding reliability with a dual-ported array such as a SPARC storage array according to one embodiment. A single array may be deployed and configured with separate sets of disks reserved for each host. Using the dual-porting feature of the array, one set of disks may be accessed by each server. This may provide an initial, low-cost way to bring RAID technology to a local ISP. Alternatively, each server may be configured with its own array, eliminating the possibility that a single controller failure on an array might bring down both servers. This configuration may also provide for growth in disk space without changing the nature of the storage architecture.

Figure 96:
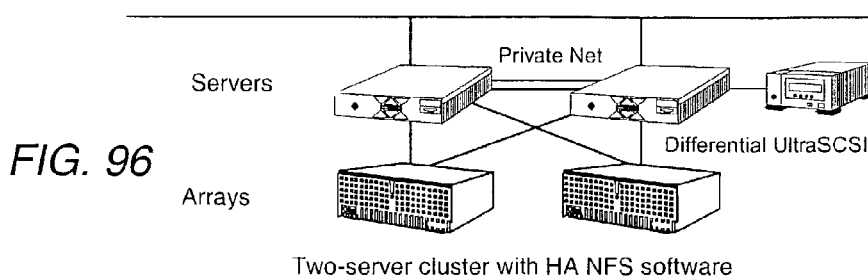
FIG. 96 illustrates adding reliability using a cluster according to one embodiment.

FIG. 96 illustrates adding reliability using a cluster according to one embodiment. In one embodiment, the cluster may be based on two Sun Ultra 2 Servers configured with high-availability NFS software. Other embodiments may use other combinations of servers and software. In one embodiment, an approach is to deploy Sun Cluster HA-ready Internet software. The cluster may be configured, for example, with two Ultra 2 servers and a pair of cross-connected StorEdge A1000 disk arrays. A private pair of network connections preferably allows each server to reliably monitor the status of the other server. Each array may be configured with two sets of disks, one for each connected server. Each set is configured as a RAID device, and mirroring may be used to keep a consistent image of each partition on both arrays.

Referring again to FIG. 94, the internal network is where the business operations for the ISP take place. In one embodiment, in a local ISP installation, one workstation may be used for authentication, billing, network management, and problem tracking. Because this network may include mission-critical data for the ISP, it is preferably protected accordingly. Some ISPs may have additional authentication servers outside of the internal network so that network traffic can be restricted to pass between the internal network and the services network only.

There are available software solutions for authentication and billing. There are also available software solutions for network management, backup, and customer service functions. Network management may be provided with tools such as Sun Enterprise SyMON and HP OpenView. Other third-party tools may be used for backups and for streamlining help desk support.

In one embodiment, the administration system is a workstation (e.g. an Ultra 5 workstation) with, for example, 25 GB of external storage for billing software and data, and a 4 mm DAT drive for backups. As the ISP subscriber base grows, more workstations may be added to the internal network; each may host separate functions.

Regional and National ISPs

Regional Internet Service Providers typically handle between 50,000 and 75,000 subscribers. National ISPs typically begin with a base of 150,000 subscribers, and may to scale to millions of subscribers. As a rule, these ISPs may utilize many or all of the architectural techniques discussed above section titled Architectural Principles. Ways in which these techniques may be applied to regional and national ISPs are discussed here. Regional and national Internet Service Providers may be faced with using highly scalable software package, as well as developing custom software and unique architectural solutions to the problems of scaling to large numbers of subscribers. Performance, reliability, and security may be important considerations, and these ISPs preferably do not accept compromises.

Regional ISPs tend to have larger, more complex networks for handling between 5,000 and 7,500 concurrent users with preferably reasonable performance and a preferably high degree of security. These networks are typically custom-designed, and may vary significantly depending on the kinds of services to be provided. Characteristics of regional ISPs may include one or more of, but are not limited to:

Custom Tools. Most standard UNIX utilities have limited capabilities for handling more than 50,000 subscribers, so specialized packages and homegrown software solutions may be used.

Scalability. A growth rate of even a few percent may result in an additional thousand subscribers, so scalability is typically an important concern for regional ISPs. These networks preferably support fast and easy configuration of additional servers to maintain performance at a target level. Ethernet using 10BaseT is no longer sufficient; 100BaseT and gigabit Ethernet are the rule throughout these networks.

Reliability. Reliability is typically a priority for regional ISPs. These ISPs are often owned by large organizations, for example telephone companies, that do not want the publicity of network failures to tarnish their reputations in other service areas.

Importance of Processes. At some number of subscribers (e.g., 20,000), the administration costs of an ISP may peak. Beyond this point, in the realm of the regional ISPs, it may be preferable to establish automated operating procedures, which may include, but are not limited to, subscriber sign-up and preconfigured tools such as Netscape Communicator with settings for their network. The savings in support costs preferably make it possible to provide these packages to subscribers at no cost. Automated help desk software may help to track customer problems and preferably ensure timely problem resolution.

Regional ISPs may extend their services across many local calling areas, making it preferable to have Points-of-Presence (POPs) in a wide range of geographical locations. These ISPs typically prefer remote routers and modem banks that connect through high-speed lines (e.g., T1, T3, and ATM) to a single core service center. These POPs preferably operate in unattended, "lights-out" mode, and may require telco-grade equipment.

National ISPs serving more than 150,000 subscribers inherit all of the issues of regional ISPs, and their large size tends to raise additional issues. National ISPs may provide scalable architectures using several methods. In one method, centralized architectures may be designed with unattended POPs. Alternatively, centralized architectures may replicate regional-sized networks across the country with central control of administration and billing. Network traffic is such that even 100 Mbps Ethernet may not be able to handle all of the ISP's traffic, and sub-networks are preferably designed to ensure that no single segment of 100 Mbps Ethernet becomes overloaded.

As failures in these ISP networks frequently receive national news coverage, reliability may be a matter of public credibility. National ISPs preferably have high-availability networks that may be dynamically reconfigured to work around outages in parts of the network.

In order to reach more subscribers, national ISPs may form alliances with other ISPs, allowing subscribers to dial-in using another ISP's points of presence. Using an integrated authentication network, a roaming user may gain access through leased lines back to the national ISP services.

Because of the huge volume of Internet traffic that may be generated by even a small percentage of subscribers accessing the same resources on the World Wide Web, a layer of caching servers may be deployed in regional and national ISP networks. These servers cache frequently-accessed Internet data, including that transmitted with the HTTP, FTP, RSTP, and NNTP protocols, and respond to subscriber requests with cached information. Caching preferably network latency and may reduce Internet bandwidth requirements.

Figure 97:
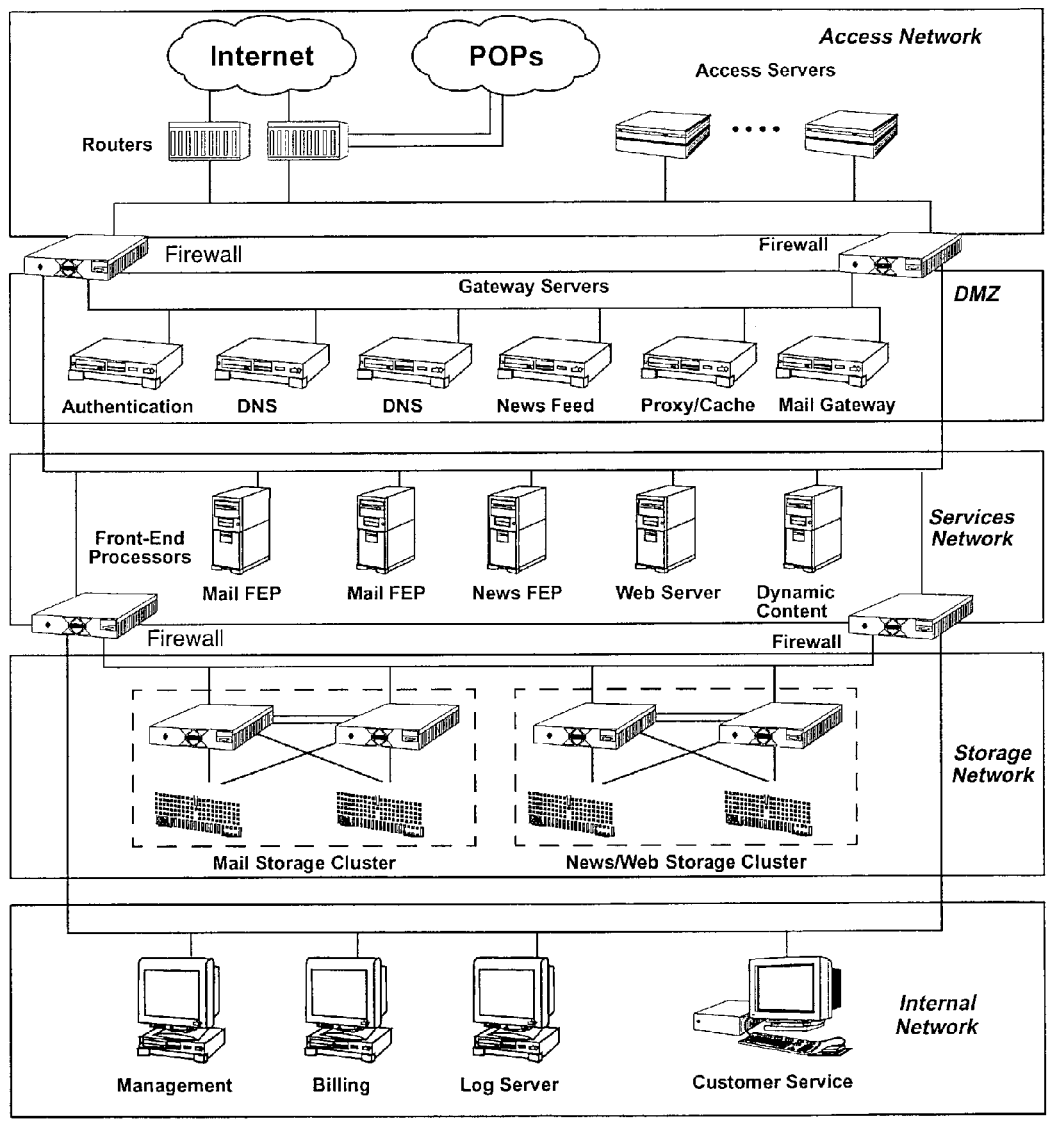
FIG. 97 illustrates an exemplary regional ISP network architecture according to one embodiment.

FIG. 97 illustrates an exemplary regional ISP network architecture according to one embodiment. The exemplary architecture illustrates a fully configured regional Internet Service Provider network along with some of the features that are found in national ISP configurations. This architecture features mail, news, and Web services decomposed by service, task layer, and by special function. This approach preferably supports scaling up to the national ISP range. Security may be enhanced by inserting firewalls between task layers, for example between front-end processors and storage systems. This ISP configuration may include separate sub-networks with inter-subnetwork traffic controlled by firewalls.

The access network connects the ISP to the Internet as well as to residential and business subscribers. There may be local modem pools and connections to points-of-presence which may be unattended installations of modem banks, routers, and high-speed connections to the core installation. The access network may be attached to the demilitarized zone (DMZ) through a redundant pair of firewalls providing both reliable and secure connectivity. In one embodiment, the firewalls may be single-processor servers hosting firewall software for optimum scalability. The servers may be upgraded with an additional processor as bandwidth requirements dictate. In this example, the DMZ may include feed servers that handle incoming mail and news, a proxy/cache server that caches requested Web pages and acts as a proxy for outgoing Internet requests, and a pair of DNS servers, one primary one secondary.

The access network may include a redundant pair of routers that manage T3 connections to the Internet and high-speed connections to the POPs. Access servers may manage modem pools and handle user authentication with the authentication server in the DMZ. In one embodiment, this, and all other networks in this ISP architecture, may be supported with 100BaseT Ethernet. In one embodiment, the access network may be scaled by adding one or more additional basic components.

The Demilitarized Zone (DMZ) may provide a first line of defense against intrusion, and preferably gives low latency access to services. In one embodiment, the hosts in this exemplary network may be servers (e.g., Ultra5S servers) with standard 10/100 Mbps Ethernet interfaces. The workload on these systems may not be as critical as the decomposition of the different services onto separate hosts.

Domain Name Service (DNS) servers may provide load balancing to the services network through round-robin DNS. Deploying load-balancing routers to allocate each request to the most lightly loaded server, thus preferably ensuring uniform response times for DNS requests, may enhance this capability.

The authentication server may communicate with local and POP-based access servers to provide user access to the network. Failure of this single server may potentially bring the ISP down, so a preferred upgrade to the DMZ is to integrate multiple servers using a cluster configuration.

The mail gateway server may use Secure Mail Access Protocol (SMAP) to receive mail and store it to a file for later transfer to the mail storage server using SMTP. Initial acceptance of mail using SMAP may be preferable to using the sendmail daemon because the SMAP daemon does not actually deliver the mail, making the mail service preferably more resistant to penetration. The mail gateway may be scaled by adding a second server and using load-balancing techniques, or by using mail server software which can partition the user workload using configuration information provided by an LDAP server.

The news feed server may receive articles from upstream news feeds and deliver them to the news storage server; additional servers may be added as necessary or desired. Since failure of this server may only cause a delay in articles due to queuing on the upstream side, it may not be necessary to duplicate this server.

The proxy/cache server filters outgoing Web requests and caches incoming data so that multiple subscribers accessing the same Web page receive the latest information from the cache, preferably reducing the demand for Internet bandwidth while simultaneously improving quality of service for subscribers. Exemplary proxy/cache servers include, but are not limited to: the Inktomi Traffic Server and the public domain SQUID packages.

The services network may include a set of front-end processors, each supporting a single service. Each service may be hosted on a single or multiple hosts with load balancing routers to distribute the load. Decomposition by special function may be used. In one embodiment, the dynamic content generation function may be split from the Web front-end processor onto a specially tuned server.

The services network may include a set of front-end processors (FEPs) that provide user access to mail, news, and Web services. These processors may be configured to run their assigned services, however they typically do not include data, but instead access mail, news, and Web pages from the storage network. This services network may include a dynamic content server to aid in the Web front-end processor's ability to generate dynamic Web pages. In this architecture, the front-end processors do not hold any user data, preferably simplifying horizontal scaling. Servers may be added by reconfiguring DNS to include them in a service group, or alternatively by configuring load-balancing routers. Using load balancing routers, a collection of mail front-end processors may be addressed with a single address like mail-.isp.net, with the router translating the address to the least heavily-loaded server each time that a request is made.

The storage network may be connected to the services network by a pair of redundant firewalls. This network may include two servers running high-availability content-management software that provides data to the front-end processors. Two firewalls removed from the Internet, this back-end network is preferably highly secure. The storage network may include two sets of servers configured as clusters running high-availability software, e.g. NFS software. Each cluster may include a pair of single-processor servers dual-attached to disk storage units. Configured with RAID and mirroring, these clusters preferably quickly detect and recover from the failure of any hardware, network, operating system, or application software component. The storage network may include high-availability content clusters, for example one for mail, and another for news and Web page storage. The host systems are preferably servers with the capability to accommodate additional processors; additional vertical scaling may be achieved by upgrading to multi-processor capable servers. Horizontal scaling may be accomplished with the addition of separate clusters for each service, and/or by partitioning some services (such as mail) across multiple clusters.

The internal network may include several hosts, for example for operations, management, and customer service. The internal network for this exemplary ISP includes three desktop workstations. One is used for management functions, one for billing, and one for logging activities on the four firewalls. A log server may collect log information from each of the firewalls, preferably ensuring that any intrusion attempts are traceable. A customer service system (e.g., a Sun JavaStation™ network computer) may provide access to customer service functions, preferably providing low-cost access to applications (e.g., Java technology-enabled applications).

Many regional and national ISPs are telephone companies that may require servers to conform to strict central office configuration and environmental requirements. In telco environments, the servers described above may be upgraded to single- and dual-processor servers tailored for telco ISPs.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
obtaining, by an Internet Service Provider (ISP) architecture development mechanism implemented on one or more computer devices:
a set of design requirements that define at least functional requirements for an ISP architecture that defines an overall structure of a potential Internet Service Provider (ISP) to provide Internet access to customers of the potential ISP; and
one or more architectural principles to be applied to the ISP architecture, wherein the one or more architectural principles include design considerations for scalability, availability, or security of the potential ISP;
generating, by the ISP architecture development mechanism, the ISP architecture according to the set of design requirements and the one or more architectural principles, wherein said generating the ISP architecture comprises:
generating an architectural model for the ISP architecture according to the set of design requirements and the one or more architectural principles, said generating the architectural model comprising:
determining a plurality of core components for the ISP architecture according to the set of design requirements and the one or more architectural principles, wherein the plurality of core components include one or more ISP services to be provided to customers of the potential ISP and one or more of an operating environment or an operating platform;
in response to generating the architectural model, generating a logical design for the ISP architecture according to the architectural model and the set of design requirements, said generating the logical design comprising:
defining a layered network components model of network components to implement at least the ISP services of the core components, the network components model comprising a plurality of layers including a core layer and an access layer;
in response to generating the logical design, generating a physical design for the ISP architecture according to the architectural model and the logical design, said generating the physical design comprising:

generating a capacity requirement for the ISP architecture, wherein said generating the capacity requirement for the ISP architecture comprises:
  estimating software storage capacities and memory capacities needed to implement the determined core components for the ISP architecture;
  estimating hardware server capacities needed to support software implementing the determined core components for the ISP architecture;
  estimating a number of links needed for Internet connectivity to implement the logical design of the ISP architecture;
  estimating port capacity needed for one or more types of network components to implement the logical design of the ISP architecture; and
in response to generating the physical design:
  selecting one or more specific software components for the ISP architecture that support the ISP services and core components of the ISP architecture and satisfy at least the logical design and the estimated storage capacities and memory capacities needed to implement the logical design of the ISP architecture;
  selecting specific hardware components for the ISP architecture that support the software components for the ISP architecture and satisfy the logical design, the estimated hardware server capacities and number of links needed to support software implementing the determined core components for the ISP architecture, and
  selecting one or more network components for the ISP architecture that support the core components of the ISP architecture and satisfy the logical design and at least the port capacity needed to implement the logical design of the ISP architecture, wherein network components include one or more of routers, switches, or consoles; and
generating output specifying at least the logical design, the physical design, the specific software and hardware and network components required for implementing the ISP architecture according to at least the capacity requirement, wherein the generated output is applicable to implement an instance of the ISP architecture of the potential ISP on the Internet according to the specified logical design and the generated capacity requirement for the ISP architecture;
wherein the one or more ISP services include one or more of basic services, value-added services, infrastructure services, or operation and management services, wherein:
  the value-added services include one or more of a calendar service, a search engine service, a WebMail service, a chat service, a messaging service, or an address book service,
  the infrastructure services include one or more of a Remote Authentication Dial-In User Service (RADIUS), a Domain Name System (DNS) service, a Lightweight Directory Access Protocol (LDAP) service, a Dynamic Host Configuration Protocol (DHCP) service, or a Network Time Protocol (NTP) service, or
  the operation and management services include one or more of a jumpstart service, a monitoring service, a provisioning service or a backup service.

2. The computer-implemented method as recited in claim 1, wherein said obtaining a set of design requirements for an ISP architecture comprises formulating the set of design requirements for the ISP architecture.

3. The computer-implemented method as recited in claim 2, wherein said formulating the set of design requirements comprises:
  obtaining input indicating the set of design requirements;
  evaluating the set of design requirements;
  establishing assumptions for the set of design requirements; and
  determining design tradeoffs and addressing architectural limitations in light of the evaluations of the set of design requirements and the assumptions for the set of design requirements.

4. The computer-implemented method as recited in claim 1, wherein the set of design requirements further define one or more business requirements for the ISP architecture.

5. The computer-implemented method as recited in claim 4, wherein the business requirements comprise one or more of: services requirements, service availability requirements, time to market requirements, future growth requirements, new technologies requirements, or capital investment requirements.

6. The computer-implemented method as recited in claim 1, wherein the functional requirements comprise one or more of: functionality requirements, interaction requirements, performance requirements, attributes requirements, or constraints requirements.

7. The computer-implemented method as recited in claim 1, wherein said generating an architectural model for the ISP architecture according to the set of design requirements and the one or more architectural principles comprises:
  identifying the plurality of core components for the architectural model; and
  applying the one or more architectural principles to the architectural model.

8. The computer-implemented method as recited in claim 1, wherein the operating platform includes one or more of network equipment, server systems, or storage equipment.

9. The computer-implemented method as recited in claim 1, wherein the operating environment includes an operating system and one or more operating environment tools or applications.

10. The computer-implemented method as recited in claim 1, wherein the basic services include one or more of email, Web hosting, Internet news, Internet access or File Transfer Protocol (FTP).

11. The computer-implemented method as recited in claim 1, wherein the one or more architectural principles further include design considerations for reliability, manageability, adaptability performance, or open systems.

12. The computer-implemented method as recited in claim 1, wherein said generating the logical design for the ISP architecture according to the architectural model and the set of design requirements comprises:
  defining one or more service flows for the ISP architecture.

13. The computer-implemented method as recited in claim 12, wherein the topology includes point of presence (POP) topology and internal infrastructure, wherein the internal infrastructure includes the one or more services and one or more physical servers.

14. The computer-implemented method as recited in claim 13, wherein network topology of the internal infrastructure is divided into a plurality of logical layers.

15. The computer-implemented method as recited in claim 14, wherein access through each of the plurality of logical layers is secured by one or more firewalls.

16. The computer-implemented method as recited in claim 14, wherein the plurality of logical layers includes two or more of a demilitarized zone (DMZ) network layer, a services network layer, an application network layer, a content network layer, a staging network layer, a backup network layer, or a management network layer.

17. The computer-implemented method as recited in claim 12, wherein the ISP architecture is an N-tiered ISP architecture comprising a plurality of layers, wherein said generating the logical design for the ISP architecture according to the architectural model and the set of design requirements further comprises functionally decomposing at least one of the one or more identified services into two or more of the layers of the N-tiered ISP architecture.

18. The computer-implemented method as recited in claim 12, wherein the one or more services include one or more of basic services, value-added services, infrastructure services, or operation and management services.

19. The computer-implemented method as recited in claim 12, wherein the one or more service flows include one or more of domain name system (DNS) service flow, Lightweight Directory Access Protocol (LDAP) service flow, Dynamic Host Configuration Protocol (DHCP) service flow, Remote Authentication Dial-In User Service (RADIUS) service flow, Network Time Protocol (NTP) service flow, email service flow, web hosting service flow, or news service flow.

20. The computer-implemented method as recited in claim 12, wherein the one or more network components include one or more of routers, switches, or load balancers.

21. The computer-implemented method as recited in claim 12, wherein said generating the logical design for the ISP architecture according to the architectural model and the set of design requirements further comprises configuring the one or more network components in the logical design according to a layered network components model comprising a plurality of layers.

22. The computer-implemented method as recited in claim 21, wherein each layer of the network components model is configured to be implemented with a combination of layer 2 (L2) switching devices and layer 3 (L3) routing devices.

23. The computer-implemented method as recited in claim 1, wherein said generating the physical design for the ISP architecture according to the architectural model and the logical design comprises:
generating the physical network design for the ISP architecture.

24. The computer-implemented method as recited in claim 23, wherein said generating the physical design for the ISP architecture according to the architectural model and the logical design further comprises creating an IP address schema for the ISP architecture.

25. The computer-implemented method as recited in claim 23, wherein said generating the physical network design for the ISP architecture comprises identifying one or more network components of the ISP architecture.

26. The computer-implemented method as recited in claim 23, wherein said generating the physical network design for the ISP architecture comprises generating a network design diagram that documents network components of the ISP architecture.

27. The computer-implemented method as recited in claim 23, wherein said generating the physical design for the ISP architecture according to the architectural model and the logical design further comprises generating the physical network design for the ISP architecture according to an N-tiered network architecture.

28. The computer-implemented method as recited in claim 23, wherein said generating the capacity requirement for the ISP architecture comprises:
estimating network capacity of the ISP architecture.

29. The computer-implemented method as recited in claim 23, wherein said generating the capacity requirement for the ISP architecture comprises:
estimating storage capacity for software implementing one or more of basic services, infrastructure services, operating or management services, and operating environment; and
estimating memory capacity for software implementing one or more of the basic services, the infrastructure services, the operating and management services, or the operating environment.

30. The computer-implemented method as recited in claim 23, wherein said generating the capacity requirement for the ISP architecture comprises:
estimating network bandwidth requirements;
estimating number of modems needed for dial-up access; and
estimating number of links needed for dial-up access.

31. The computer-implemented method as recited in claim 23, wherein said generating the capacity requirement for the ISP architecture comprises estimating size and specification of one or more servers for the ISP architecture.

32. The computer-implemented method as recited in claim 1, wherein said selecting specific hardware components comprises:
selecting one or more servers for the ISP architecture.

33. The computer-implemented method as recited in claim 32, wherein said selecting specific hardware components for the ISP architecture further comprises selecting hardware rack equipment for the ISP architecture.

34. The computer-implemented method as recited in claim 32, wherein said selecting one or more specific software components for the ISP architecture comprises selecting one or more of software for one or more basic services, software for one or more value-added services, software for one or more infrastructure services, software for one or more operation and management services, or operating environment software.

35. The computer-implemented method as recited in claim 32, wherein said selecting one or more specific software components for the ISP architecture comprises selecting software for one or more basic services, wherein the one or more basic services include one or more of Internet news, email, Web hosting, Internet access or File Transfer Protocol (FTP).

36. The computer-implemented method as recited in claim 32, wherein said selecting one or more specific software components for the ISP architecture comprises selecting software for one or more value-added services, wherein the one or more value-added services include one or more of a calendar service, a search engine service, a webmail service, a chat service, a messaging service, or an address book service.

37. The computer-implemented method as recited in claim 32, wherein said selecting one or more specific software components for the ISP architecture comprises selecting software for one or more infrastructure services, wherein the one or more infrastructure services include one or more of a Remote Authentication Dial-In User Service (RADIUS), a Domain Name System (DNS) service, a Lightweight Directory Access Protocol (LDAP) service, a Dynamic Host Configuration Protocol (DHCP) service, or a Network Time Protocol (NTP) service.

38. The computer-implemented method as recited in claim 32, wherein said selecting one or more specific servers for the ISP architecture comprises:
- selecting server type and associated tier for one or more front-end servers, one or more mid-range servers, and one or more back-end servers;
- selecting one or more enterprise servers; and
- selecting storage hardware including data storage hardware and tape library hardware.

39. The computer-implemented method as recited in claim 32, wherein said selecting one or more specific network components for the ISP architecture comprises selecting one or more of routers, switches, load balancers, firewalls, Intrusion Detection Systems (IDSs), console servers, or Network Access Servers (NASs) for the ISP architecture.

40. The computer-implemented method as recited in claim 1, further comprising implementing the instance of the ISP architecture on the Internet as said ISP that provides Internet access to customers according to the specified logical design and the specified physical design.

41. The computer-implemented method as recited in claim 40, wherein said implementing the instance of the ISP architecture on the Internet as said ISP that provides Internet access to customers according to the specified logical design and the specified physical design comprises:
- implementing the operating platform for the ISP;
- implementing the operating system for the ISP; and
- implementing one or more services for the ISP.

42. The computer-implemented method as recited in claim 41, wherein said implementing one or more services for the ISP comprises:
- implementing one or more infrastructure services for the ISP;
- implementing one or more basic services for the ISP; and
- implementing one or more value-added services for the ISP.

43. The computer-implemented method as recited in claim 41, wherein the ISP architecture is an N-tiered ISP architecture, and wherein said implementing one or more services for the ISP comprises functionally decomposing at least one of the one or more services into two or more layers of the N-tiered ISP architecture.

44. The computer-implemented method as recited in claim 40, further comprising, prior to said implementing the instance of the ISP architecture on the Internet as said ISP that provides Internet access to customers according to the specified logical design and the specified physical design, implementing a prototype according to the ISP architecture to test and validate the ISP architecture.

45. The computer-implemented method as recited in claim 41, wherein said implementing the instance of the ISP architecture on the Internet as said ISP that provides Internet access to customers according to the specified logical design and the specified physical design further comprises implementing one or more infrastructure services for the ISP, wherein the one or more infrastructure services include one or more of a Remote Authentication Dial-In User Service (RADIUS), a Domain Name System (DNS) service, a Lightweight Directory Access Protocol (LDAP) service, a Dynamic Host Configuration Protocol (DHCP) service, or a Network Time Protocol (NTP) service.

46. The computer-implemented method as recited in claim 41, wherein said implementing the instance of the ISP architecture on the Internet as said ISP that provides Internet access to customers according to the specified logical design and the specified physical design comprises implementing one or more basic services for the particular ISP, wherein the one or more basic services include one or more of Internet news, email, Web hosting, Internet access, or File Transfer Protocol (FTP).

47. The computer-implemented method as recited in claim 41, wherein said implementing the instance of the ISP architecture on the Internet as said ISP that provides Internet access to customers according to the specified logical design and the specified physical design comprises implementing one or more value-added services for the particular ISP, wherein the one or more value-added services include one or more of a calendar service, a search engine service, a webmail service, a chat service, a messaging service, or an address book service.

48. The computer-implemented method as recited in claim 1, wherein the ISP architecture is an N-tiered ISP architecture comprising a plurality of layers.

49. The computer-implemented method as recited in claim 48, wherein the plurality of layers includes two or more of a network layer, a system layer, an application layer, or a data layer.

50. A method, comprising:
- performing, by an Internet Service Provider (ISP) architecture development mechanism implemented on one or more computer devices:
  - formulating a set of design requirements that define at least functional requirements for an ISP architecture that defines an overall structure of and components for an Internet Service Provider (ISP) to provide Internet access to customers of the ISP, the design requirements comprising;
  - obtaining one or more architectural principles to be applied to the ISP architecture, wherein the one or more architectural principles include design considerations for scalability, availability, or security;
  - generating a capacity requirement for the ISP architecture, wherein said generating the capacity requirement for the ISP architecture comprises:
    - estimating software storage capacities and memory capacities needed to implement components for the ISP architecture;
    - estimating hardware server capacities needed to support software implementing the components for the ISP architecture;
    - estimating a number of links needed for Internet connectivity for the ISP architecture;
    - estimating port capacity for routers, switches or consoles to implement at least a portion the ISP architecture; and
  - selecting components for the ISP architecture according to the set of design requirements, the capacity requirement, and the one or more architectural principles, wherein said selecting components for the ISP architecture comprises:
    - selecting a set of ISP services for the ISP architecture to satisfy one or more of the set of design requirements according to the one or more architectural principles;
    - selecting an operating environment for the selected set of ISP services, wherein the operating environment is selected to satisfy one or more of the set of design requirements according to the one or more architectural principles;
    - selecting an operating platform for the selected operating environment, wherein the operating environment is selected to satisfy one or more of the set of design requirements according to the one or more architectural principles;

generating an architectural model for the ISP architecture that includes the selected set of ISP services, the selected operating environment and the selected operating platform, wherein the architectural model provides a framework for a logical design and a physical design for the ISP architecture;

generating the logical design for the ISP architecture according to the architectural model and the set of design requirements, wherein the logical design indicates a topology for the ISP architecture and defines one or more network components for the ISP architecture;

generating the physical design for the ISP architecture according to the architectural model and the logical design, wherein the physical design specifies a physical network design for the ISP architecture and incorporates the capacity requirement for the ISP architecture;

determining a configuration of specific hardware and software components to support the set of ISP services, operating environment, and operating platform according to at least the estimated software storage capacities and memory capacities, estimated hardware server capacities, estimated number of links, and estimated port capacity;

using the configuration of specific hardware and software components, implementing an instance of the ISP architecture as the ISP on the Internet that provides Internet access to customers according to the selected set of ISP services, the selected operating environment and the selected operating platform; and generating output specifying at least the logical design and the physical design for the ISP architecture, wherein the generated output is applicable to implement the instance of the ISP architecture on the Internet according to the specified logical design and the specified physical design for the ISP architecture;

wherein the specified logical design and the specified physical design for the ISP architecture indicate hardware and software components and interconnections among the hardware and software components for implementing the instance of the ISP architecture on the Internet as an ISP that provides Internet access to customers;

wherein the set of ISP services comprise one or more value-added services, wherein the one or more value-added services include one or more of a calendar service, a search engine service, a webmail service, a chat service, a messaging service, or an address book service; or wherein the set of ISP services comprise one or more infrastructure services, wherein the one or more infrastructure services include one or more of a Remote Authentication Dial-In User Service (RADIUS), a Domain Name System (DNS) service, a Lightweight Directory Access Protocol (LDAP) service, a Dynamic Host Configuration Protocol (DHCP) service, or a Network Time Protocol (NTP) service; or wherein the set of ISP services comprise one or more operation and management services, wherein the one or more operation and management services include one or more of: a monitoring service, a provisioning service, a backup service, or a jumpstart service.

51. The method as recited in claim 50, wherein said generating the logical design for the ISP architecture according to the architectural model and the set of design requirements comprises:
identifying the topology for the ISP architecture;
identifying one or more services within the topology;
defining one or more service flows for the ISP architecture; and
defining the one or more network components for the logical design according to the identified one or more services and the logical design.

52. The method as recited in claim 50, wherein said generating the physical design for the ISP architecture according to the architectural model and the logical design comprises:
generating the physical network design for the ISP architecture; and
creating an IP address schema for the ISP architecture.

53. The method as recited in claim 50, further comprising selecting specific hardware and software components for the ISP architecture in accordance with the logical design and the physical design for the ISP architecture.

54. The method as recited in claim 50, wherein said implementing the instance of the ISP architecture as the ISP on the Internet is performed according to the logical design and the physical design.

55. The method as recited in claim 50, wherein the set of ISP services comprise one or more basic services, wherein the one or more basic services include one or more of Internet news, email, Web hosting, Internet access, or File Transfer Protocol (FTP).

56. The method as recited in claim 50, wherein the one or more architectural principles further include design considerations for reliability, manageability, adaptability, performance, or open systems.

57. The method as recited in claim 50, wherein the set of design requirements further define one or more business requirements for the ISP architecture;
wherein the business requirements comprise one or more of: services requirements, service availability requirements, time to market requirements, future growth requirements, new technologies requirements, or capital investment requirements; and
wherein the functional requirements comprise one or more of: functionality requirements, interaction requirements, performance requirements, attributes requirements, or constraints requirements.

58. The method as recited in claim 50, wherein said formulating a set of design requirements comprises:
obtaining one or more design requirements;
evaluating the obtained design requirements;
establishing assumptions for the obtained design requirements; and
determining design tradeoffs and addressing architectural limitations in light of the evaluations of the obtained design requirements and the assumptions for the obtained design requirements.

59. A method, comprising:
generating, by an Internet Service Provider (ISP) architecture development mechanism implemented on one or more computer devices, a physical design for an Internet Service Provider (ISP) architecture that defines an overall structure of an Internet Service Provider (ISP) to provide Internet access to customers of the ISP, wherein the ISP architecture comprises a plurality of core components which include one or more ISP services to be provided to customers of the ISP, wherein said generating the physical design for the ISP architecture comprises:
  partitioning the ISP architecture into a plurality of network tiers;
  determining capacity requirements for software and hardware components for the ISP architecture, wherein said generating the capacity requirement for the ISP architecture comprises:
    estimating storage capacities and memory capacities of the software components needed for the ISP architecture;
    estimating hardware server capacities needed to support software components needed for the ISP architecture;
    estimating a number of links needed for Internet connectivity for the ISP architecture;
    estimating port capacity for routers, switches or consoles for the ISP architecture; and
  determining network components for each network tier of the ISP architecture according to at least the estimated port capacity included in the determined capacity requirements, wherein the network components for each network tier include one or more of routers, switches, or load balancers;
  determining location for and number of fire ridges separating the network tiers of the ISP architecture, wherein each fire ridge includes one or more firewalls;
  determining a number of high-speed trunks for the ISP architecture, according to at least the estimated number of links included in the determined capacity requirements, that are needed to support a projected number of concurrent users of the ISP;
  determining number of network access servers (NASs) for the ISP architecture, according to at least the estimated number of links included in the determined capacity requirements, that are needed to support the projected number of concurrent users of the ISP; and
  determining one or more servers for each of one or more of the plurality of tiers in the ISP architecture, according to at least the estimated hardware server capacity included in the determined capacity requirements, wherein the one or more servers at each tier include one or more of web servers, application servers, or database servers; and
implementing an instance of the ISP architecture on the Internet according to the physical design as the ISP that provides Internet access to customers;
wherein the one or more ISP services include one or more of basic services, value-added services, infrastructure services, or operation and management services, wherein:
  the basic services include one or more of email, Web hosting, Internet news, Internet access or File Transfer Protocol (FTP),
  the value-added services include one or more of a calendar service, a search engine service, a WebMail service, a chat service, a messaging service, or an address book service,
  the infrastructure services include one or more of a Remote Authentication Dial-In User Service (RADIUS), a Domain Name System (DNS) service, a Lightweight Directory Access Protocol (LDAP) service, a Dynamic Host Configuration Protocol (DHCP) service, or a Network Time Protocol (NTP) service, or the operation and management services include one or more of a jumpstart service, a monitoring service, a provisioning service or a backup service.

60. A system, comprising:
  at least one processor; and
  a memory comprising program instructions, wherein the programming instructions are executable by the at least one processor to:
    obtain a set of design requirements that define at least functional requirements for an ISP architecture that defines an overall structure of a potential Internet Service Provider (ISP) to provide Internet access to customers of the potential ISP;
    obtain one or more architectural principles to be applied to the ISP architecture, wherein the one or more architectural principles include design considerations for scalability, availability, or security of the potential ISP;
    generate the ISP architecture according to the set of design requirements and the one or more architectural principles, wherein, to generate the ISP architecture, the programming instructions are executable by the at least one processor to:
      generate an architectural model for the ISP architecture according to the set of design requirements and the one or more architectural principles, said generating the architectural model comprising:
        determining a plurality of core components for the ISP architecture according to the set of design requirements and the one or more architectural principles, wherein the plurality of core components include one or more ISP services to be provided to customers of the potential ISP and one or more of an operating environment or an operating platform;
      in response to generating the architectural model, generate a logical design for the ISP architecture according to the architectural model and the set of design requirements, said generating the logical design comprising:
        defining a layered network components model of network components to implement at least the ISP services of the core components, the network components model comprising a plurality of layers including a core layer and an access layer;
      in response to generating the logical design, generate a physical design for the ISP architecture according to the architectural model and the logical design, said generating the physical design comprising:
        generating a capacity requirement for the ISP architecture, wherein said generating the capacity requirement for the ISP architecture comprises:
          estimating software storage capacities and memory capacities needed to implement the determined core components for the ISP architecture;
          estimating hardware server capacities needed to support software implementing the determined core components for the ISP architecture;
          estimating a number of links needed for Internet connectivity to implement the logical design of the ISP architecture;
          estimating port capacity needed for one or more types of network components to implement the logical design of the ISP architecture; and
      in response to generating the physical design:
        select one or more specific software components for the ISP architecture that support the ISP services and core components of the ISP architecture and satisfy at least the logical design and the estimated storage capacities and memory capacities needed to implement the logical design of the ISP architecture, select specific hardware components for the ISP architecture that support the software components of the ISP architecture and satisfy the logical design, the estimated hardware server capacities and number of links needed to support software implementing the determined core components for the ISP architecture, and select one or more network components for the ISP architecture that support the core components of the ISP architecture and satisfy the logical design and at least the port capacity needed to implement the logical design of the ISP architecture, wherein network components include one or more of routers, switches, or consoles; and generate output specifying at least the logical design, the physical design, the specific software and hardware and network components required for implementing the ISP architecture according to at least the capacity requirement, wherein the generated output is applicable to implement an instance of the ISP architecture of the potential ISP on the Internet according to the specified logical design and the generated capacity requirement for the ISP architecture;

wherein the plurality of core components further include one or more ISP services;

wherein the one or more ISP services include one or more of basic services, value-added services, infrastructure services, or operation and management services, wherein:

the basic services include one or more of email, Web hosting, Internet news, Internet access or File Transfer Protocol (FTP), the value-added services include one or more of a calendar service, a search engine service, a WebMail service, a chat service, a messaging service, or an address book service, the infrastructure services include one or more of a Remote Authentication Dial-In User Service (RADIUS), a Domain Name System (DNS) service, a Lightweight Directory Access Protocol (LDAP) service, a Dynamic Host Configuration Protocol (DHCP) service, or a Network Time Protocol (NTP) service, or wherein the operation and management services include one or more of a jumpstart service, a monitoring service, a provisioning service or a backup service.

61. The system as recited in claim 60, wherein the set of design requirements further define one or more business requirements for the ISP architecture, wherein the business requirements comprise one or more of: services requirements, service availability requirements, time to market requirements, future growth requirements, new technologies requirements, or capital investment requirements; and wherein the functional requirements comprise one or more of: functionality requirements, interaction requirements, performance requirements, attributes requirements, or constraints requirements.

62. The system as recited in claim 60, wherein, to generate an architectural model for the ISP architecture according to the set of design requirements and the one or more architectural principles, the programming instructions are further executable by the at least one processor to:

identify the plurality of core components of the architectural model; and apply the one or more architectural principles to the architectural model.

63. The system as recited in claim 60, wherein the operating platform includes one or more of network equipment, server systems, or storage equipment, and wherein the operating environment includes an operating system and one or more operating environment tools and applications.

64. The system as recited in claim 60, wherein the one or more architectural principles further include design considerations for reliability, manageability, adaptability, performance, or open systems.

65. The system as recited in claim 60, wherein, to generate the logical design for the ISP architecture according to the architectural model and the set of design requirements, the programming instructions are further executable by the at least one processor to:

generate the topology for the ISP architecture;

identify one or more services within the topology;

define one or more service flows for the ISP architecture; and define the one or more network components for the logical design according to the identified one or more services and the logical design.

66. The system as recited in claim 65, wherein the topology includes point of presence (POP) topology and internal infrastructure, wherein the internal infrastructure includes the one or more services and one or more physical servers.

67. The system as recited in claim 66, wherein network topology of the internal infrastructure is divided into a plurality of logical layers, wherein the plurality of logical layers includes two or more of a demilitarized zone (DMZ) network layer, a services network layer, an application network layer, a content network layer, a staging network layer, a backup network layer, or a management network layer.

68. The system as recited in claim 65, wherein the ISP architecture is an N-tiered ISP architecture comprising a plurality of layers, and wherein, to generate the logical design for the ISP architecture according to the architectural model and the set of design requirements, the programming instructions are further executable by the at least one processor to functionally decompose at least one of the one or more identified services into two or more of the layers of the N-tiered ISP architecture.

69. The system as recited in claim 65, wherein the one or more services include one or more of basic services, value-added services, infrastructure services, or operation and management services.

70. The system as recited in claim 65, wherein the one or more service flows include one or more of domain name system (DNS) service flow, Lightweight Directory Access Protocol (LDAP) service flow, Dynamic Host Configuration Protocol (DHCP) service flow, Remote Authentication Dial-In User Service (RADIUS) service flow, Network Time Protocol (NTP) service flow, email service flow, web hosting service flow, or news service flow.

71. The system as recited in claim 65, wherein the one or more network components include one or more of routers, switches, or load balancers.

72. The system as recited in claim 65, wherein, to generate the logical design for the ISP architecture according to the architectural model and the set of design requirements, the programming instructions are further executable by the at least one processor to configure the one or more network components in the logical design according to a layered network components model comprising a plurality of layers, wherein the plurality of layers of the network components model include a core layer, a distribution layer, and an access layer.

73. The system as recited in claim 60, wherein, to generate the physical design for the ISP architecture according to the architectural model and the logical design, the programming instructions are further executable by the at least one processor to:
generate the physical network design for the ISP architecture; and
generate an IP address schema for the ISP architecture.

74. The system as recited in claim 73, wherein, to generate the physical network design for the ISP architecture, the programming instructions are further executable by the at least one processor to generate a network design diagram that documents network components of the ISP architecture.

75. The system as recited in claim 73, wherein, to generate the physical design for the ISP architecture according to the architectural model and the logical design, the programming instructions are further executable by the at least one processor to generate the physical network design for the ISP architecture according to an N-tiered network architecture.

76. The system as recited in claim 73, wherein, to estimate the capacity requirement for the ISP architecture, the programming instructions are further executable by the at least one processor to:
estimate software capacity of the ISP architecture; and
estimate hardware capacity of the ISP architecture.

77. The system as recited in claim 73, wherein, to estimate the capacity requirement for the ISP architecture, the programming instructions are further executable by the at least one processor to:
estimate sever capacity of the ISP architecture; and
estimate network capacity of the ISP architecture.

78. The system as recited in claim 73, wherein, to estimate the capacity requirement for the ISP architecture, the programming instructions are further executable by the at least one processor to:
estimate storage capacity for software implementing one or more of basic services, infrastructure services, operating and management services, or operating environment; and
estimate memory capacity for software implementing one or more of the basic services, the infrastructure services, the operating and management services, or the operating environment.

79. The system as recited in claim 73, wherein, to estimate the capacity requirement for the ISP architecture, the programming instructions are further executable by the at least one processor to:
estimate network bandwidth requirements;
estimate number of modems needed for dial-up access;
estimate number of links needed for Internet connectivity;
estimate number of links needed for dial-up access; and
estimate port capacity for routers, switches and consoles.

80. The system as recited in claim 73, wherein, to estimate the capacity requirement for the ISP architecture, the programming instructions are further executable by the at least one processor to estimate size, type and specification of one or more servers for the ISP architecture.

81. The system as recited in claim 60, wherein, to select specific hardware components of the ISP architecture, the programming instructions are further executable by the at least one processor to:
select one or more servers for the ISP architecture.

82. The system as recited in claim 81, wherein, to select one or more specific software components for the ISP architecture, the programming instructions are further executable by the at least one processor to select one or more of software for one or more basic services, software for one or more value-added services, software for one or more infrastructure services, software for one or more operation and management services, or operating environment software.

83. The system as recited in claim 60, wherein, to obtain a set of design requirements for an ISP architecture, the programming instructions are further executable by the at least one processor to:
obtain input indicating the set of design requirements;
evaluate the set of design requirements;
establish assumptions for the set of design requirements; and
determine design tradeoffs and address architectural limitations in light of the evaluations of the set of design requirements and the assumptions for the set of design requirements.

84. The system as recited in claim 60, wherein the ISP architecture is an N-tiered ISP architecture comprising a plurality of layers.

85. The system as recited in claim 84, wherein plurality of layers includes two or more of a network layer, a system layer, an application layer, or a data layer.

86. A non-transitory computer-readable storage device or memory medium comprising program instructions, wherein the program instructions are computer-executable to implement:
obtaining a set of user-specified design requirements for an ISP architecture that define at least a user-desired overall structure of an Internet Service Provider (ISP) to provide Internet access to customers of the ISP;
obtaining one or more user-specified architectural principles to be applied to the ISP architecture, wherein the one or more architectural principles include user-specified design considerations for scalability, availability, or security of the ISP; and
generating the ISP architecture according to the set of design requirements and the one or more architectural principles, wherein, in said generating the ISP architecture, the program instructions are computer-executable to implement:
generating an architectural model for the ISP architecture according to the set of design requirements and the one or more architectural principles, said generating the architectural model comprising:
determining a plurality of core components required for implementing the ISP architecture according to the set of design requirements and the one or more architectural principles, wherein the plurality of core components include one or more ISP services to be provided to customers of the potential ISP and one or more of an operating environment or an operating platform;
in response to generating the ISP architecture, generating a logical design for the ISP architecture according to the architectural model and the set of design requirements, generating the logical design comprising:
determining point of presence (POP) topology and internal infrastructure for the ISP architecture, wherein the internal infrastructure includes one or more services and one or more physical servers, wherein network topology of the internal infrastructure is divided into a plurality of logical layers; and determining one or more network components required to support the internal infrastructure according to a layered network components model comprising a plurality of layers, wherein the plurality of layers of the network components model include a core layer, a distribution layer, and an access layer, wherein the one or more network components include one or more of routers, switches, or load balancers;

in response to generating the logical design, generating a physical design for the ISP architecture according to the architectural model and the logical design, generating the physical design comprising:

generating a capacity requirement for the network components, wherein said generating the capacity requirement comprises:

estimating software storage capacities and memory capacities needed to support at least the one or more services for the ISP architecture;

estimating network bandwidth requirements for the ISP architecture;

estimating a number of links needed for Internet connectivity for the ISP architecture;

estimating port capacity for routers, switches and consoles required for the ISP architecture; and estimating size, type and specification of one or more servers required for the ISP architecture;

in response to generating the physical design, selecting specific hardware and software components and interconnections among the hardware and software components for implementing the ISP architecture on the Internet in accordance with the logical design and generated capacity requirement of the physical design, wherein said selecting comprises:

selecting one or more specific software components to implement at least the one or more services for the ISP architecture according to the estimated software storage capacities and memory capacities; and selecting one or more servers to implement the ISP architecture according to at least the estimated network bandwidth requirements; and generating output specifying at least the logical design, the physical design, the specific software and hardware and network components required for implementing the ISP architecture according to at least a portion of the capacity requirement, and specific interconnections among the hardware and software components required for implementing the ISP architecture on the Internet, wherein the generated output is applicable to implement an instance of the ISP architecture on the Internet according to the specified logical design and at least a portion of the generated capacity requirement for the ISP architecture;

wherein the one or more ISP services include one or more of basic services, value-added services, infrastructure services, and operation or management services, wherein:

the basic services include one or more of email, Web hosting, Internet news, Internet access or File Transfer Protocol (FTP), the value-added services include one or more of a calendar service, a search engine service, a WebMail service, a chat service, a messaging service, or an address book service, the infrastructure services include one or more of a Remote Authentication Dial-In User Service (RADIUS), a Domain Name System (DNS) service, a Lightweight Directory Access Protocol (LDAP) service, a Dynamic Host Configuration Protocol (DHCP) service, or a Network Time Protocol (NTP) service, or the operation and management services include one or more of a jumpstart service, a monitoring service, a provisioning service or a backup service.

87. The non-transitory computer-readable storage device or memory medium as recited in claim 86, wherein the set of design requirements further define one or more business requirements for the ISP architecture, wherein the business requirements comprise one or more of: services requirements, service availability requirements, time to market requirements, future growth requirements, new technologies requirements, or capital investment requirements; and wherein the functional requirements comprise one or more of: functionality requirements, interaction requirements, performance requirements, attributes requirements, or constraints requirements.

88. The non-transitory computer-readable storage device or memory medium as recited in claim 86, wherein, in said generating an architectural model for the ISP architecture according to the set of design requirements and the one or more architectural principles, the program instructions are further computer-executable to implement:

identifying the plurality of core components of the architectural model; and applying the one or more architectural principles to the architectural model.

89. The non-transitory computer-readable storage device or memory medium as recited in claim 86, wherein the operating platform includes one or more of network equipment, server systems, or storage equipment, and wherein the operating environment includes an operating system and one or more operating environment tools or applications.

90. The non-transitory computer-readable storage device or memory medium as recited in claim 86, wherein the one or more architectural principles further include design considerations for reliability, manageability, adaptability, performance, or open systems.

91. The non-transitory computer-readable storage device or memory medium as recited in claim 86, wherein, in said generating the logical design for the ISP architecture according to the architectural model and the set of design requirements, the program instructions are further computer-executable to implement:

identifying the topology for the ISP architecture;

identifying one or more services within the topology;

defining one or more service flows for the ISP architecture; and defining the one or more network components for the logical design according to the identified one or more services and the logical design.

92. The non-transitory computer-readable storage device or memory medium as recited in claim 91, wherein the topology includes point of presence (POP) topology and internal infrastructure, wherein the internal infrastructure includes the one or more services and one or more physical servers.

93. The non-transitory computer-readable storage device or memory medium as recited in claim 92, wherein network topology of the internal infrastructure is divided into a plurality of logical layers, wherein the plurality of logical layers includes two or more of a demilitarized zone (DMZ) network layer, a services network layer, an application network layer, a content network layer, a staging network layer, a backup network layer, or a management network layer.

94. The non-transitory computer-readable storage device or memory medium as recited in claim 91, wherein the ISP architecture is an N-tiered ISP architecture comprising a plurality of layers, wherein, in said generating the logical design for the ISP architecture according to the architectural model and the set of design requirements, the program instructions are further computer-executable to implement functionally decomposing at least one of the one or more identified services into two or more of the layers of the N-tiered ISP architecture.

95. The non-transitory computer-readable storage device or memory medium as recited in claim 91, wherein the one or more services include one or more of basic services, value-added services, infrastructure services, and operation or management services.

96. The non-transitory computer-readable storage device or memory medium as recited in claim 91, wherein the one or more service flows include one or more of domain name system (DNS) service flow, Lightweight Directory Access Protocol (LDAP) service flow, Dynamic Host Configuration Protocol (DHCP) service flow, Remote Authentication Dial-In User Service (RADIUS) service flow, Network Time Protocol (NTP) service flow, email service flow, web hosting service flow, or news service flow.

97. The non-transitory computer-readable storage device or memory medium as recited in claim 91, wherein the one or more network components include one or more of routers, switches, or load balancers.

98. The non-transitory computer-readable storage device or memory medium as recited in claim 86, wherein, in said generating the physical design for the ISP architecture according to the architectural model and the logical design, the program instructions are further computer-executable to implement:
   generating the physical network design for the ISP architecture; and
   generating an IP address schema for the ISP architecture.

99. The non-transitory computer-readable storage device or memory medium as recited in claim 98, wherein, in said generating the physical network design for the ISP architecture, the program instructions are further computer-executable to implement generating a network design diagram that documents network components of the ISP architecture.

100. The non-transitory computer-readable storage device or memory medium as recited in claim 98, wherein, in said generating the physical design for the ISP architecture according to the architectural model and the logical design, the program instructions are further computer-executable to implement generating the physical network design for the ISP architecture according to an N-tiered network architecture.

101. The non-transitory computer-readable storage device or memory medium as recited in claim 98, wherein, in said generating the capacity requirement for the ISP architecture, the program instructions are further computer-executable to implement:
   estimating software capacity of the ISP architecture; and
   estimating hardware capacity of the ISP architecture.

102. The non-transitory computer-readable storage device or memory medium as recited in claim 98, wherein, in said generating the capacity requirement for the ISP architecture, the program instructions are further computer-executable to implement:
   estimating sever capacity of the ISP architecture; and
   estimating network capacity of the ISP architecture.

103. The non-transitory computer-readable storage device or memory medium as recited in claim 98, wherein, in said generating the capacity requirement for the ISP architecture, the program instructions are further computer-executable to implement:
   estimating storage capacity for software implementing one or more of basic services, infrastructure services, operating and management services, or operating environment; and
   estimating memory capacity for software implementing one or more of the basic services, the infrastructure services, the operating and management services, or the operating environment.

104. The non-transitory computer-readable storage device or memory medium as recited in claim 98, wherein, in said generating the capacity requirement for the ISP architecture, the program instructions are further computer-executable to implement:
   estimating number of modems needed for dial-up access; and
   estimating number of links needed for dial-up access.

105. The non-transitory computer-readable storage device or memory medium as recited in claim 86, wherein said selecting hardware components comprises:
   selecting one or more servers for the ISP architecture; and
   selecting one or more network components for the ISP architecture.

106. The non-transitory computer-readable storage device or memory medium as recited in claim 86, wherein, in said obtaining a set of design requirements for an ISP architecture, the program instructions are further computer-executable to implement:
   obtaining input indicating the set of design requirements;
   evaluating the set of design requirements;
   establishing assumptions for the set of design requirements; and\
   determining design tradeoffs and addressing architectural limitations in light of the evaluations of the set of design requirements and the assumptions for the set of design requirements.

107. The non-transitory computer-readable storage device or memory medium as recited in claim 86, wherein the ISP architecture is an N-tiered ISP architecture comprising a plurality of tiers.

108. The non-transitory computer-readable storage device or memory medium as recited in claim 107, wherein the plurality of layers includes a network layer, a system layer, an application layer, and a data layer.

* * * * *